United States Patent [19]

Koopman, Jr. et al.

[11] Patent Number: 5,053,952

[45] Date of Patent: Oct. 1, 1991

[54] STACK-MEMORY-BASED WRITABLE INSTRUCTION SET COMPUTER HAVING A SINGLE DATA BUS

[75] Inventors: Philip J. Koopman, Jr., N. Kingston, R.I.; Glen B. Haydon, La Honda, Calif.

[73] Assignee: WISC Technologies, Inc., La Honda, Calif.

[21] Appl. No.: 58,737

[22] Filed: Jun. 5, 1987

[51] Int. Cl.[5] .......................... G06F 9/42; G06F 9/22; G06F 13/40

[52] U.S. Cl. ................................ 364/200; 364/244.3; 364/262.7; 364/240; 364/247.7; 364/240.1

[58] Field of Search ... 364/200 MS File, 900 MS File

[56] References Cited

U.S. PATENT DOCUMENTS

| | | | |
|---|---|---|---|
| 3,215,987 | 11/1965 | Terzian | 364/200 |
| 3,629,857 | 12/1971 | Faber . | |
| 3,757,306 | 9/1978 | Boone . | |
| 3,771,141 | 11/1973 | Culler | 364/200 |
| 3,786,432 | 1/1974 | Woods . | |
| 4,045,781 | 8/1977 | Levy et al. | 364/200 |
| 4,204,252 | 5/1980 | Hitz et al. | 364/200 |
| 4,210,960 | 7/1980 | Borgerson et al. | 364/200 |
| 4,415,969 | 11/1983 | Bayliss et al. | 364/200 |
| 4,447,875 | 5/1984 | Bolton et al. | 364/200 |
| 4,491,912 | 1/1985 | Kainaga et al. | 364/200 |
| 4,546,431 | 10/1985 | Horvath | 364/200 |
| 4,615,003 | 9/1986 | Logsdon et al. | 364/200 |
| 4,618,925 | 10/1986 | Bratt et al. | 364/200 |
| 4,654,780 | 3/1987 | Logsdon et al. | 364/200 |
| 4,674,032 | 6/1987 | Michaelson . | |
| 4,719,565 | 1/1988 | Moller . | |
| 4,791,551 | 12/1988 | Garde | 364/200 |
| 4,835,738 | 5/1989 | Niehaus et al. . | |

OTHER PUBLICATIONS

"Stack-Oriented WISC Machine", WISC Technologies, La Honda, Ca., 94020, 2 pages.

BYTE 6/86, Microcoded IBM PC Board, Mtn. Vw. Press Advertisement, Haydon, MVP Microcoded CPU/16, Mountain View Press, 4 pages.

Koopman & Haydon, MVP Microcoded CPU/16 Architecture, Mountain View Press, 4 pages.

Koopman, Microcoded Versus Hard-Wired Control, BYTE, Jan. 1987, pp. 235-242.

Haydon, The Multi-Dimensions of Forth, *Forth Dimensions*, vol. 8, No. 3, pp. 32-34, Sep./Oct., 1986.

Rust, ACTION Processor Forth Right, *Rochester Forth Standards Conference*, pp. 309-315, 3/8/79.

Wada, Software and System Evaluation of a Forth Machine System, *Systems, Computers, Controls*, vol. 13, No. 2, pp. 19-28.

Wada, System Design and hardware Structure of a Forth Machine System, *Systems, Computers, Controls*, vol. 13, No. 2, 1982, pp. 11-18.

(List continued on next page.)

*Primary Examiner*—Gareth D. Shaw
*Assistant Examiner*—P. V. Kulik
*Attorney, Agent, or Firm*—Edward B. Anderson

[57] ABSTRACT

A computer is provided as an add-on processor for attachment to a host computer. Included are a single data bus, a 32-bit arithmetic logic unit, a data stack, a return stack, a main program memory, data registers, program memory addressing logic, micro-program memory, and a micro-instruction register. Each machine instruction contains an opcode as well as a next address field and subroutine call/return or unconditional branching information. The return address stack, memory addressing logic, program memory, and microcoded control logic are separated from the data bus to provide simultaneous data operations with program control flow processing and instruction fetching and decoding. Subroutine calls, subroutine returns, and unconditional branches are processed with a zero execution time cost. Program memory may be written as either bytes or full words without read/modify/write operations. The top of data stack ALU register may be exchanged with other registers in two clock cycles instead of the normal three cycles. MVP-FORTH is used for programming a microcode assembler, a cross-compiler, a set of diagnostic programs, and microcode.

9 Claims, 90 Drawing Sheets

OTHER PUBLICATIONS

Norton & Abraham, Adaptive Interpretation as a Means of Exploiting Complex Instruction Sets, *IEEE International Symposium on Computer Architecture*, pp. 277-282, 1983.

Sequin et al., Design and Implementation of RISC I, *ELSI Architecture*, pp. 276-298, 1982.

Patterson et al., RISC Assessment: A High-Level Language Experiment, *Symposium on Computer Architecture*, No. 9, pp. 3-8, 1982.

Folger et al., Computer Architectures-Designing for Speed, *Intellectual Leverage for the Information Society*, Spring 83, pp. 25-31.

Larus, A Comparison of Microcode, Assembly Code & High-Level Langauges on the VAX-11 & RISC I, *Computer Architecture News*, vol. 10, No. 5, pp. 10-15.

Castan et al., μ3L: An HLL-RISC Processor for Parallel Execution of FP Language Programs, *Symposium on Core Computer Architecture*, #9, pp. 239-247, 1982.

Koopman, The WISC Concept, *BYTE*, pp. 187-193, Apr. 1987.

Haydon, A Unification of Software and Hardware; A New Tool for Human Thought, 1987 Rochester, Forth Conference, pp. 25-28.

Koopman, Writable Instruction Set, Stack Oriented Computers: The WISC Concept, 1987 Rochester Forth Conference, pp. 29-51.

Thurber et al., "A Systematic Approach to the Design of Digital Bussing Structures", Fall Joint Computer Conference, 1972, pp. 719-740.

Philip J. Koopman, Jr., *Stack Computers-The New Wave*, 1989.

Ditzel and McLellan, "Branch Folding in the CRISP Microprocessor: Reducing Branch Delay to Zero", *ACM*, 6/2/87, pp. 2-9.

Ditzel, McLellan and Berenbaum, "The Hardware Architecture of the CRISP Microprocessor", *ACM*, 6/2/87, pp. 309-319.

Kaneda, Wada and Maekawa, "High-Speed Execution of Forth and Pascal Programs on a High-Level Language Machine", 1983, pp. 259-266.

Grewe and Dixon, "A Forth Machine for the S-100 System", The Journal of Forth Application and Research, vol. 2, No. 1, 1984, pp. 23-32.

A. C. D. Haley, "The KDF.9 Computer System", *AFIPS Conference Proceedings*, vol. 22, 1962 Fall Joint Computer Conference, pp. 108-120.

STACK-MEMORY-BASED WRITABLE INSTRUCTION SET COMPUTER HAVING A SINGLE DATA BUS

BACKGROUND AND SUMMARY OF THE INVENTION

This invention relates to general purpose data processors, and in particular, to such data processors having a writable instruction set with a hardware stack.

This invention is based upon the groundwork laid by our previous CPU/16 patent application Ser. No. 031,473 filed on Mar. 24, 1987, also assigned to the same assignee.

Since the advent of computers, attempts have been made to make computers smaller, with increased memory, and with faster operation. Recently, minicomputers and microcomputers have been built which have the memory capacity of original mainframe computers. Most of these computers are referred to as "complex instruction set" computers. Because of the use of complex instruction sets, these computers tend to be relatively slow in operation as compared to computers designed for specific applications. However, they are able to perform a wide variety of programs because of their ability to process instruction sets corresponding to the source programs run on them.

More recently, "reduced instruction set" computers have been developed which can execute programs more quickly than the complex instruction set computers. However, these computers tend to be limited in that the instruction sets are reduced to only those instructions which are used most often. Infrequently used instructions are eliminated to reduce hardware complexity and to increase hardware speed. Such computers provide limited semantic efficiency in applications for which they are not designed. These large semantic gaps cannot be filled easily. Emulation of complex but frequently used instructions is always a less efficient solution and significantly reduces the initial speed advantage of such machines. Thus, such computers provide limited general applicability.

The present invention provides a computer having general purpose applicability by increasing flexibility while providing substantially improved speed of operation by minimizing complexity as compared to conventional computers. The invention provides this in a way which uses simple, commonly available components. Further the invention minimizes hardware and software tool costs.

More specifically, the present invention provides a computer having a main program memory, a writable micro-program memory, an arithmetic logic unit, and a stack memory, all connected to a single common data bus. In a preferred embodiment, this invention provides a computer interface for use with a host computer. Further, more specifically, both a data stack and a subroutine return address stack are provided, each associated with a pointer which may be set to any element in the corresponding stack without affecting the contents of the stack. Further, there is a direct communication link between the return stack and the main program memory addressing logic, and a direct link between the main program memory and the microcode memory which is separate from the data bus. This provides overlapped instruction fetching and executing, and allows the processing of subroutine calls in parallel with other operations. This parallel capability provides for zero-time-cost (i.e. "free") subroutine calls not possible with other computer architectures.

A major innovation of the present invention over previous writable instruction set, hardware stack computers is the use of a fixed-length machine instruction format that contains an operation code, a jump or return address, and subroutine calling control bits. This innovation, when combined with the direct connection of the return address stack to memory, the use of a hardware data stack, and other design considerations, allows the machine to process subroutine calls, subroutine returns and unconditional branches in parallel with normal instruction processing. Programs which follow modern software doctrine use a large number of small subroutines with frequent subroutine calls. The impact of processing subroutine calls in parallel with other computations is to encourage following modern software doctrine by eliminating the considerable execution speed penalty imposed by other machines for invoking a subroutine.

As a result of the combination of a next instruction address with the opcode for each instruction, the preferred embodiment does not have a program counter in the traditional sense. Except for subroutine return instructions, each instruction contains the address of the next instruction to be executed. In the case of a subroutine return, the next instruction address is obtained from the top value on the return address stack. While this technique is commonly employed at the micro-program level, it has never been used in a high-level language machine. In particular, it has never been used on any machine for the express purpose of processing subroutine calls in parallel with other high level machine operations.

A consequence of the availability of "free" subroutine calls combined with a writable instruction set is a shift of paradigm from the programmer's point of view, opening the as yet unexploited possibility of new methods for writing programs. Conventional computers are viewed by the programmer as executing sequential arrangements of instructions with occasional branches or subroutine calls. Each list is conceived of as directly executing machine functions (although a layer of interpretation may be hidden from the programmer by the hardware.) In a writable instruction set computer with hardware stacks and zero-cost subroutine calls, programs are viewed as a tree-structured database of instructions, in which the "root" of the tree consists of a group of pointers to sub-tree nodes, each sub-tree node consists of another group of pointers to further nodes, and so on out to the tree "leaves" which contain instructions instead of pointers. Flow of control is not viewed as along sequences of instructions, but rather as flow traversing a tree structure, from roots to leaves and then up and down the tree structure in a manner to visit the leaves in sequential order. In the case of this preferred embodiment, the tree structure nodes consist of subroutine call pointers, and the leaves consist of effectively subroutine calls into microcoded primitives. Due to the capability of combining an instruction opcode with a subroutine call, greater efficiency is realized with this design than with what could be realized with a pure tree machine that could only execute operations or process subroutine calls (but not both) with each instruction.

A preferred ALU made in accordance with the invention has a register (the data hi register) on one input for holding intermediate results. On the other input side is a transparent latch (implemented in the preferred embodiment with standard 74ALS373 integrated circuits) that can either pass data through from the data bus, or retain data present on the bus on the previous clock cycle. This retention capability, along with the capability to direct the contents of the ALU register directly to the bus, allows exchanging the data hi register with the data stack or other registers in two clock cycles instead of the three clock cycles which would be required without this innovation. Since exchanging the top two elements of the data stack is a common operation, this results in a substantial increase in processing speed with very little hardware cost over having multiple intermediate storage registers.

In the preferred embodiment of the invention, a four-way decoder is used to control individual 8-bit banks of the 32-bit program memory. This, combined with data flow logic in the interface between the program memory and the data bus, allows individual access to modification of any byte value in program memory with a single write operation. Conventional computers require a full width memory read, 8-bit modification of the data within a temporary holding register, and a full width memory write operation to update a byte in memory, resulting in substantially slower speeds for such operations. While the preferred embodiment employs this new technique to modify 8 bits of a 32 bit word, this technique is generally applicable to accessing any subset of bits within any length of memory word.

The combination of appropriate software shown in Appendix A that exploits the simultaneous processing of conditional branching opcodes with subroutine calls and the use of hardware stacks combine to form an exceptionally efficient expert system inference engine. An expert system rule base typically is formed by a nested list of "rules" which can invoke other rules via subroutine calls that are only activated under certain conditions. The capability of the preferred embodiment to simultaneously process each rule-oriented subroutine call while evaluating the conditions under which the subroutine call will either be allowed to proceed or will be aborted greatly speeds up processing of expert system programs. Expert systems can run at speeds of over 600,000 inferences per second on the preferred embodiment using a 150ns clock cycle, which is a substantial improvement over existing general purpose computers, and in fact over most special purpose computers.

It will be seen that such a computer offers substantial optimization of throughput while maintaining flexibility. It is also predicted that use of such a machine will positively influence programs and programming languages to have improved structure and lower development cost by not penalizing the modern software principle of breaking programs up into small subroutines.

These and other advantages and features of the invention will be more clearly understood from a consideration of the drawings and the following detailed description of the preferred embodiment.

BRIEF DESCRIPTION OF THE DRAWINGS

Referring to the associated sheets of drawings:

FIGS. 90 through 95 show a preferred placement of the integrated circuits for FIGS. 3 through 89 on 5 expansion boards for use in conjunction with a host computer.

DETAILED DESCRIPTION OF THE PREFERRED EMBODIMENT SYSTEM HARDWARE

Figure 1:
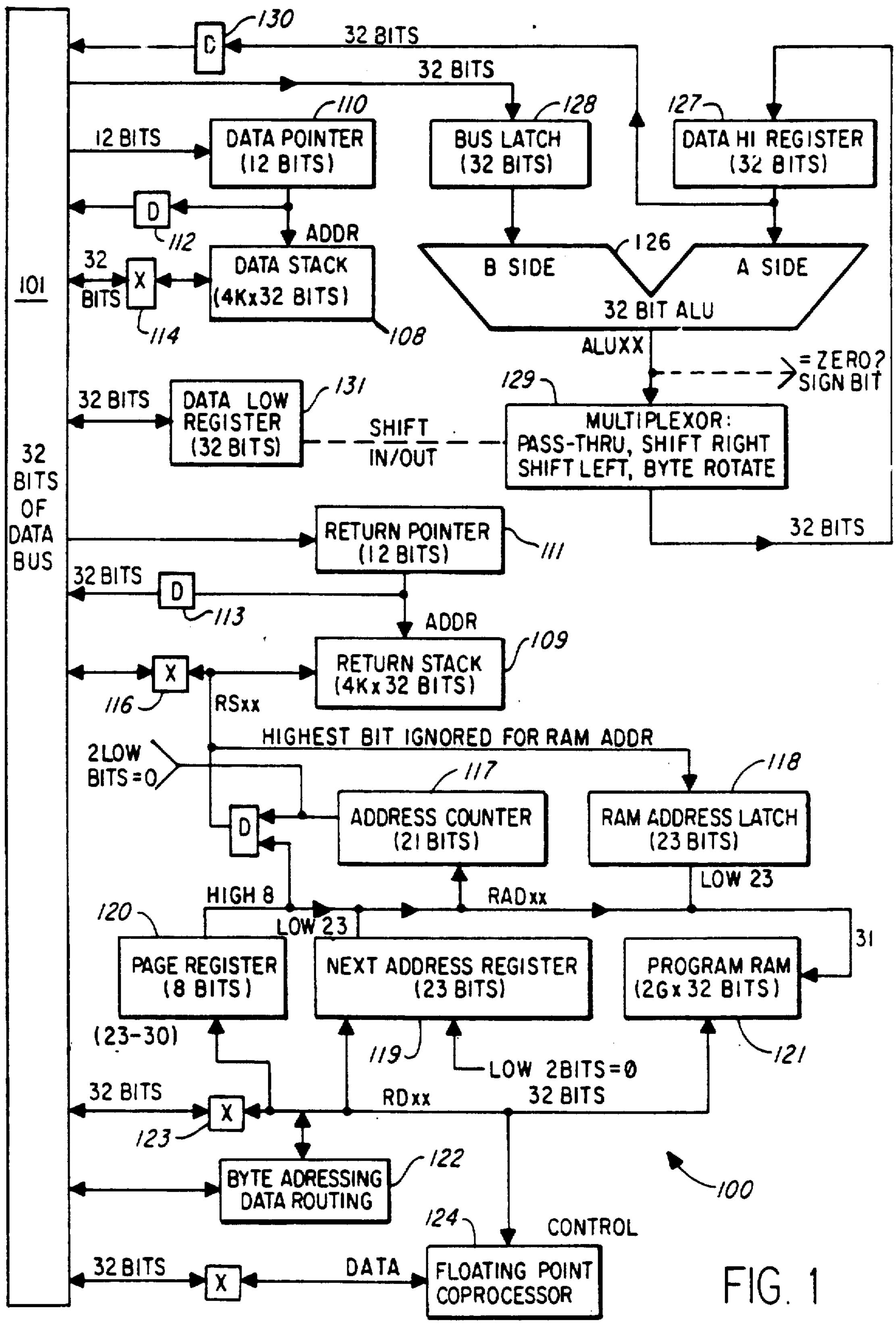
FIGS. 1 and 2 are a system block diagram showing a preferred embodiment made according to the present invention.
Figure 2:
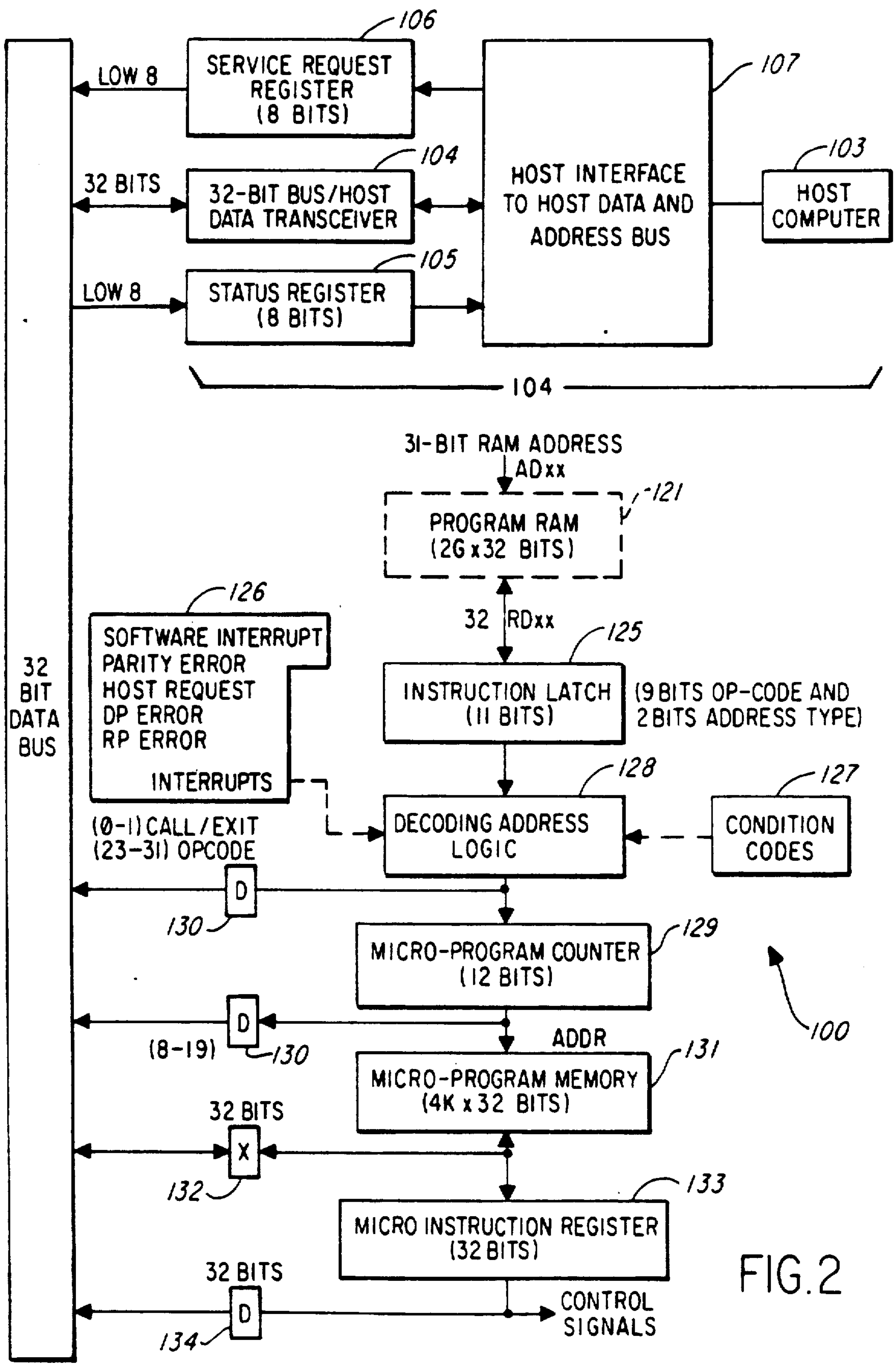

Referring initially to FIG. 1 and FIG. 2, a system overview of the hardware of a writable instruction set computer 100 made according to the present invention is shown. Computer 100 includes a single 32-bit system data bus 101. An interface assembly 102 is coupled to bus 101 for interfacing with a host computer 103, which for the preferred embodiment is an IBM PC/AT, made by International Business Machines, Inc., or equivalent personal computer. Assembly 102 includes a bus interface transceiver 104, an 8-bit status register 105 for requesting host services, and an 8 bit service request register 106 for the host to request services of computer 100. In the preferred embodiment, the host interface adapter 107 provides the necessary 8 bit host to 32 bit computer data sizing changes. Hosts in other embodiments would not necessarily be restricted to an 8-bit interface.

Memory stack means are provided in the form of a data stack 108 and a return address stack 109. Each stack is organized in the preferred embodiment as 4 kilowords of 32 bits per word. Each stack has an associated pointer. Specifically, a data stack pointer 110 is associated with data stack 108, and a return stack pointer 111 is associated with return stack 109. As can be seen, each stack pointer receives as input the low 12 bits from bus 101 and has its output connected to the address input of the corresponding stack, as well as through a transmitter 112 or 113 to bus 101. The data stack data inputs and outputs are buffered through transceiver 114 to provide for better current driving capability. The return stack data may be read from or written to the data bus 101 through the transceiver 116. In addition, the return stack data may be read from the address counter 117 or written to the address latch 118.

The RAM address latch 118 and the next address register 119 are the two possible sources for the low 23 bits of address to the program memory (RAM) 121. The bits 23–30 of program memory address are provided by a page register 120, allowing up to 2 gigabytes of addressable program memory organized as a group of non-overlapping 8 megabyte pages. When fetching an instruction based on an unconditional branch or subroutine call specified by the address field of the previous instruction, the next address register 119 is used to address memory 121. For subroutine calls, the contents of the address counter 117 are loaded with the address of the calling program, incremented by 4, and saved in the return stack 109 for use upon subroutine return. The return pointer 111 is decremented before writing to return stack 109.

Upon subroutine return, return stack 109 provides an address through RAM address latch 118 to address program RAM 121. RAM address latch 118 retains the address while return stack pointer 111 is incremented to pop the return address off the return stack. In jump, subroutine call, and subroutine return operations, the instruction fetched from program RAM 121 is stored in next address register 119 and the instruction latch 125 at the end of the fetching operation. Thus, each instruction directly addresses the next instruction through the next address register 119 and program RAM 121.

It should be noted that the address counter 117 and next address register 119 are not used as a program counter in the conventional sense. In conventional computers, the program counter is a hardware device used as the primary means of generating addresses for program memory whose normal operation is to increment in some manner while accessing sequential instructions. In computer 100, the next address register 119 is a simple holding register that is used to hold the address of the next instruction to be fetched from memory. The value of the next address register 119 is determined by an address field contained within the previous instruction executed, NOT from incrementing the previous register value. The address counter 117 is not directly involved in computing instruction addresses; it is only used to generate subroutine return addresses. Thus, computer 100 uses address information in each instruction to determine the address of the next instruction to be executed for high level language programs.

Program RAM 121 is organized as a 32-bit program memory addressable for full-words only on evenly divisible by 4 byte addresses. Computer 100 provides a minimum quantity of 512 kilobytes of program memory, with expansion of up to 8 megabytes of program memory possible. A minor modification of the memory expansion boards, employed to allow for decoding more boards, allows use of up to 2 gigabytes of program memory. Program memory words of 32 bits are read from or written to the data bus 101 through transceiver 123. Additionally, single byte values with the high 24 bits set to 0 may be read and written to any byte (within each 32-bit word) in memory through the byte addressing and data routing block 122.

Provisions have been made to incorporate a microcode-controlled floating point math coprocessor 124 into the design, but such a processor has not yet been implemented in the preferred embodiment. The floating point coprocessor 124 would take its instructions not from a separate microcode memory, as is the usual design practice, but rather directly from program memory.

The thirty-two bit arithmetic logic unit (ALU) 126 has its A input connected to a data high register (DHI) 127 and its B input connected to the data bus 101 through a transparent latch 128. The output of the ALU 126 is connected to a multiplexer 129 that provides for data pass-through, single bit shift left and shift right operations, and a byte rotate right operation. The output of ALU 126 is always fed back into the DHI register 127. The DHI register 127 is connected to data bus 101 through a data transmitter 130.

A data low register (DLO) 131 is connected via a bidirectional path to the data bus 101, and its shift in/out signals are connected to the multiplexer 129 to provide a 64-bit shifting capability.

The opcode portion of program RAM 121 is connected to instruction latch 125 for the purpose of holding the next opcode to be executed by the machine. This instruction latch 125 is decoded according to existing interrupt information from interrupt register 126 and conditional branching information from the condition code register 127 to form the contents of the micro-program counter 129. The micro-program counter 129 forms a 12 bit address into micro- program memory 131. The three low bits of the address into micro-program memory 131 are generated from a combination of the micro-address constant inputs and decoding of the condition select field to allow for conditional branching. The contents of the output of the decoding/address logic 128 and the micro-program counter 129 may be read to data bus 101 for diagnostic and interrupt processing,purposes through bus driver 130.

Micro-program memory 131 is a 32-bit high speed memory of 4 kilowords in length. Its data may be read or written to data bus 101 through transceiver 132, providing a writable instruction set capability. During program execution, its data is fed into the micro-instruction register 133 to provide control signals for operation. Micro-instruction register 133 may be read to data bus 101 through transmitter 134 for diagnostic purposes.

Figure 3:
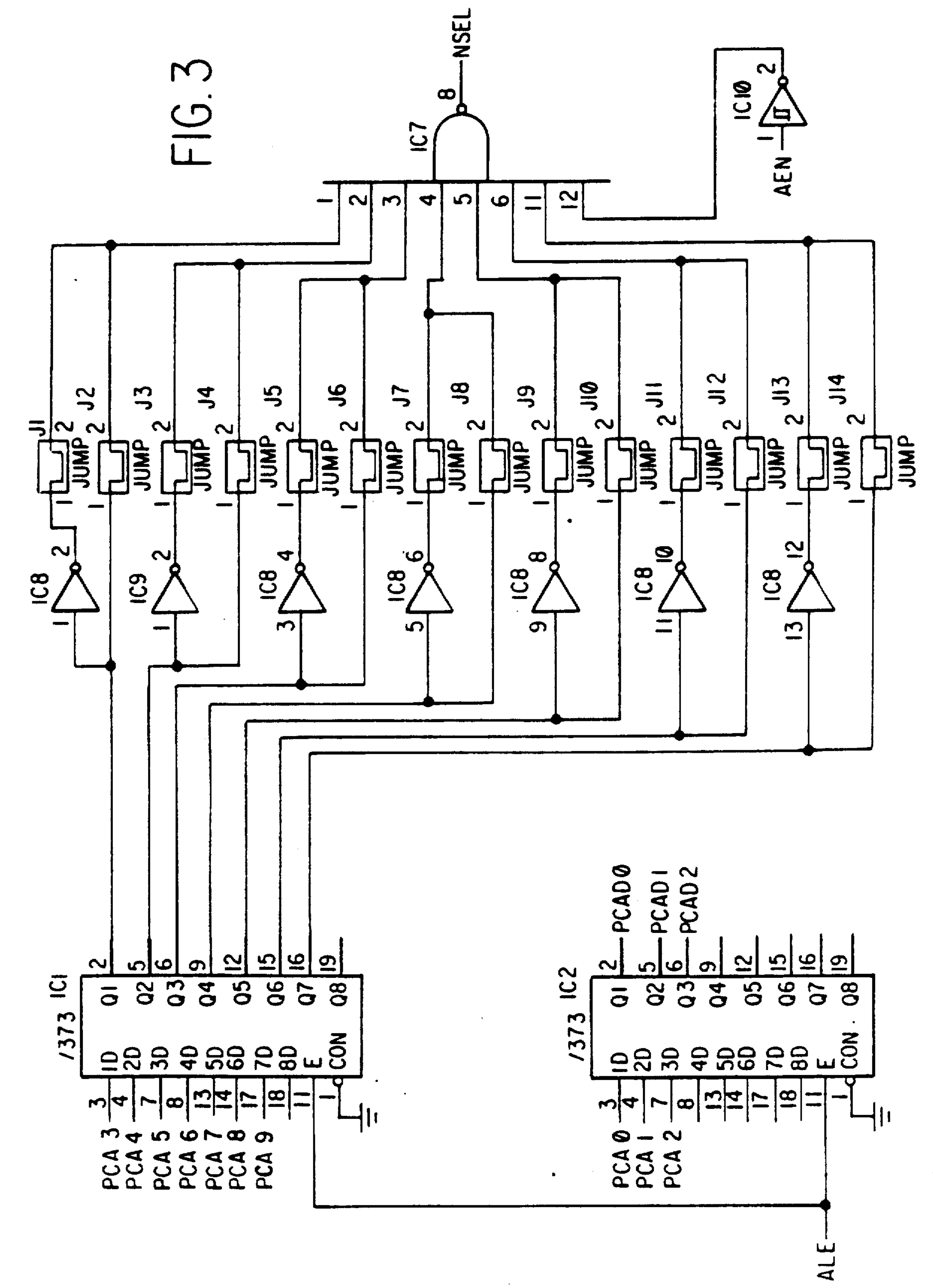
FIGS. 3 through 89 show the detailed schematics of the embodiment of FIGS. 1 and 2 organized into groups of components placed on five separate printed circuit boards in the preferred embodiment.
Figure 89:
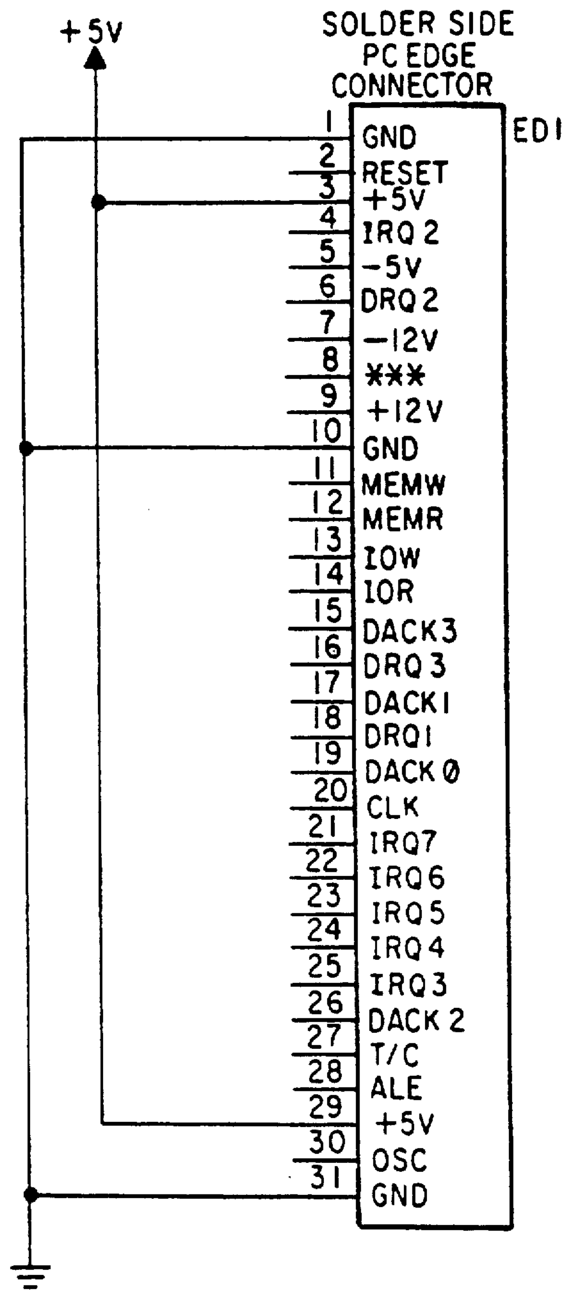
Figure 90:
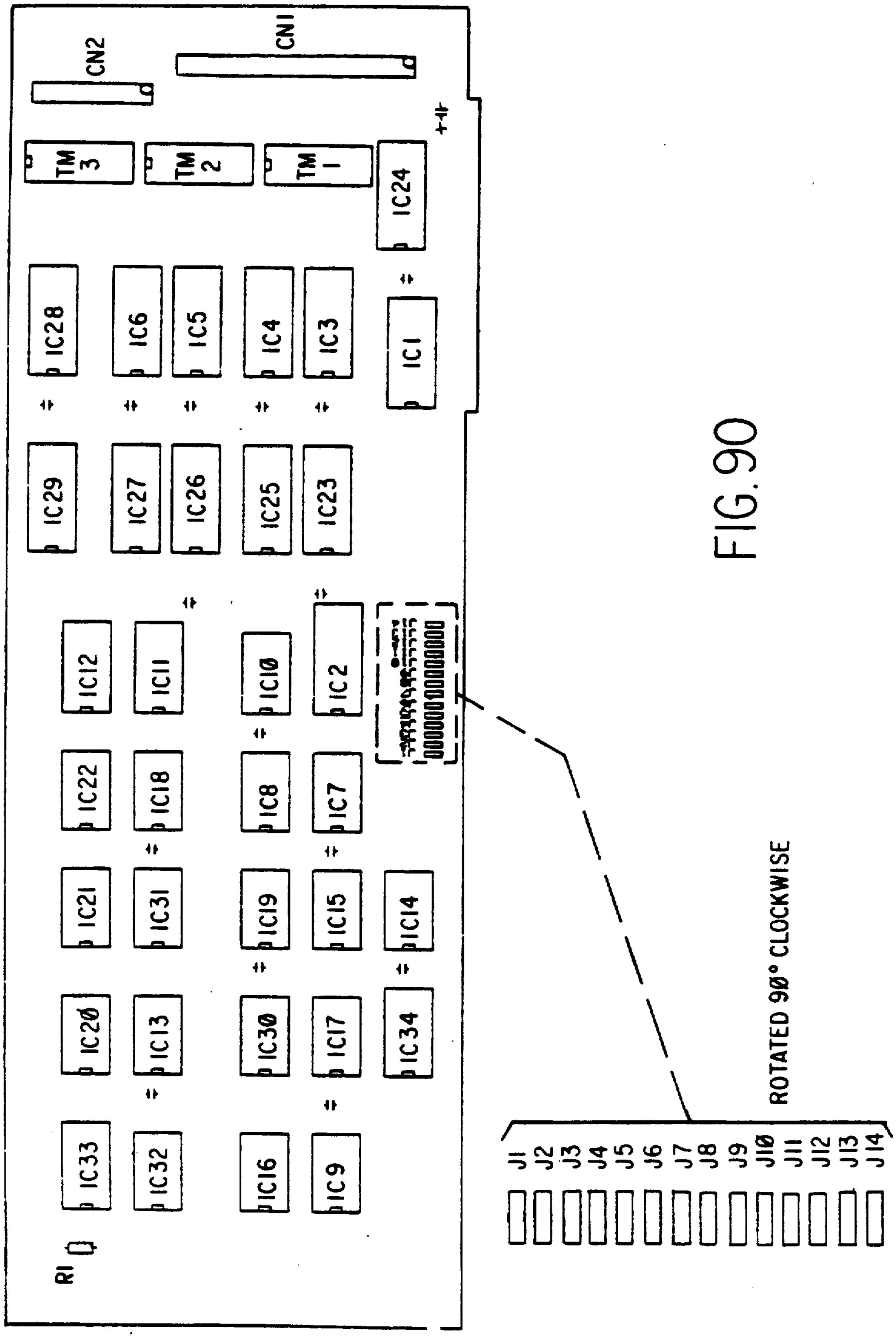
Figure 91:
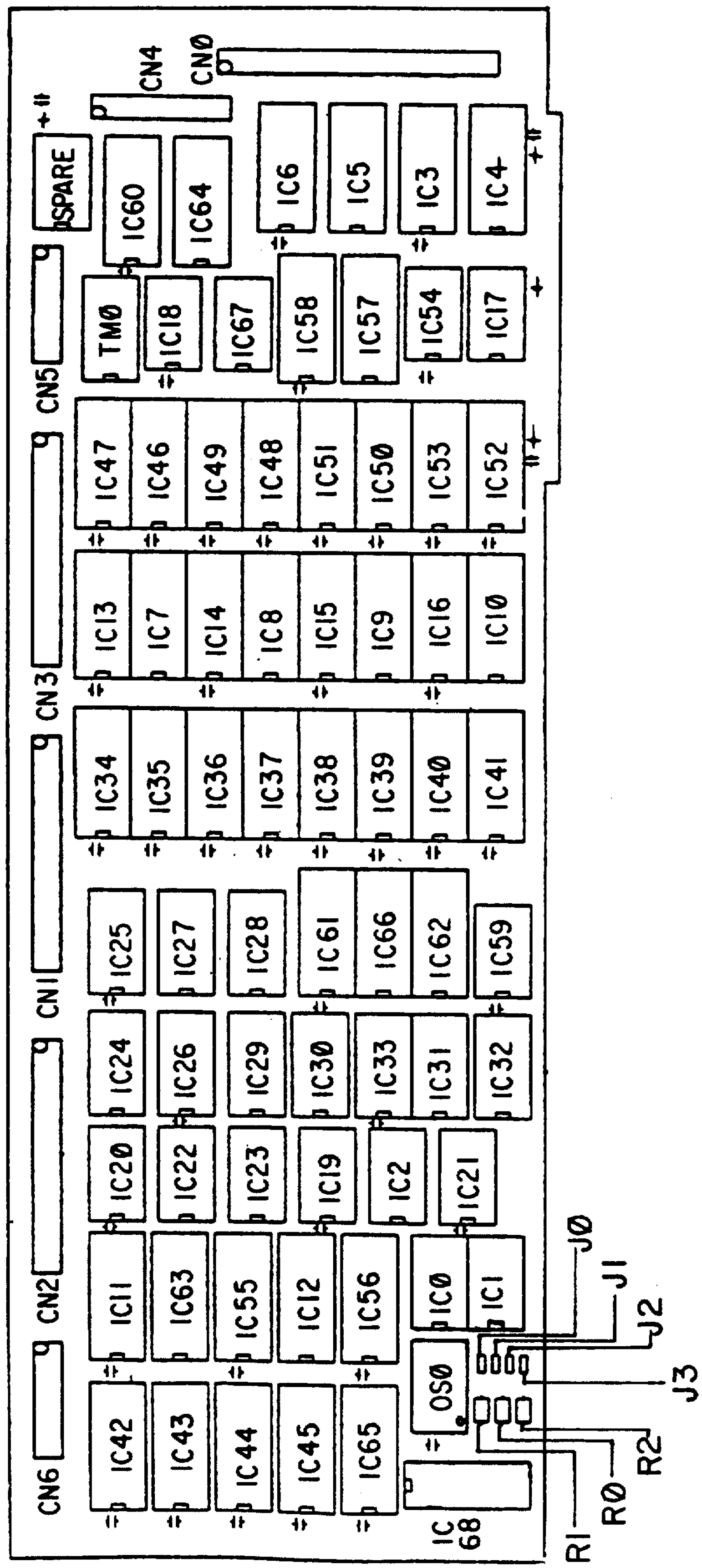
Figure 92:
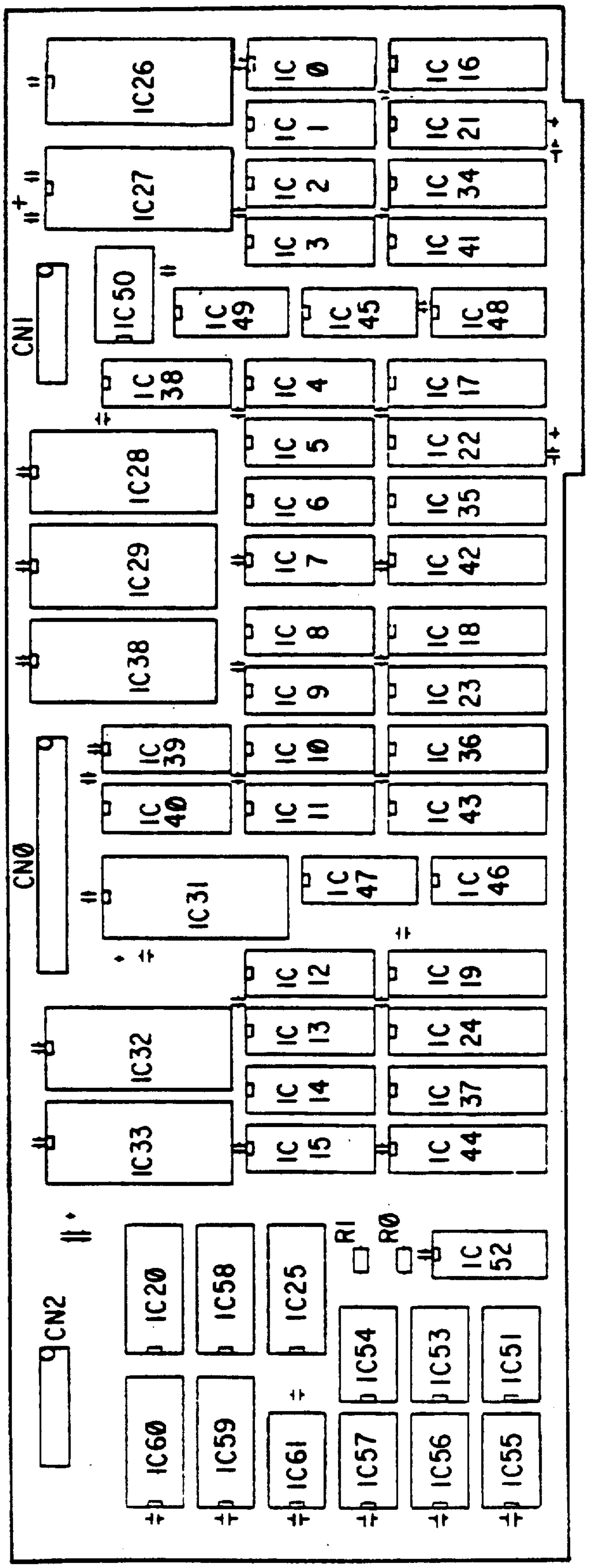
Figure 93:
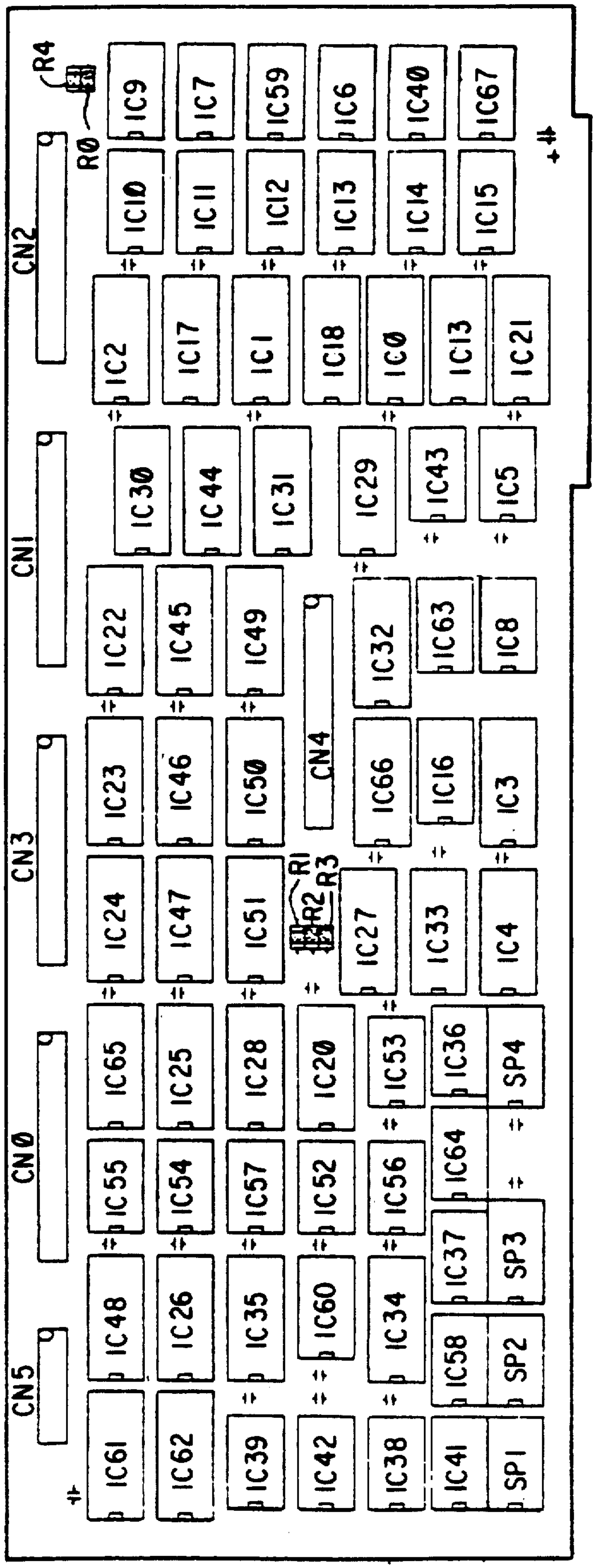
Figure 94:
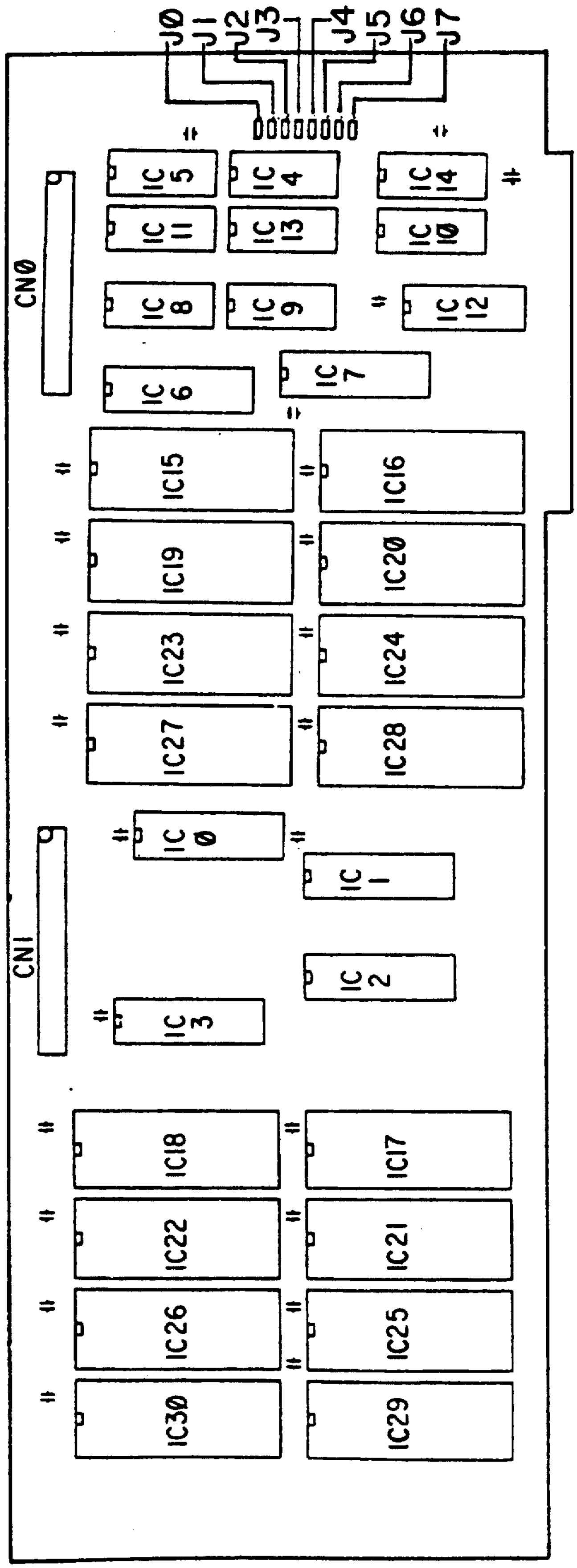

The detailed schematics of the various integrated circuits forming computer 100 are shown in FIGS. 3-89. Narrative text preceding each group of figures gives descriptions of each signal mnemonic used in the schematics. Other than to identify general features of these circuits, they will not be described in detail, the detail being ascertainable from the hardware themselves. However, some general comments are in order.

Computer 100 in its preferred embodiment is designed for construction on five boards which take five expansion slots in a personal computer. It is addressed with conventional 8088 microprocessor IN and OUT port instructions. It uses 32-bit data paths and 32- bit horizontal microcode (of which bits only 30 are actually used.) It operates on a jumper- and crystal-oscillator controlled micro-instruction cycle period which is preferably set at 150 ns. Most of the logic is the 74ALS series. The ALU is composed of eight 74F181 integrated circuits with carry-lookahead logic. Stack and microcode memory chips are 35 ns CMOS 4-bit chips. Program memory is 120 ns low power CMOS 8-bit memory chips. Since simple primitives are only two clock cycles long, this gives a best case operating speed of 3.3 million basic high level stack operations per second (MOPS). In actual program operation, the average instruction would take just over two cycles, exclusive of complex micro-instructions such as multiplication, division, block memory moves, etc. This, combined with the fact that subroutine calls are zero-cost operations when combined in an instruction with an opcode, gives an average operational speed of approximately 3.5 MOPS.

Variable benchmarks show speed increases of 5 to 10 times over an 80286 running at 8 MHz with zero-wait-state memory. An expert system benchmark shows an even more impressive performance of in excess of 640,000 logical inferences per second.

Instruction decoding requires a 2-cycle minimum on a microcode word definition.

SUMMARY OF FIGURES

The following is a summary of the figures that will be referred to in the detailed description of the preferred embodiment. The figures are organized into general block diagrams and five groups corresponding to the five printed circuit boards in the preferred embodiment.

| FIGURE NUMBER | FILE NAME | DESCRIPTION OF CONTENTS |
|---|---|---|
| SYSTEM BLOCK DIAGRAM | | |
| 1 | SBLOCK | ALU AND MEMORY ADDRESS BLOCK DIAGRAM |

-continued

| FIGURE NUMBER | FILE NAME | DESCRIPTION OF CONTENTS |
|---|---|---|
| 2 | MBLOCK | INSTRUCTION DECODING AND HOST INTERFACE BLOCK DIAGRAM |
| HOST ADAPTER BOARD | | |
| 3 | HOST1 | HOST ADDRESS DECODER |
| 4 | HOST2 | READ/WRITE DECODER |
| 5 | HOST3 | DMA CONTROL LOGIC |
| 6 | HOST4 | DATA WIDTH CONVERTER FROM HOST |
| 7 | HOST5 | DATA WIDTH CONVERTER TO HOST |
| 8 | HOST6 | DATA WIDTH CONVERTER CONTROL LOGIC |
| 9 | HOST7 | HOST DATA BUS BUFFER |
| 10 | HOST8 | CONTROL SIGNAL TRANSMITTER - 1 |
| 11 | HOST9 | 32-BIT DATA SIGNAL BUS TERMINATORS |
| 12 | HOST10 | CONTROL SIGNAL TRANSMITTER - 2 |
| 13 | CON1 | HOST EDGE CONNECTOR |
| 14 | CON3 | HOST TO CPU/32 RIBBON CABLES |
| The signal descriptions for the host adapter (HOST) board are listed in Appendix D on pages 1 and 2. | | |
| HOST INTERFACE & STACK MEMORY BOARD | | |
| 15 | MRAM1 | MICRO-PROGRAM (0-7) |
| 16 | MRAM2 | MICRO-PROGRAM (8-15) |
| 17 | INT1 | STATUS & SERVICE REQUEST REGS |
| 18 | INT2 | DATA BUFFER TO/FROM HOST |
| 19 | INT3 | CONTROL SIGNAL SIGNAL BUFFER - 1 |
| 20 | INT4 | CONTROL SIGNAL BUFFER - 2 |
| 21 | MISC1 | SYSTEM CLOCK GENERATOR/OSCILLATOR |
| 22 | MISC2 | CLOCK CONDITIONING |
| 23 | MISC3 | BUS SOURCE & DEST DECODERS |
| 24 | MISC4 | MRAM CONTROL LOGIC |
| 25 | STACK1 | DATA STACK POINTER |
| 26 | STACK2 | DATA STACK RAM (0-7) |
| 27 | STACK3 | DATA STACK RAM (8-15) |
| 28 | STACK4 | DATA STACK RAM (16-23) |
| 29 | STACK5 | DATA STACK RAM (24-31) |
| 30 | STACK6 | RETURN STACK POINTER |
| 31 | STACK7 | RETURN STACK RAM (0-7) |
| 32 | STACK8 | RETURN STACK RAM (8-15) |
| 33 | STACK9 | RETURN STACK RAM (16-23) |
| 34 | STAK10 | RETURN STACK RAM (24-31) |
| 35 | CON2 | DATA & CONTROL BUS RIBBON CABLES |
| 36 | CON3 | HOST TO CPU/32 RIBBON CABLES |
| 37 | CON4 | DATA TO INTERFACE BOARD RIBBON CABLE |
| 38 | CON5 | INTERFACE TO ADDRESS BOARD RIBBON CABLE "A" |
| 39 | CON6 | INTERFACE TO ADDRESS BOARD RIBBON CABLE "B" |
| 40 | CON9 | PC-BUS POWER/GND |
| The signal descriptions for the host interface and stack memory (INT) board are listed in Appendix D on pages 3-6. | | |
| ALU & DATA PATH BOARD | | |
| 41 | MRAM3 | MICRO-PROGRAM BITS (16-23) |
| 42A, 42B | DATA1 | ALU (0-7) |
| 43A, 43B | DATA2 | ALU (8-15) |
| 44A, 44B | DATA3 | ALU (16-23) |
| 45A, 45B | DATA4 | ALU (24-31) |
| 46 | DATA5 | ALU CARRY-LOOKAHEAD |
| 47 | DATA6 | DLO REGISTER |
| 48 | DATA7 | ALU ZERO DETECT |
| 49 | DATA8 | SHIFT INPUT CONDITIONING |
| 50 | DATA9 | ALU FUNCTION CONDITIONING FOR DIVISION |
| 51 | CON2 | DATA & CONTROL BUS RIBBON CABLES |
| 52 | CON4 | DATA TO INTERFACE BOARD RIBBON CABLE |
| 53 | CON9 | PC-BUS POWER/GND |
| The signal descriptions for the ALU and data path (DATA) board are listed in Appendix D on pages 7-9. | | |
| MEMORY ADDRESS & MICROCODE CONTROL BOARD | | |
| 54 | MRAM4 | MICRO-PROGRAM BITS (24-31) |
| | ADDR1 | intentionally omitted |
| | ADDR2 | intentionally omitted |
| 55 | ADDR3 | RAM ADDRESS LATCH |
| 56 | ADDR4 | ADDRESS COUNTER (2-9) |
| 57 | ADDR5 | ADDRESS COUNTER (10-17) |
| 58 | ADDR6 | ADDRESS COUNTER (18-31) & (0-1) |
| 59 | ADDR7 | NEXT ADDRESS & PAGE REGISTERS |
| 60 | ADDR8 | RETURN STACK CONTROL LOGIC |
| 61 | CONT1 | INSTRUCTION REGISTER & MICRO-PROGRAM COUNTER |
| 62 | CONT2 | INTERUPT FLAG REGISTER |
| 63 | CONT3 | CONDITION CODE REGISTER |
| 64 | CONT4 | INTERRUPT MICRO-ADDRESS REGISTER |
| 65 | CONT5 | MISC CONTROL LOGIC |
| 66 | RAM1 | RAM DATA TO BUS INTERFACE (0-7) |
| 67 | RAM2 | RAM DATA TO BUS INTERFACE (8-15) |
| 68 | RAM3 | RAM DATA TO BUS INTERFACE (16-23) |
| 69 | RAM4 | RAM DATA TO BUS INTERFACE (24-31) |
| 70 | CON2 | DATA & CONTROL BUS RIBBON CABLES |
| 71 | CON5 | INTERFACE TO ADDRESS BOARD RIBBON CABLE "A" |
| 72 | CON6 | INTERFACE TO ADDRESS BOARD RIBBON CABLE "B" |
| 73 | CON7 | ADDRESS TO RAM BOARDS RIBBON CABLE "A" |
| 74 | CON8 | ADDRESS TO RAM BOARDS RIBBON CABLE "B" |
| 75 | CON9 | PC-BUS POWER/GND |
| The signal instructions for the memory address and microcode control (ADDR) board are listed in Appendix D on pages 10-13. | | |
| MEMORY BOARD | | |
| (Note that up to sixteen memory boards may be used within one system) | | |
| 76 | MEM1 | RAM DATA BUFFER |
| 77 | MEM2 | RAM ADDRESS BUFFER |
| 78 | MEM3 | READ/WRITE/OUTPUT CONTROL LOGIC |
| 79 | MEM4 | RAM BANK 0 BITS (0-15) |
| 80 | MEM5 | RAM BANK 0 BITS (16-31) |
| 81 | MEM6 | RAM BANK 1 BITS (0-15) |
| 82 | MEM7 | RAM BANK 1 BITS (16-31) |
| 83 | MEM8 | RAM BANK 2 BITS (0-15) |
| 84 | MEM9 | RAM BANK 2 BITS (16-31) |
| 85 | MEM10 | RAM BANK 3 BITS (0-15) |
| 86 | MEM11 | RAM BANK 3 BITS (16-31) |
| 87 | CON7 | ADDR TO MEMORY BOARD RIBBON CABLE "A" |
| 88 | CON8 | ADDR TO MEMORY BOARD RIBBON CABLE "B" |
| 89 | CON9 | PC-BUS POWER/GND |
| The signal instructions for the memory (MEM) board are listed in Appendix D on page 14. | | |

DETAILED NARRATIVE FOR THE FIGURES

The Host Interface Adapter. FIGS. 3-14 describe the host interface adapter card (referred to as the "host" card.) The host card included in the preferred embodiment is suited for use in an IBM PC computer or compatible, but other functionally similar embodiments are possible for use with other host computers.

Figure 4:
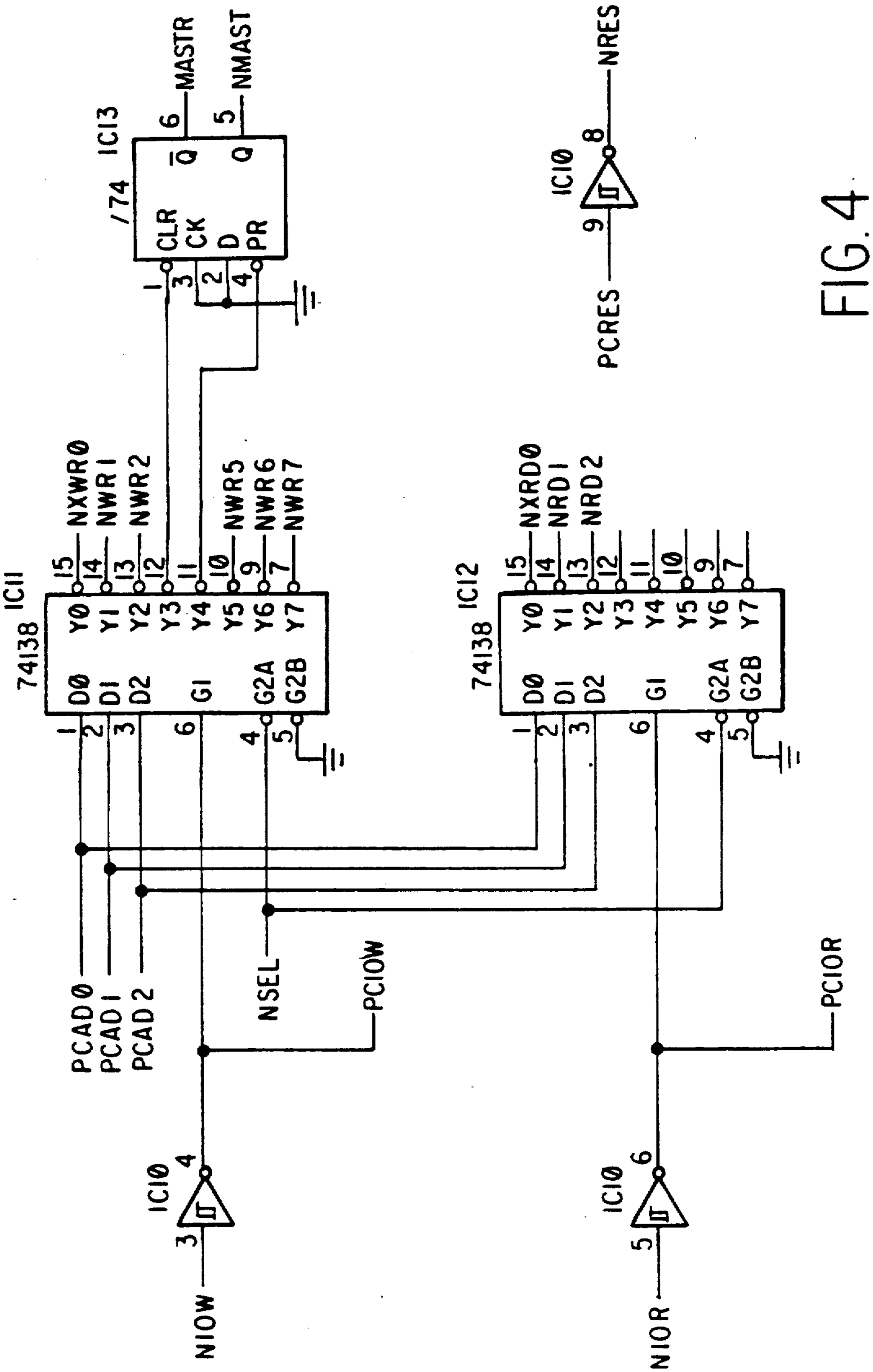

FIG. 3 shows the host address bus decoding logic used to activate the board for operation during a host 103 IN or OUT port operation. Jumpers J1 through J14 are used to select the decoded address to any bank of eight ports in the port address space. FIG. 4 shows the decoders IC11 and IC12 which generate control signals based on the lowest bits of the port addresses. In common usage, the preferred embodiment uses eight output ports and three input ports as follows:

| PORT | FUNCTION |
|---|---|
| OUTPUT | |
| 300 | DATA BUS (AUTOMATICALLY SEQUENCED FOR 4 BYTES) |
| 301 | MIR (WRITE 4 TIMES JUST LIKE WRITE0) |
| 302 | SINGLE STEP BOARD CLOCK |
| 303 | START BOARD |
| 304 | STOP BOARD |
| 305 | SET DMA MODE |
| 306 | RESET DATA BUS SEQUENCER & DMA MODE |
| 307 | SERVICE REQUEST REG & INTERUPT |
| INPUT | |
| 300 | DATA BUS (AUTOMATICALLY SEQUENCED FOR 4 BYTES) |
| 301 | MIR (READ 4 TIMES JUST LIKE READ0) |
| 302 | STATUS REGISTER (8 BITS) |

Figure 5:
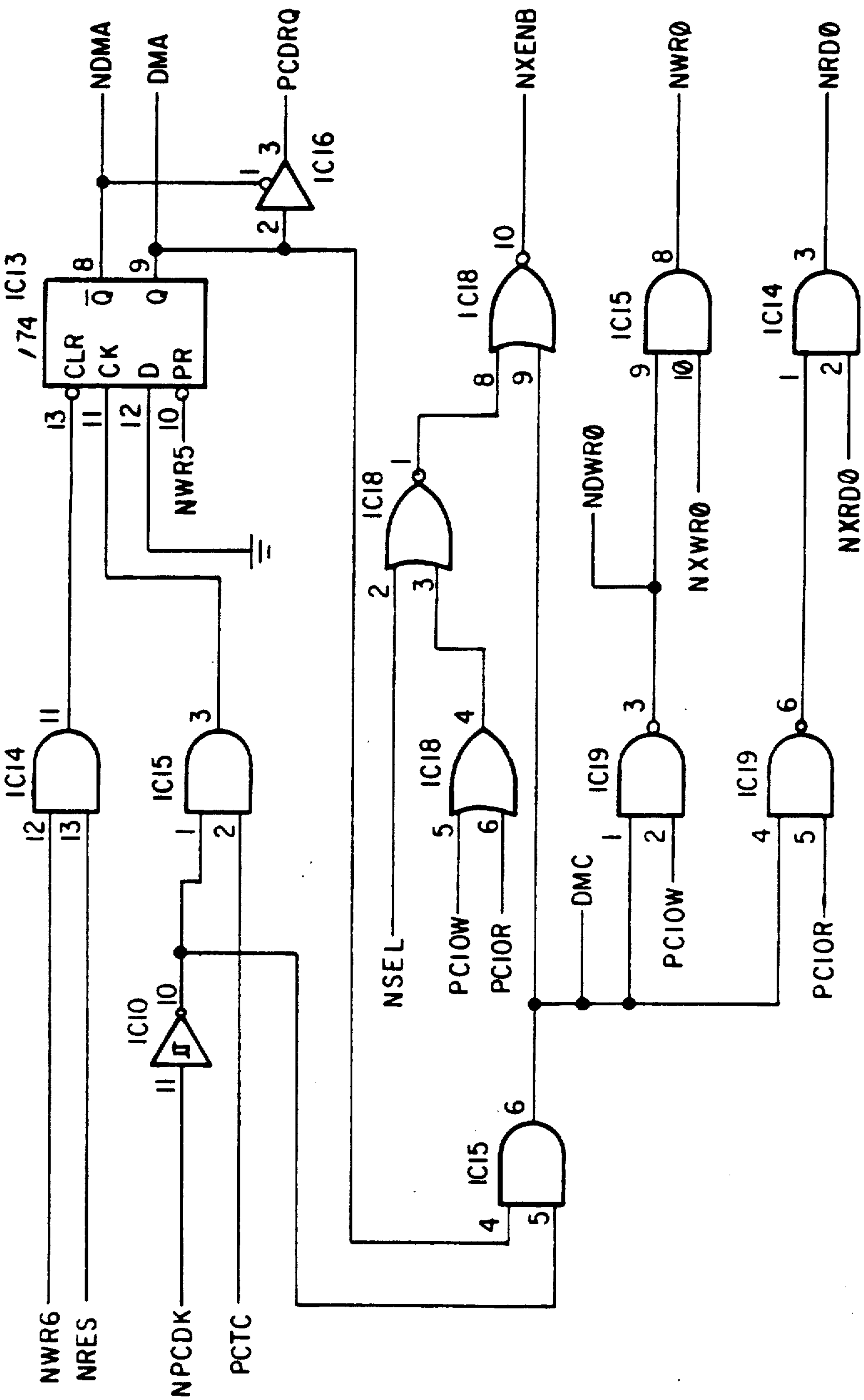
Figure 6:
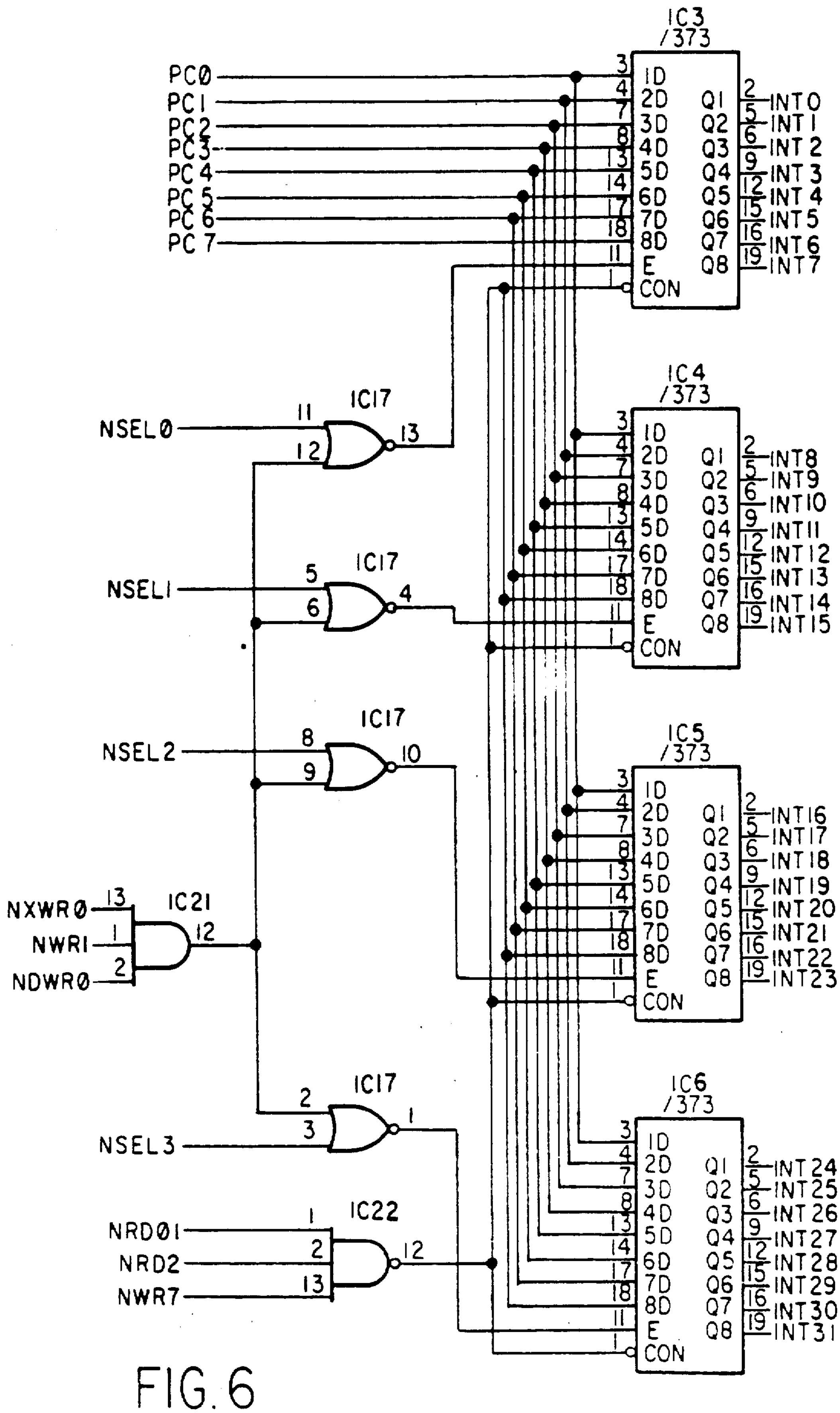
Figure 7:
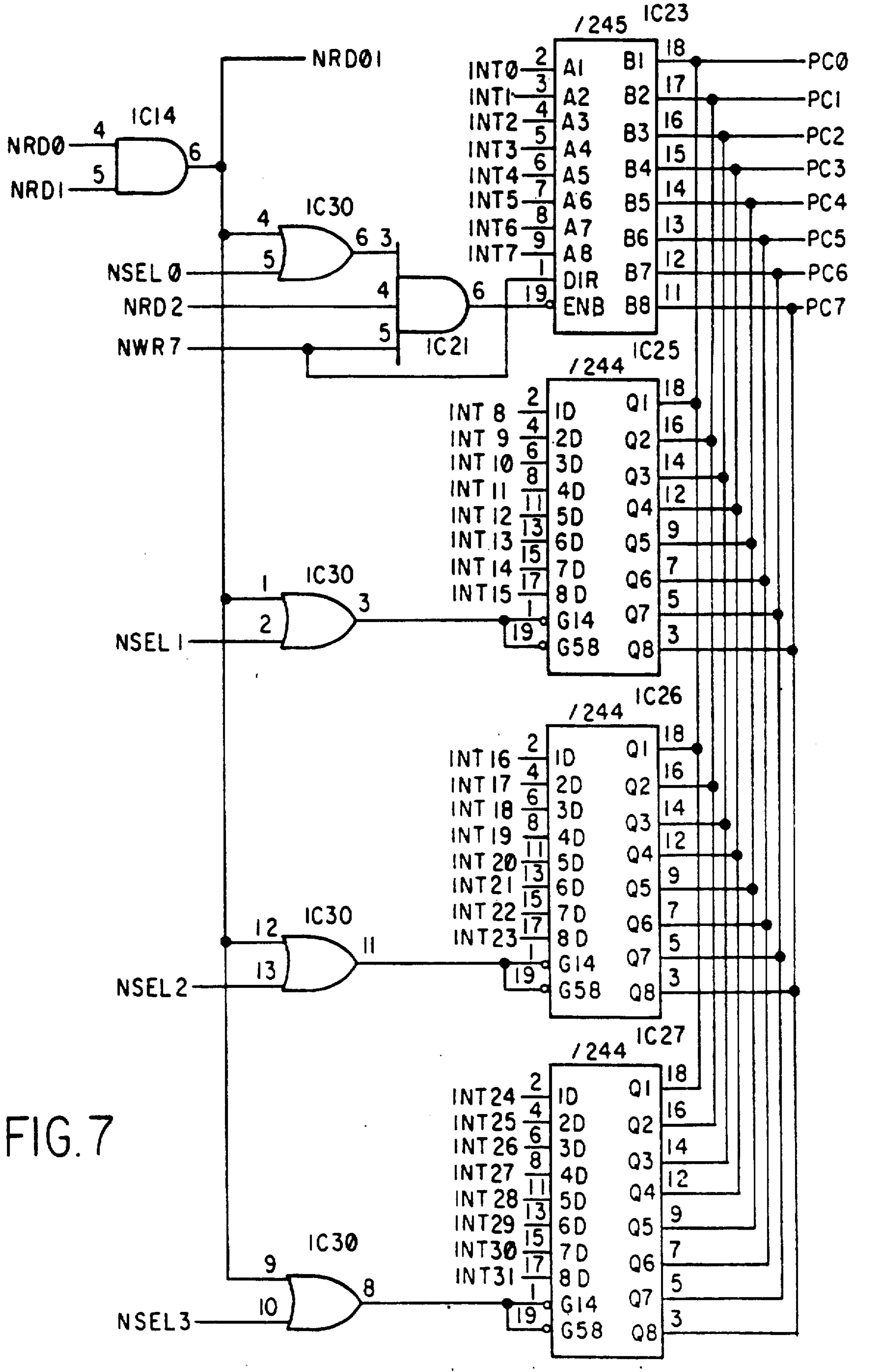
Figure 8:
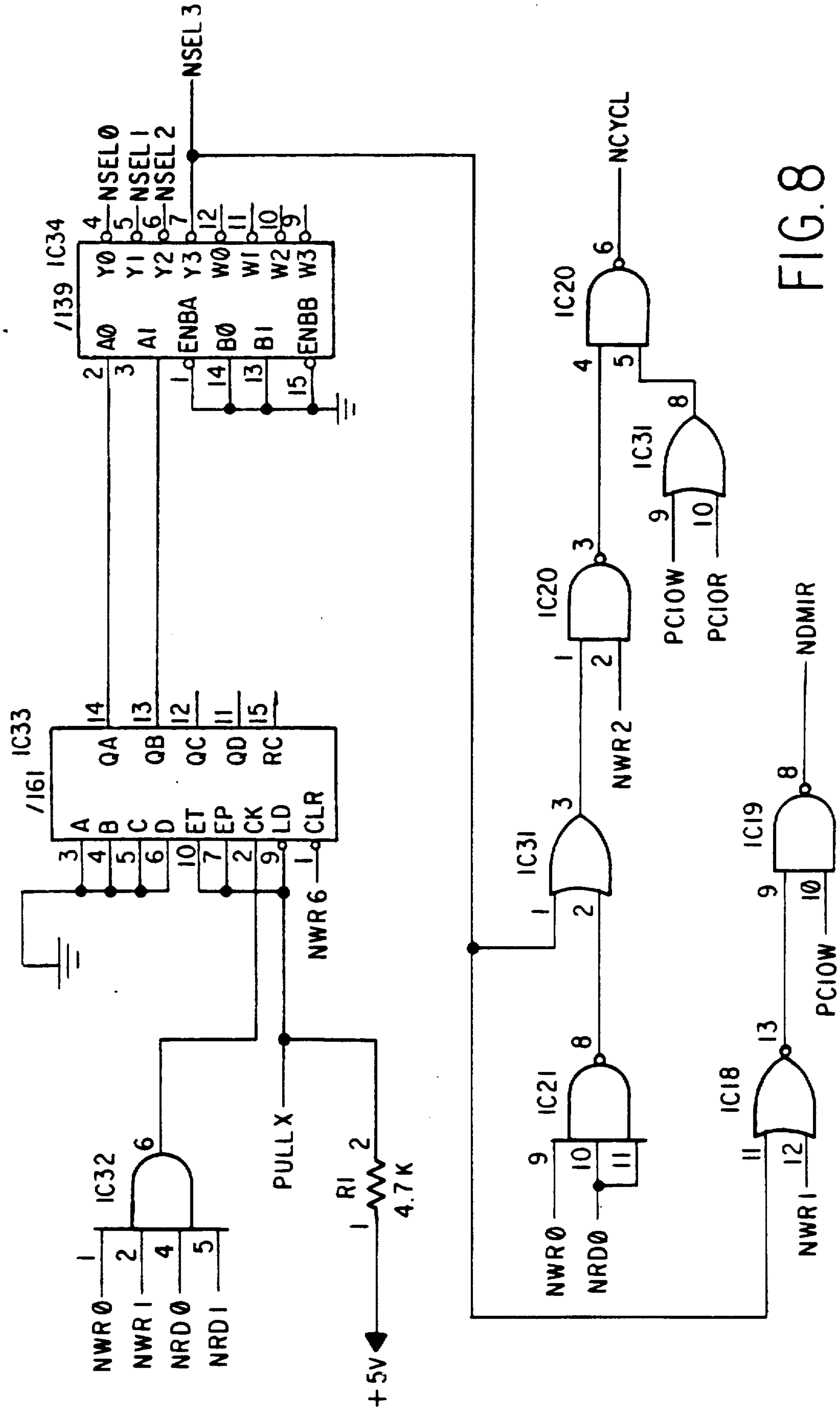
Figure 9:
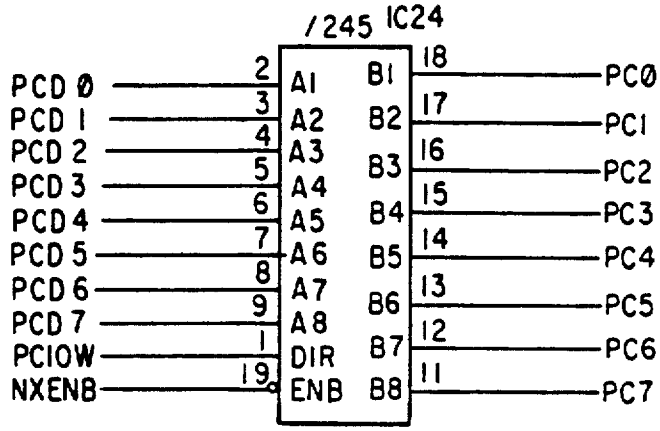
Figure 1C:
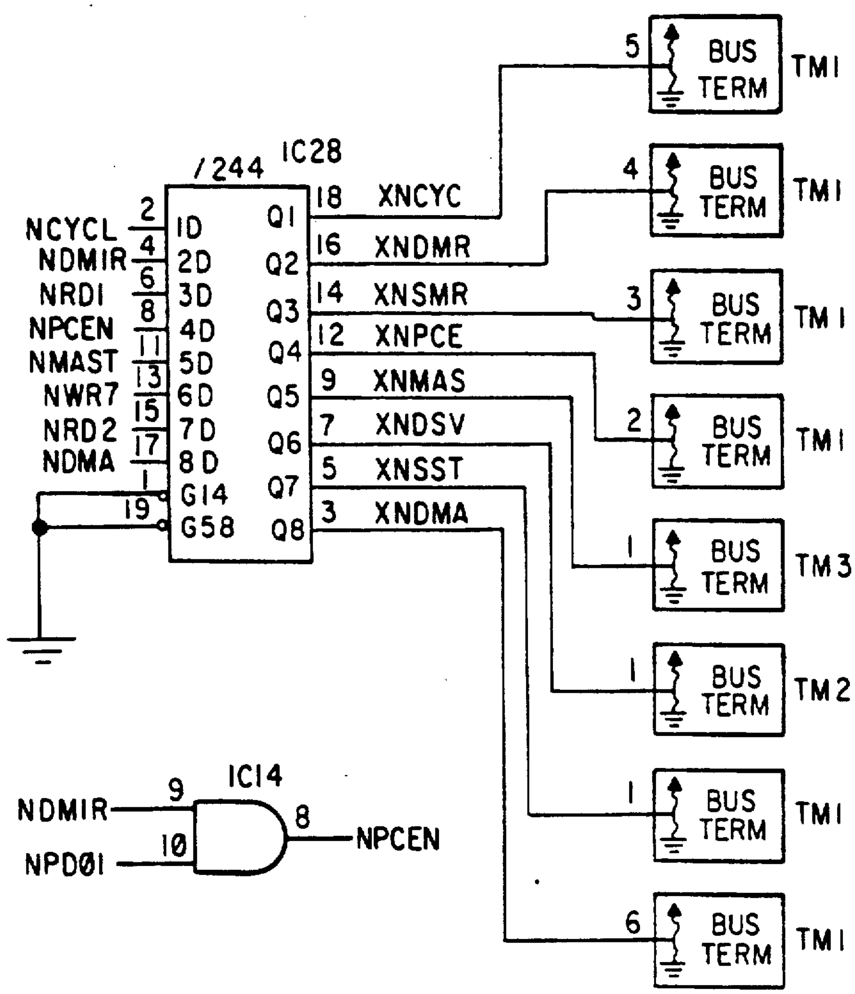
Figure 11:
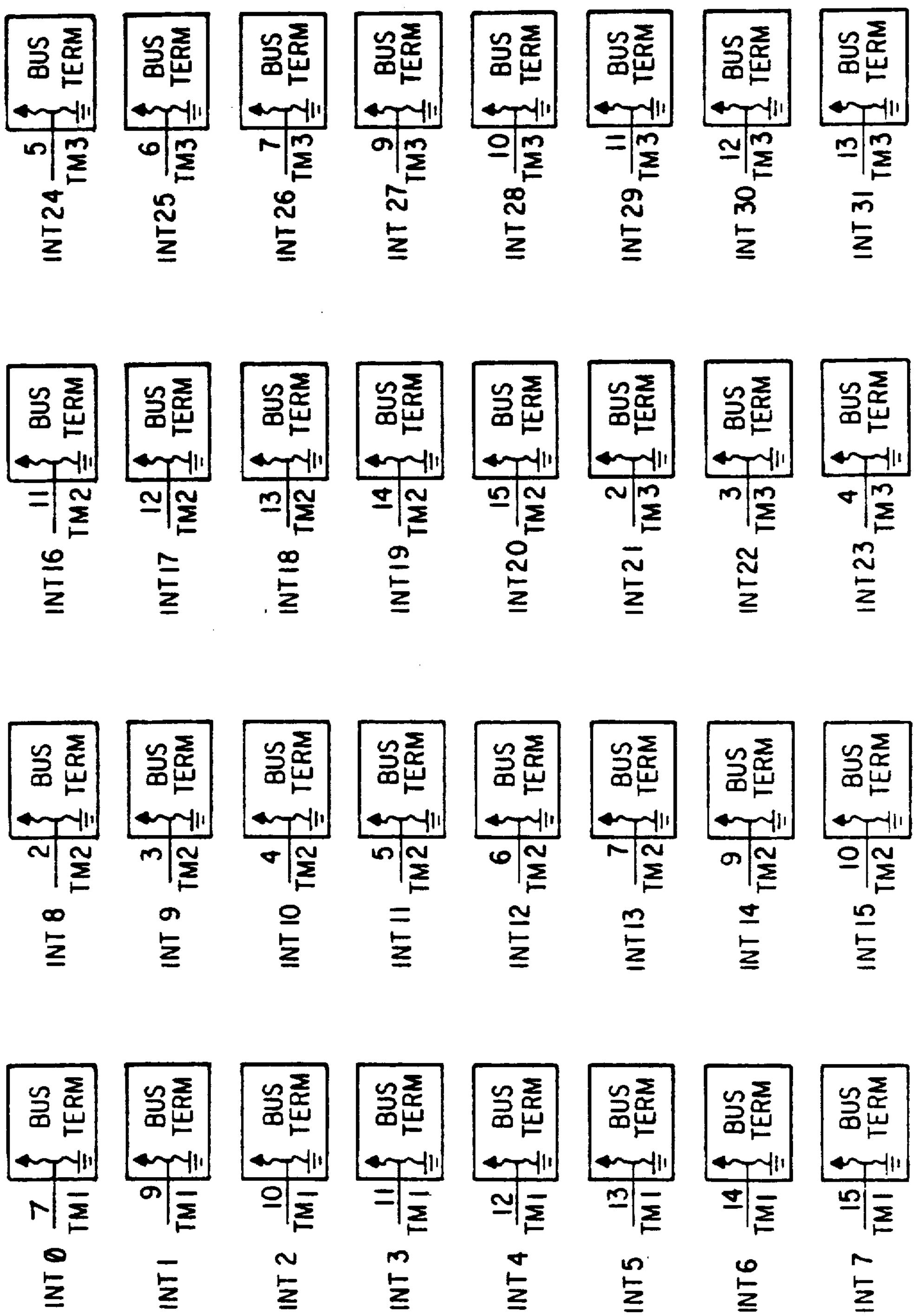
Figure 12:
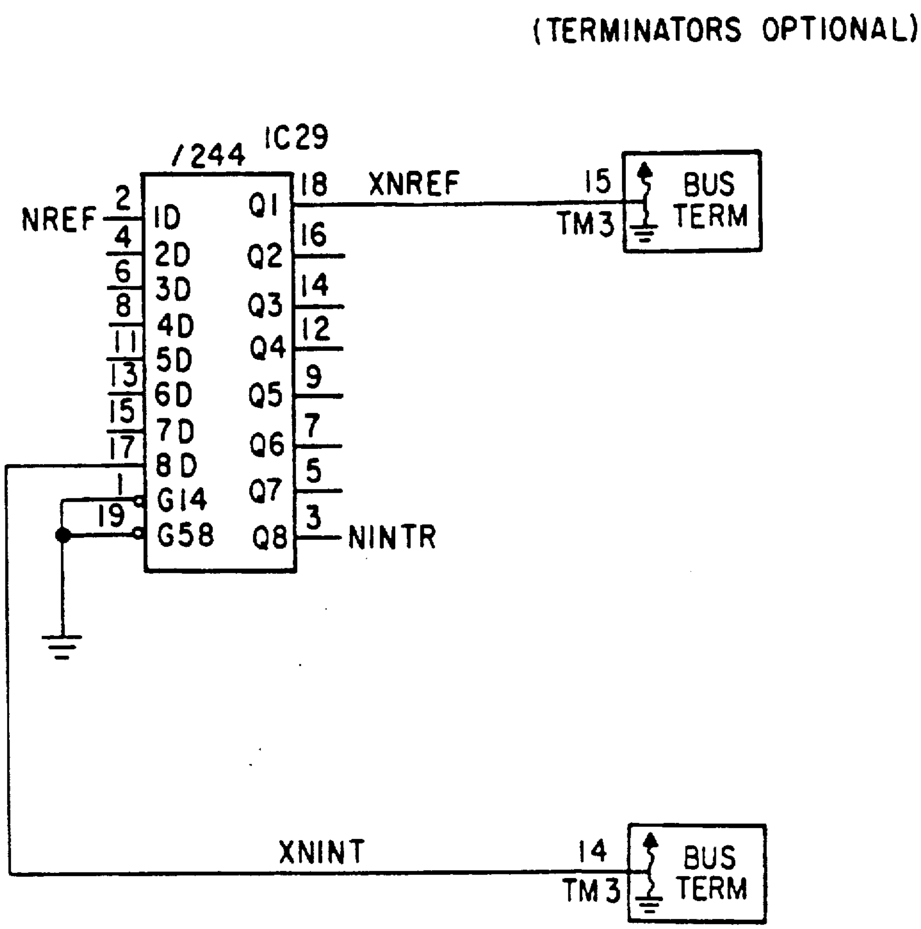
Figure 13:
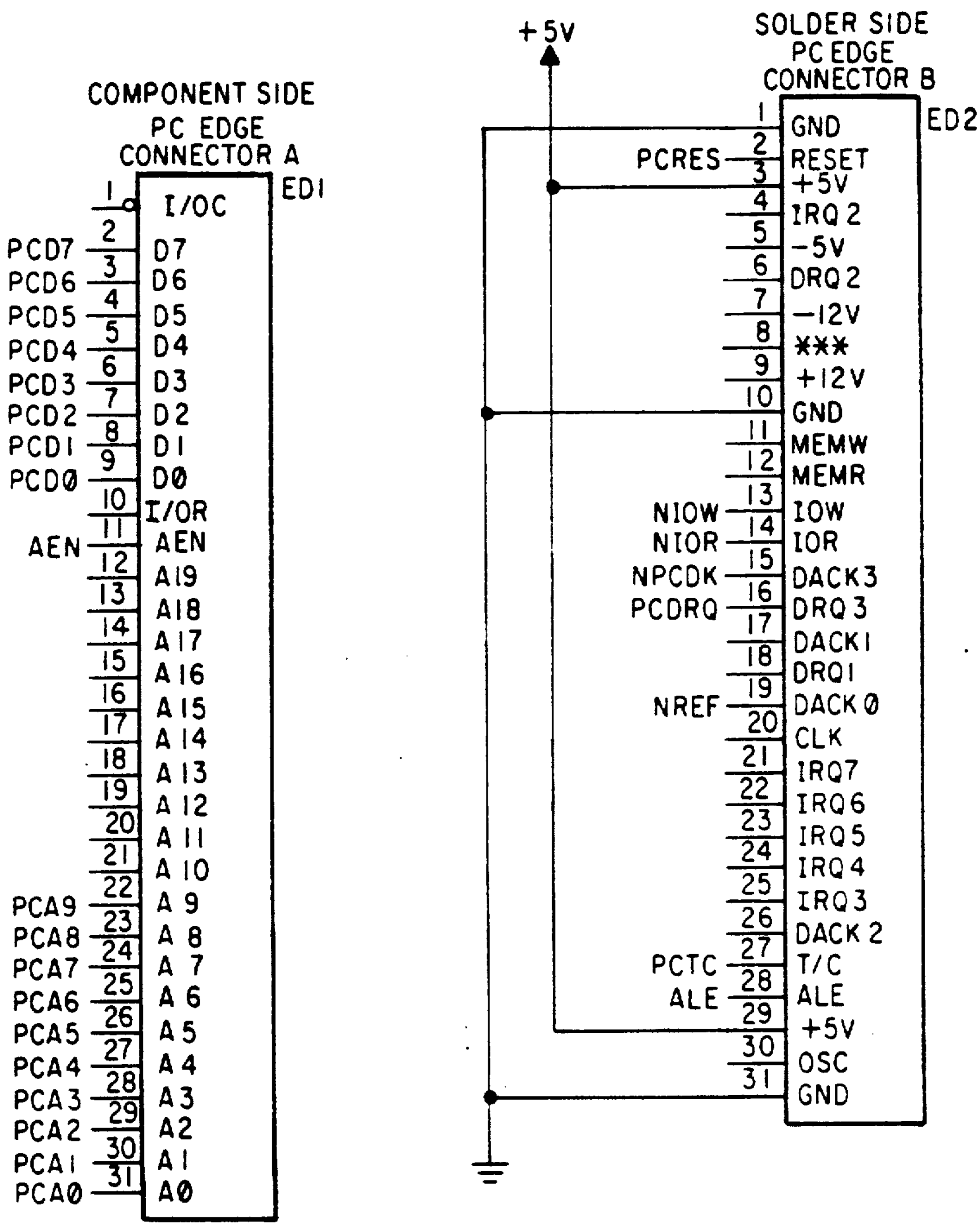
Figure 14:
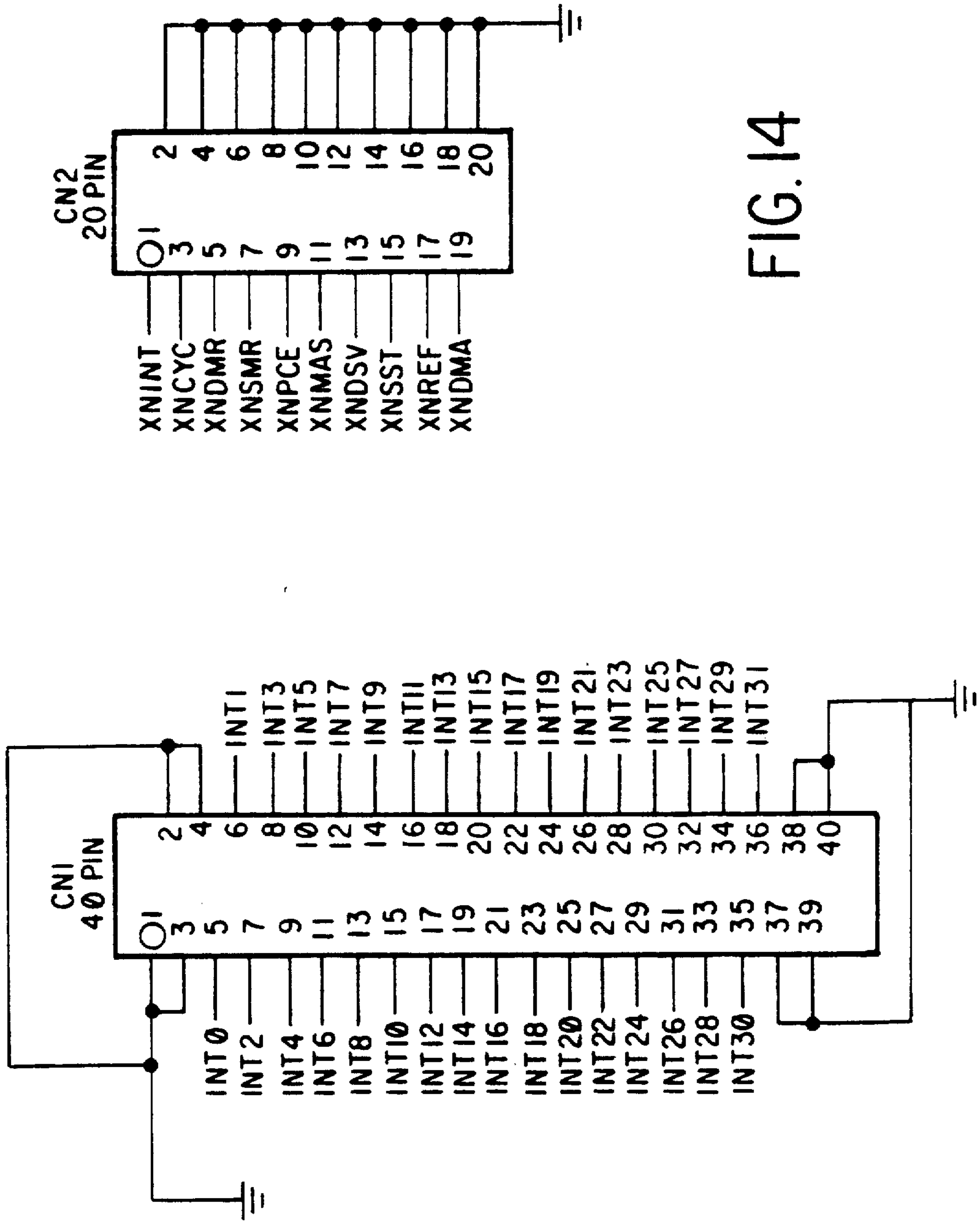

FIG. 5 shows the generation of control signals and direct memory access (DMA) handshaking signals for the host interface. The host board is capable of accepting high-speed DMA transfers to or from host computer 103 memory directly to and from computer 100 memory. FIGS. 6–12 show the data paths for conversion between an 8-bit host 103 data bus and the 32-bit data bus 101, as well as the buffering for data and control signals on the ribbon cables connecting the host card to the interface card described next. FIGS. 13–14 show the connector arrangements for the host card to host computer bus connector and for the host card to interface card connectors.

Figure 15:
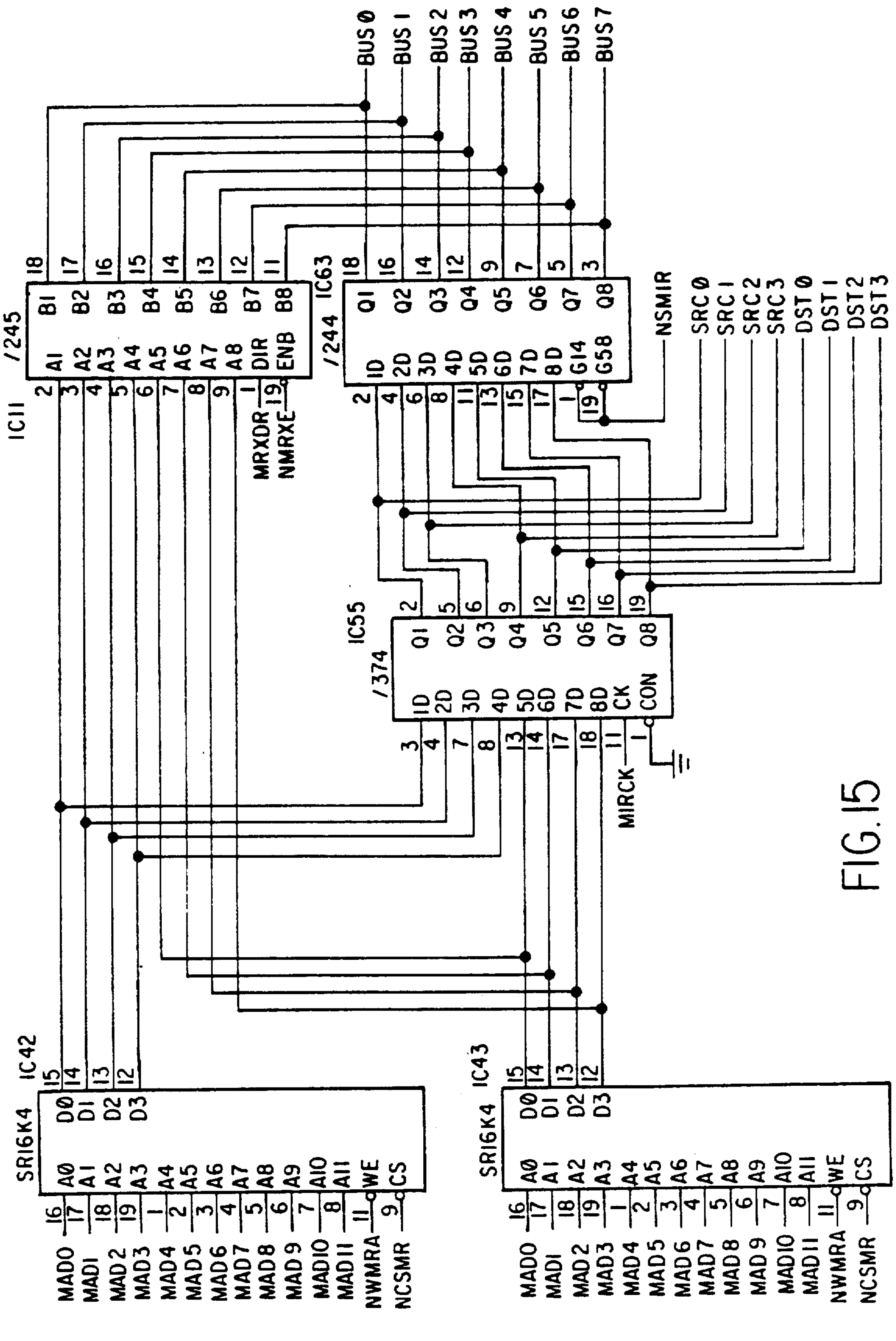
Figure 16:
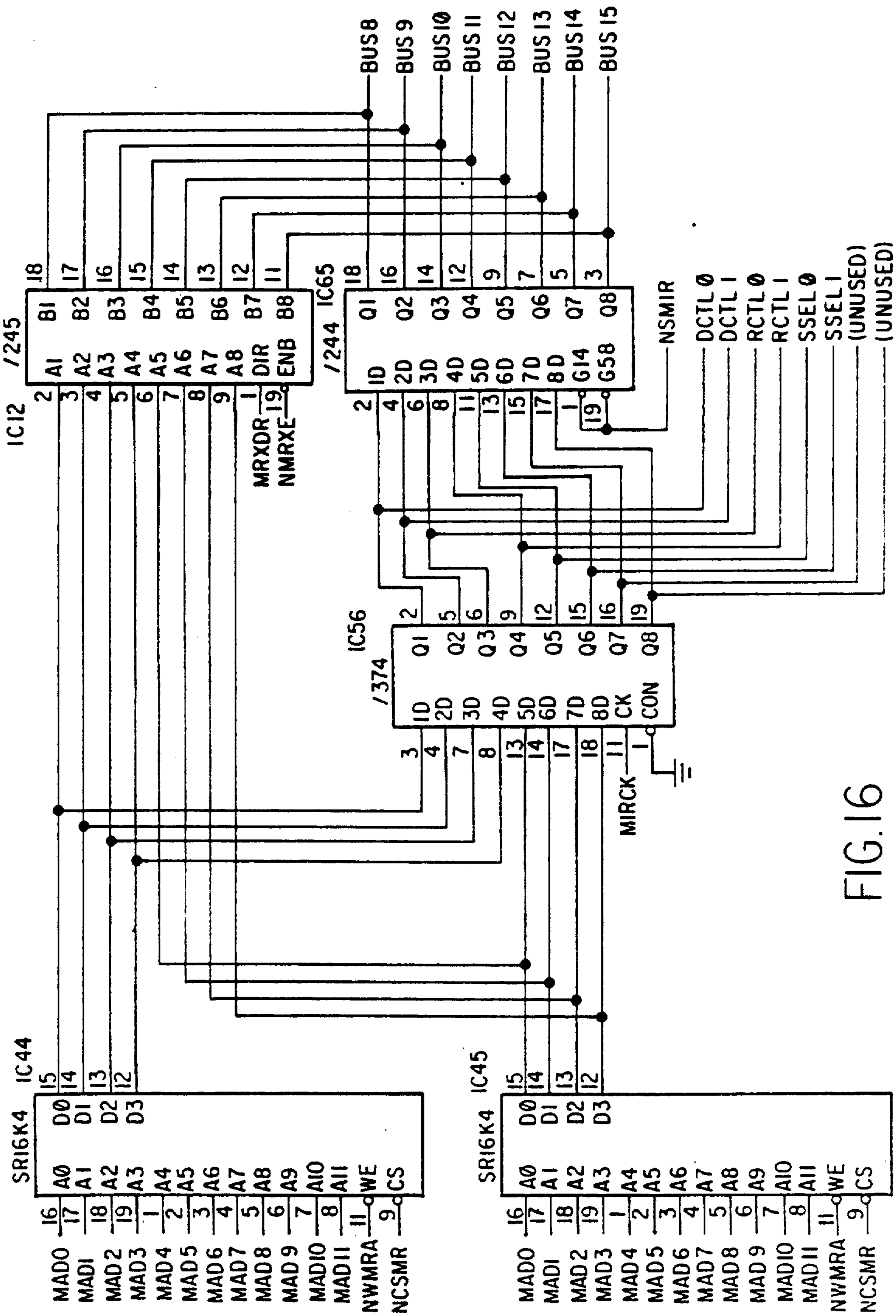

The Interface And Stack Card. The interface and stack card (called the interface card) described by FIGS. 15–40 performs a dual function: It serves as the control for bus transfers from the host card and within computer 100 over data bus 101, and provides both the data stack means 108 and the return stack means 109. FIGS. 15–16 show storage for bits 0–15 of the microcode memory and the micro-instruction register. The micro-instruction format is discussed in Appendix B.

Figure 17:
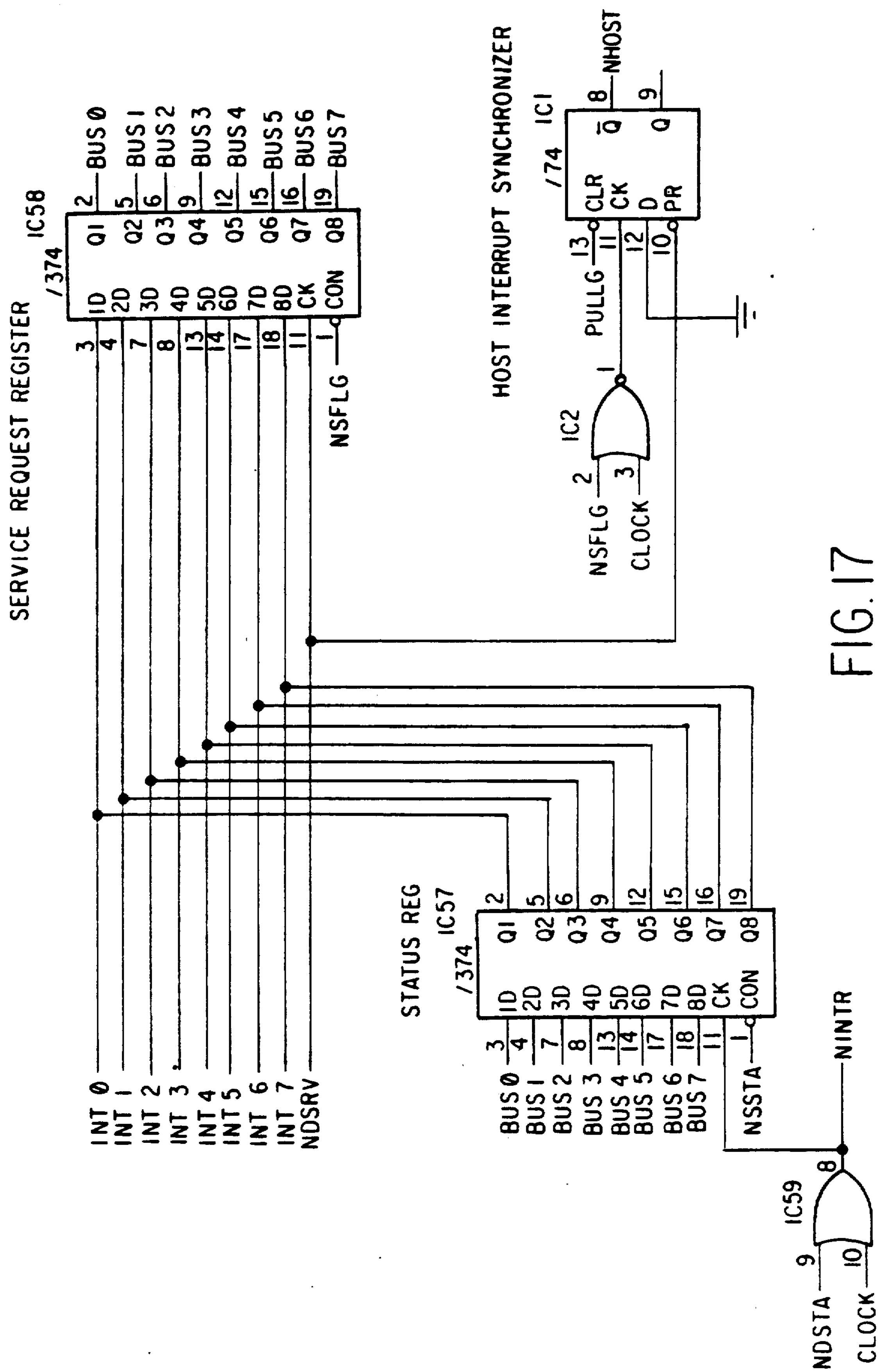
Figure 18:
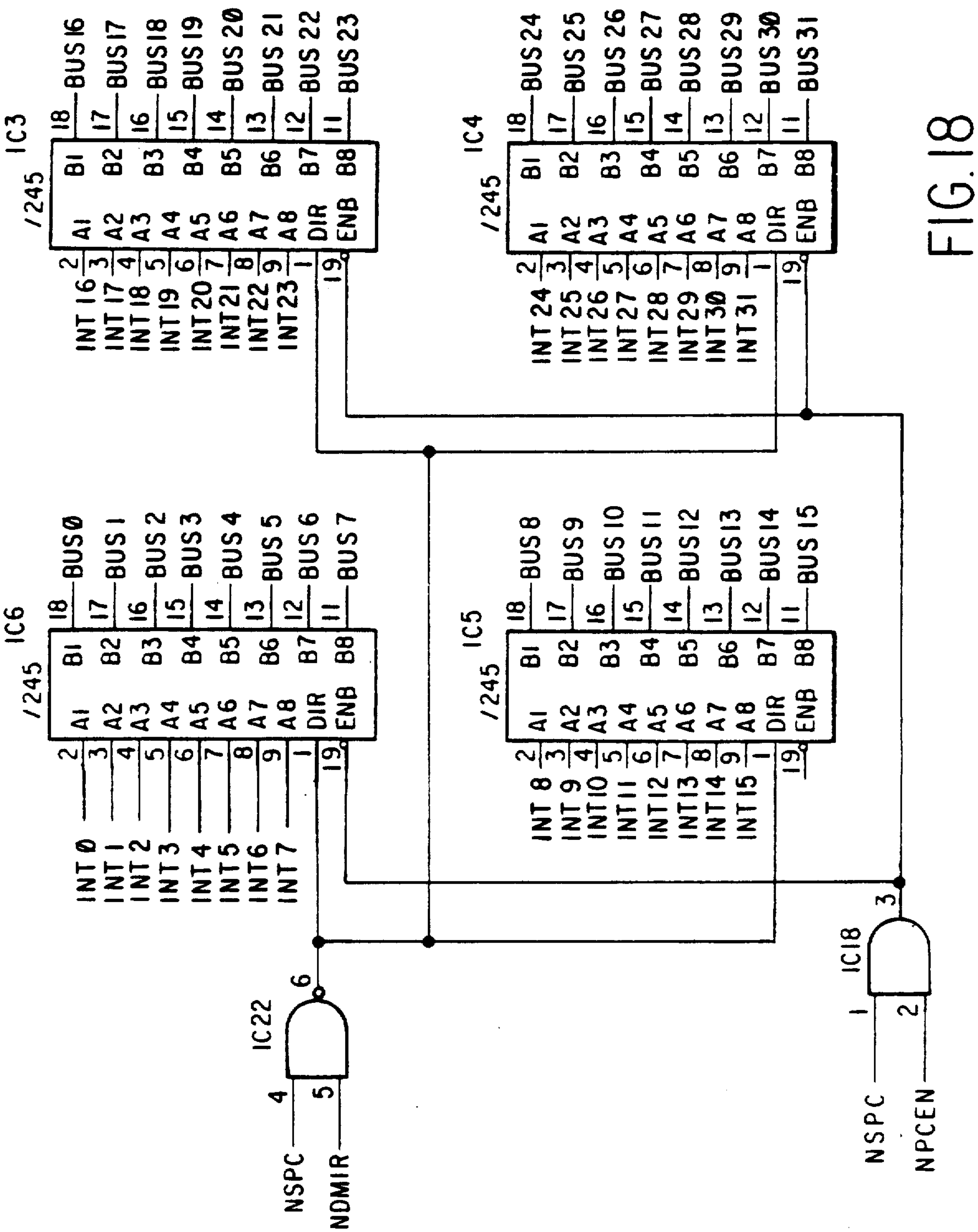
Figure 19:
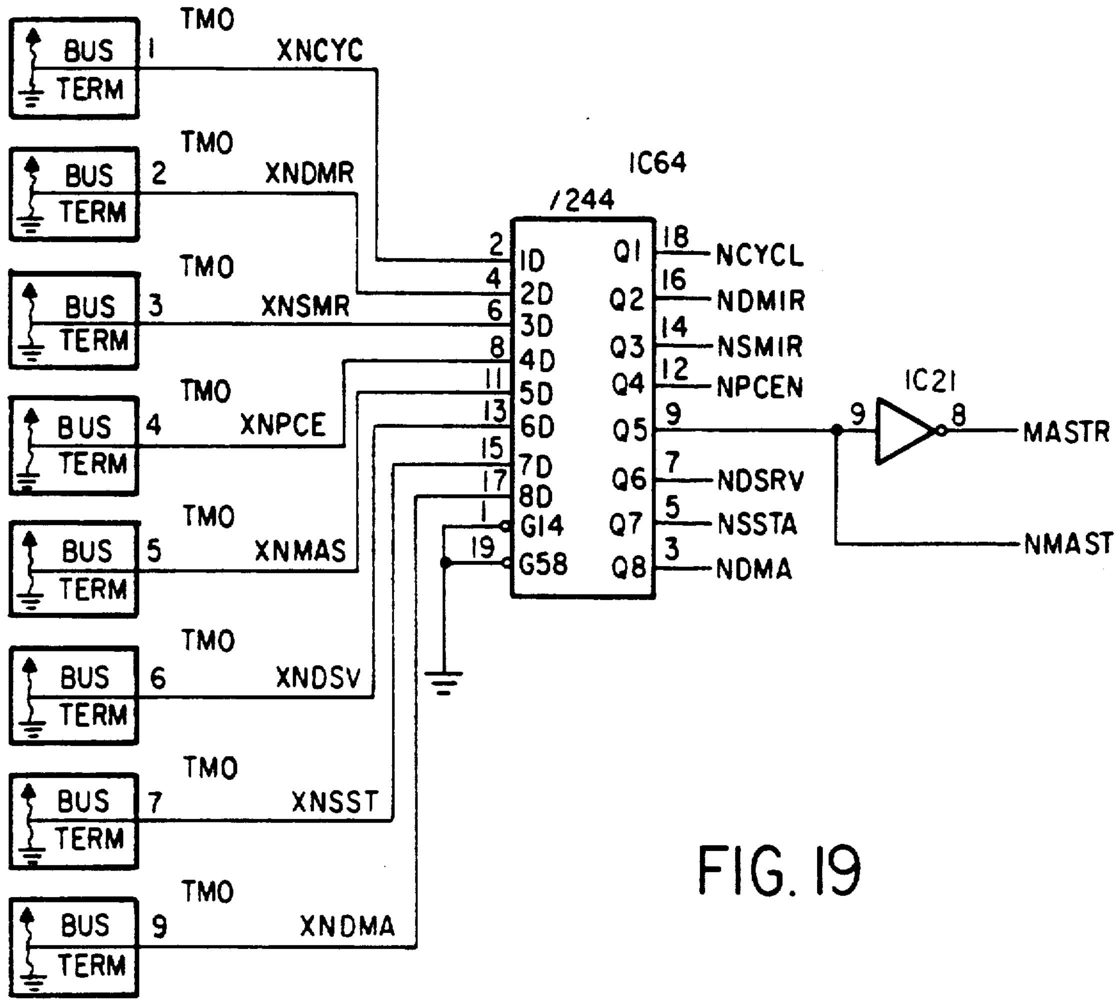
Figure 20:
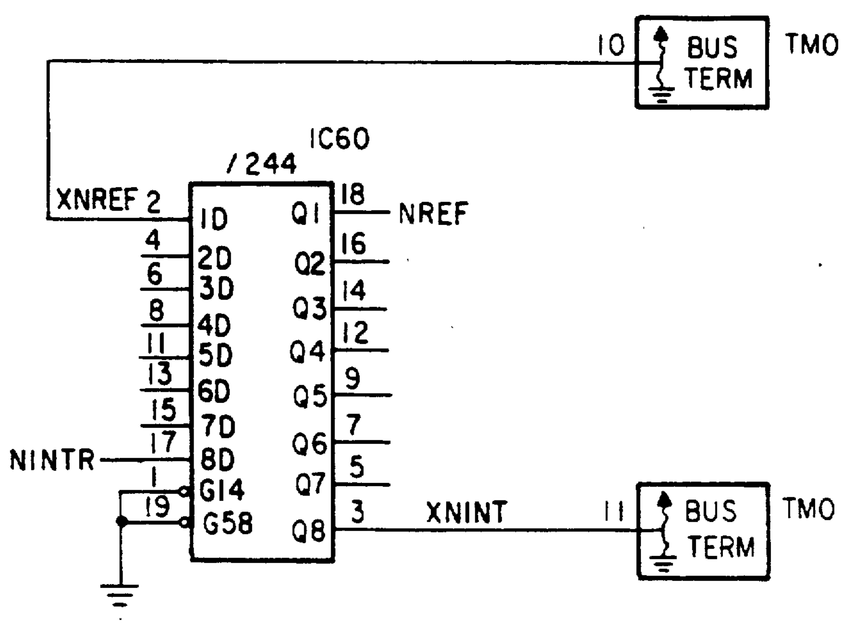

FIG. 17 shows the service request register IC58 which is used by the host computer 103 to request one of 255 possible programmable service types from the computer 100. Also shown is the status register IC57 which is used by computer 100 to signal a request for service from host computer 103. FIGS. 18–20 show data and control signal buffers between the host card and the interface card.

Figure 21:
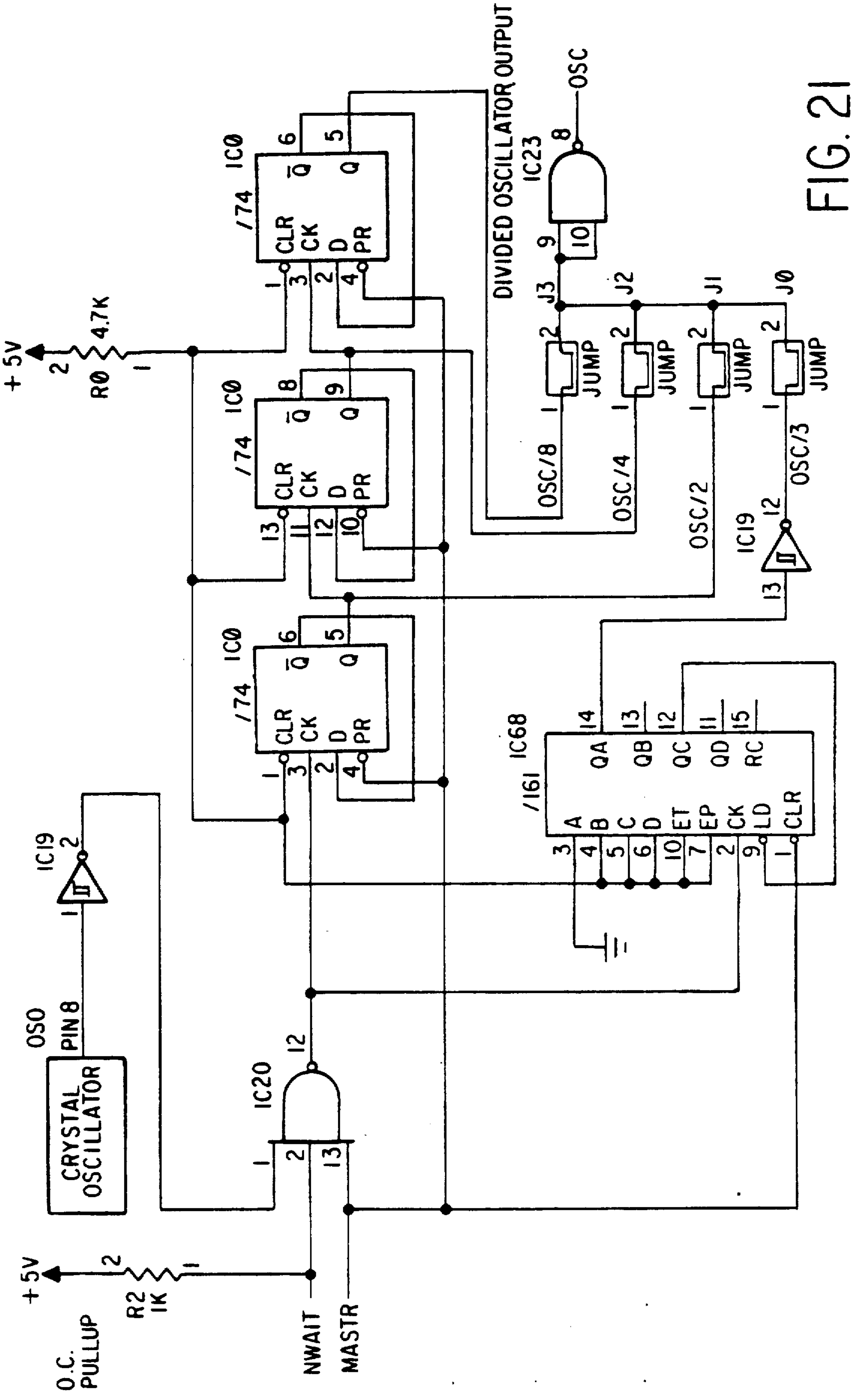
Figure 22:
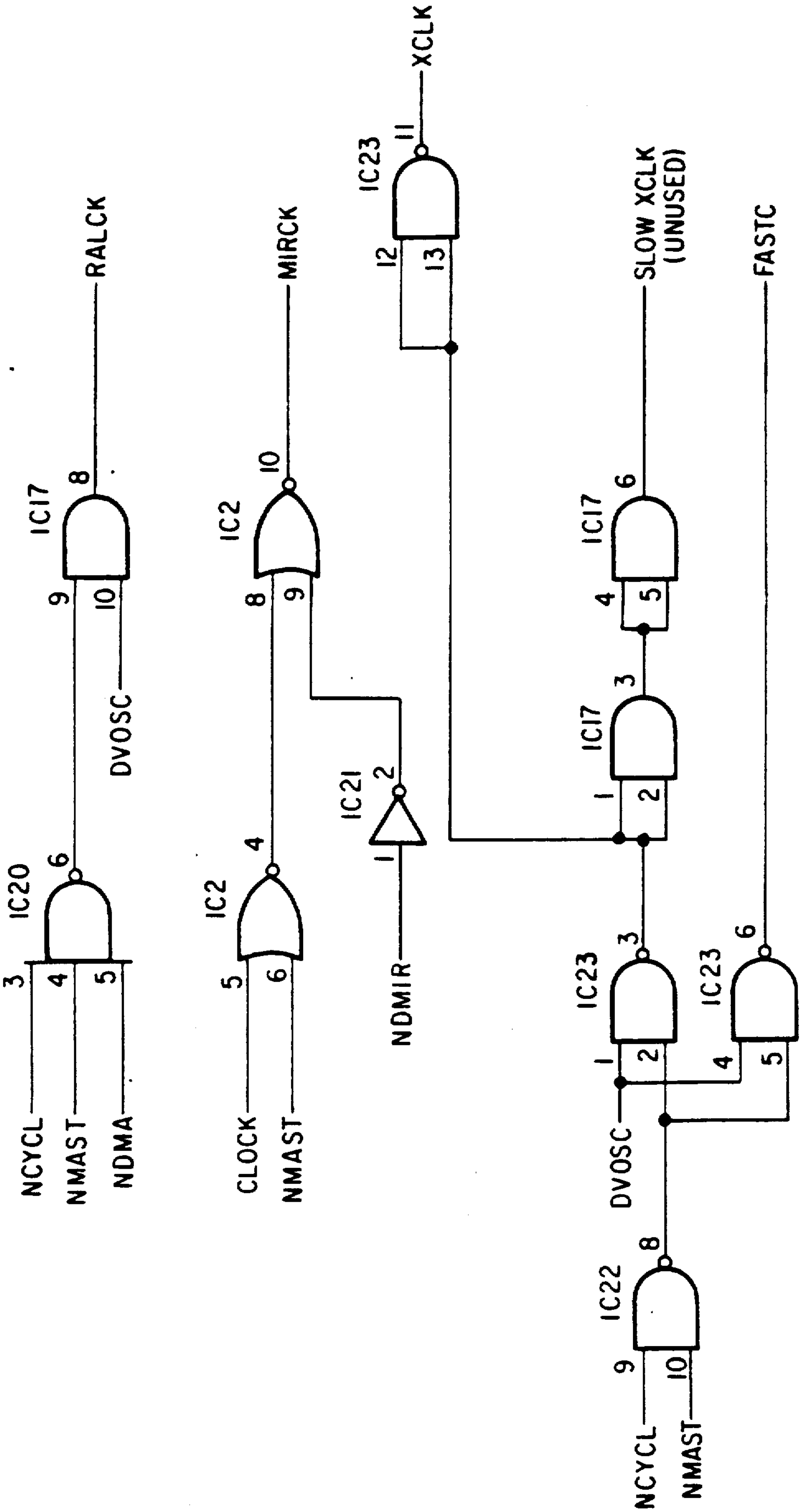
Figure 23:
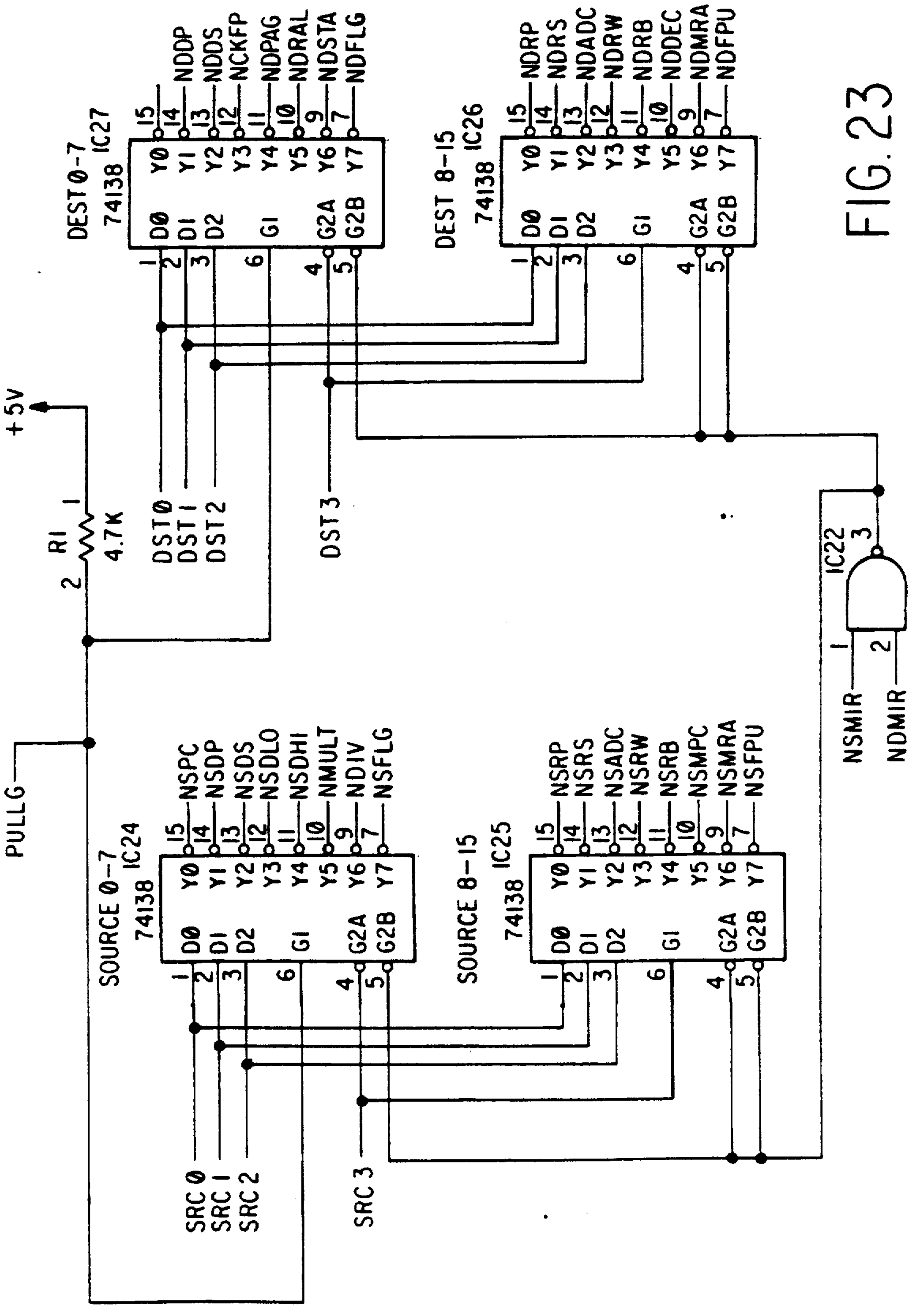
Figure 24:
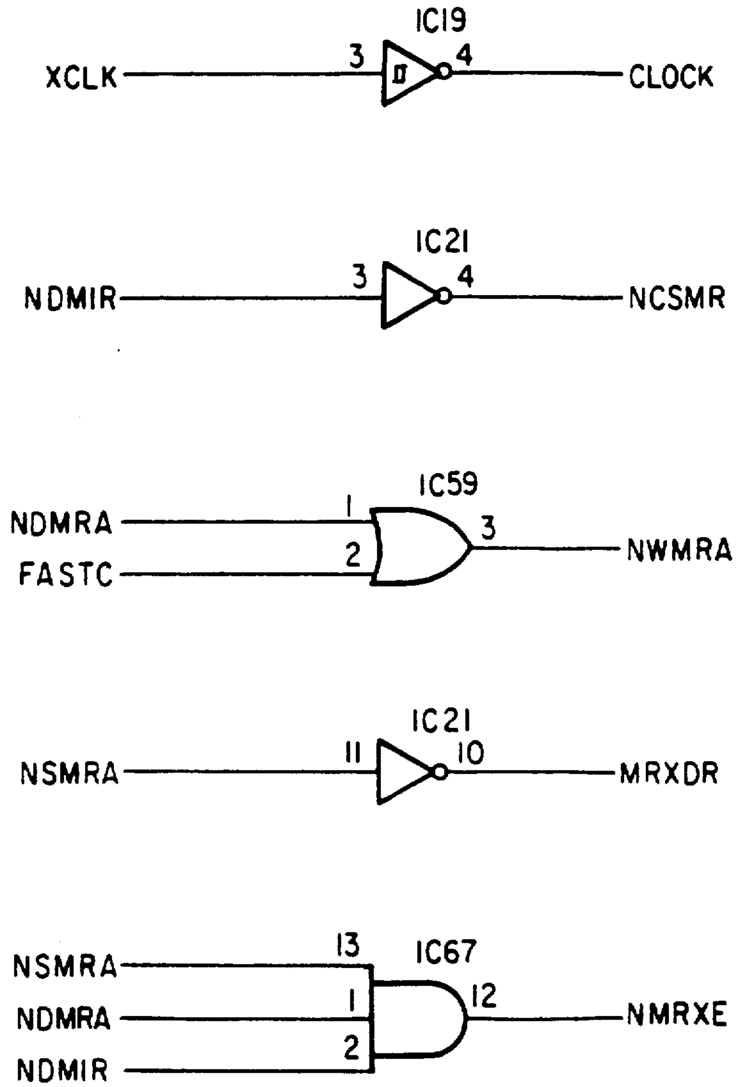
Figure 25:
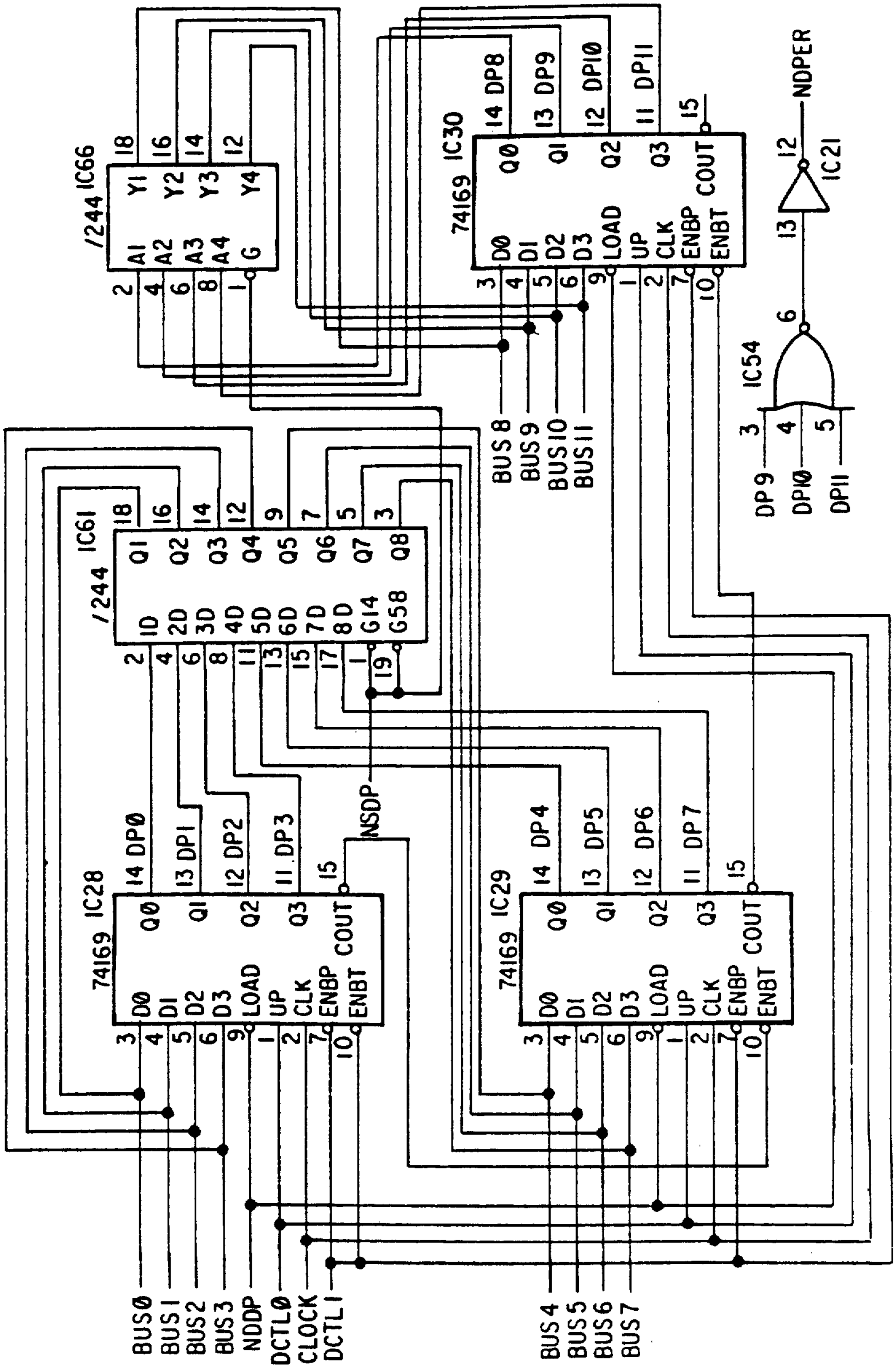
Figure 26:
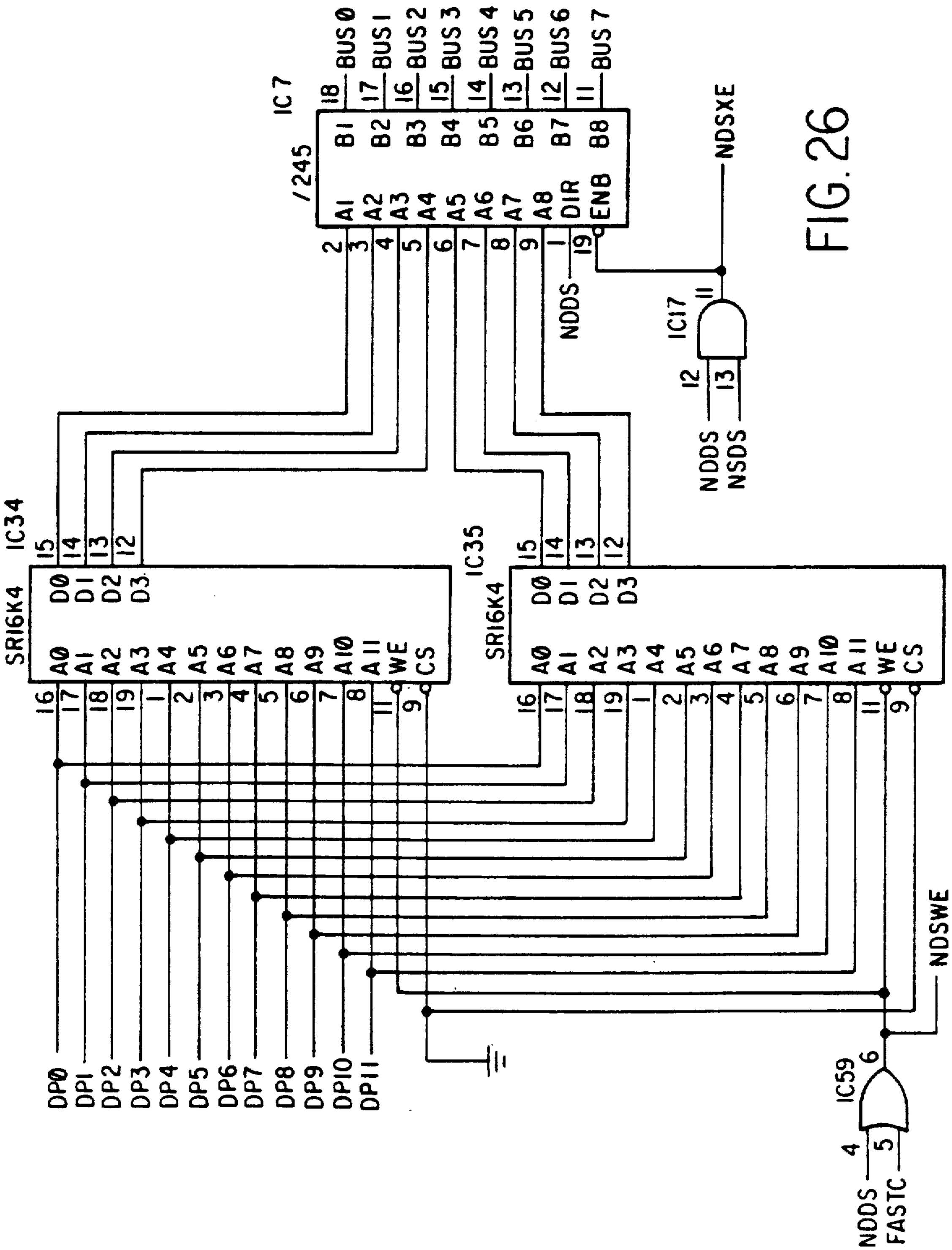
Figure 27:
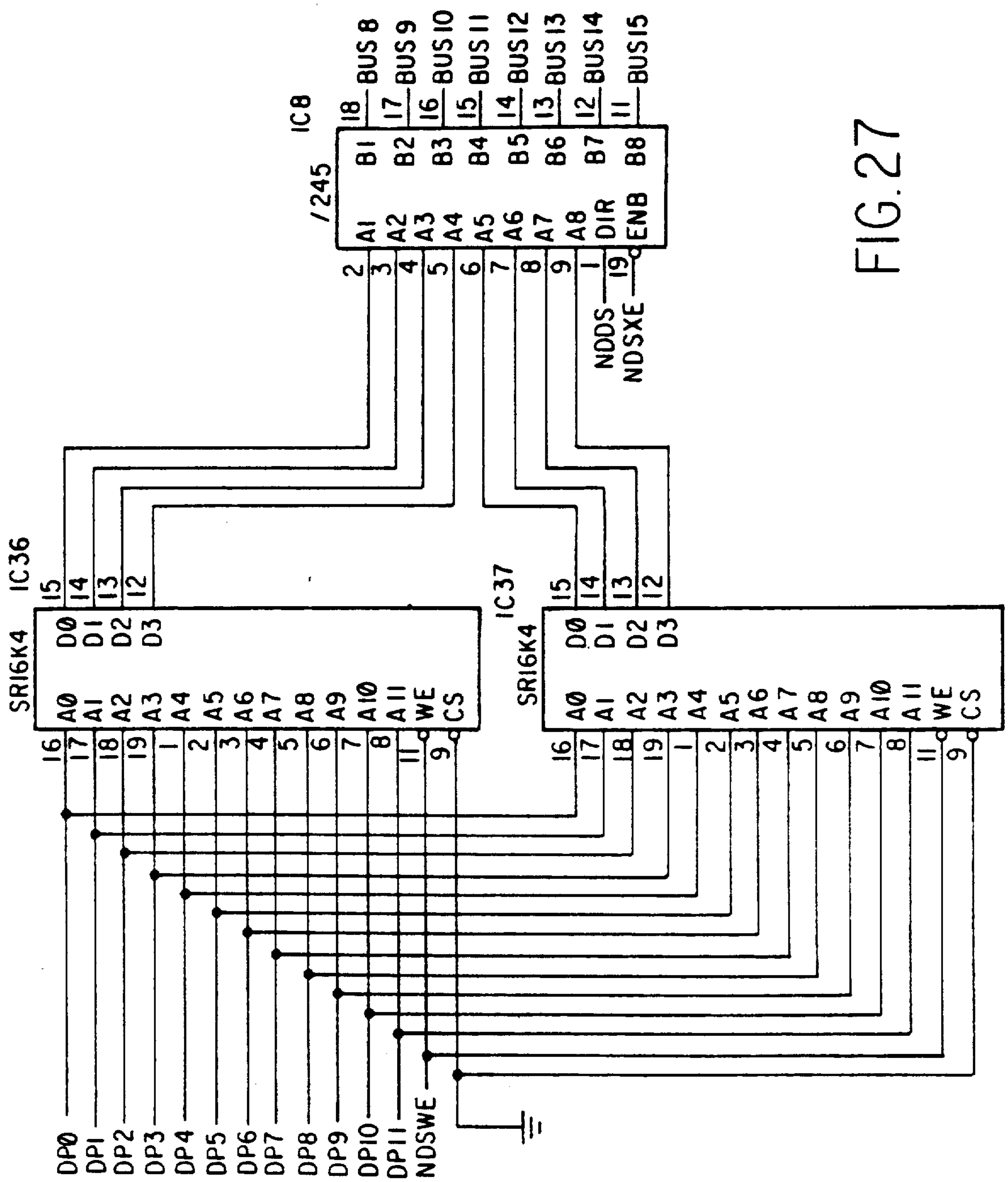
Figure 28:
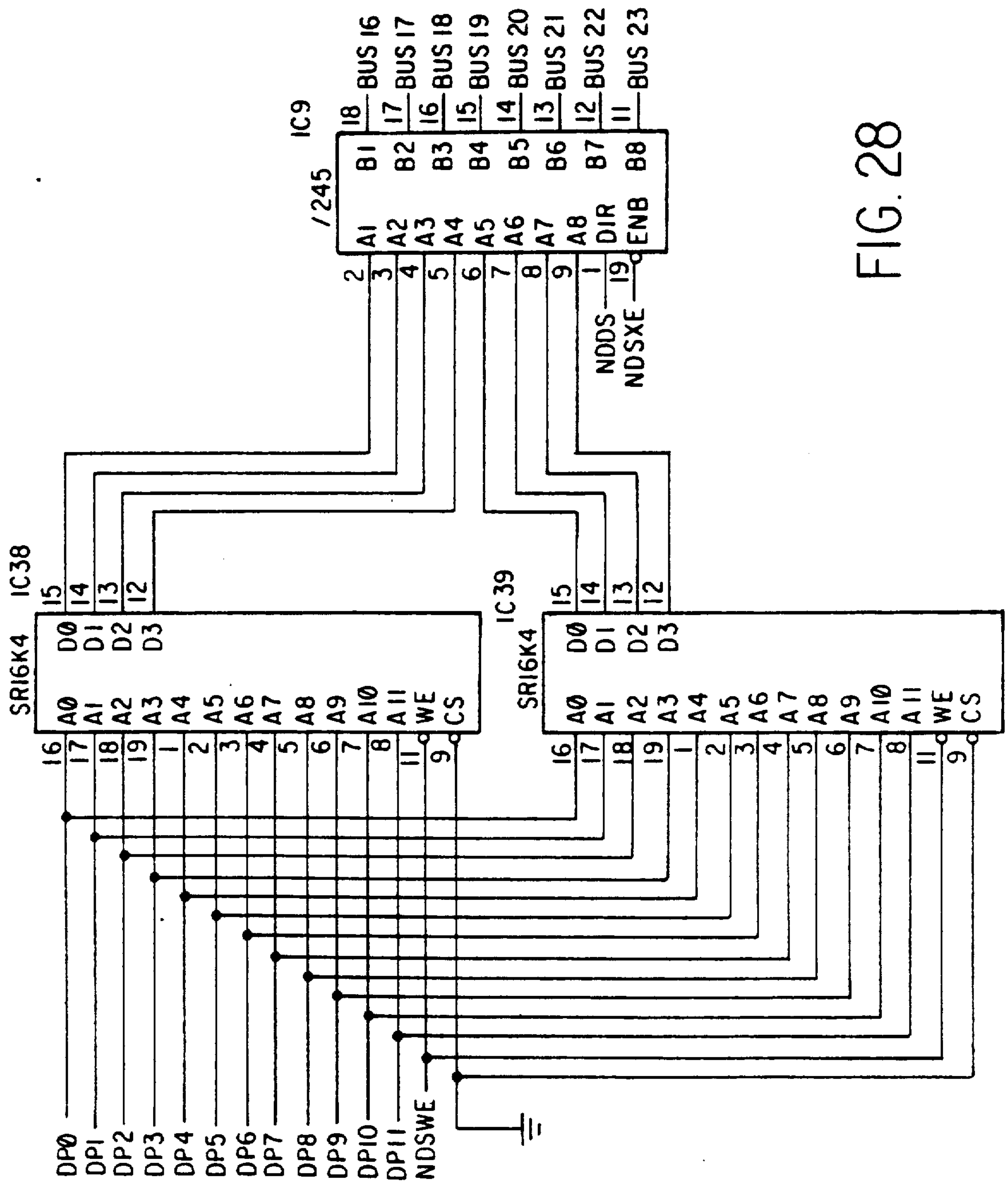
Figure 29:
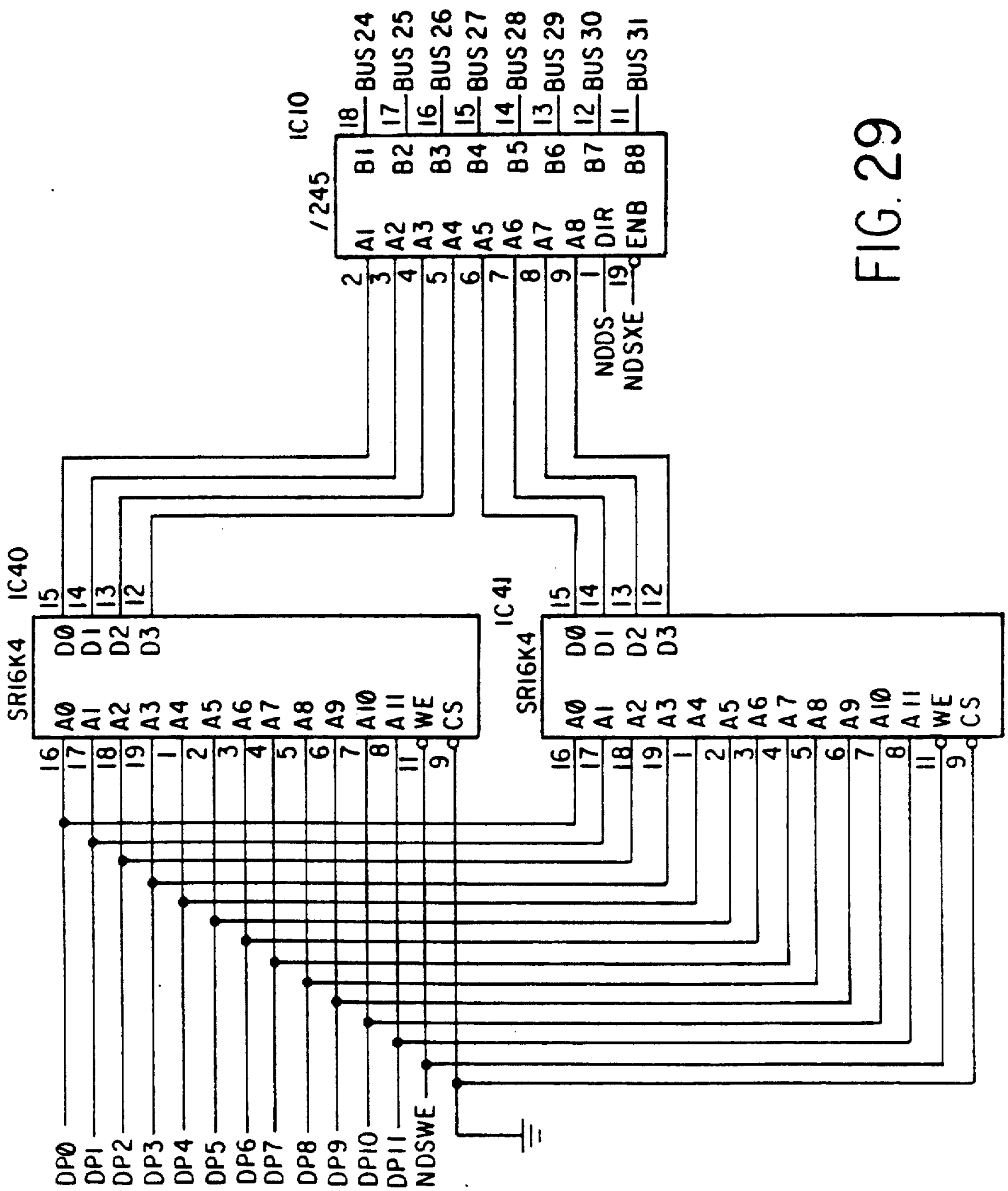
Figure 30:
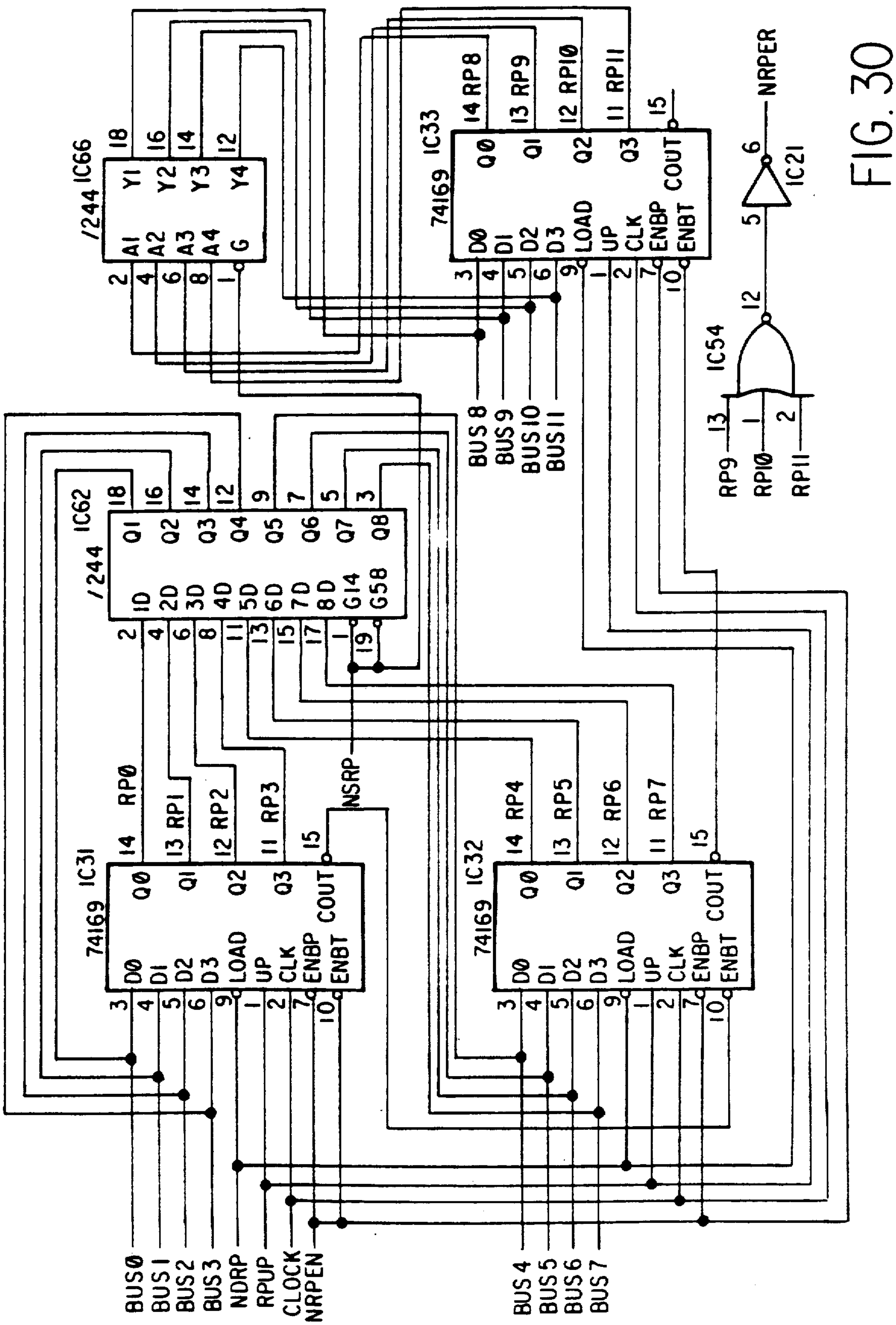
Figure 31:
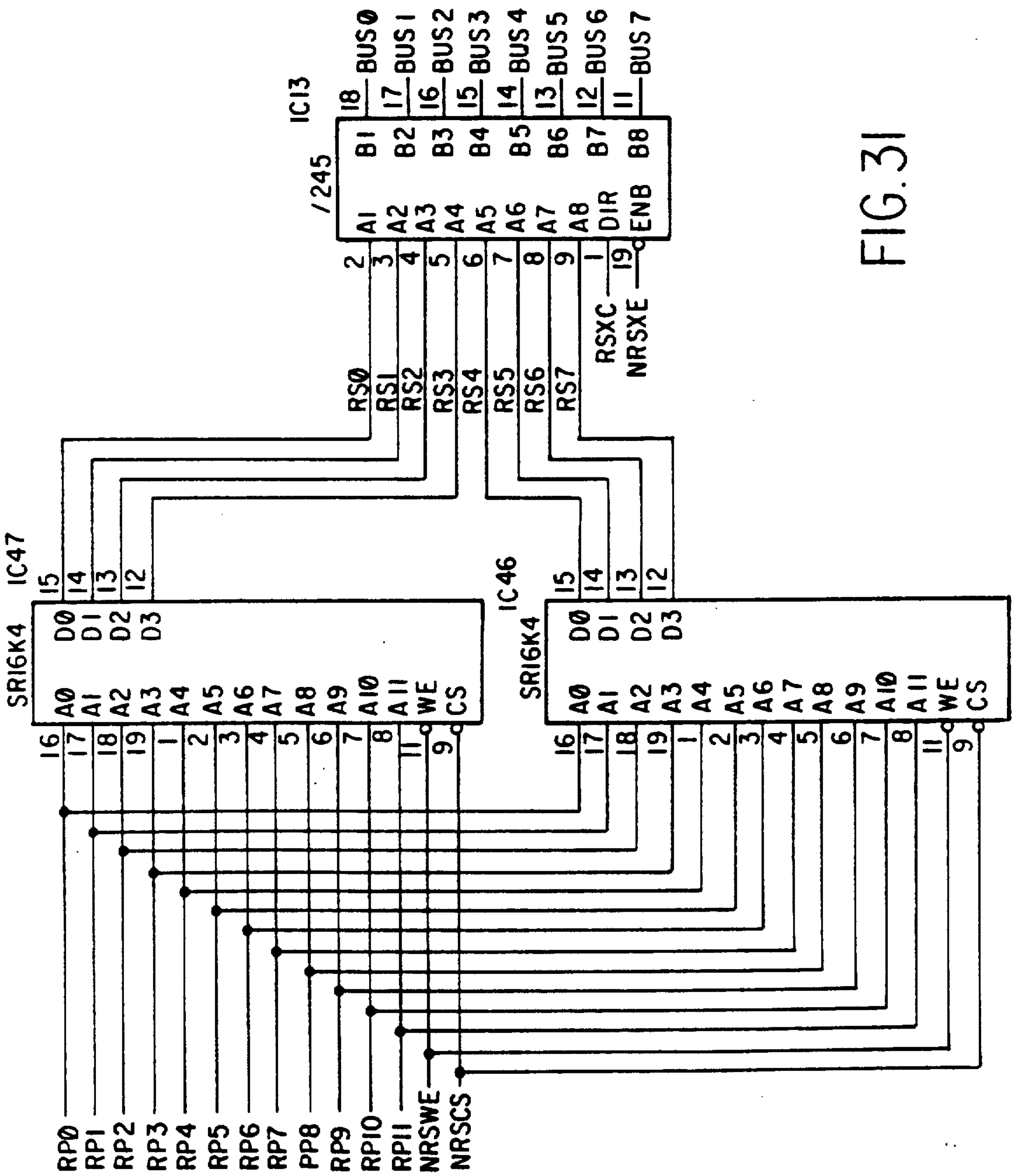
Figure 32:
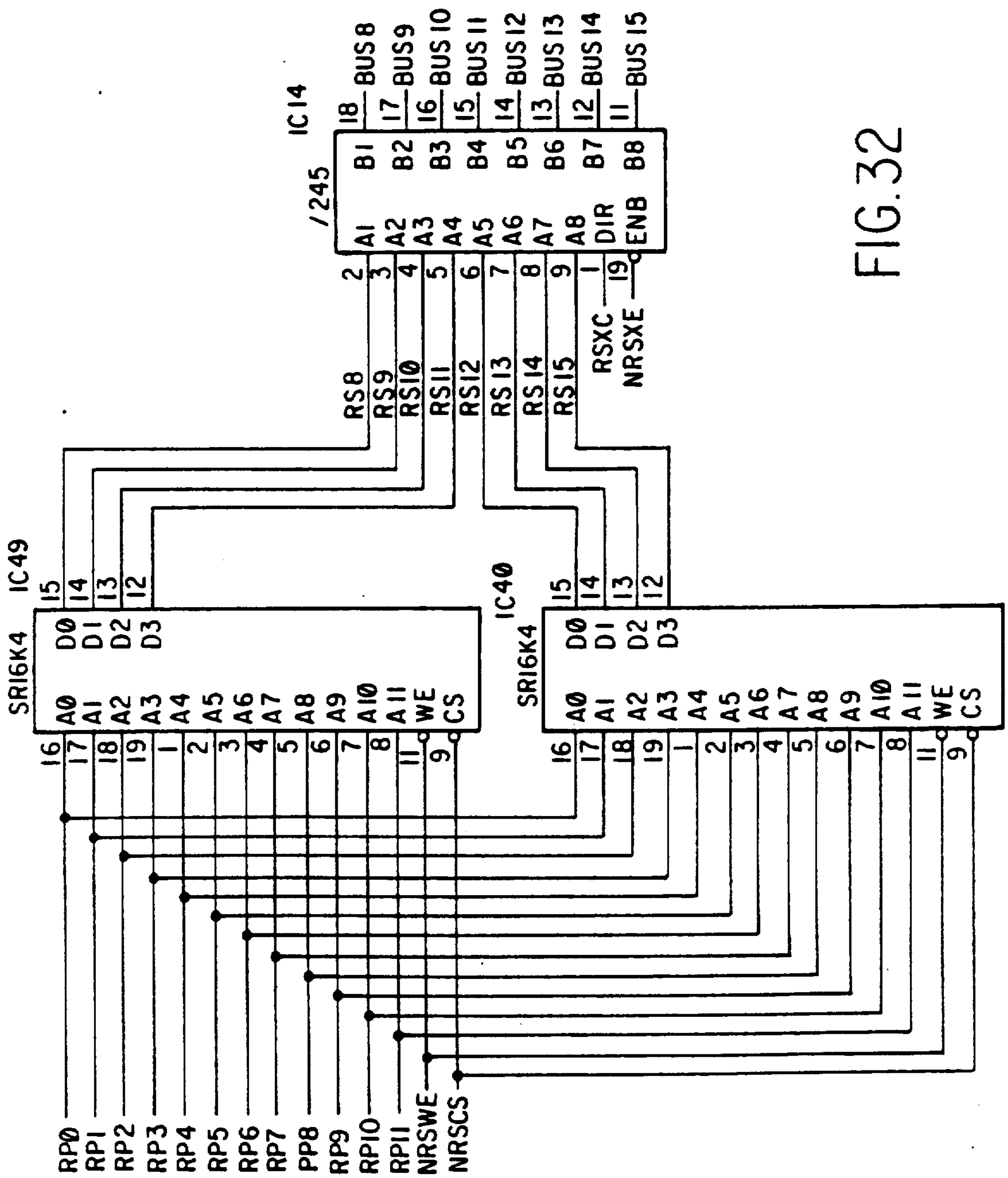
Figure 33:
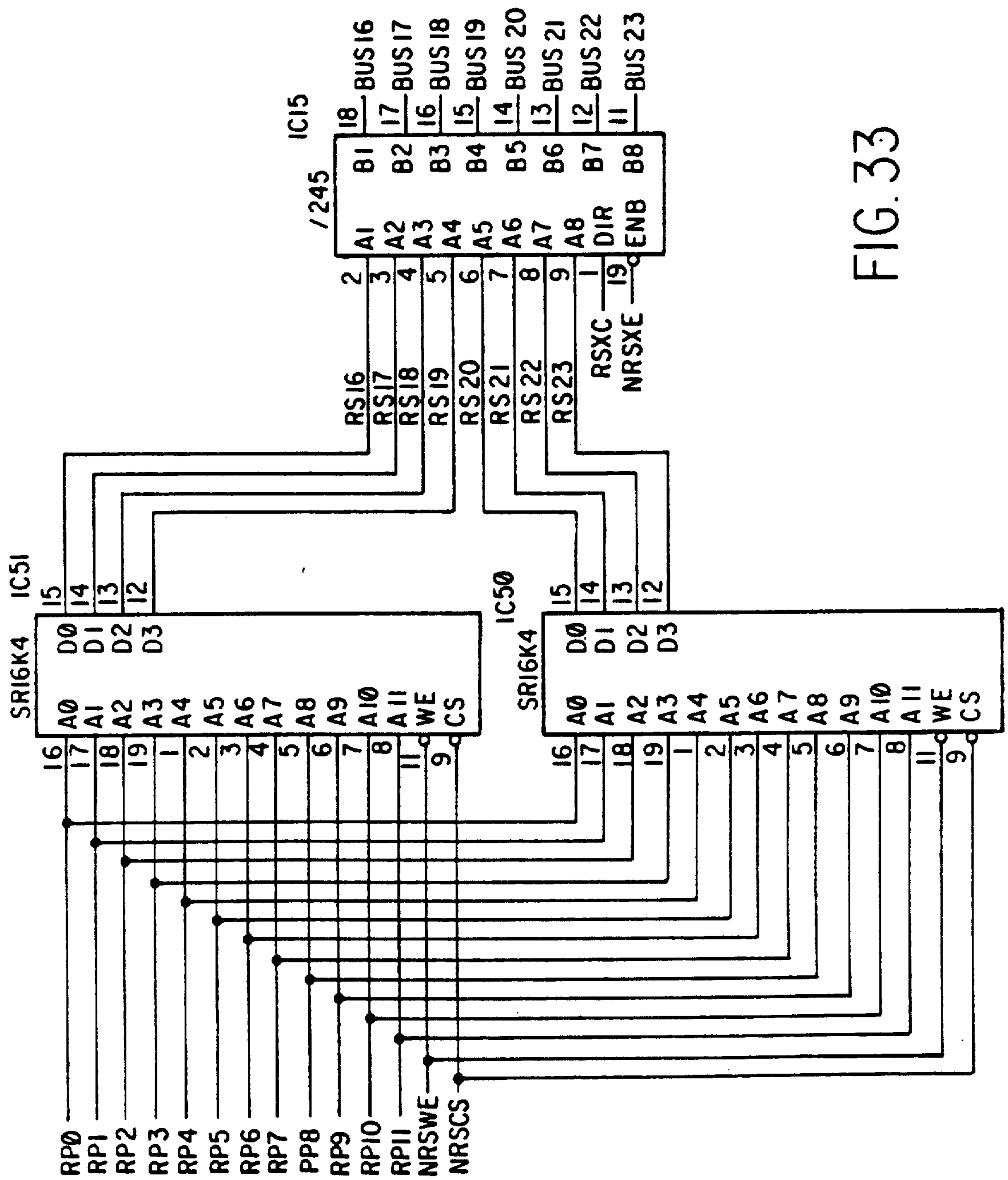
Figure 34:
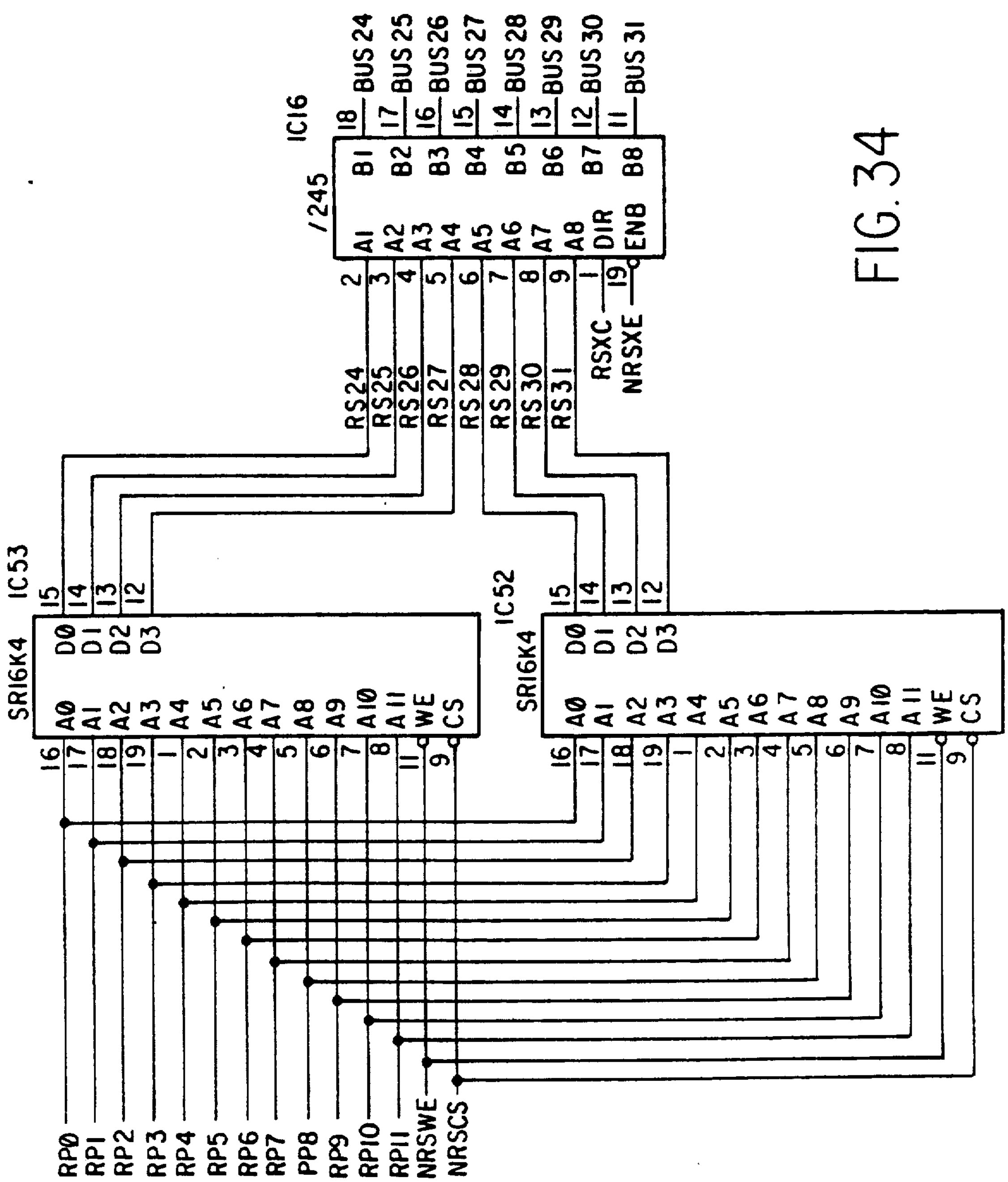
Figure 35:
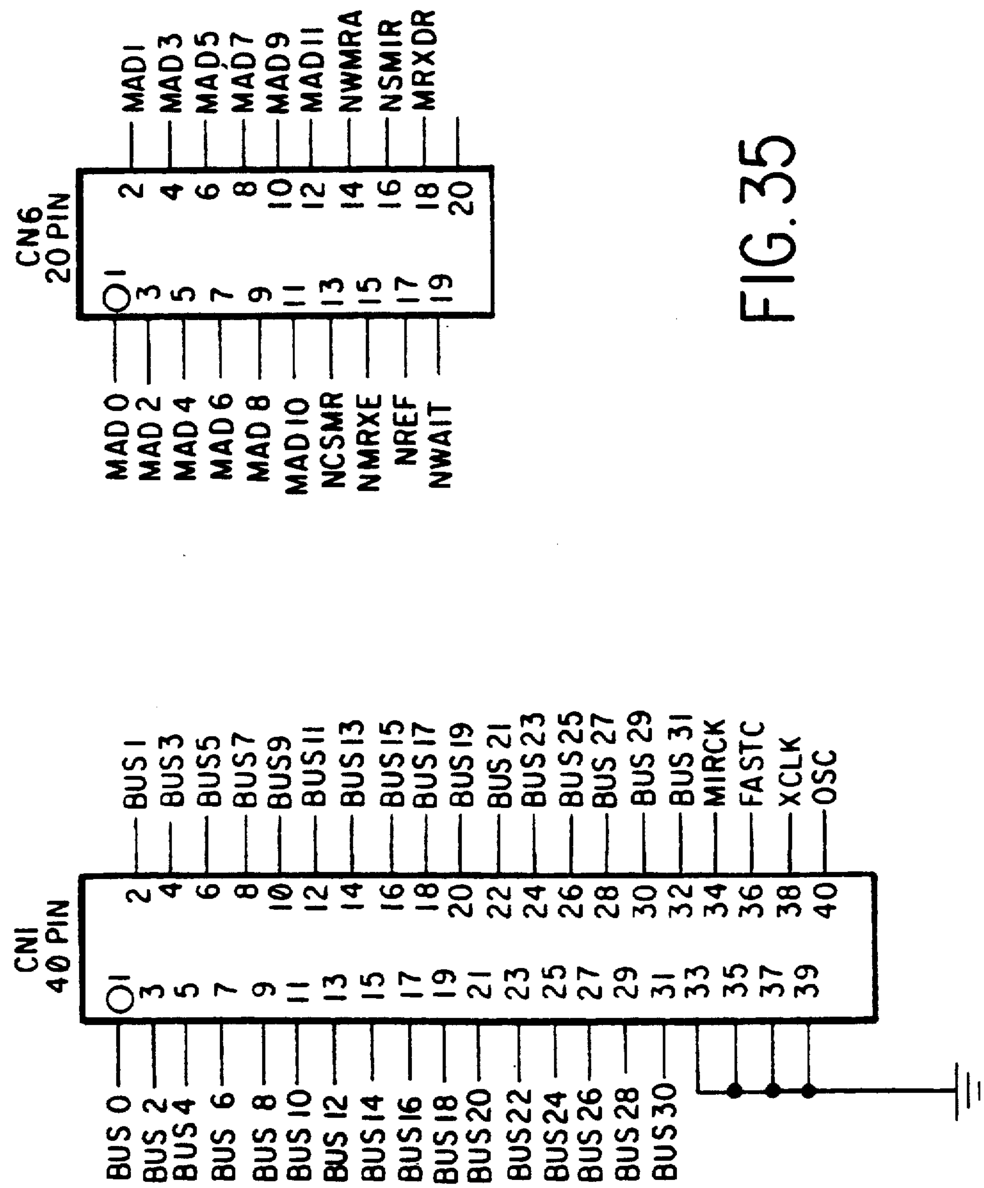
Figure 36:
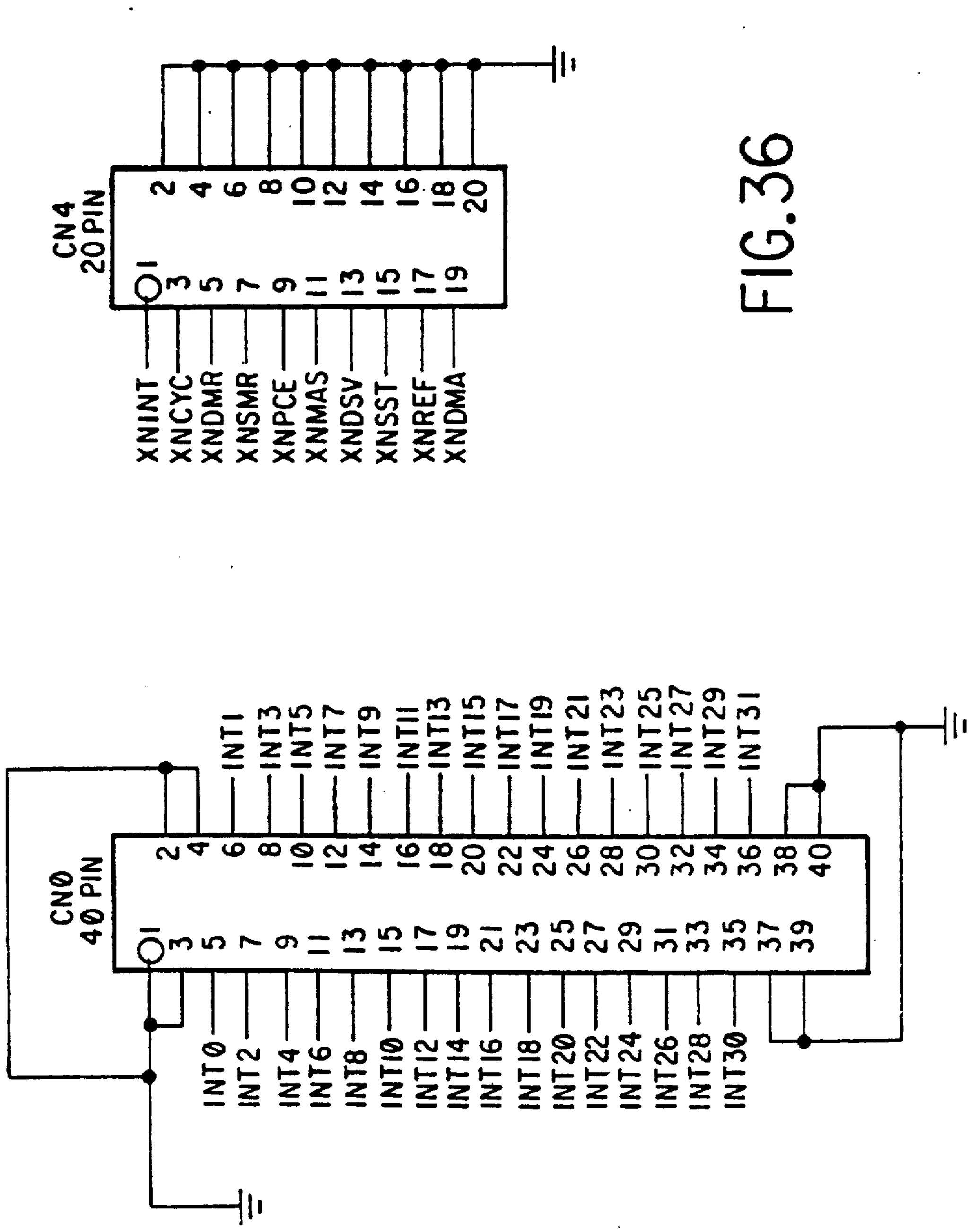
Figure 37:
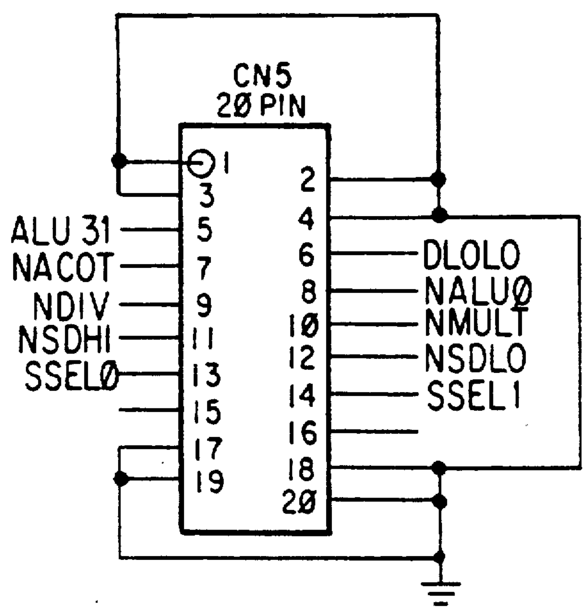
Figure 39:
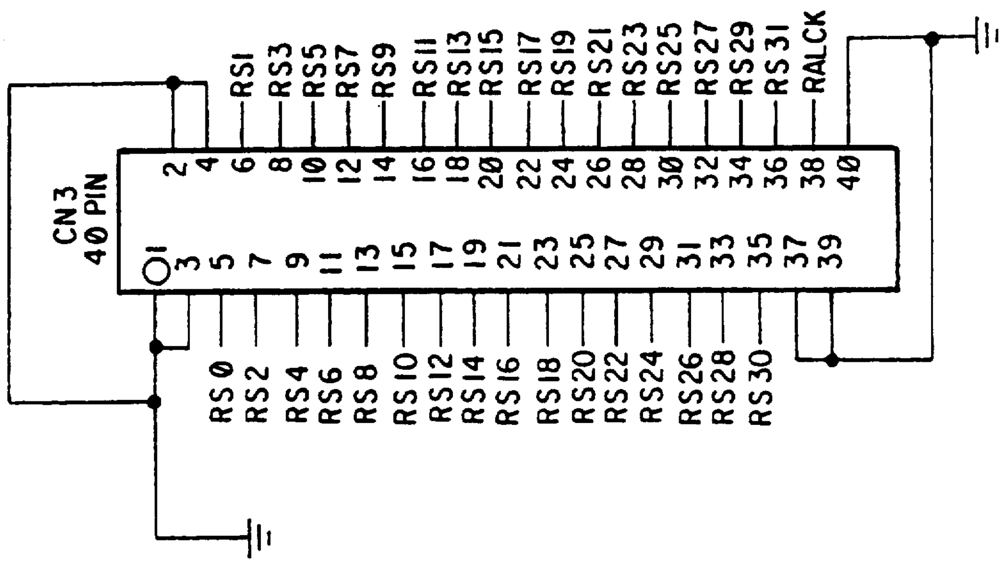
Figure 38:
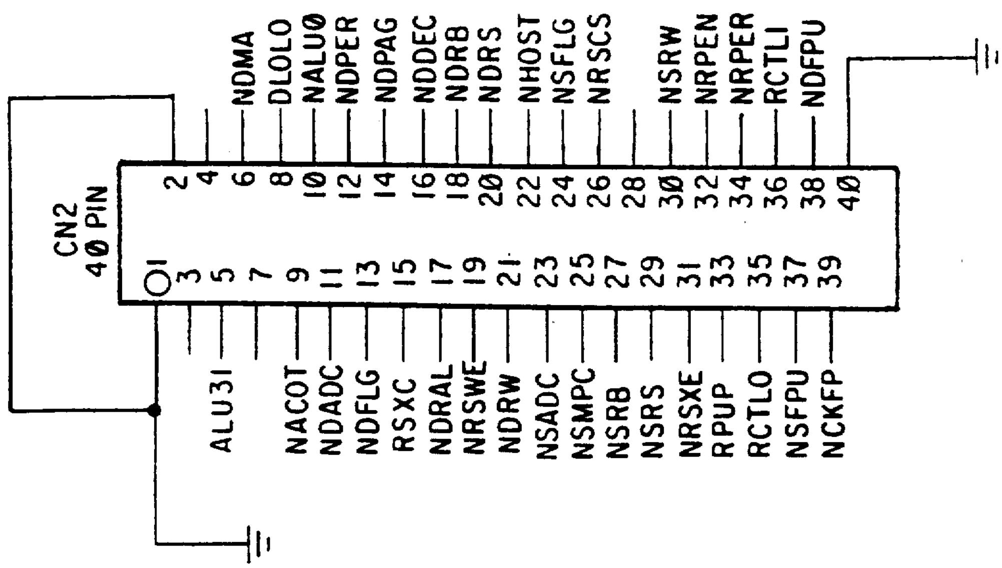
Figure 40:
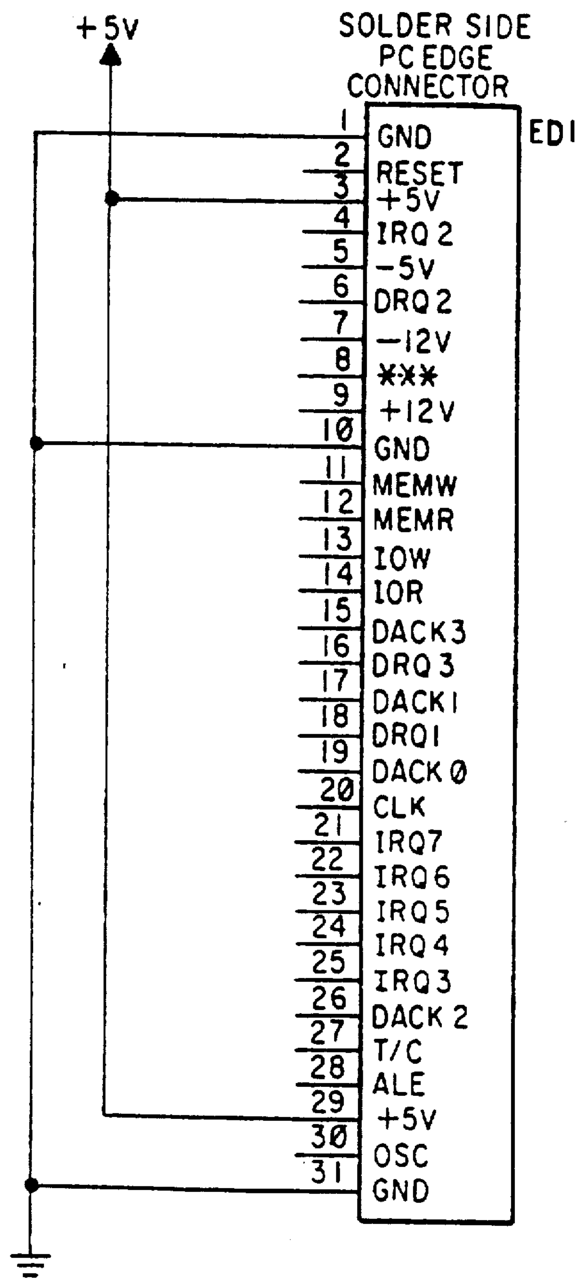

FIGS. 21–22 show the clock generating circuits for computer 100. Jumpers J0 through J3 in FIG. 21, along with a socket to change the crystal oscillator used for OS0 allow selection of a wide range of oscillator frequencies. The preferred frequency for the preferred embodiment is 5.0 million Hertz. FIG. 22 shows that a fast clock FASTC is generated that is several nanoseconds ahead in phase of the system clock XCLK for the purpose of satisfying hold times of chips that require data to be valid after the clock rising edge. FIG. 23 shows the data bus 101 source and destination decoders. The devices in this figure generate signals to select only one device to drive data bus 101 and one device to receive data from bus 101. FIG. 24 shows miscellaneous control gates for microcode memory and the micro-instruction register.

FIGS. 25–28 show the data stack means. The data stack has a 12-bit up/down counter that may be incremented, decremented, or loaded from data bus 101 at the end of every clock cycle. The use of fast static RAM chips for the stack memory itself allows the data stack 108 to be read or written and then the stack pointer 110 to be changed on each clock cycle. FIGS. 30–34 show the return stack means. The implementation of the return stack 109 and return stack pointer 111 is very similar to that of the data stack 108 and data stack pointer 110.

FIGS. 35–40 show connector arrangements for transmitting and receiving signals from other cards in the system and from the host adapter card.

Figure 41:
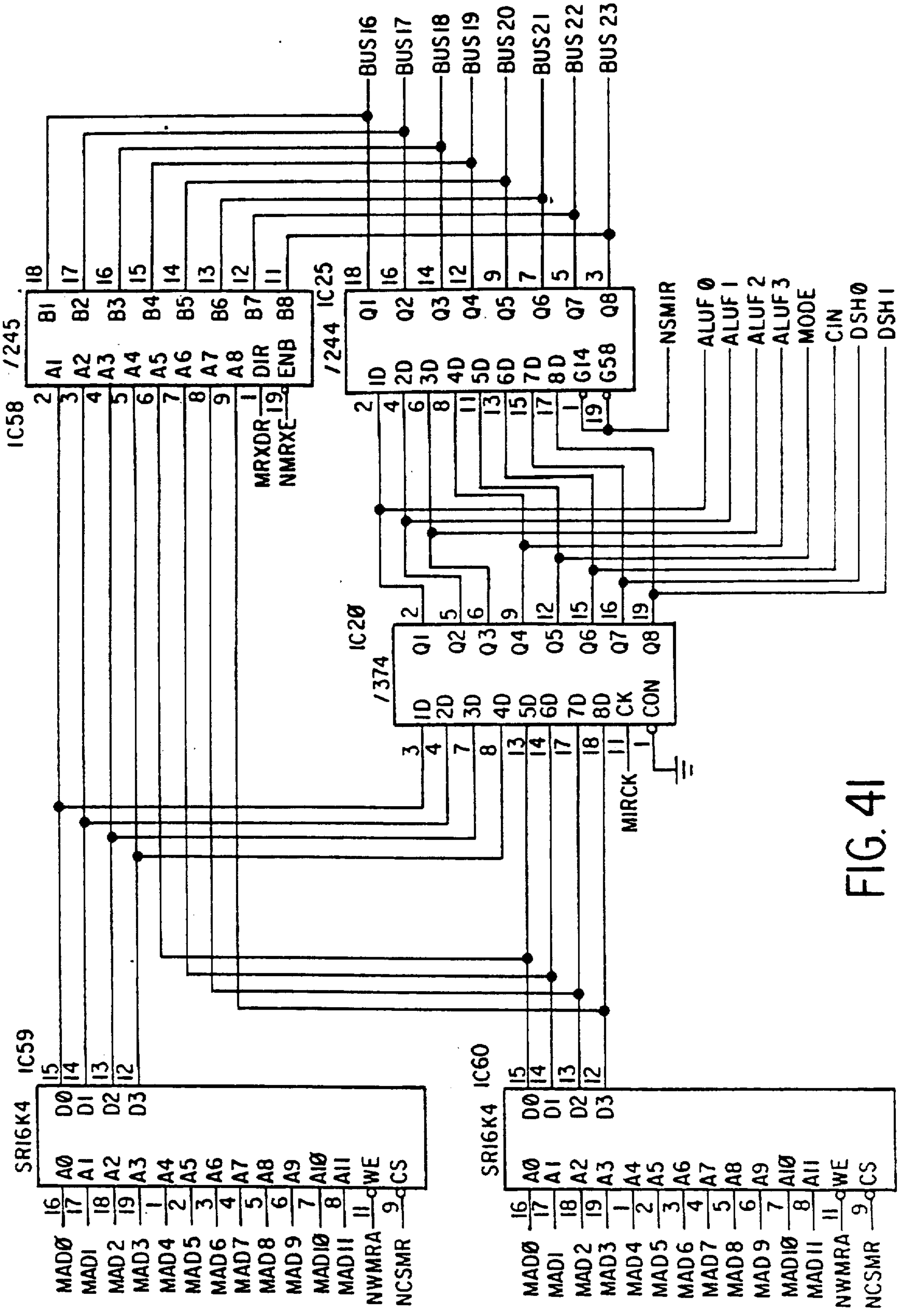
Figure 42A:
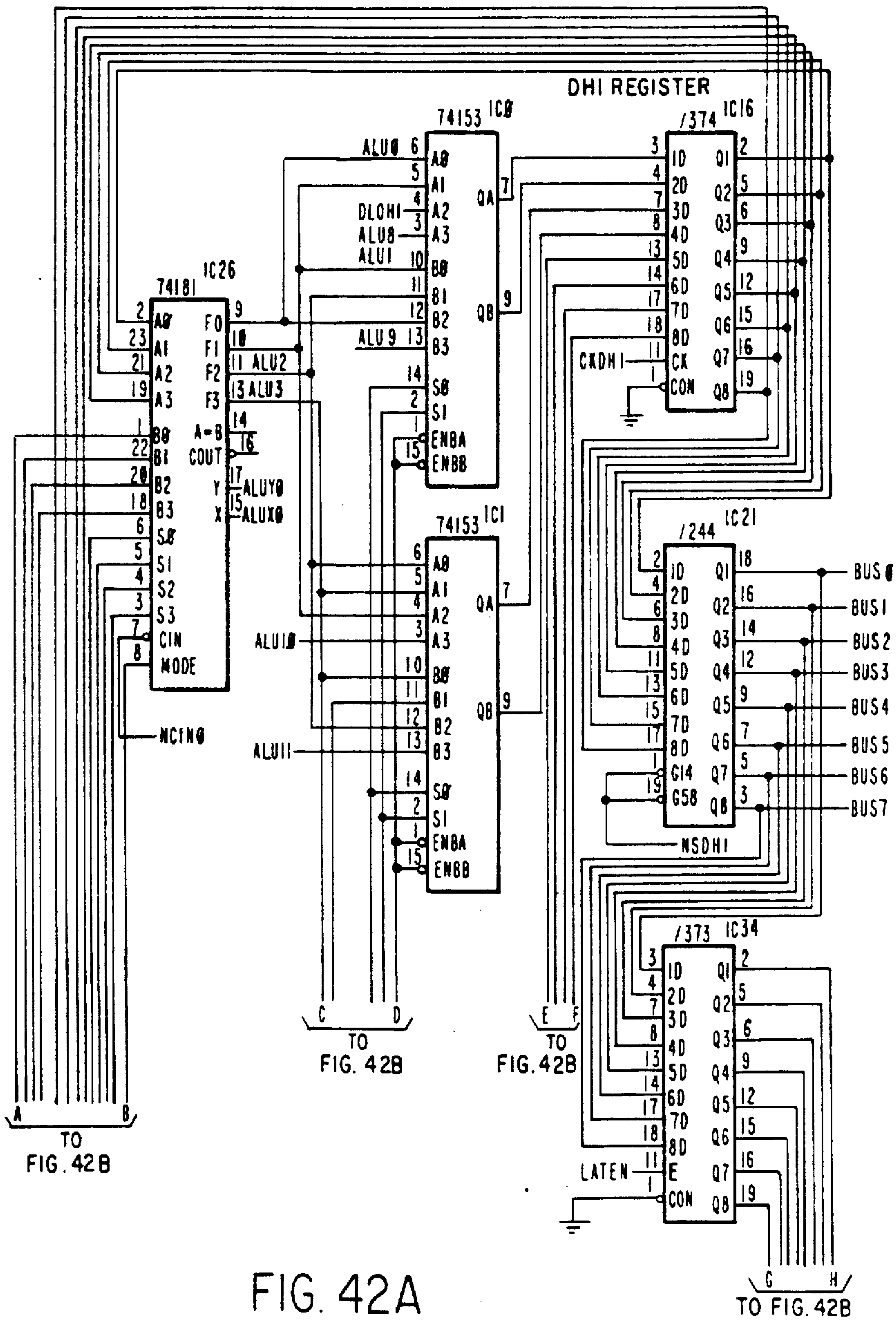
Figure 42B:
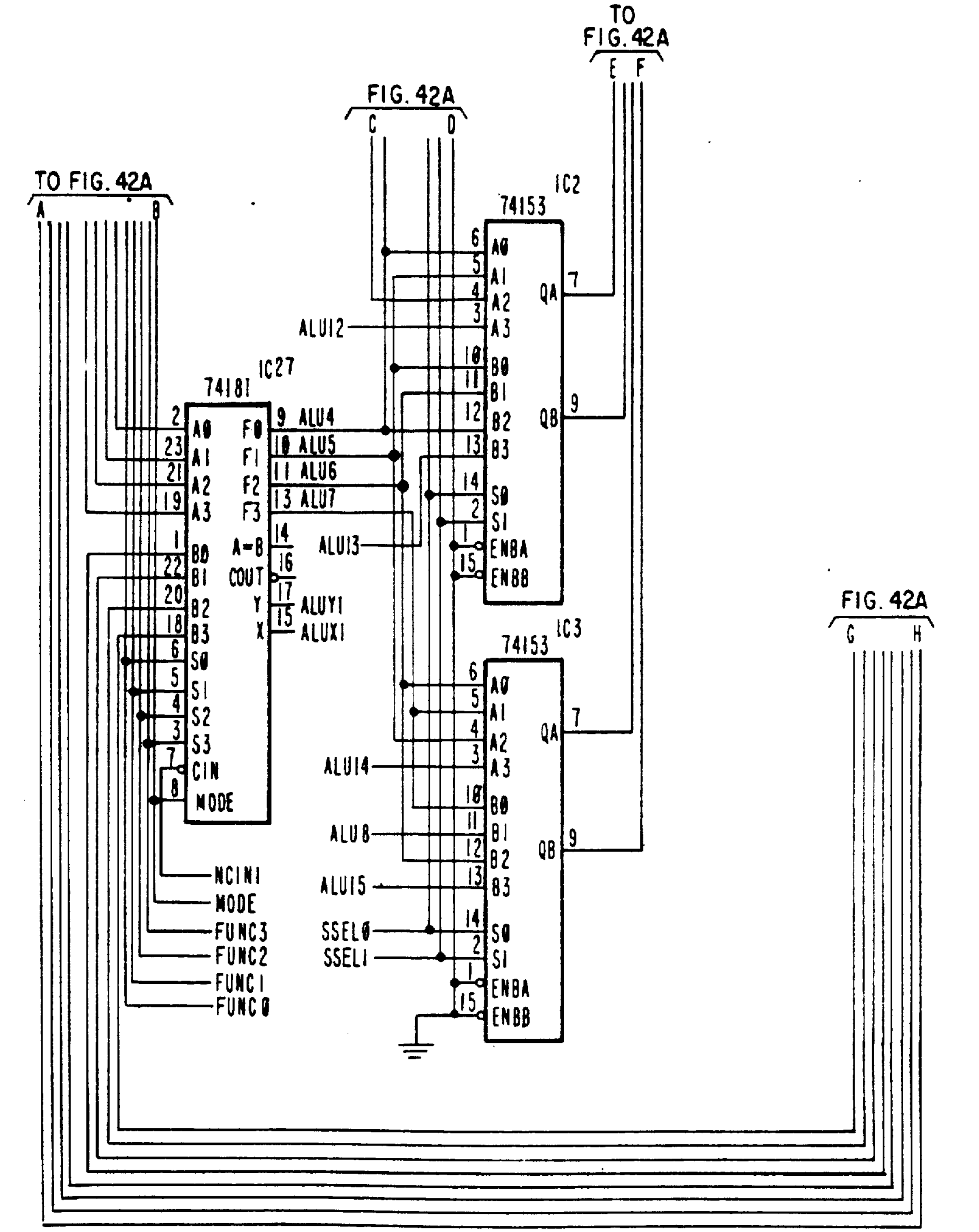
Figure 43A:
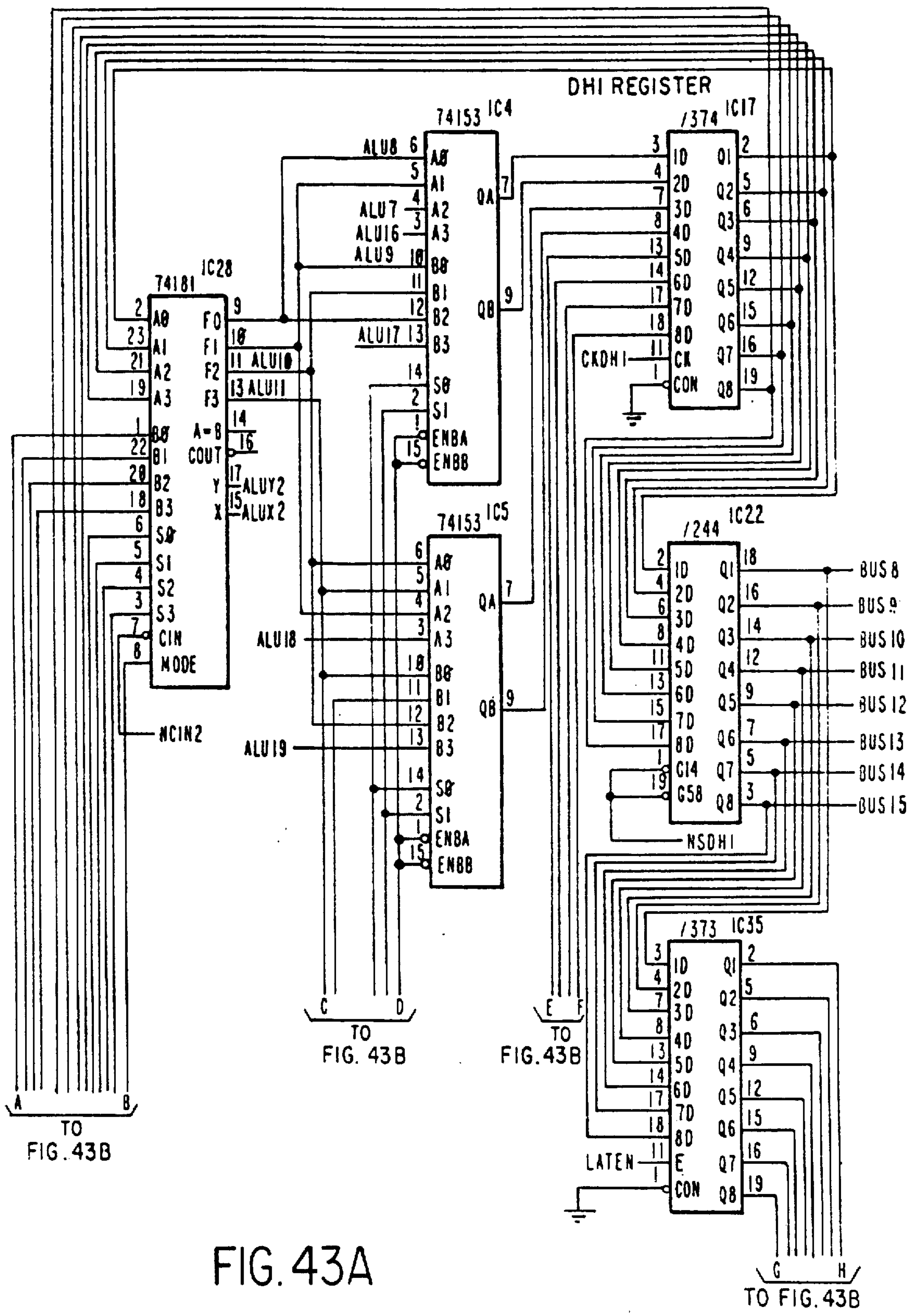
Figure 43B:
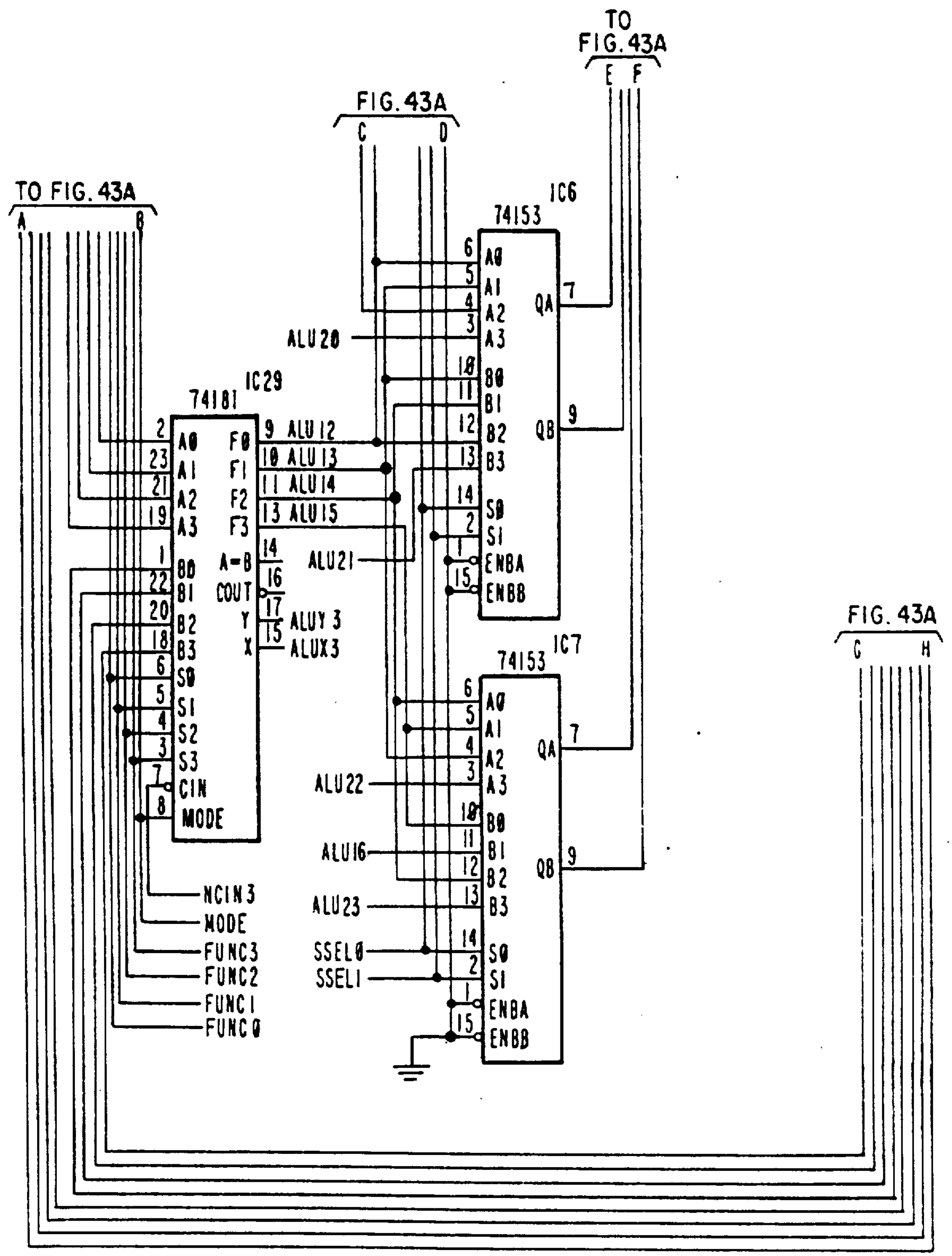
Figure 44A:
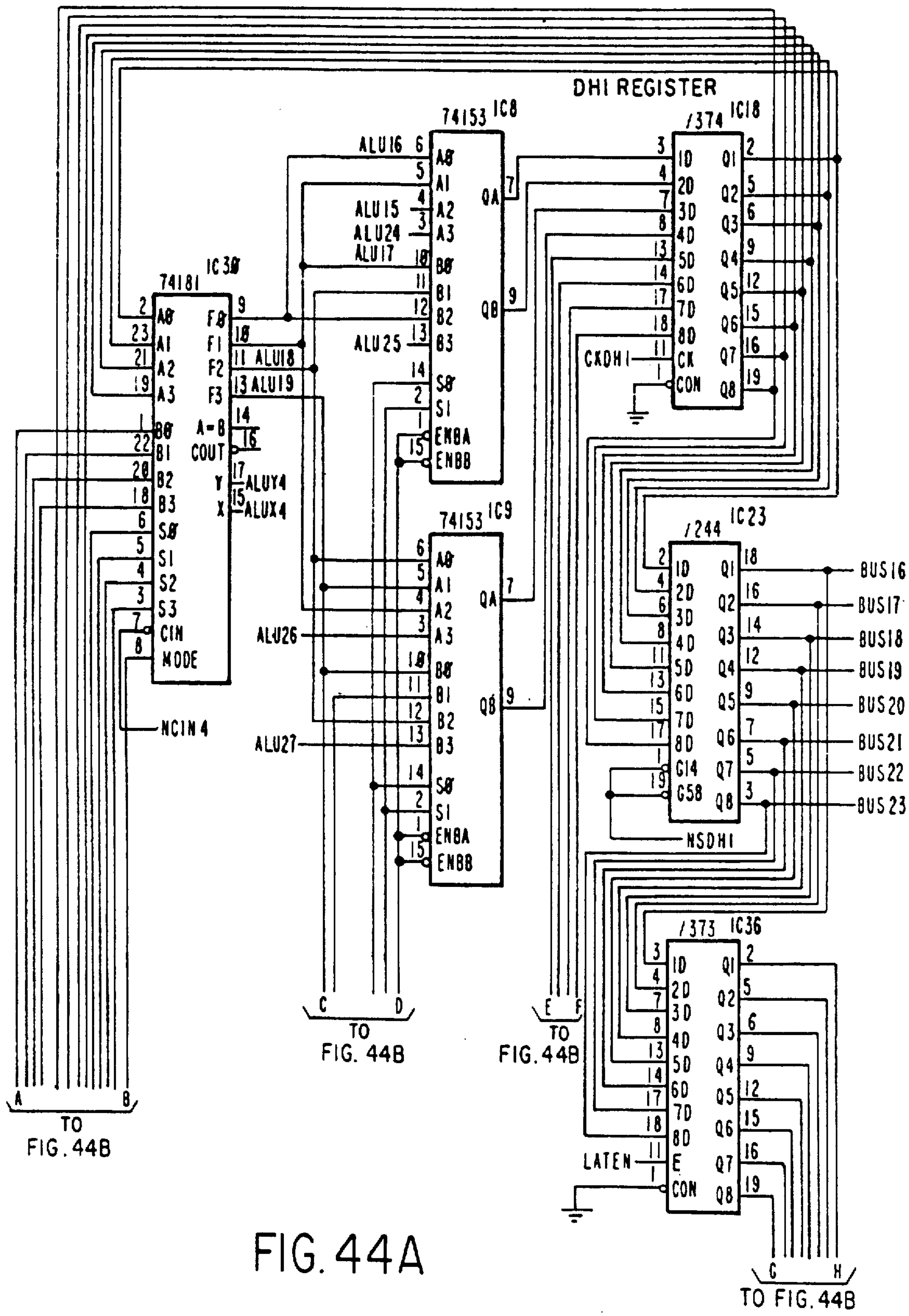
Figure 44B:
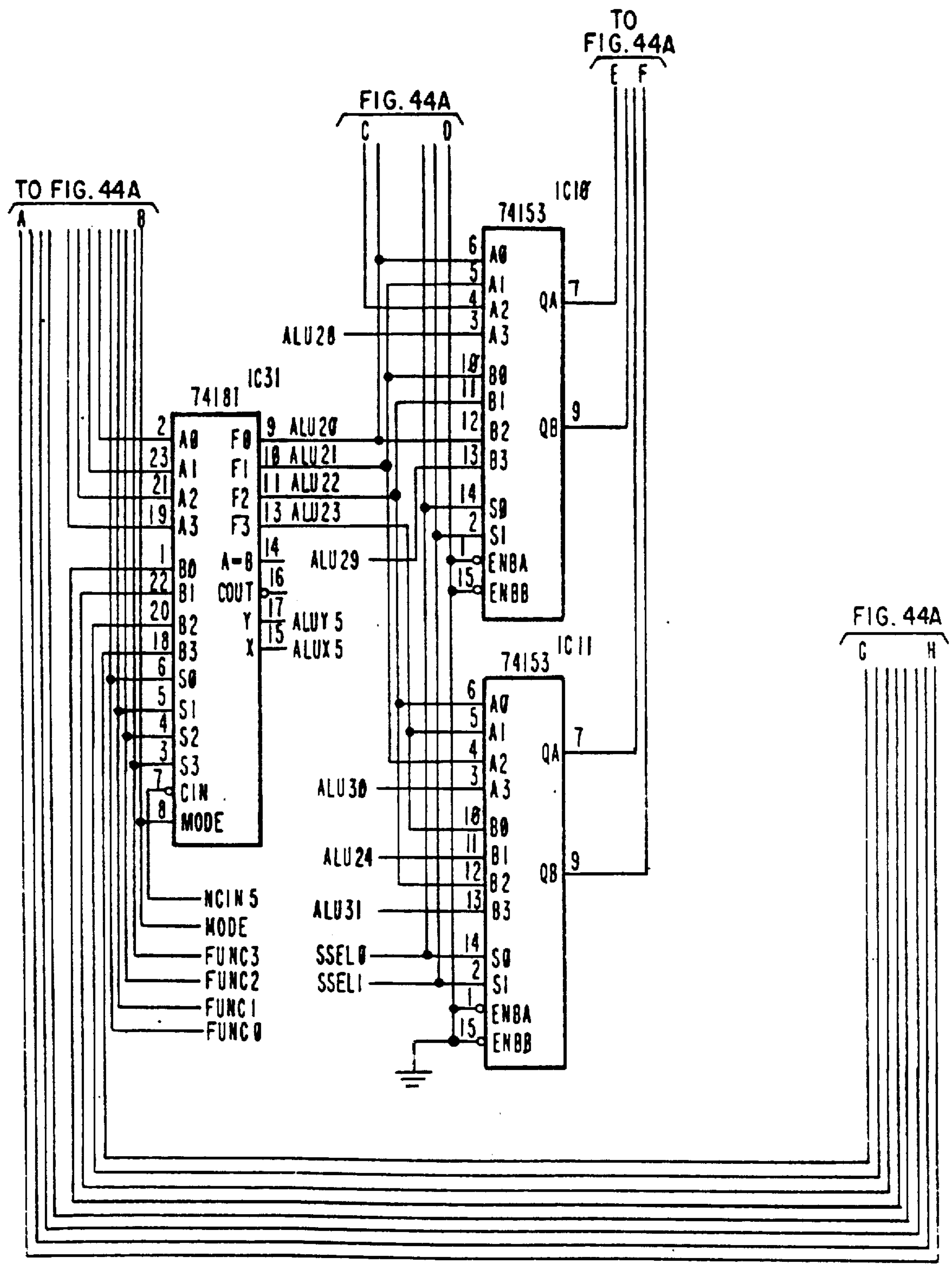
Figure 45A:
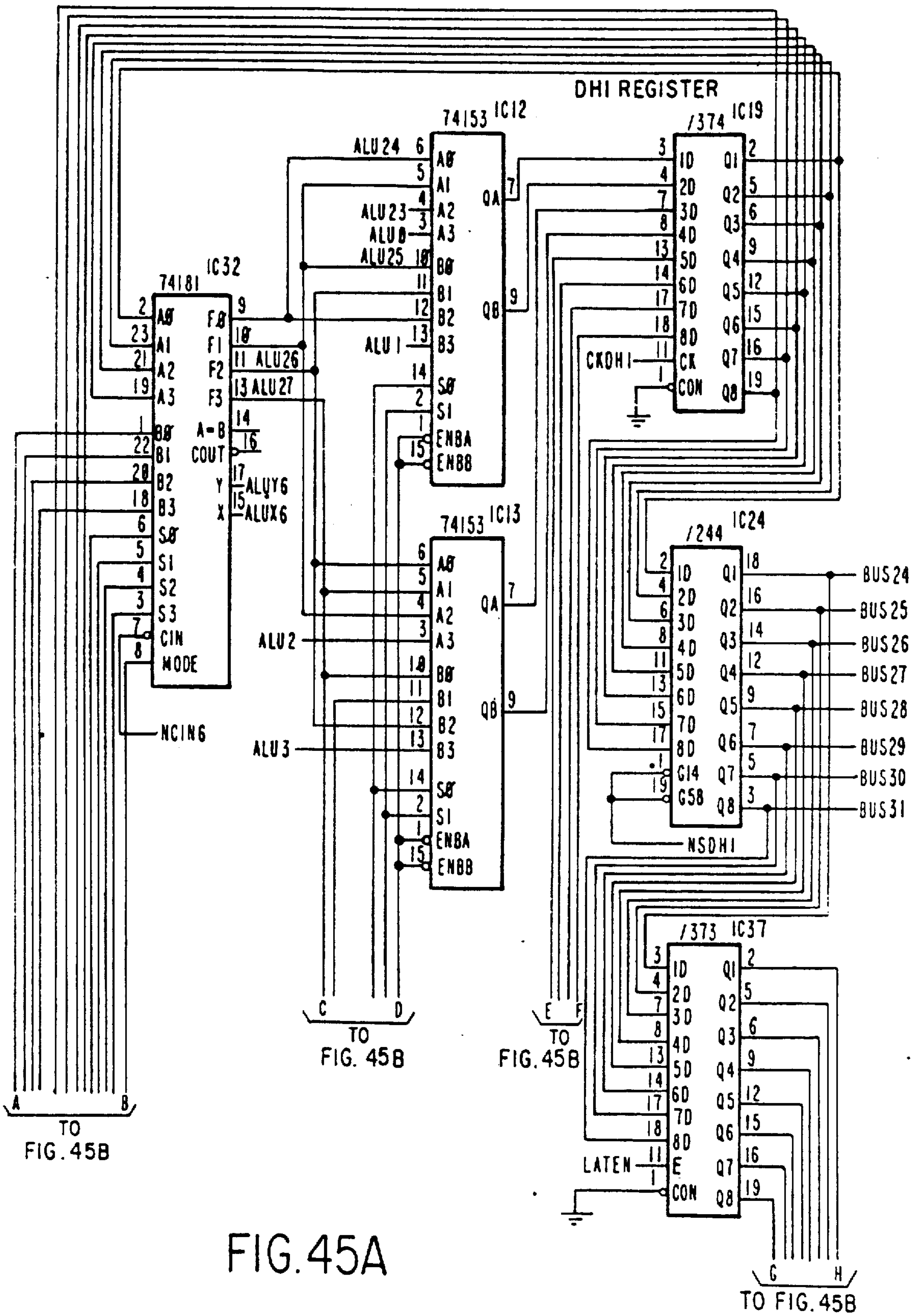
Figure 45B:
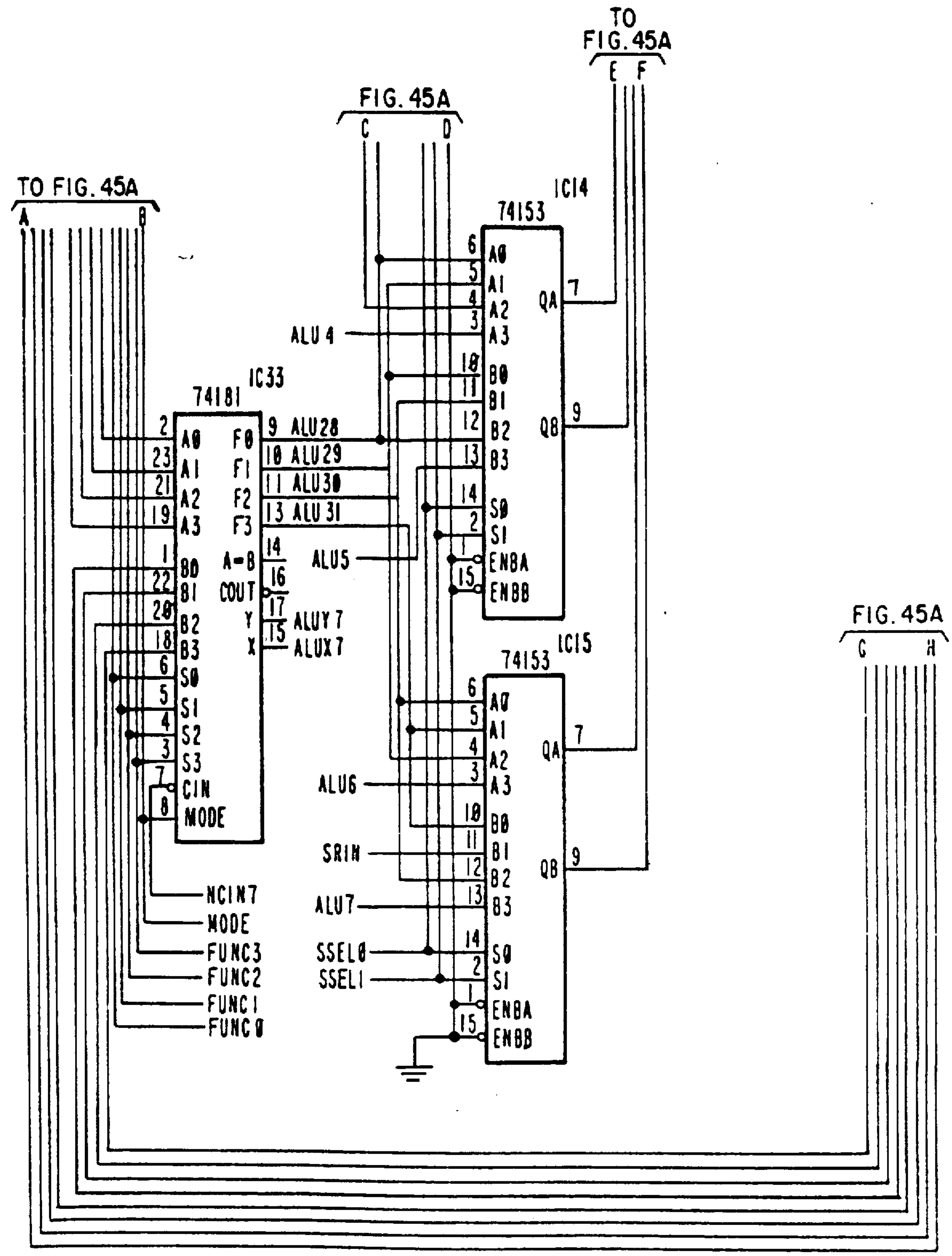
Figure 46:
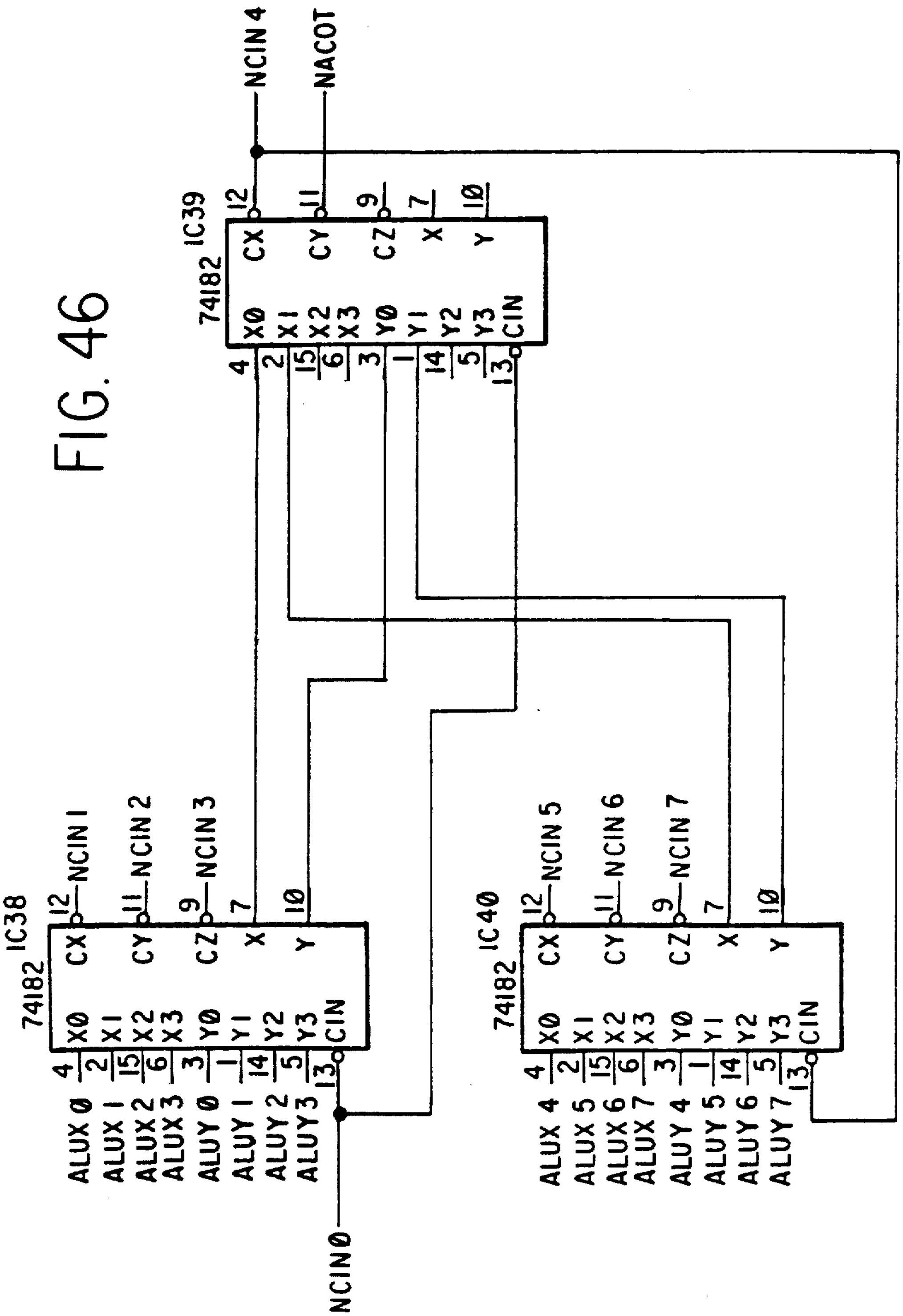

The Data, Arithmetic, and Logic Card. The data, arithmetic and logic card (called the data card) described by FIGS. 41–53 performs all arithmetic and logical manipulation of data for computer 100. FIG. 41 shows storage for bits 16–23 of the microcode memory and the micro-instruction register. The micro-instruction format is discussed in Appendix B.

Figure 47:
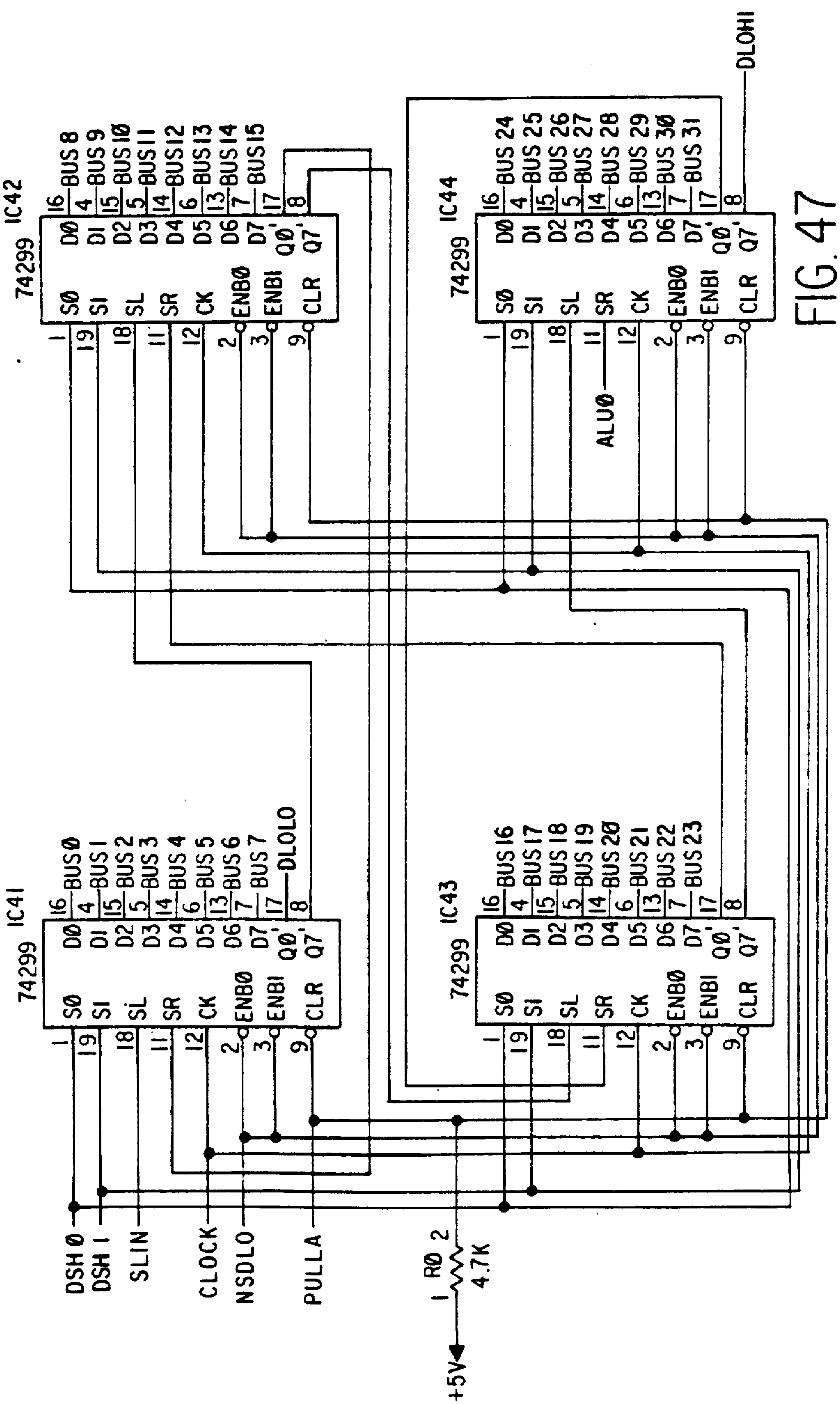

FIGS. 42A–46 show the arithmetic and logic unit (ALU) 126, bus latch 128, data hi register 127, DHI to data bus 100 driver 130, and ALU multiplexer 129. Data from the DHI register 127 and/or the bus data latch 128 flows through the ALU 126 and multiplexer 129 on each clock cycle, then is written back to the DHI register 127. FIG. 47 shows the DLO register 131.

Figure 48:
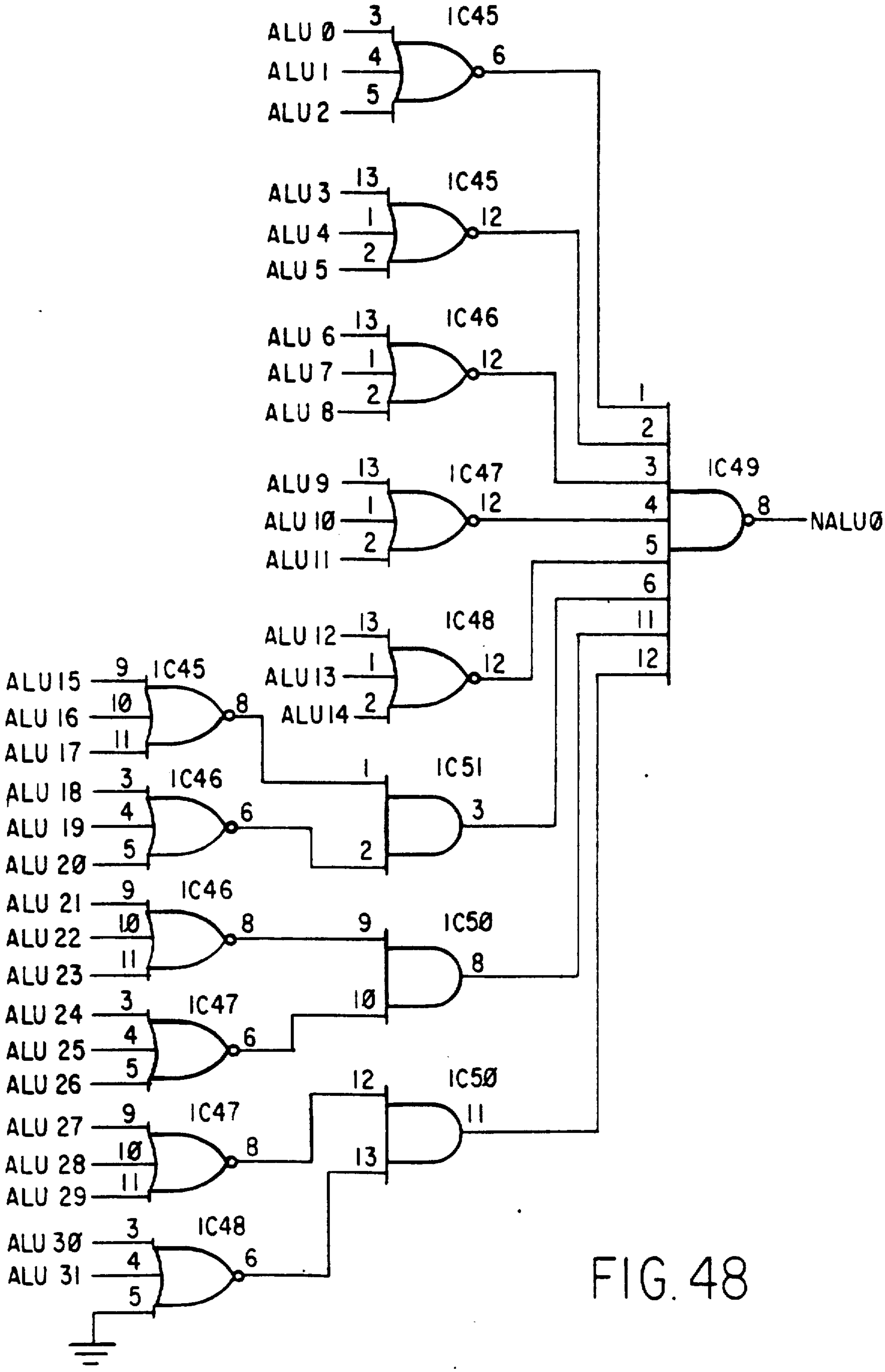
Figure 49:
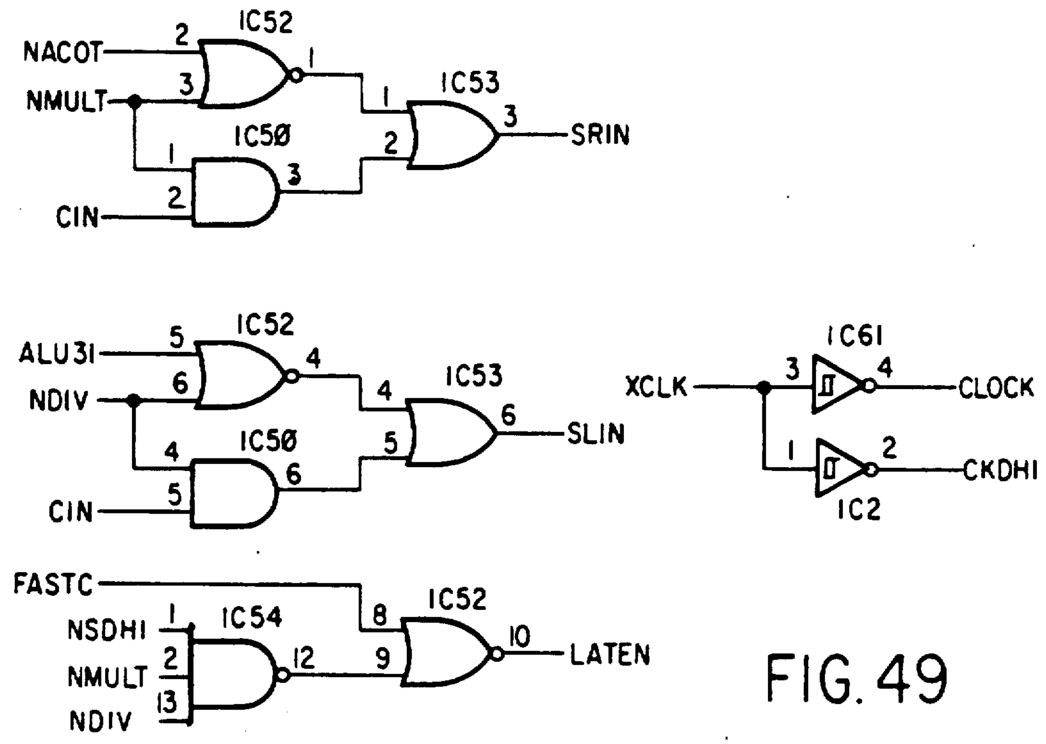
Figure 50:
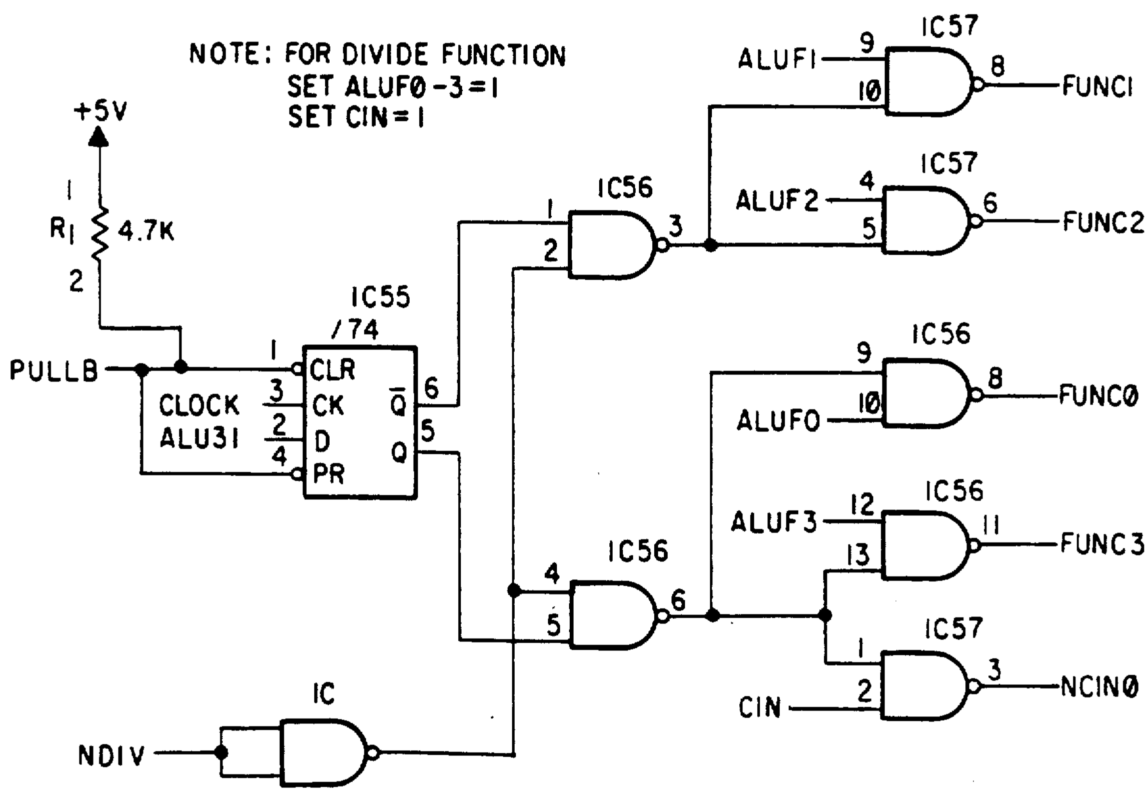

FIG. 48 shows the logic used to detect when the output of the ALU is exactly zero. This is very useful for conditional branching. FIG. 49 shows the generation of the data bus latch 128 control signal and the shift-in bits to the DLO register 131 and the DHI register 127. These shift-in bits are conditioned to provide capability of one-cycle-per-bit multiplication shift-and-conditional-add and non-restoring division algorithms. FIG. 50 shows the conditioning of ALU 126 input control signals to likewise provide for efficient multiplication and division functions.

Figure 51:
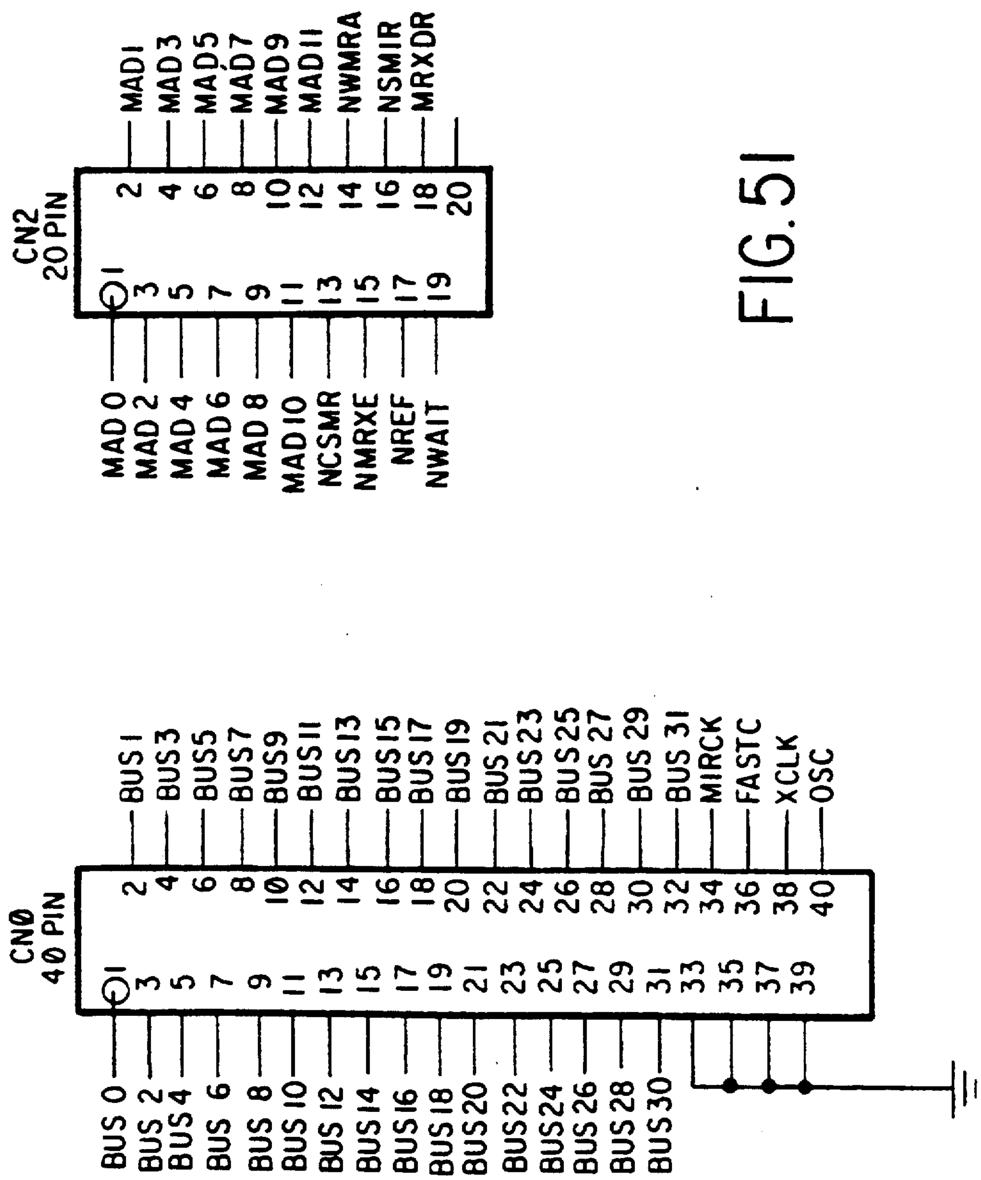
Figure 53:
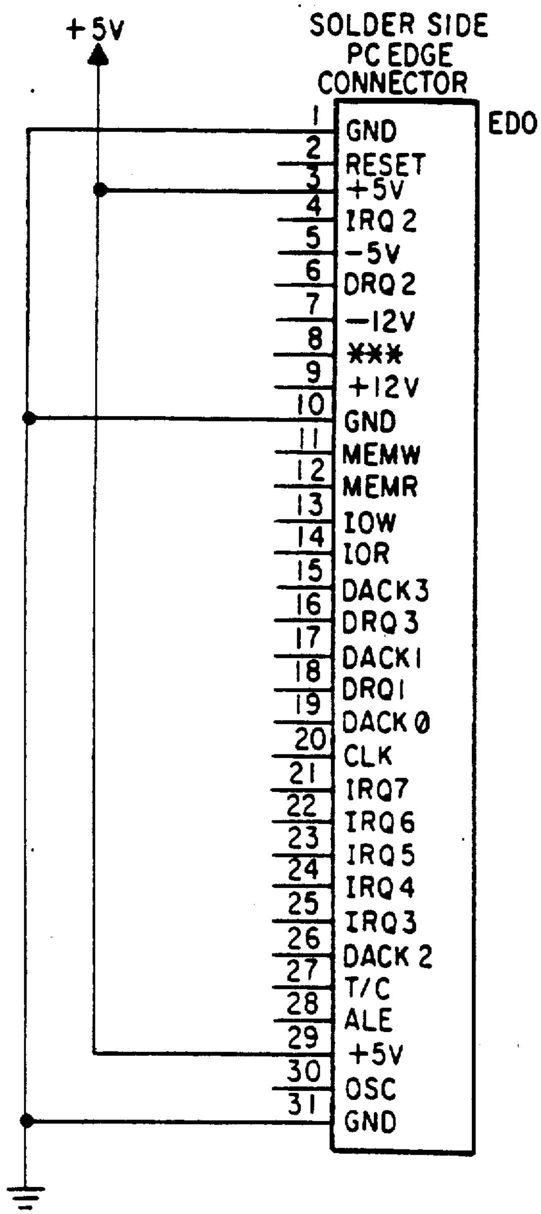
Figure 52:
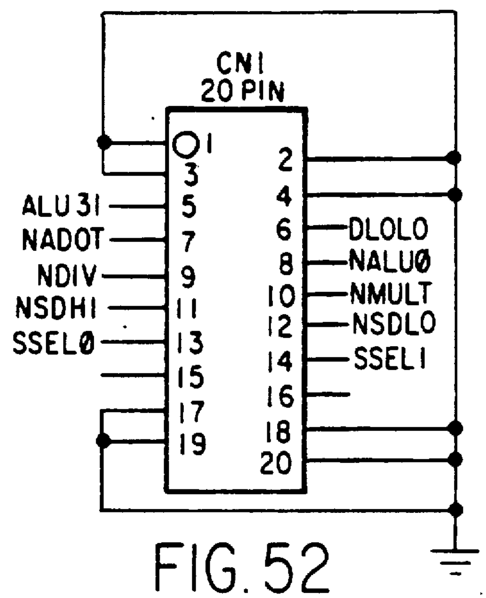

FIGS. 51–53 show connector arrangements for transmitting and receiving signals from other cards in the system.

Figure 54:
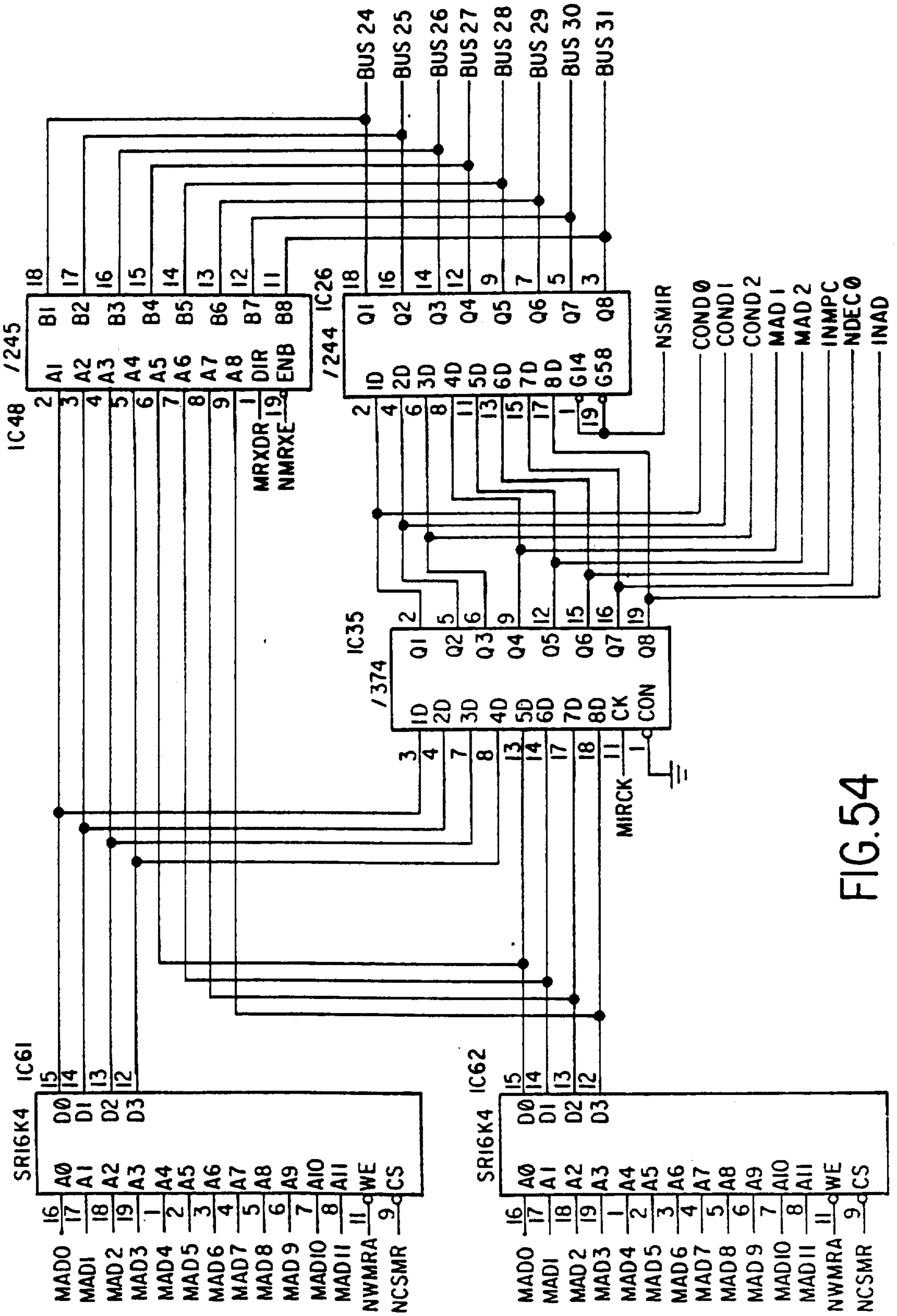

The Address Card. The address card described by FIGS. 54–75 performs the memory addressing functions, microcoded control and branching functions, and memory data manipulation functions for computer 100. FIG. 54 shows storage for bits 24–31 of the microcode memory and the micro-instruction register. The micro-instruction format is discussed in Appendix B.

Figure 55:
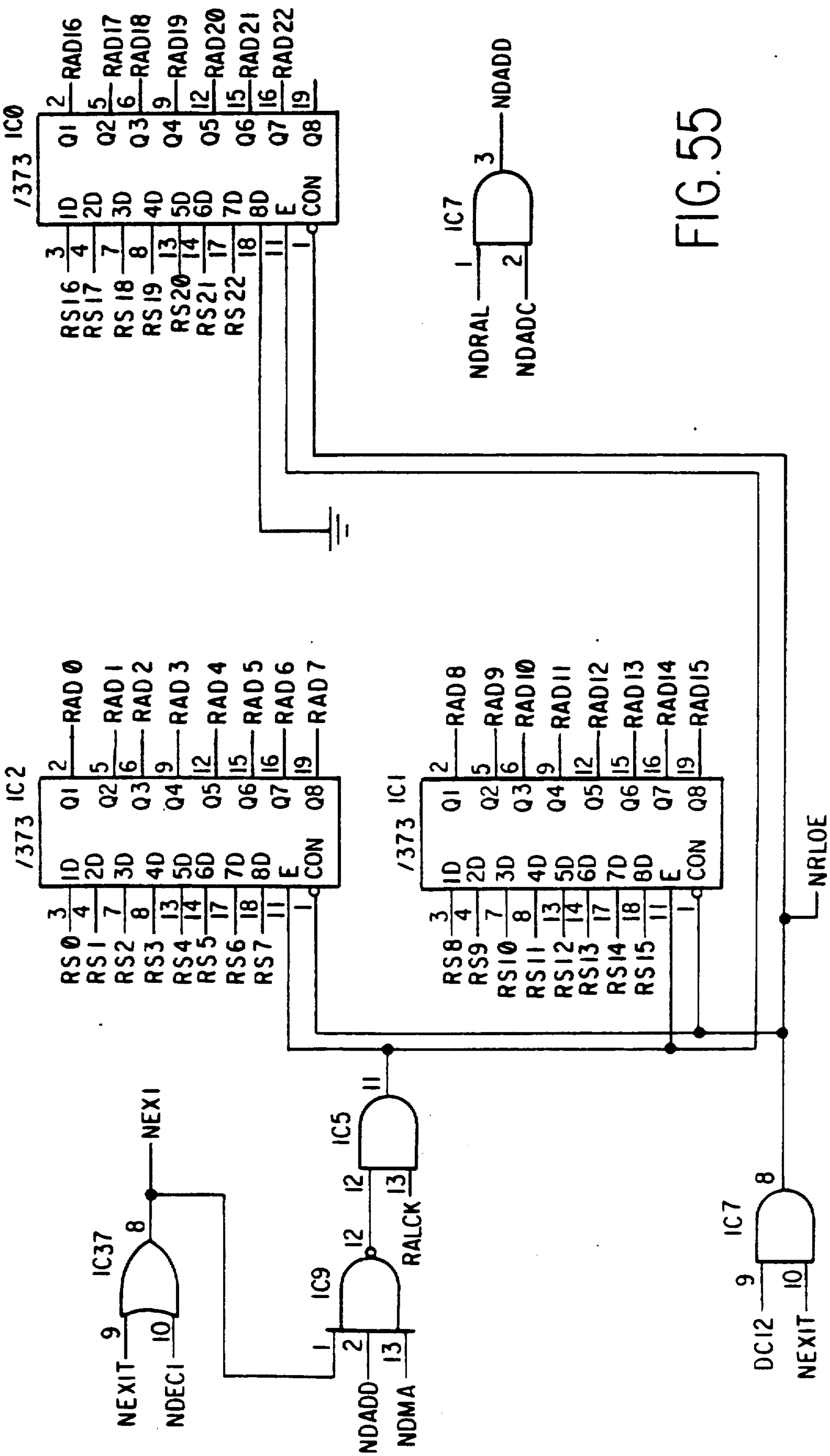
Figure 56:
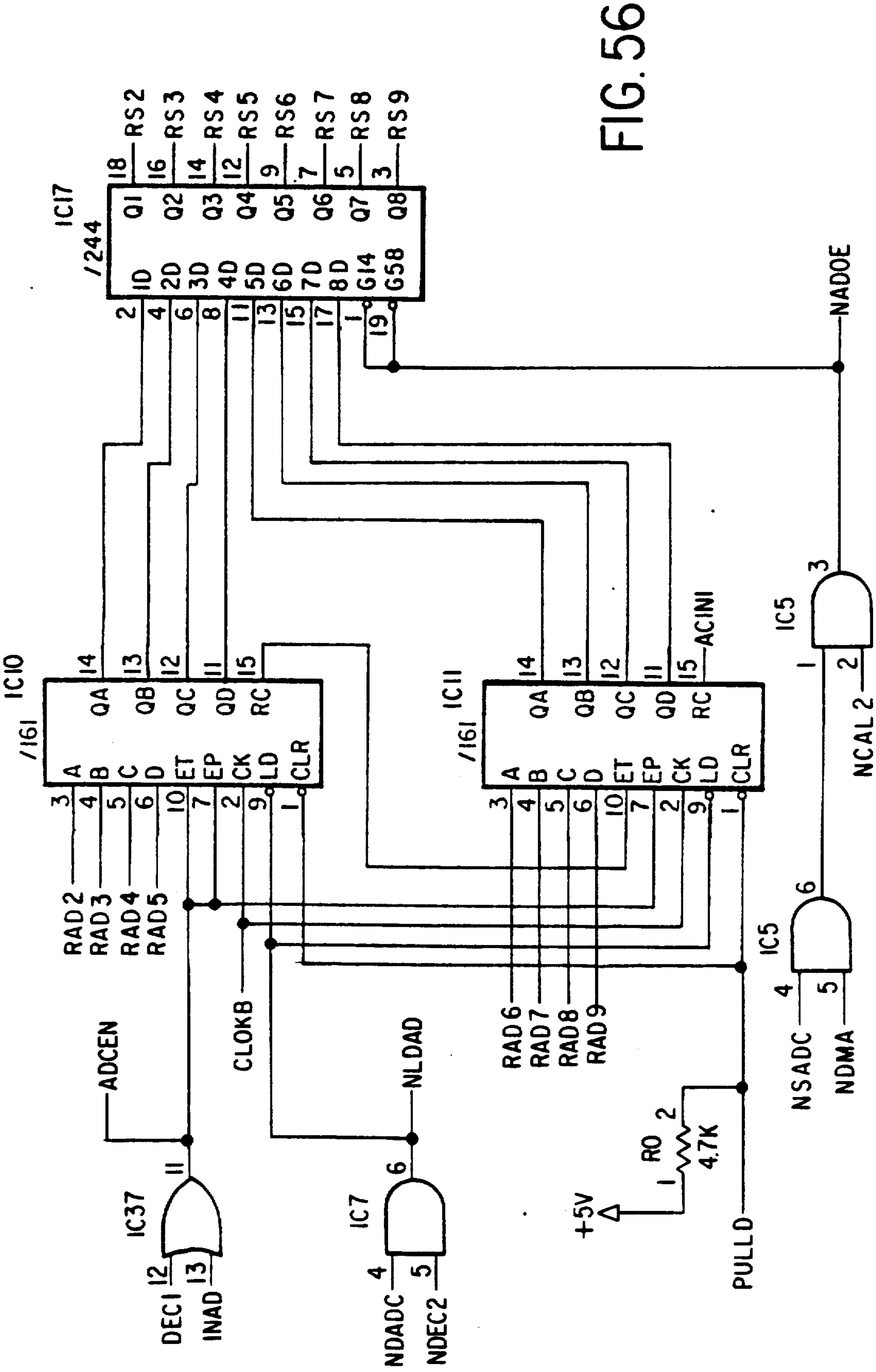
Figure 57:
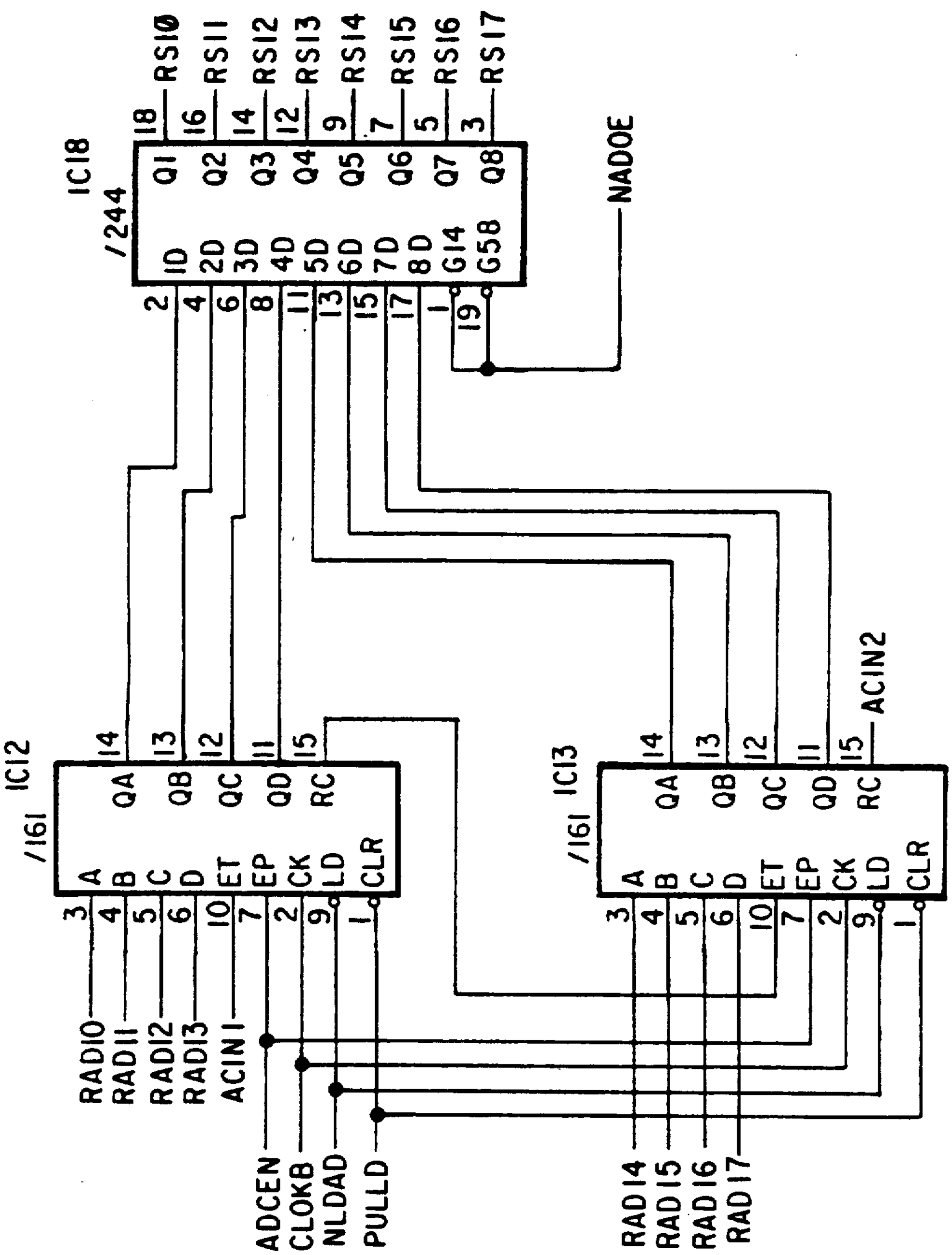
Figure 58:
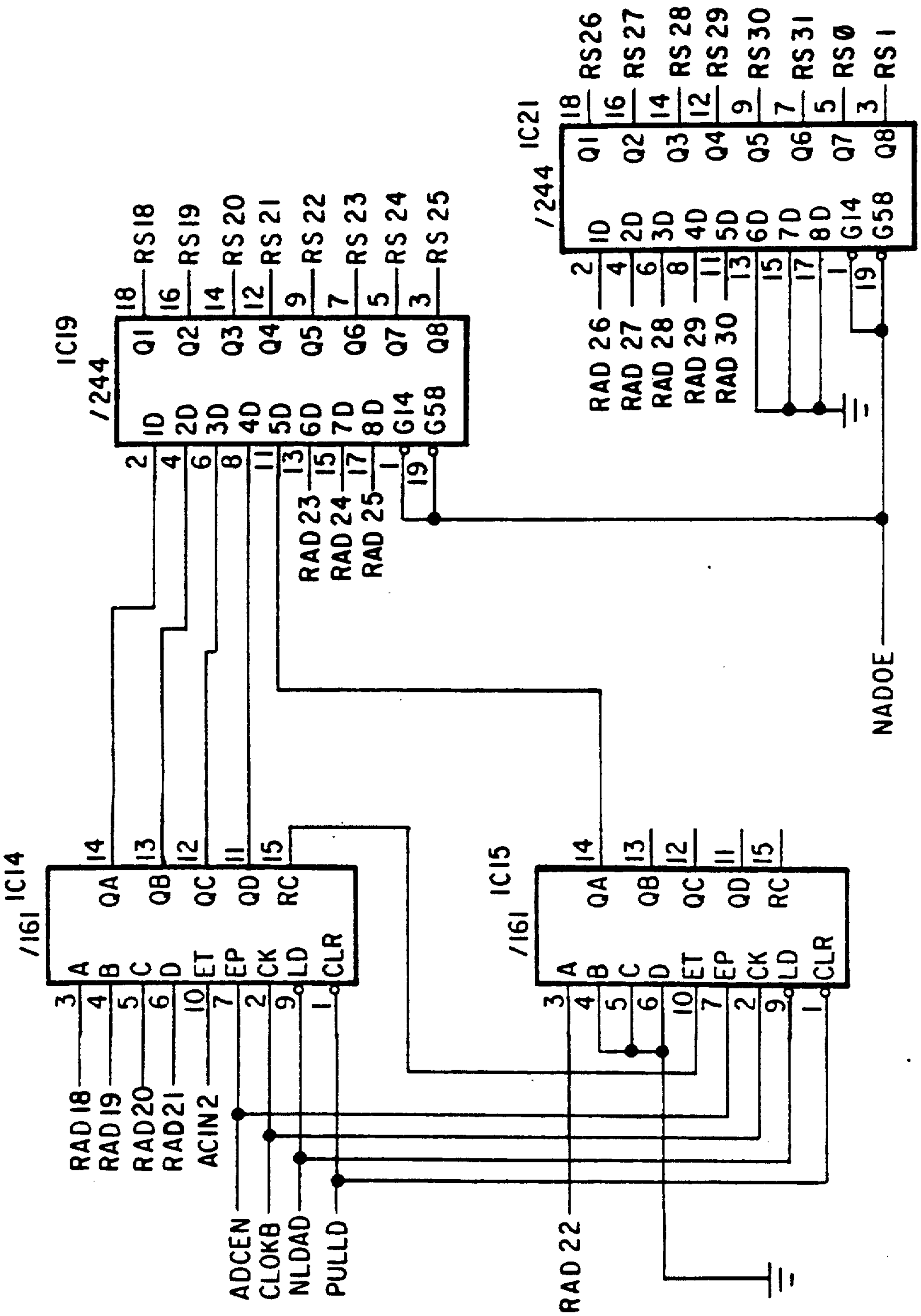
Figure 59:
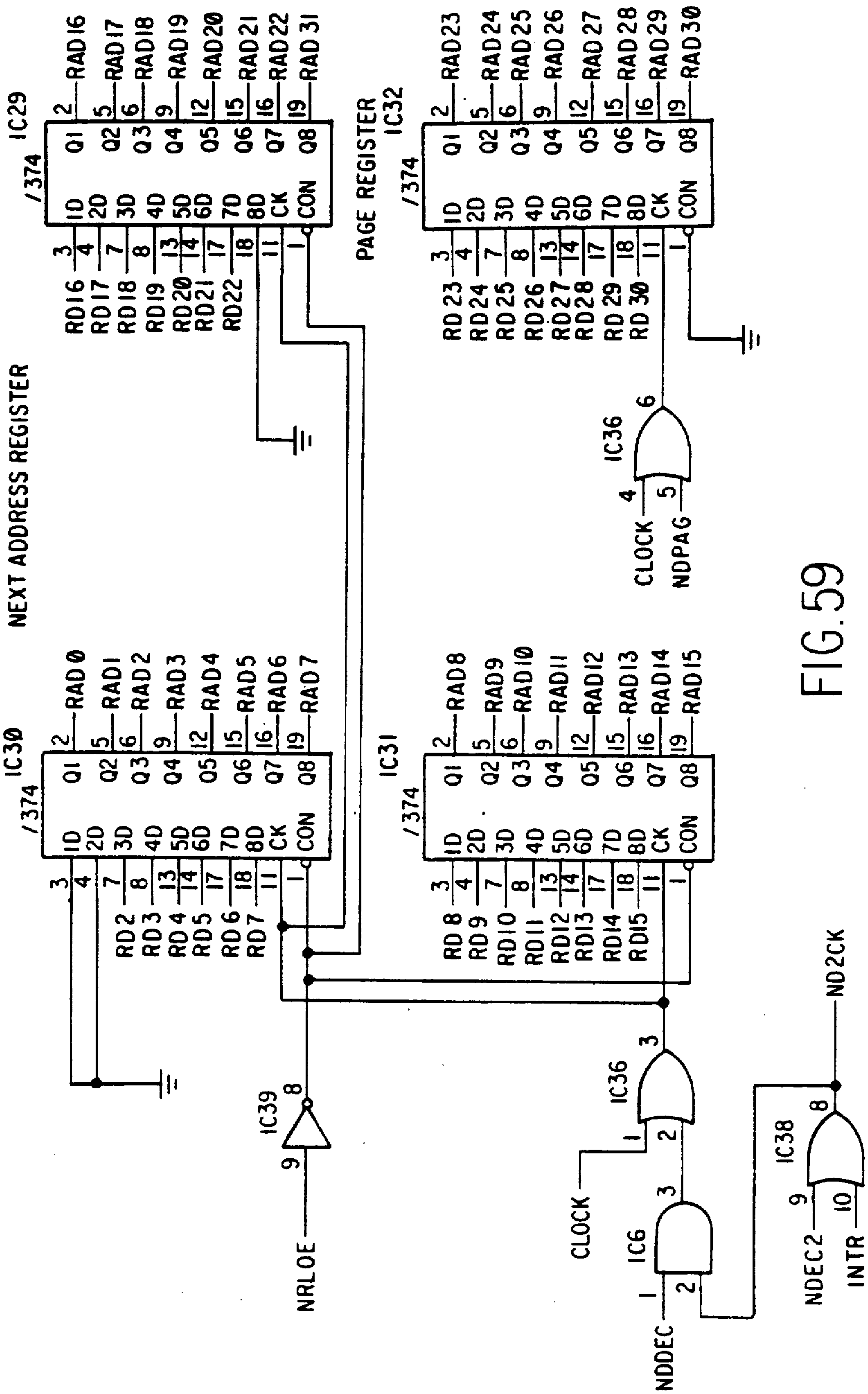

FIG. 55 shows the arrangement of the RAM address latch 118. The RAM address latch is used to address program memory for all non-instruction operations, for return from subroutine operations, and passes data through for DMA transfers with host 103. FIGS. 56–58 show the address counter 117. The address counter 117 may be incremented and passed through the address latch 118 to step through memory one word at a time during DMA access or block memory operations. The address counter 117 is also incremented when performing a subroutine call operation in order to save a correct subroutine return address in return stack 109. FIG. 59 shows the next address register 119 and page register 120. The next address register is used to store the address field of an instruction that points to the memory address of the next instruction during the instruction fetch and decode operation.

Figure 60:
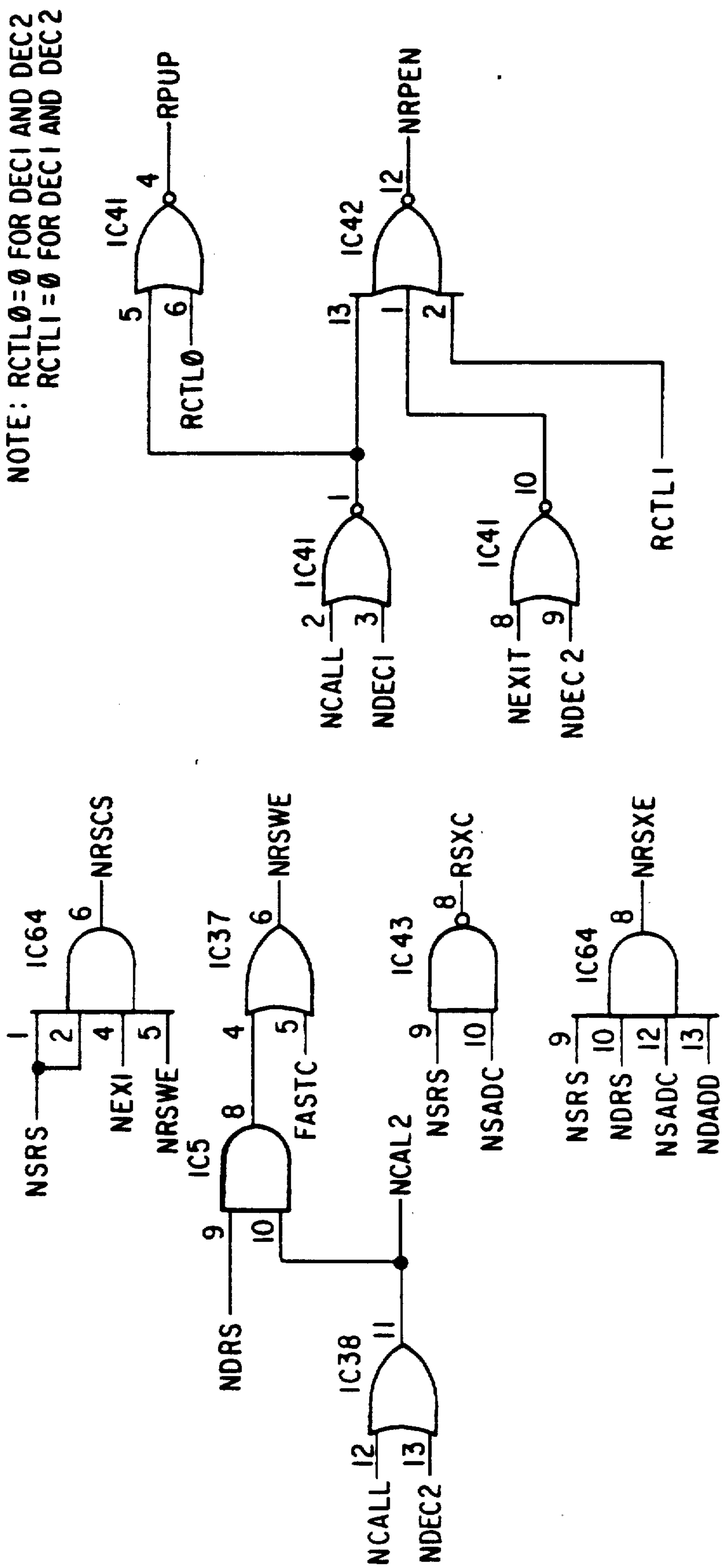
Figure 61:
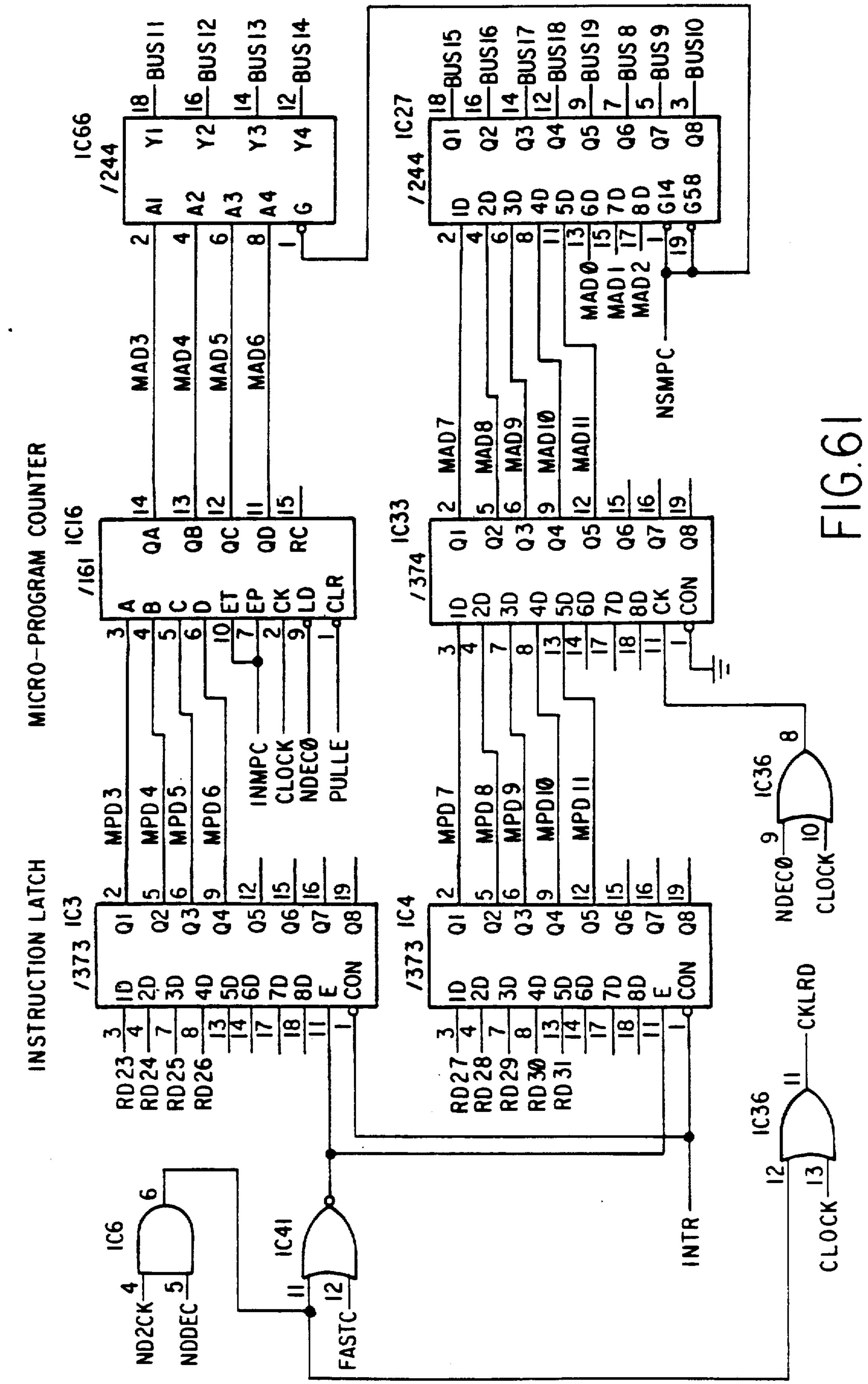
Figure 62:
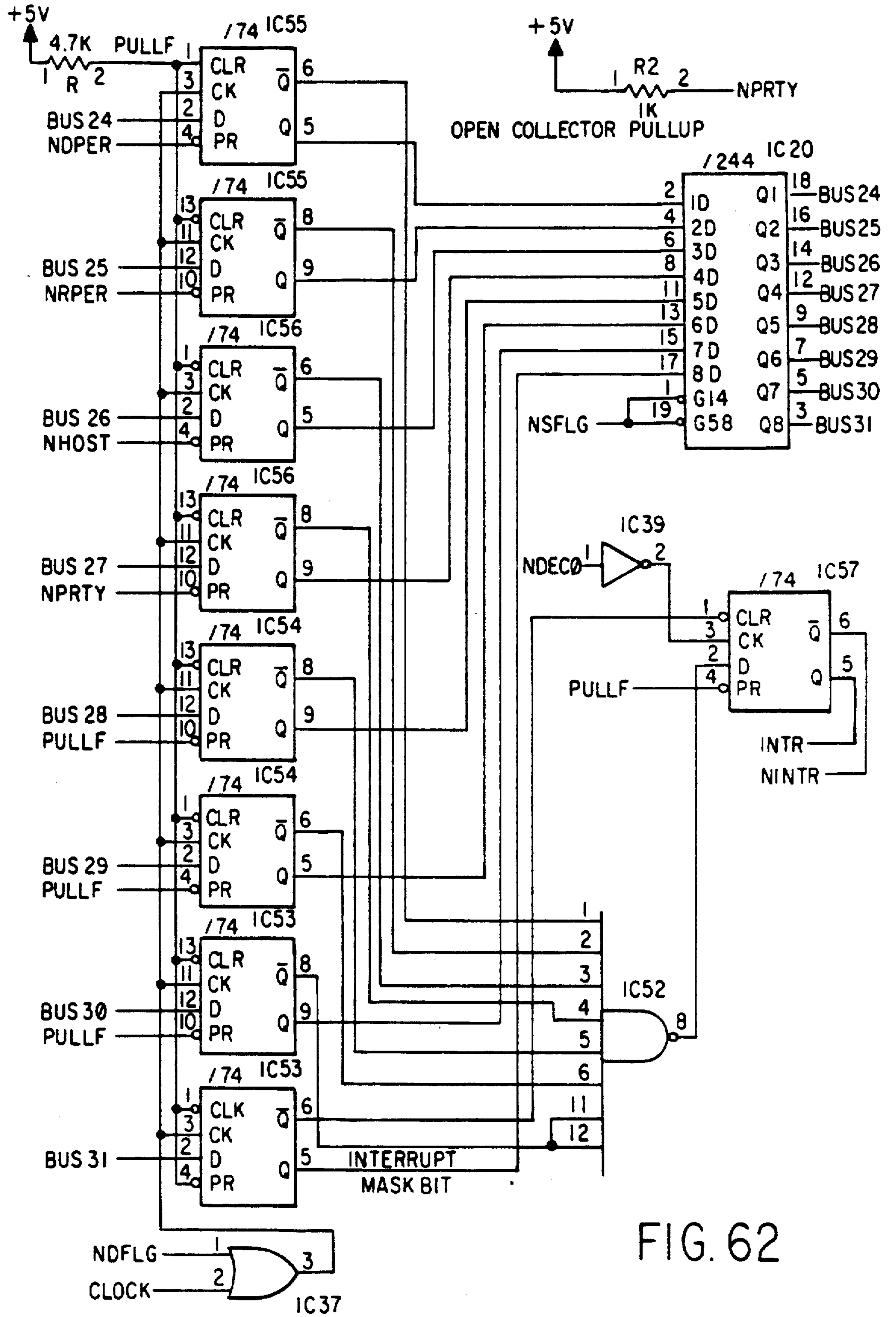

FIG. 60 shows the logic used to control return stack 109 and return stack pointer 111. In particular, this logic implements the subroutine call and return control operations for the return stack means. FIG. 61 shows the instruction latch 125 and micro-program counter 129. FIG. 62 shows the interrupt status register 126. Interrupts are set by a processor condition pulling a "PR" pin of IC53–IC56 low, causing the flip-flop to activate, or by loading a one bit from data bus 101. Any one or more active interrupts causes an interrupt at the next instruction decoding operation. An interrupt mask bit from IC53 pin 5 is used to allow masking of all further interrupts during interrupt processing.

Figure 63:
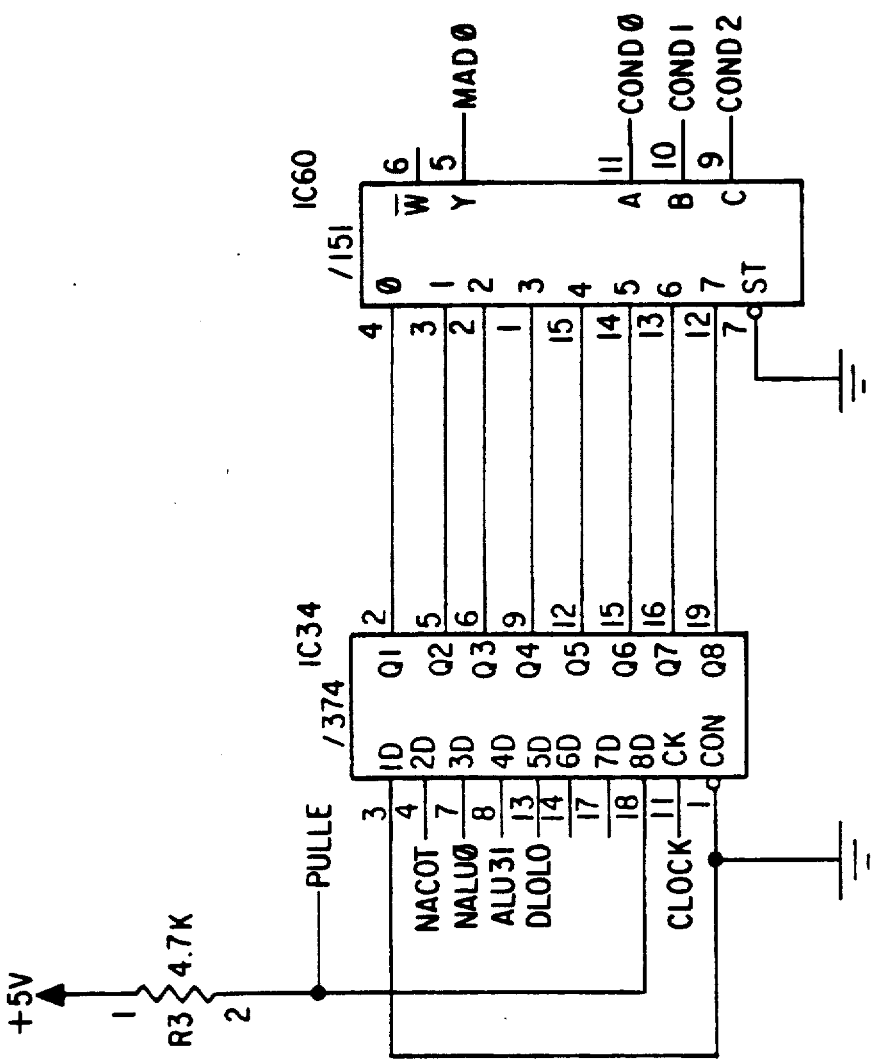
Figure 64:
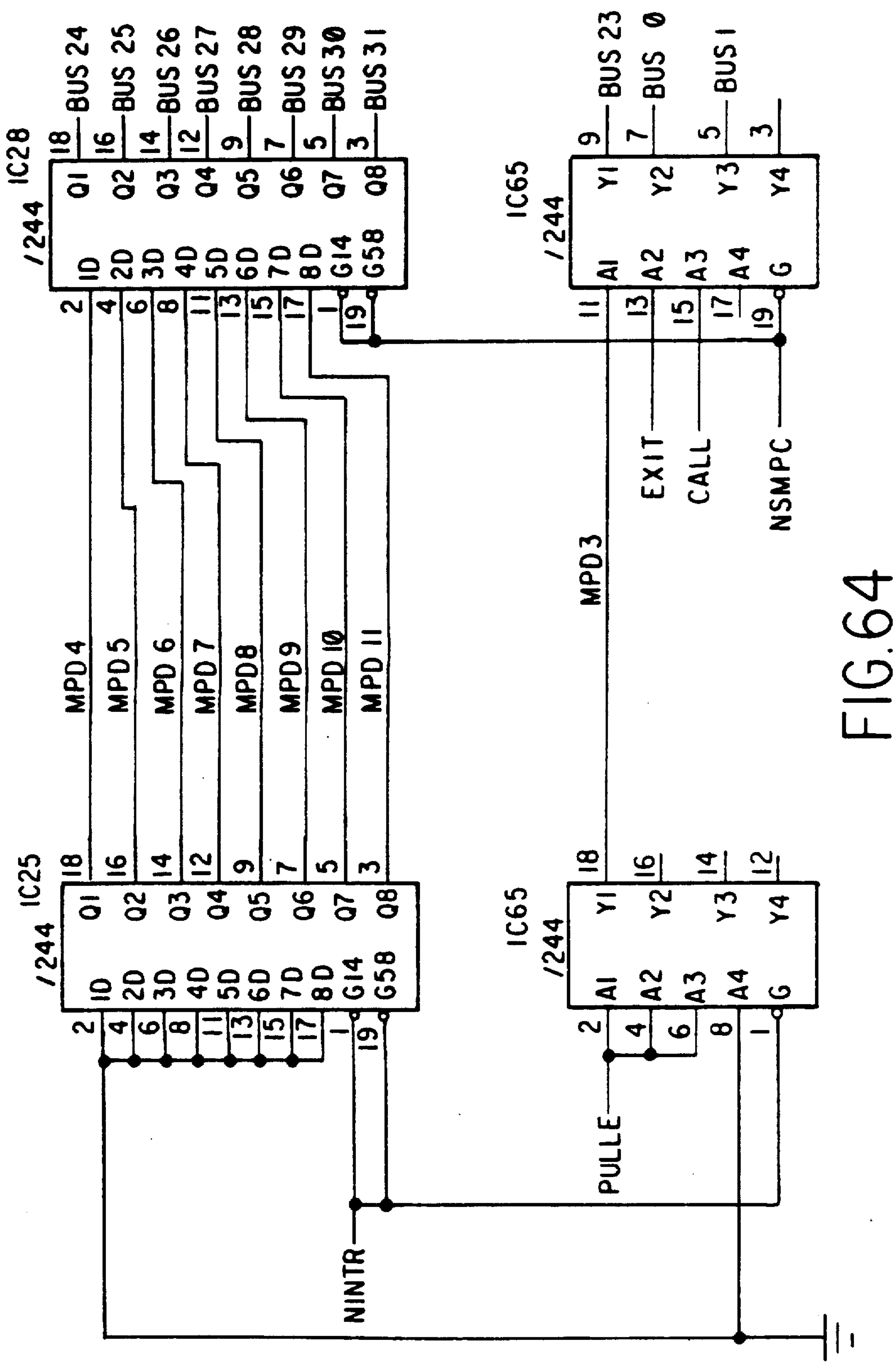
Figure 65:
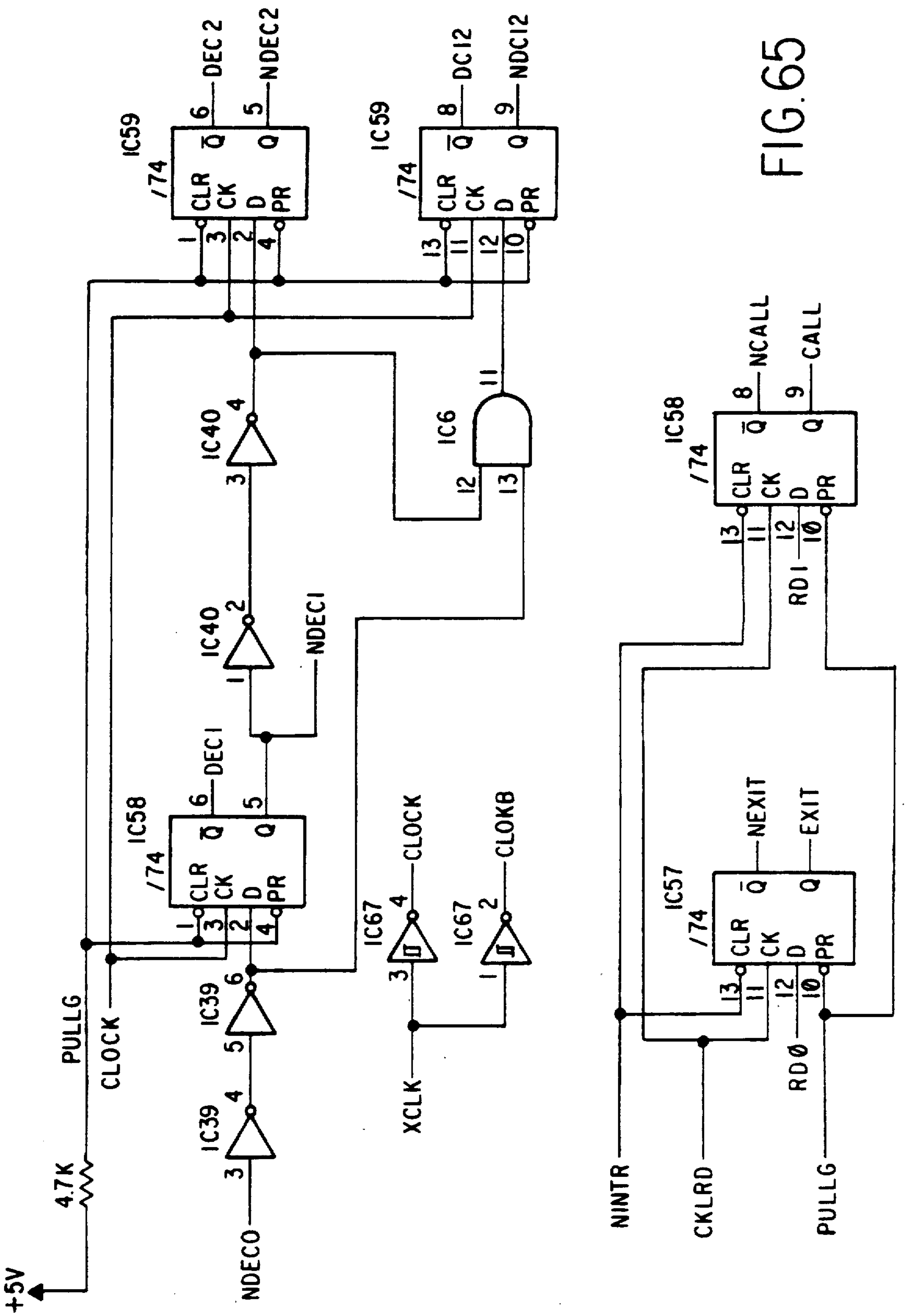
Figure 66:
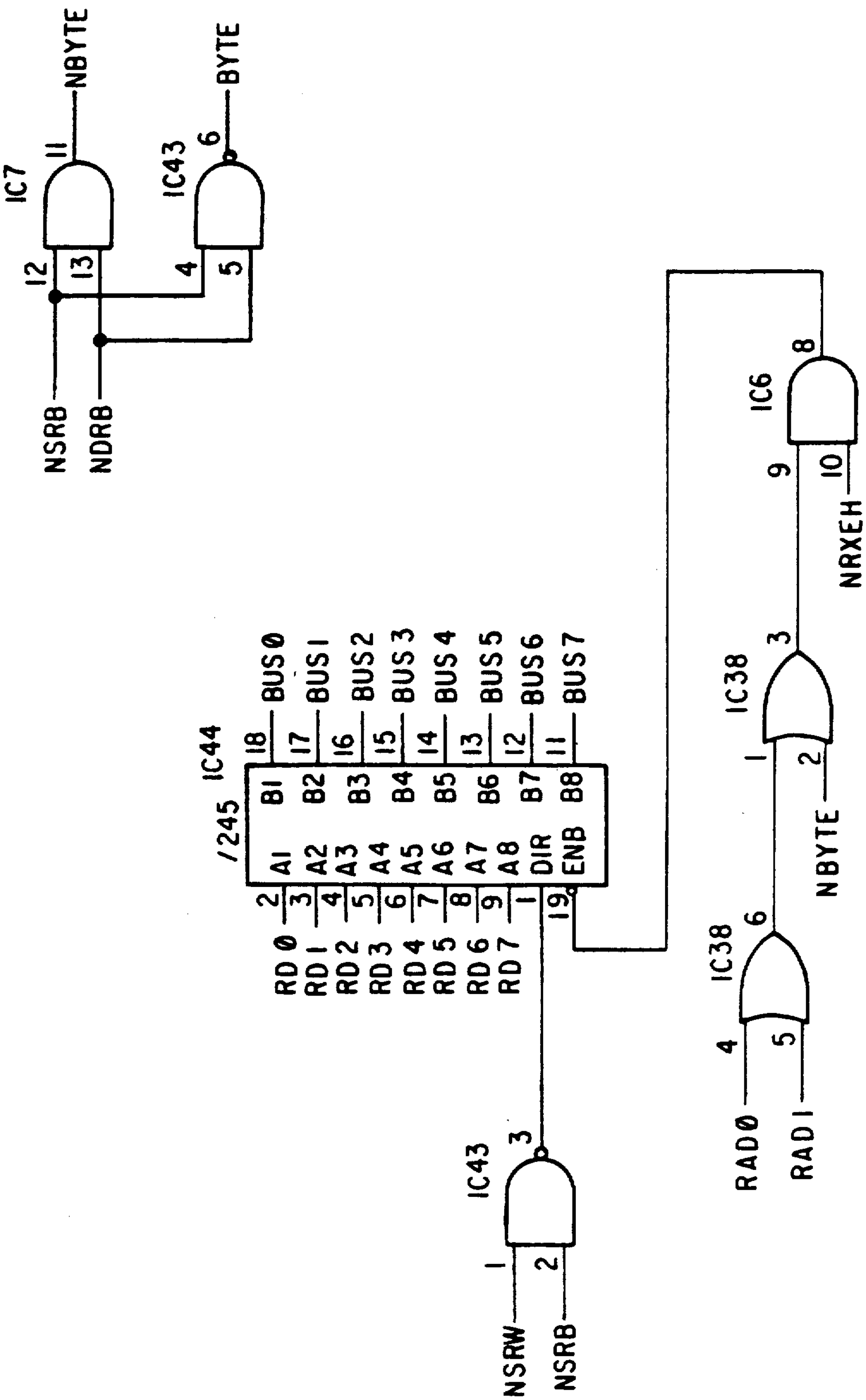
Figure 67:
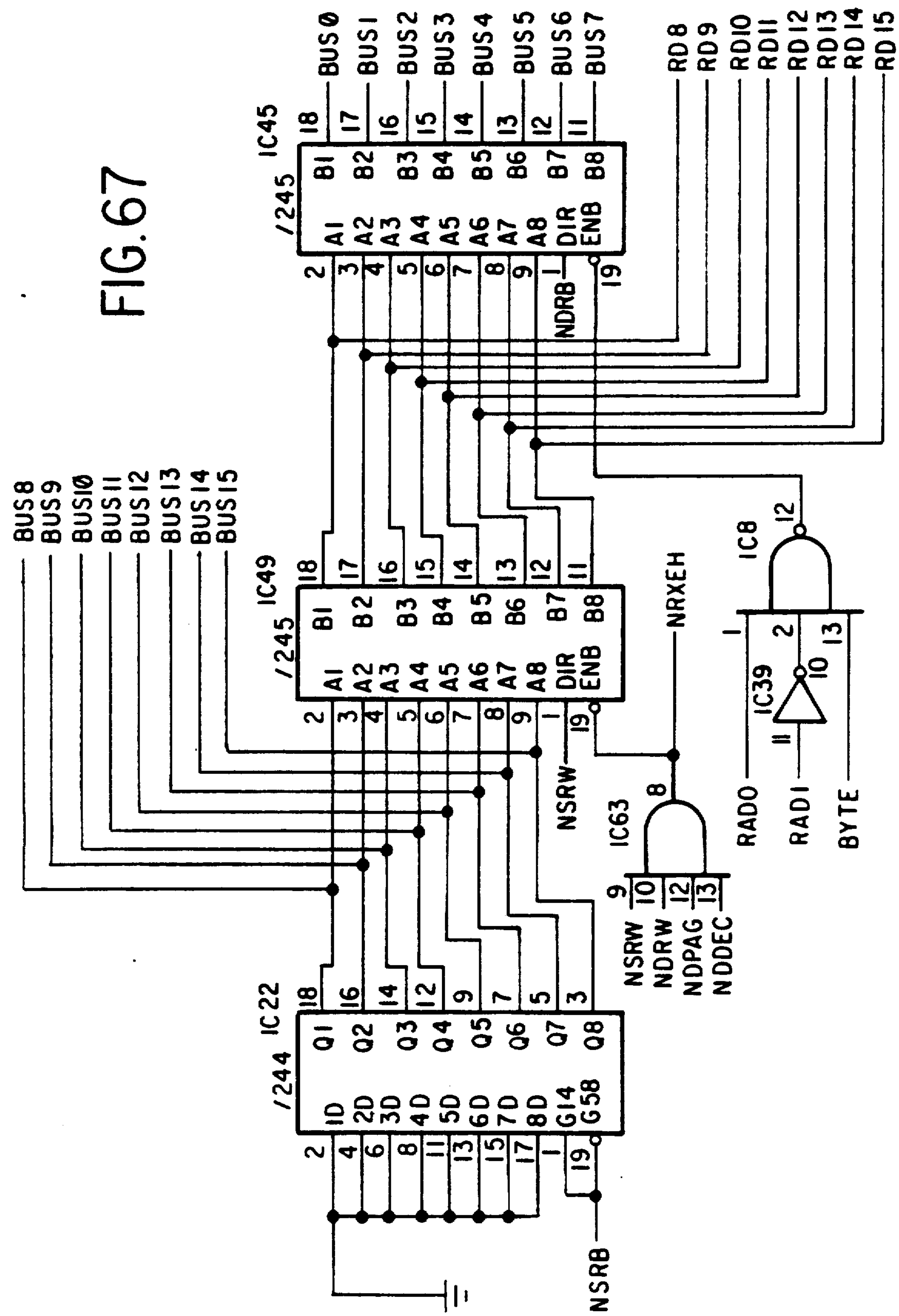
Figure 68:
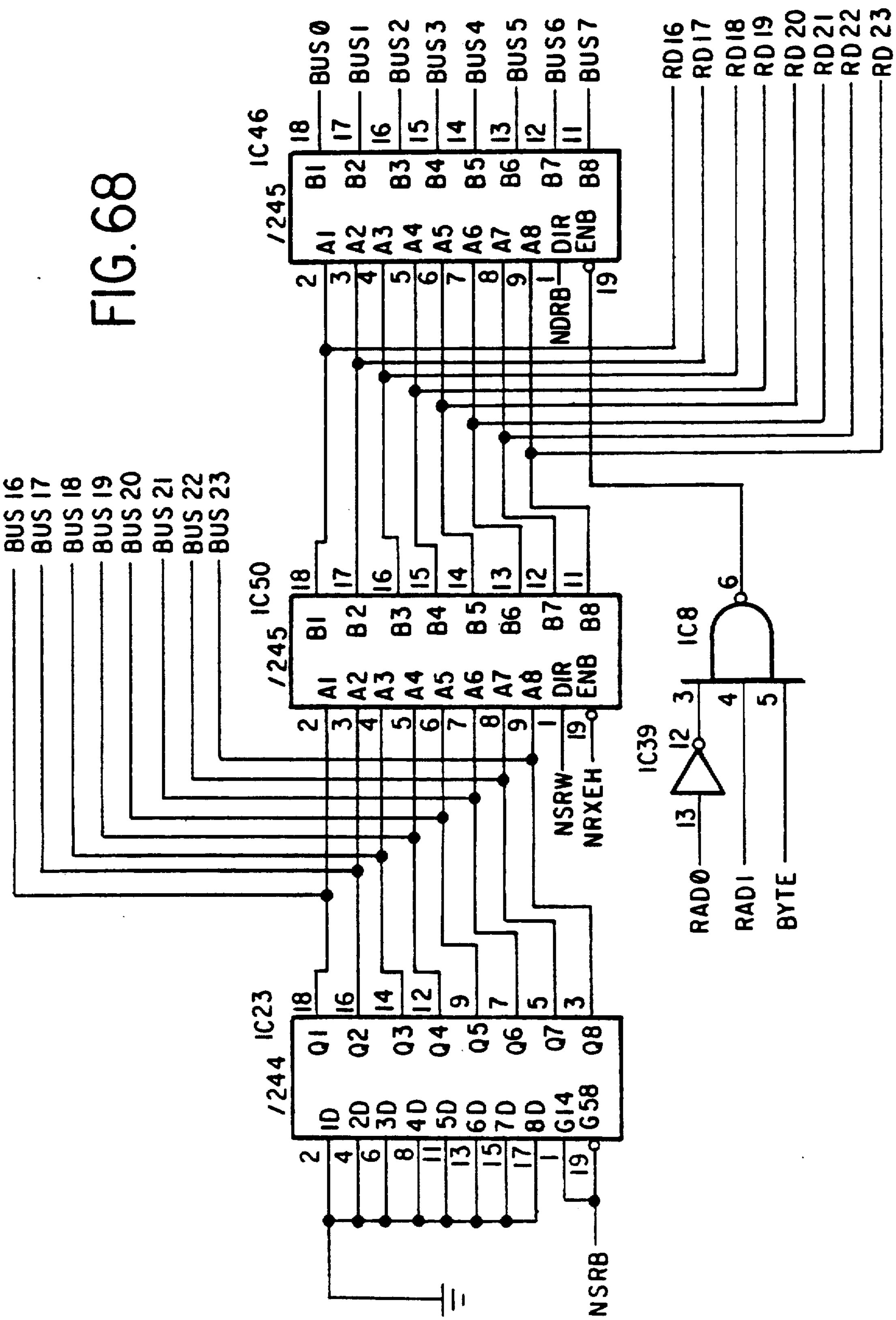
Figure 69:
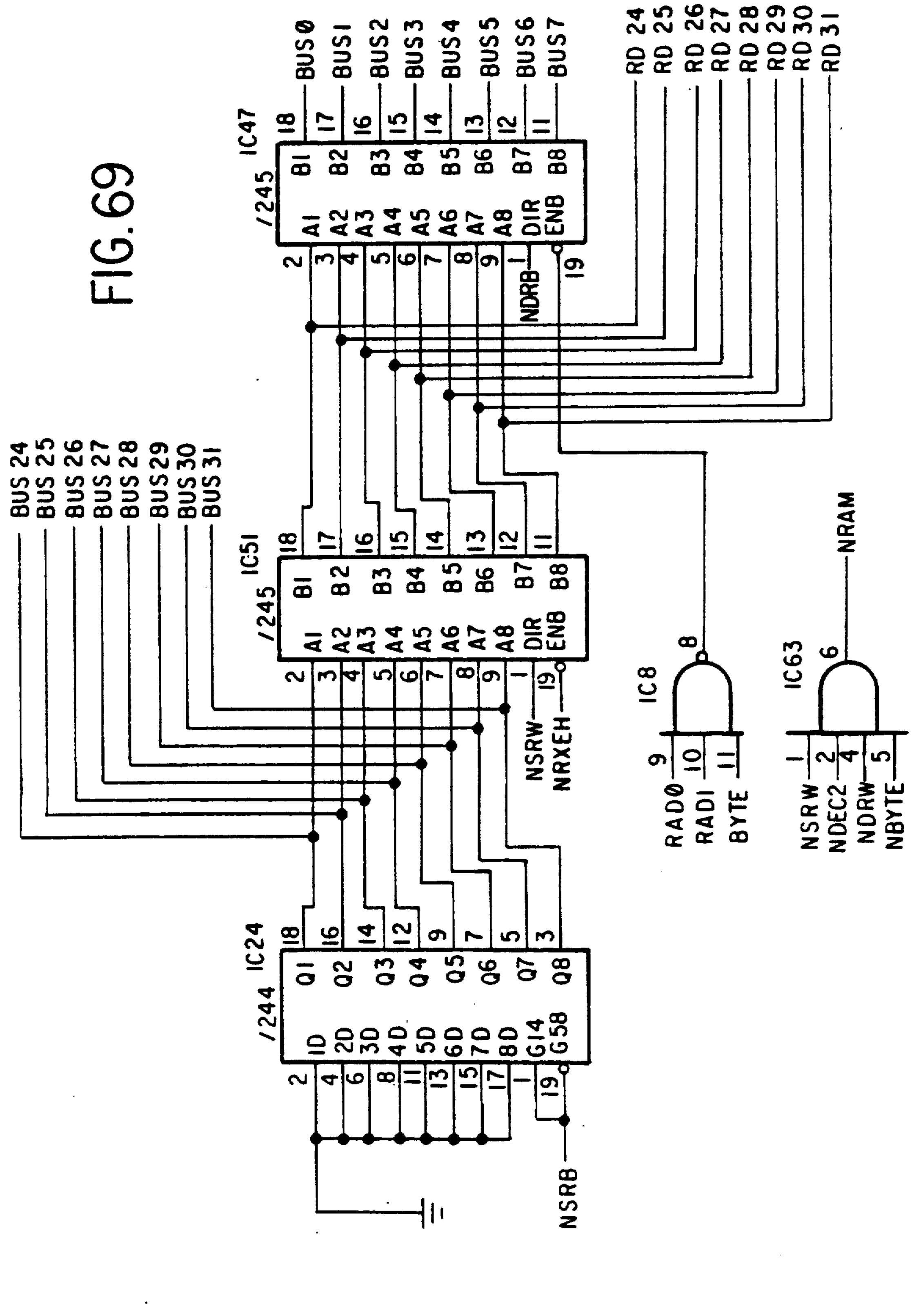
Figure 70:
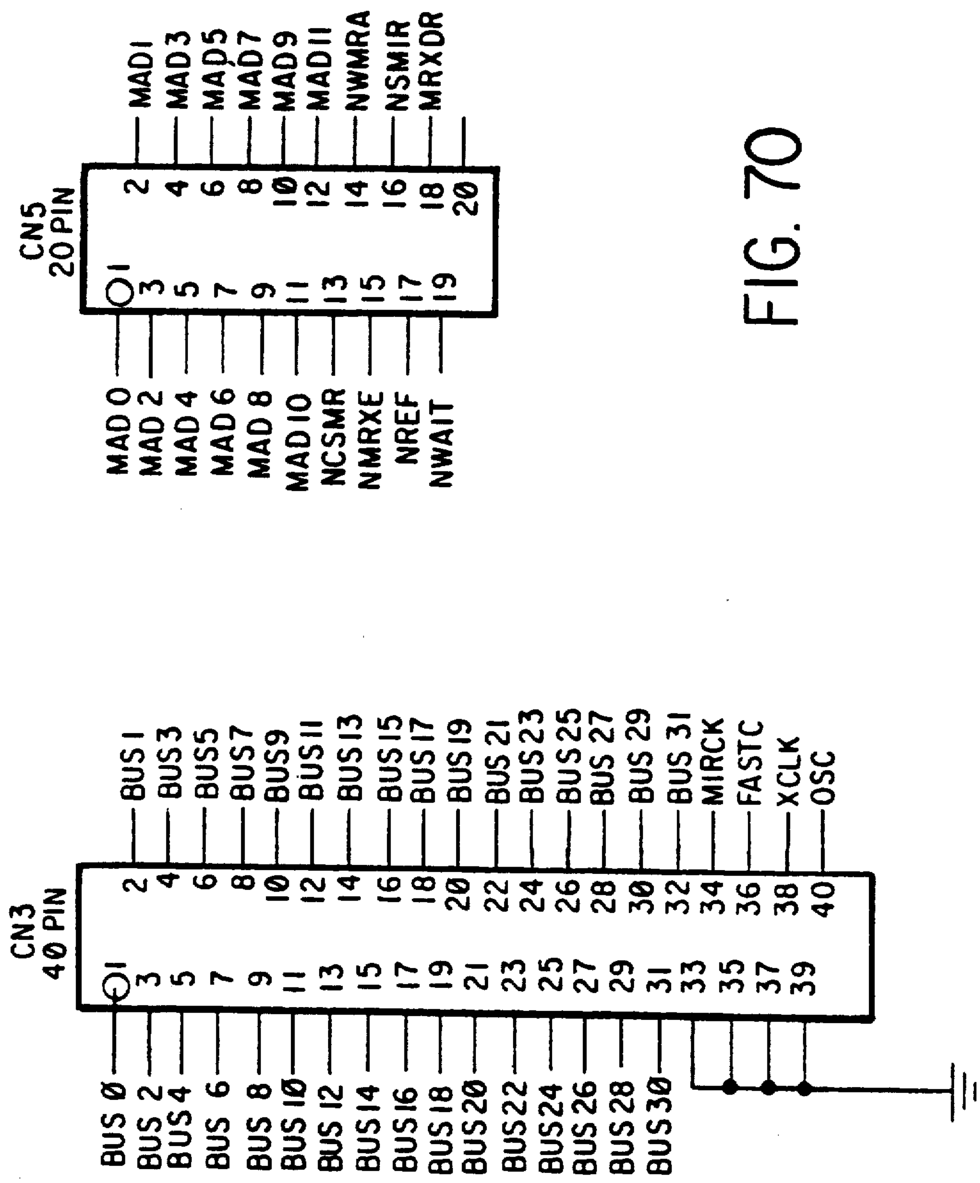
Figure 72:
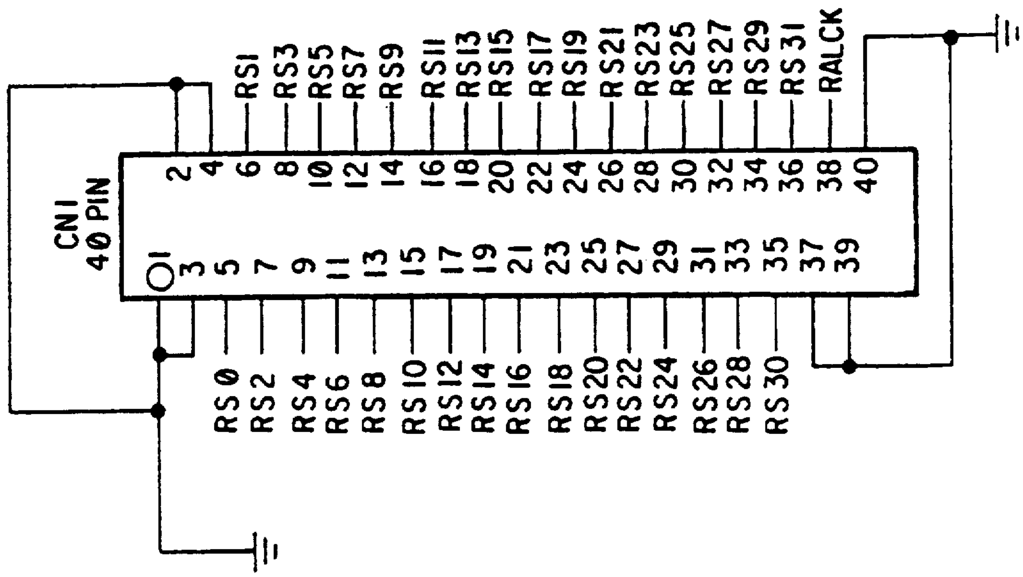
Figure 71:
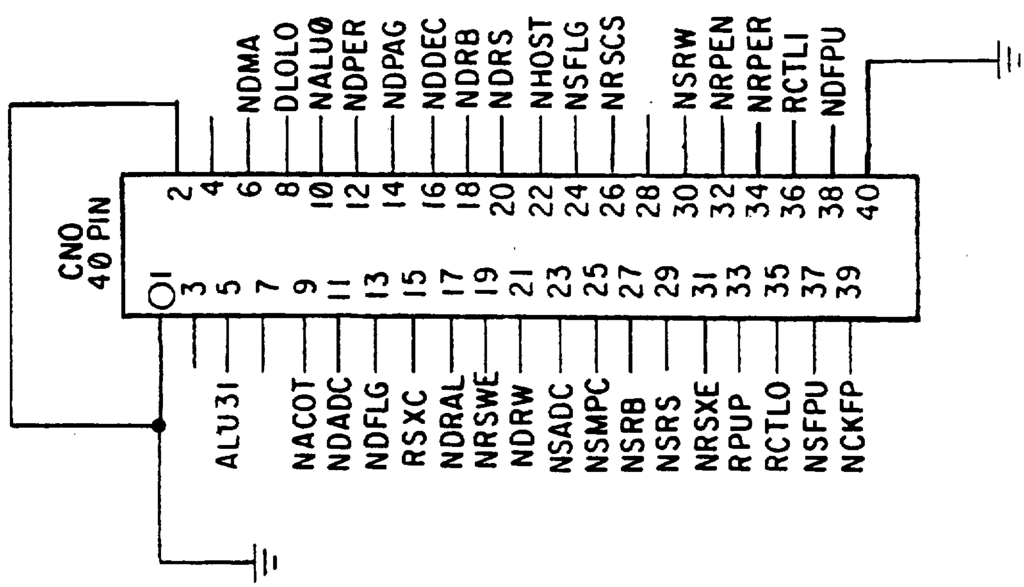
Figure 74:
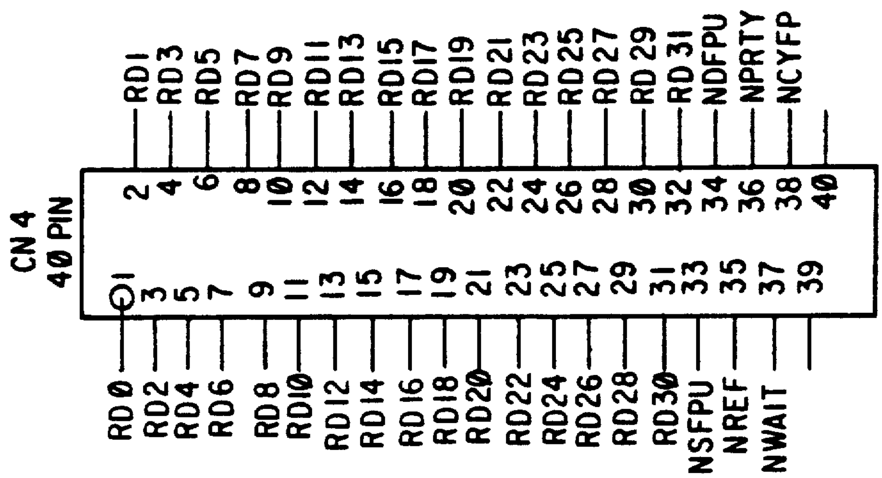
Figure 73:
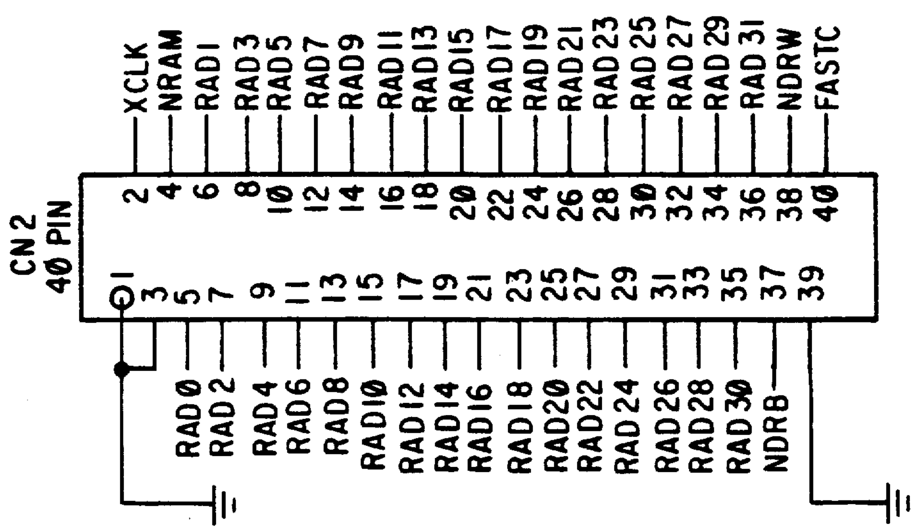
Figure 75:
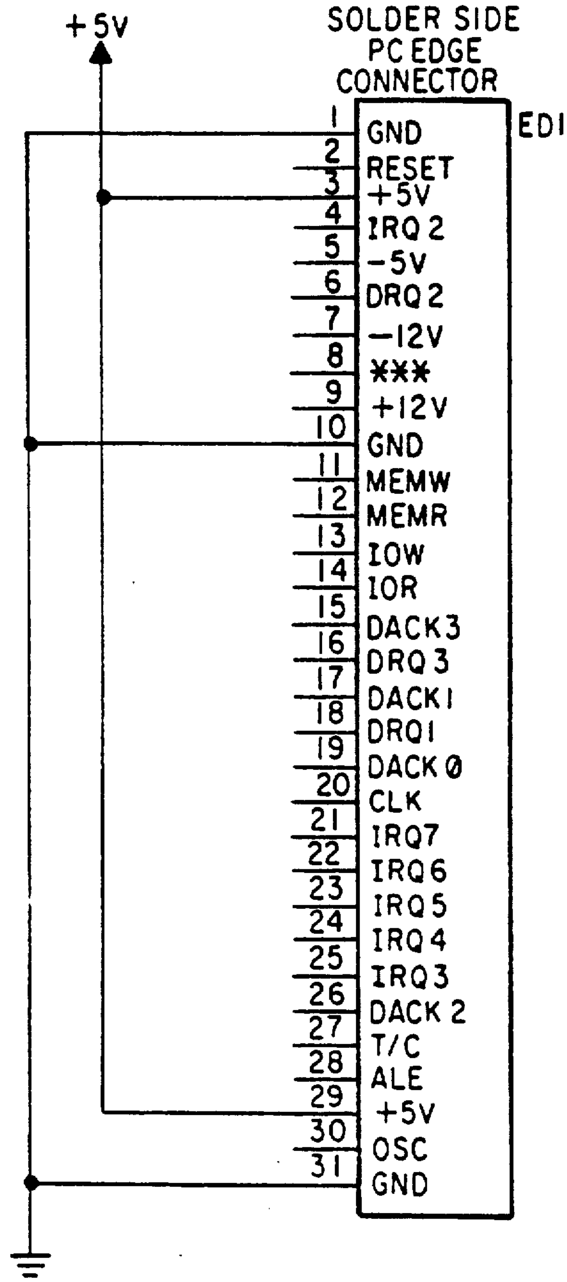

FIG. 63 shows the condition code register 127. This register is set at the end of every clock cycle, and forms the basis of the lowest bit of the next micro-instruction address fetched during the succeeding clock cycle. FIG. 64 shows a special forcing driver for the microcode-memory address that forces an opcode of 1 during interrupt recognition. FIG. 65 shows a timing chain used to control the 2 cycle instruction fetch and decoding operation.

FIGS. 66–69 show the RAM data to data bus 101 transfer logic shown by block 122 on FIG. 1. This transfer logic allows access of arbitrary bytes within the 32-bit memory organization as well as 32-bit full word access on evenly-divisible-by-four memory address locations.

FIGS. 70–75 show connector arrangements for transmitting and receiving signals from other cards in the system.

The Memory Card. The memory card described by FIGS. 76–89 is a single program memory 121 storage card for computer 100. Computer 100 may have one to sixteen of these cards in operation simultaneously to use up to 8 megabytes of memory.

Figure 76:
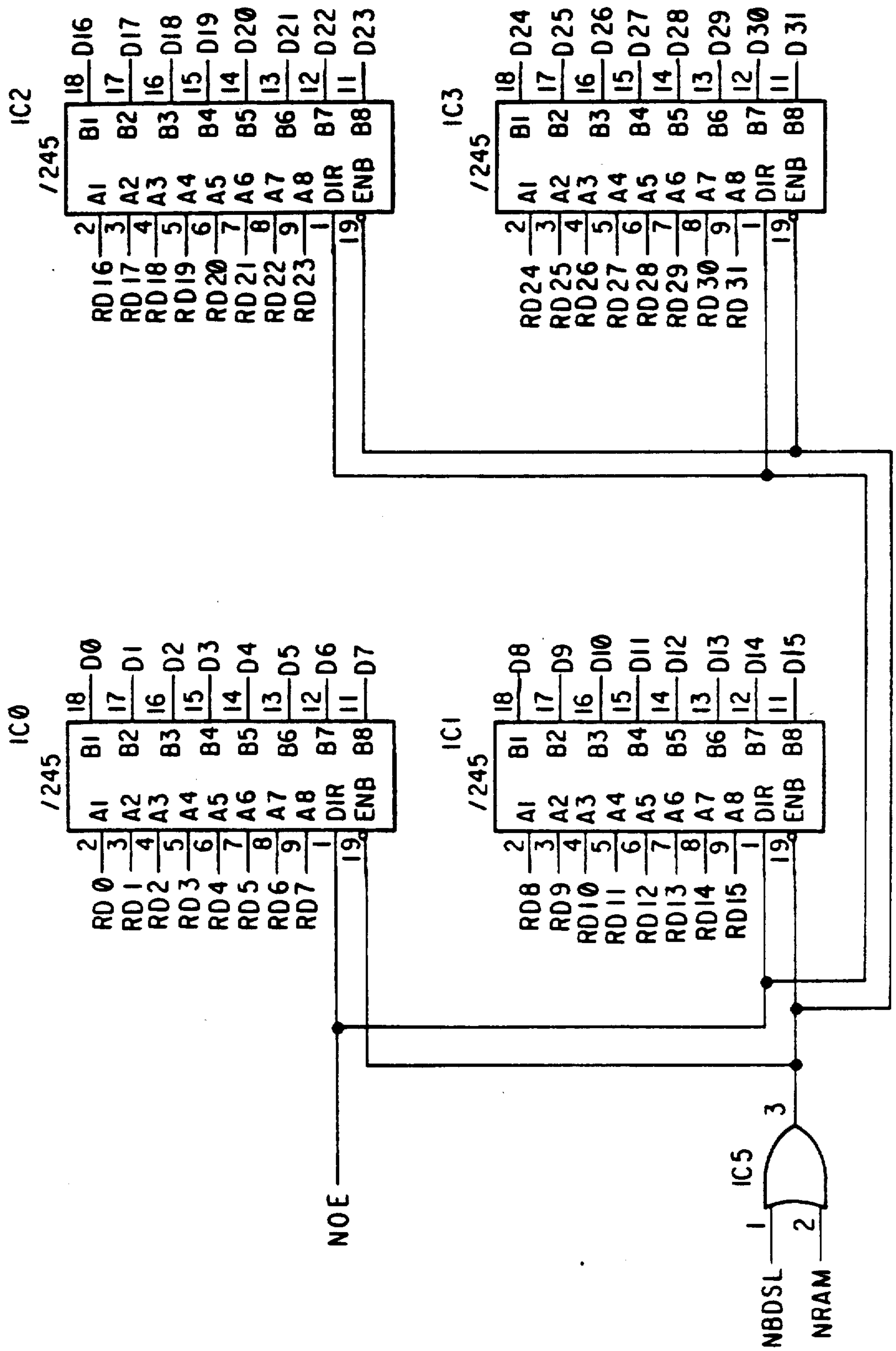
Figure 77:
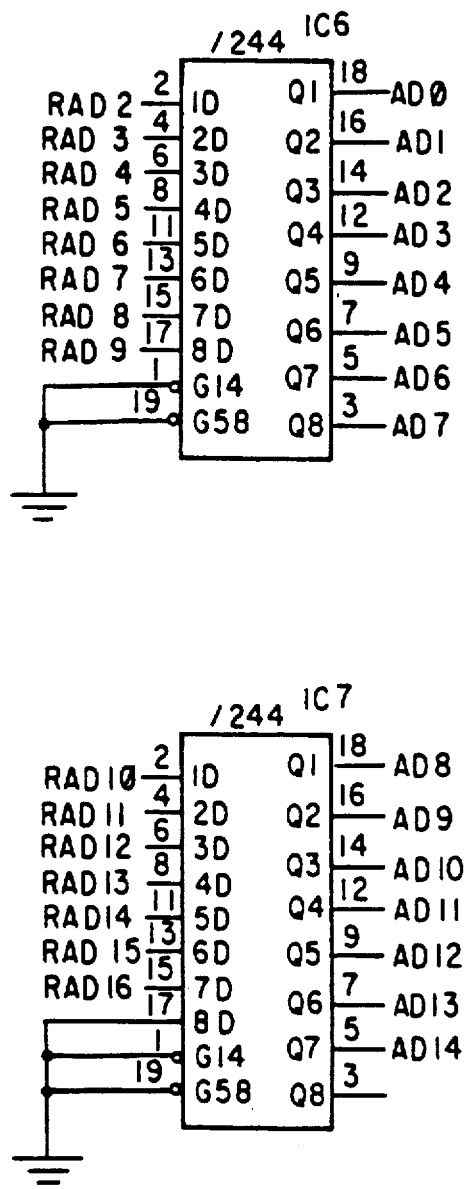
Figure 78:
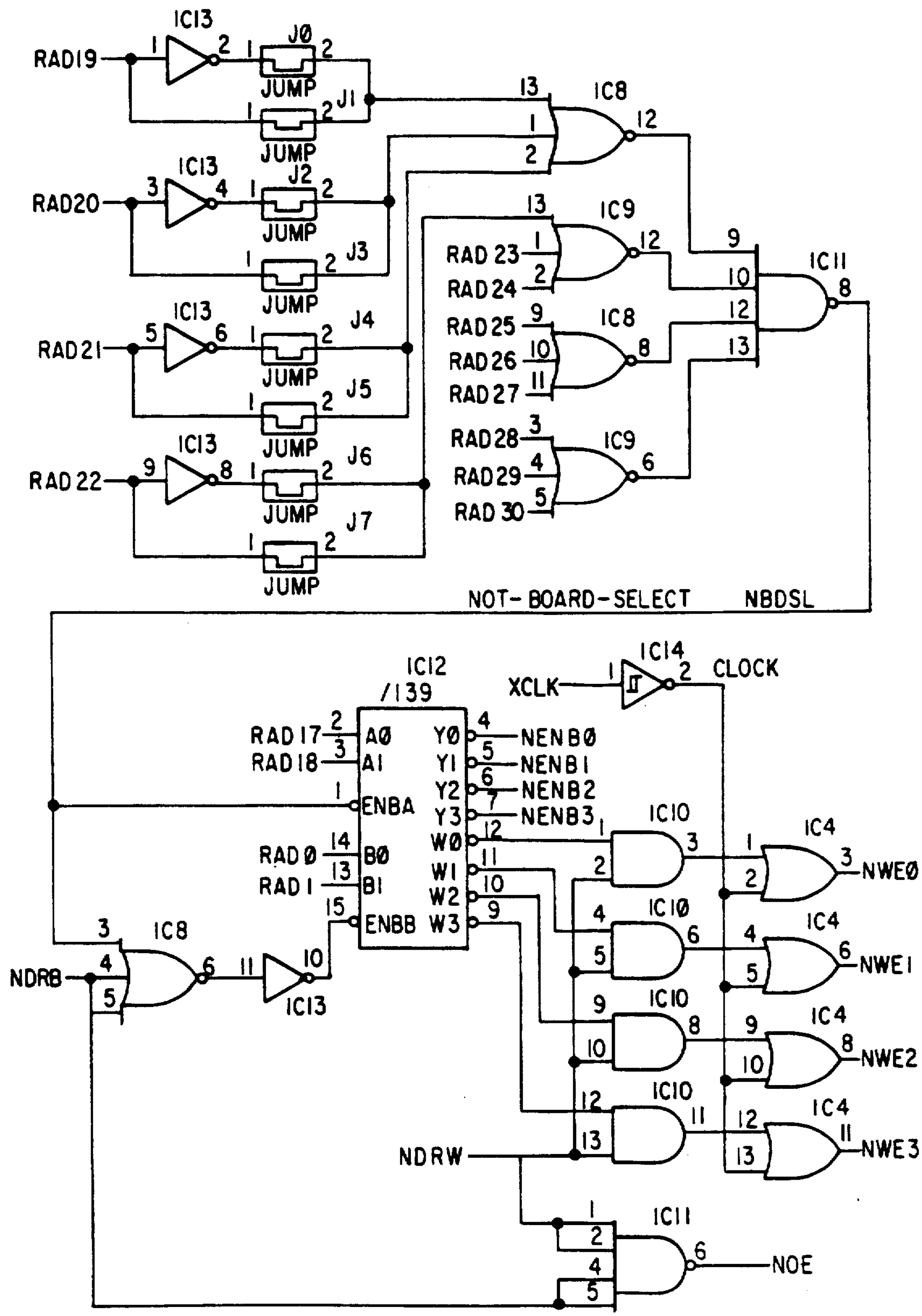
Figure 79:
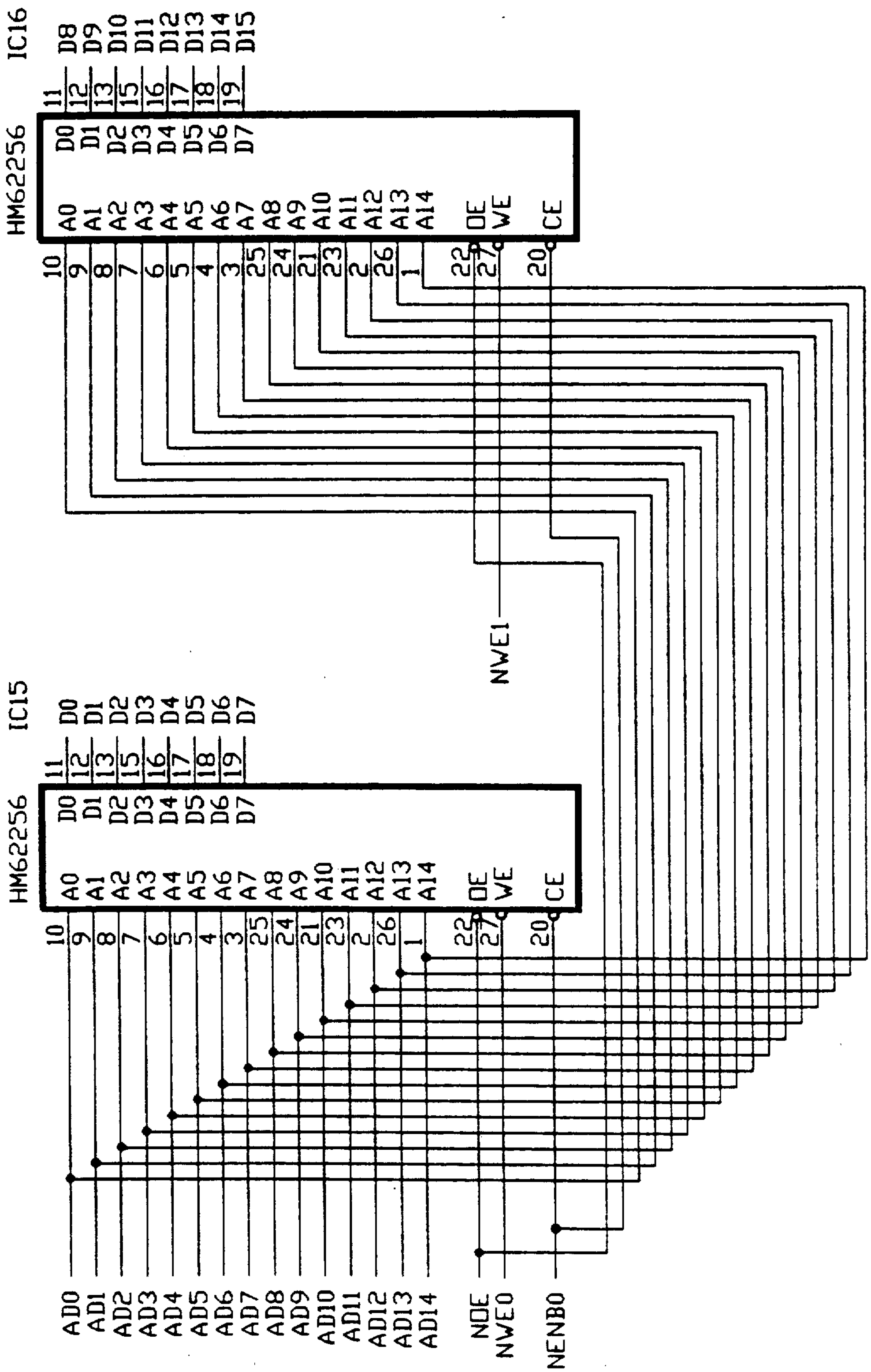
Figure 80:
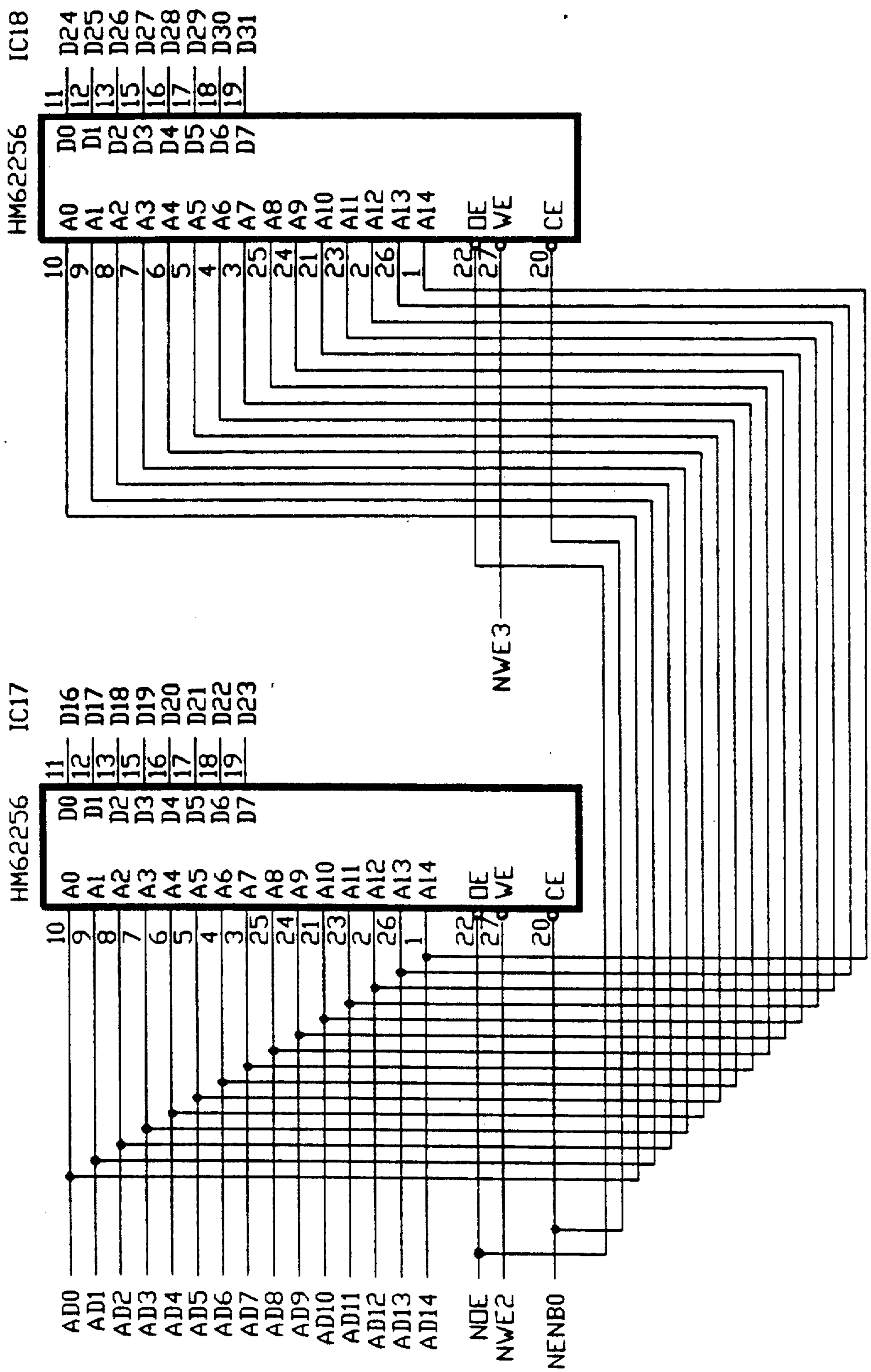
Figure 81:
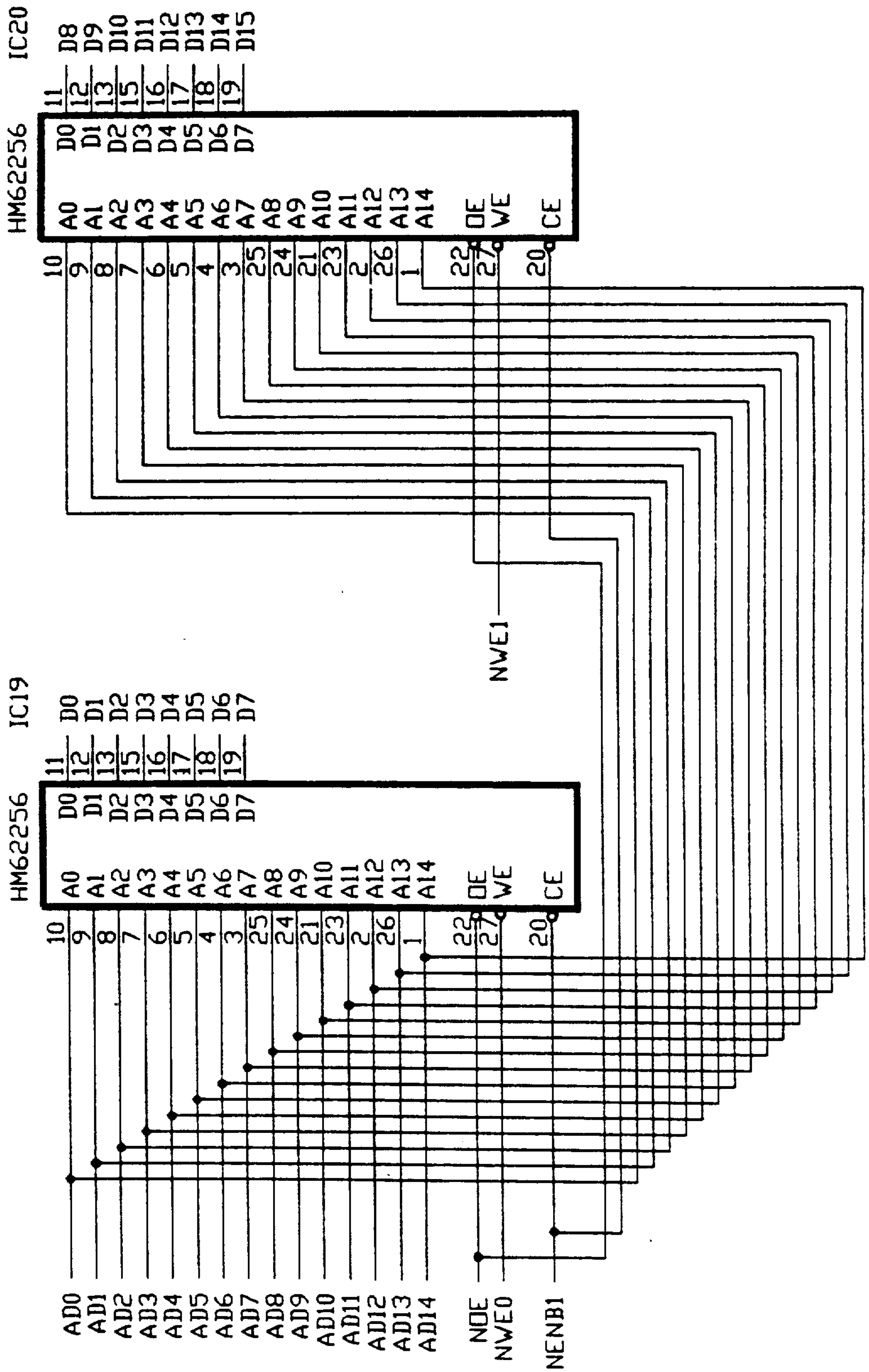
Figure 82:
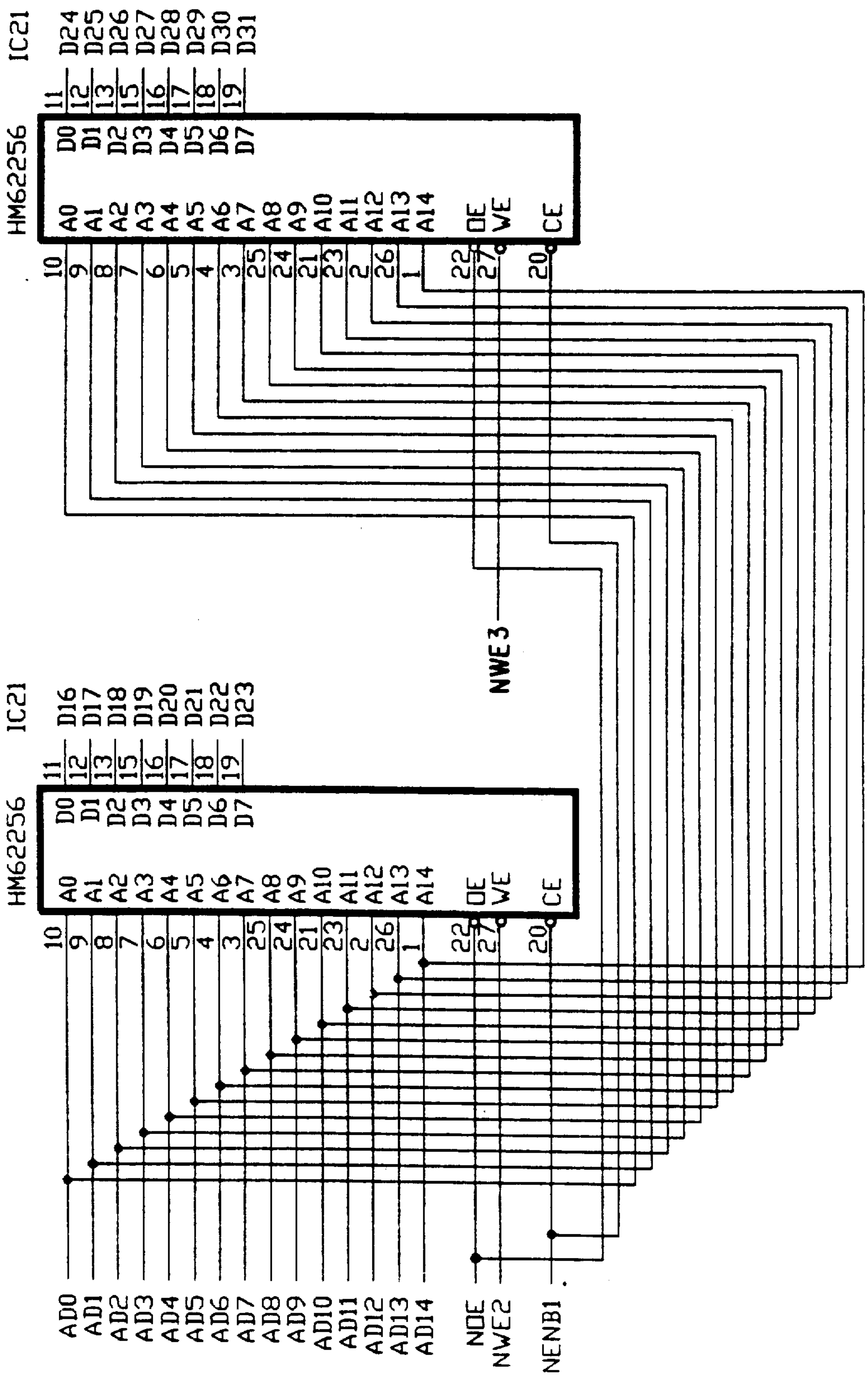
Figure 83:
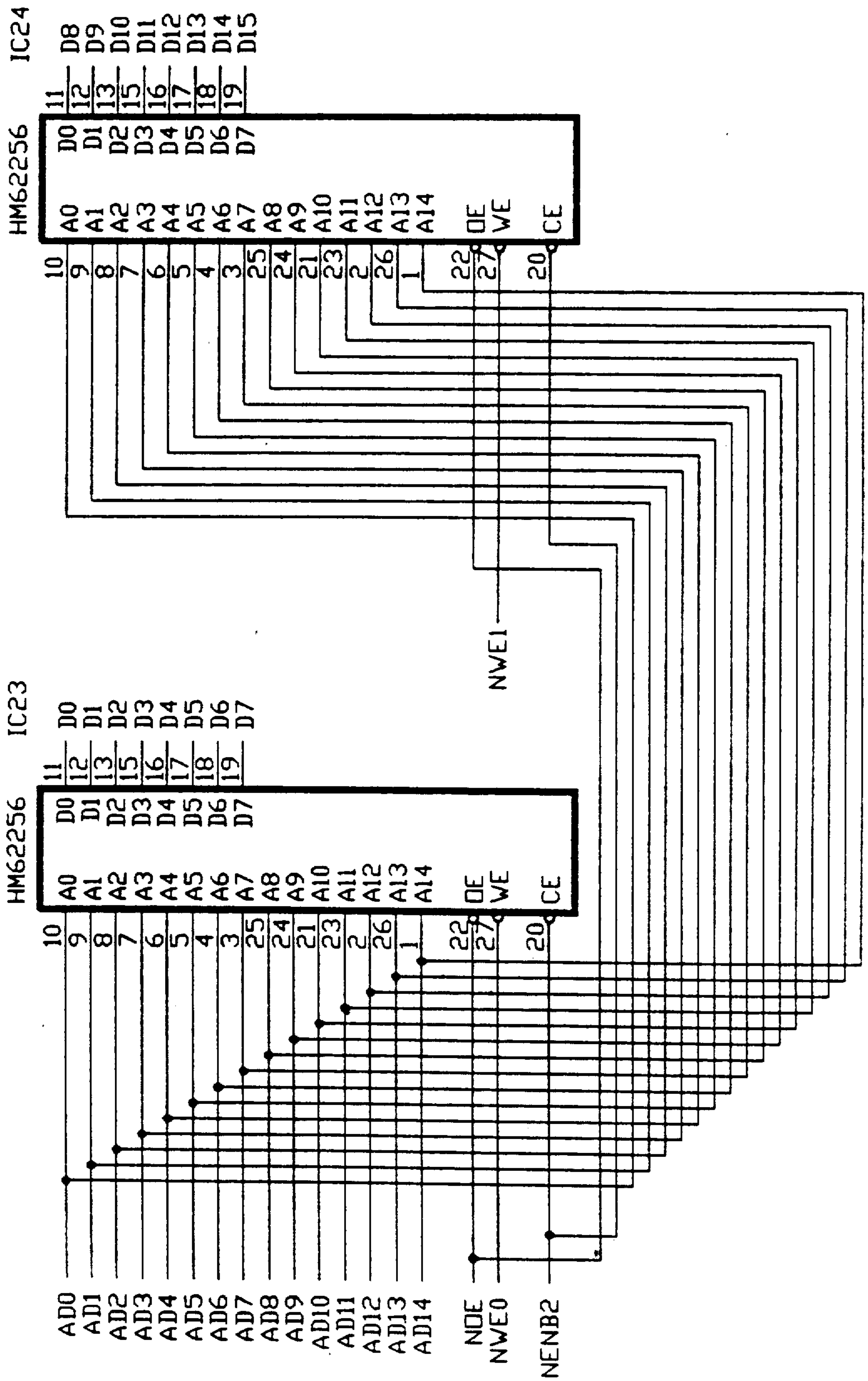
Figure 84:
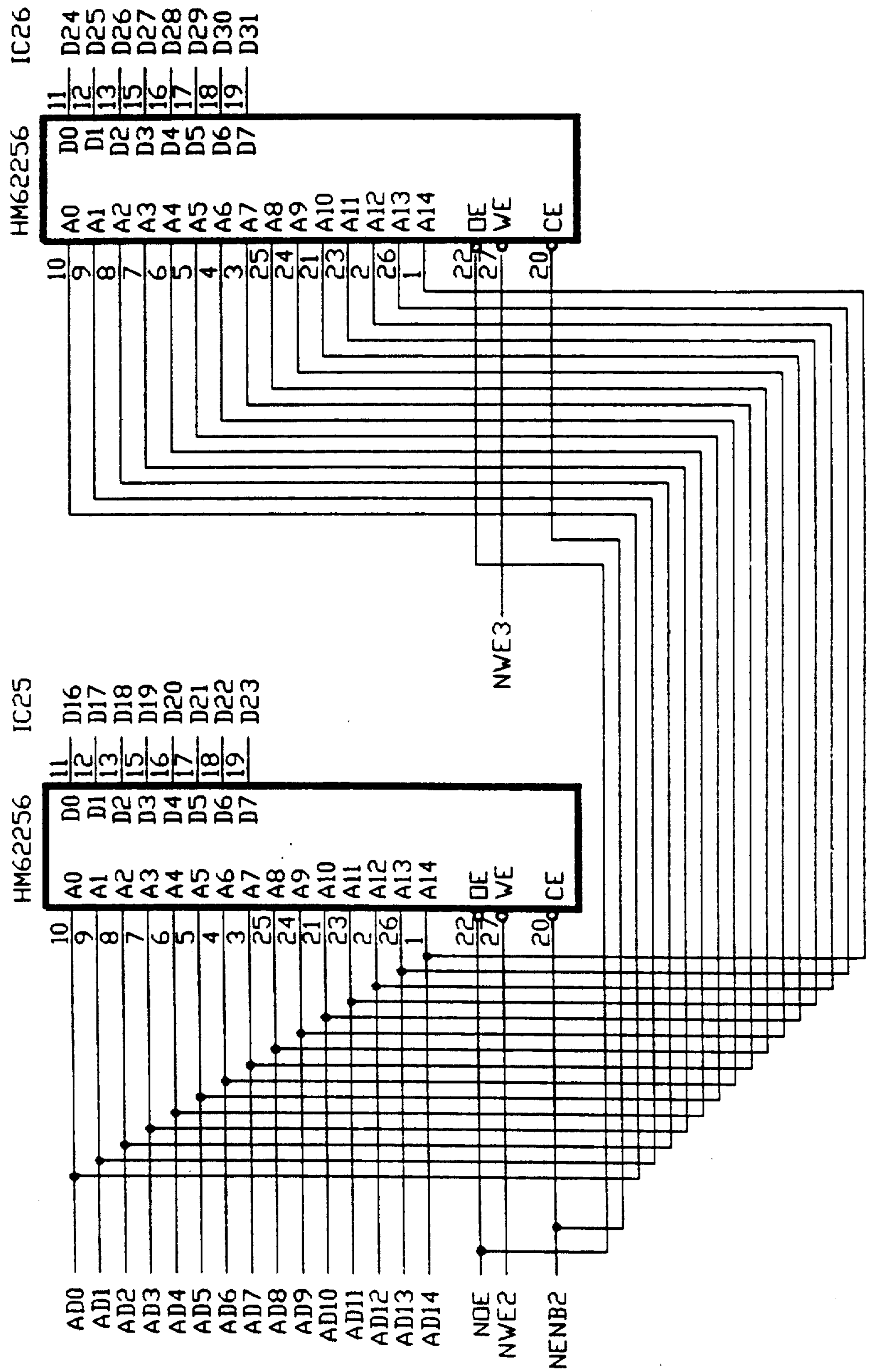
Figure 85:
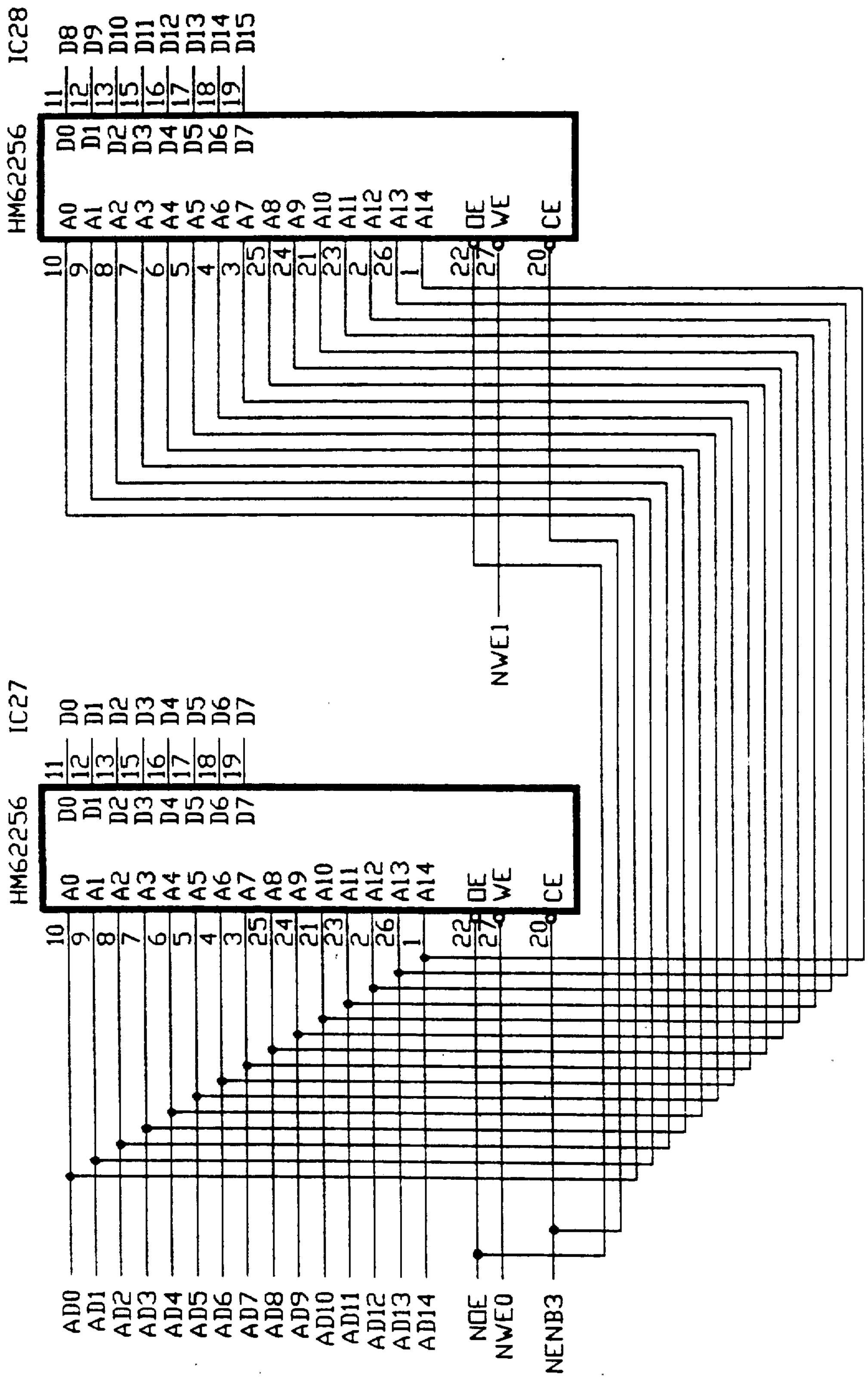
Figure 86:
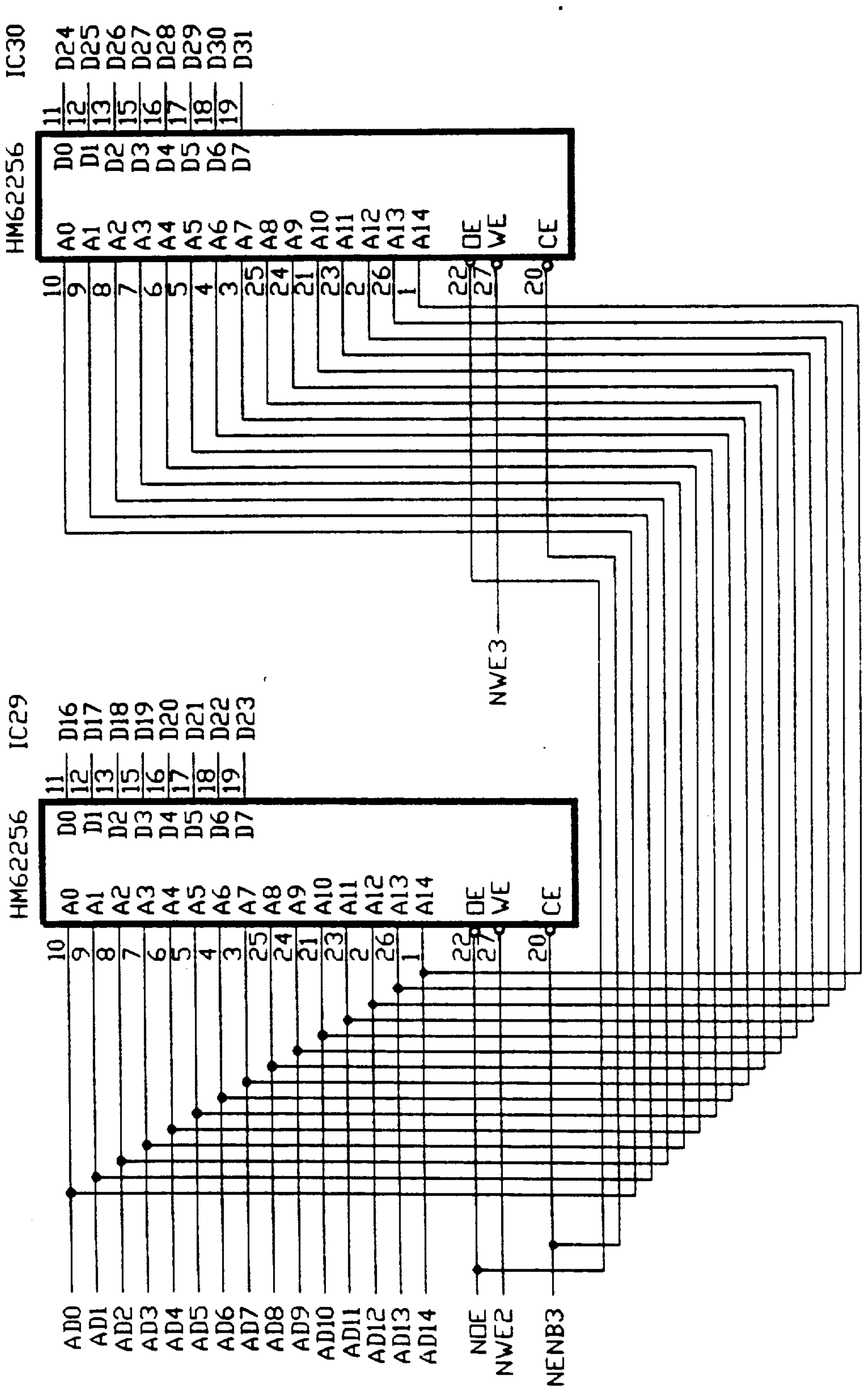

FIG. 76 shows data buffering logic used to satisfy current driving requirements of the memory chips. Similarly, FIG. 77 shows address buffering logic. FIG. 78 shows the memory board selection, bank selection, and chip selection logic. Jumpers J0–J7 may be set to map the memory board to one of 16 non-overlapping 512 kilobyte locations within the first eight megabytes of the available memory space. Only one memory board is activated at a time. Once the memory board is activated, a particular bank of chips (numbered from 0–3) is enabled selecting a 32 kiloword address within the board. If byte memory access is being used, a single chip within the bank is selected for a single byte operation, otherwise all chips within the bank are enabled.

FIGS. 79–86 show the four banks of four RAM chips each.

Figure 88:
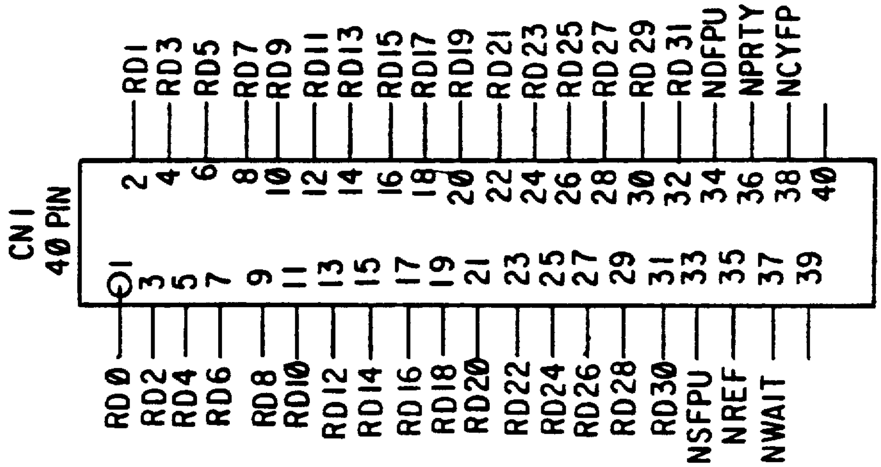
Figure 87:
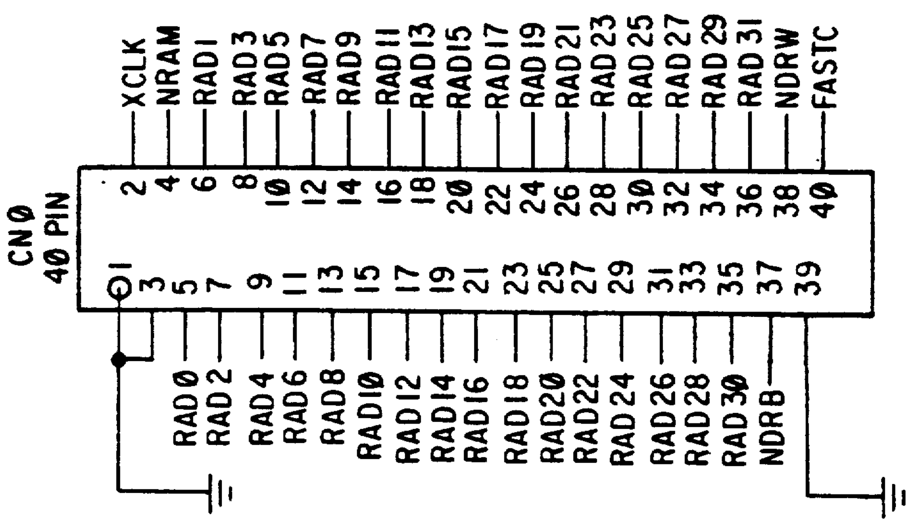

FIGS. 87–89 show connector arrangements for transmitting and receiving signals from other cards in the system.

SYSTEM SOFTWARE

Computer 100 in this preferred embodiment uses various software packages, including a FORTH kernel, a cross-compiler, a micro-assembler, as well as microcode. The software for these packages, written using MVP-FORTH, are listed in Appendix A. Further, the microcode format is discussed in Appendix B. The User's Manual (less appendices duplicated elsewhere in this document) is included as Appendix C. Some general comments about the software are in order. The Cross-Compiler. The cross-compiler maintains a sealed vocabulary with all the words currently defined for computer 100. At the base of this dictionary are special cross-compiler words such as IF ELSE THEN : and ;. After cross-compilation has started, words are added to this sealed vocabulary and are also cross-compiled into computer 100. Whenever the keyword CROSS-COMPILER is used, any word definitions, constants, variables, etc. will be compiled to computer 100. However, any immediate operations will be taken from the cross-compiler's vocabulary, which is chained to the normal MVP-FORTH vocabulary.

By entering the FORTH word {, the cross-compiler enters the immediate execution mode for computer 100. All words are searched for in the sealed vocabulary for computer 100 and are executed by computer 100 itself. The "START.." "END" that is displayed indicates the start and the end of execution of computer 100. If the execution freezes in between the start and end, that means that computer 100 is hung up. The cross-compiler builds a special FORTH word in computer 100 to execute the desired definition, then performs a HALT instruction. Entering the FORTH word } will leave the computer 100 mode of execution and return to the cross-compiler. No colon definitions or other creation of dictionary entries should be performed while between { and }.

The FORTH word CPU32 will automatically transfer control of the system to computer 100 via its Forth language cold start command. The host MVP-FORTH will then execute an idle loop waiting for computer 100 to request services. The word BYE will return control back the host's MVP FORTH.

The current cross-compiler can not keep track of the dictionary pointer DP, etc., in computer 100 if it is out of sync with the cross-compiler's copy. This means that no cross- C compiling or micro-assembly may be done after the FORTH of computer 100 has altered the dictionary in any way. This could be fixed at a later date by updating the cross-compiler's variables from computer 100 after every BYE command of computer 100.

Cross-compiled code should be kept to a minimum, since it is tricky to write. After a bare minimum kernel is up and running, computer 100 should do all further FORTH compilation. The Micro-assembler. The micro-assembler is a tool to save the programmer from having to set all the bits for microcode by hand. It allows the use of mnemonics for setting the micro-operation fields in a micro-instruction, and, for the most part, automatically handles the micro-instruction addressing scheme.

The micro-assembler is written to be co-resident with the cross-compiler. It uses the same routines for computer 100 and sealed host vocabulary dictionary handling, etc. Currently all microcode must be defined before the board starts altering its dictionary, but this could be changed as discussed previously.

In the terminology used here, a micro-instruction is a 32-bit instruction in microcode, while a micro-operation is formed by one or more microcode fields within a single micro-instruction.

Appendix B gives a quick reference to all the hardware-defined micro-instruction fields supported by the micro-assembler. The usage and operation of each field of the micro-instruction format is covered in detail in Part Two of the User's Manual included as Appendix C. Since the microcode layout is very horizontal, there is a direct relationship between bit settings and control line inputs to various ips on computer 100. As with most horizontally mic oded machines, as many micro-operations as desired may take place at the same time, although some operations don't do anything useful when used together. Microcode Definitions Format. The micro-assembler has a few keywords to make life easier for the micro-programmer. The word OP-CODE: starts a microcode definition. The input parameter is the page number from 0–OFF hex that the op-code resides in. For example, the word ± is op-code 7. This means that whenever computer 100 interprets a hex 038xxxxx (where the x's represent don't care bit values), the word ± will be executed in microcode. The character string after OP-CODE: is the name of the op-code that will be added to the cross-compiler and computer 100 dictionaries. It is the programmer's responsibility to ensure that two op-codes are not assigned to the same microcode memory page. The variable CURRENT-OPCODE contains the page currently assigned by OP-CODE:. It may be changed to facilitate multi-page definitions.

The word :: signifies the start of the definition of a micro-instruction. The number before :: must be from 0 to 7, and signifies the offset from 0 to 7 within the current micro-program memory page for that micro-instruction. Micro-instructions may be defined in any order desired. When directly setting the micro-instruction register (MIR) for interactive execution, the word >> may be used without a preceding number instead of the sequence 0 ::.

The word ;; signifies the end of a micro-instruction and stores the micro-instruction into the appropriate location in micro-program memory.

The word ;;END signifies the end of a definition of a FORTH microcoded primitive.

If the FORTH vocabulary is in use, the programmer may single-step microcoded programs. Use the >> word to start a micro-instruction. Instead of using ;;, use ;SET to copy the micro-instruction to the MIR. This allows reading resources of computer 100 to the host 103 with the X@ word or storing resource values with the X! word. Using ;DO instead of ;; will load the instruction into the MIR and cycle the clock once. This is an excellent way of single-stepping microcode. The User's Manual in Appendix C and the Diagnostics of computer 100 given in Appendix A part III provide examples of how to use these features. End/Decode. END and DECODE are the two micro-operations that perform the FORTH NEXT function and perform subroutine calls, subroutine returns, and unconditional branches in parallel with other operations. DECODE is always in the next to last micro-instruction of a micro-coded instruction. It causes the interrupt register 126 to be clocked near the falling clock edge, and loads highest 9 bits of the instruction into the instruction latch 125 at the following rising clock edge. Thereafter, instruction fetching and decoding proceeds according to the actions described in Appendix C part II. END is a micro-operation that marks the last instruction in a program and forces a jump to offset 0 of the next instruction's microcoded memory page. Microcode Next Address Generation. The micro-assembler automatically generates an appropriate microcode jump to the next sequential offset within a page. This means that if a 3 is used before the :: word, then the micro-assembler will assume that the next micro-instruction is at offset 4 unless a JMP= micro-instruction is used to tell it otherwise.

The JMP= micro-operation allows forcing non-sequential execution or conditional branching simultaneously with other micro-operations. A JMP=000, JMP=001, ... , JMP=111 command forces an unconditional microcode jump to the offset within the same page specified by the binary operand after JMP=. For example, JMP=101 would force a jump to offset 5 for the next micro-cycle.

A conditional jump allows jumping to one of the two locations depending on the value of one of the 8 condition codes. The unconditional jump described in the preceding paragraph is just a special conditional jump in which the condition picked is a constant that is always set to 0 or 1. The sign bit conditional jump is used below as an example.

A conditional jump sets the lowest bit of the next micro-instruction address to the value of the condition that was valid at the end of the previous microcycle. The syntax is JMP=00S, where "S" can be replaced by any of the conditions: Z, L, C, S, 0, 1. The first two bits are always numeric, indicating the top two binary bits of the jump destination address within the micro-program memory page. The example JMP=10S would jump to offset 4 within the micro-program memory page if the sign bit were 0, and location 5 if it were 1.

Appendix C is the user manual for computer 100, and describes other information of interest in the operation of the preferred embodiment of the invention.

It will thus be appreciated that the described preferred embodiment achieves the desired features and advantages of the invention. While the invention has been particularly shown and described with reference to the foregoing preferred embodiment, it will be understood by those skilled in the art that other changes in form and detail may be made therein without departing from the spirit and scope of the invention, as defined in the claims.

APPENDIX A

PART I

MICRO-ASSEMBLER, CROSS-COMPILER, AND MICROCODE PROGRAM LISTING

SCREEN #1

```
INDEX --- CPU/32 X COMPILER & MICRO-ASSEMBLER   PHIL KOOPMAN JR.
LIBRARY VERSION    FILE: XCOMP.4TH          LAST UPDATE: 6/1/87
BETA TEST VERSION  (C) COPYRIGHT 1987
BY PHIL KOOPMAN JR.
LOAD     SOURCE
SCREEN   SCREENS     CONTENTS
=======  ========    ========
2 LOAD   2 - 102     MICRO-CODE ASSEMBLER & CROSS-COMPILER
  ...    105 - 203   KERNEL MICROCODE DEFINITIONS
  ...    205 - 254   EXTENDED KERNEL MICROCODE DEFINITIONS
```

SCREEN #2

```
\ LOAD SCREEN FOR MICRO-ASSEMBLER   & CROSS-COMPILER
HEX  MATH  CR CR ." Loading cross-compiler & micro-assembler" CR
 ." (C) Copyright 1987 by Phil Koopman Jr." CR
VARIABLE OPTIMIZE?   \  True value means combine ops with jumps
1 OPTIMIZE? !
100000. DCONSTANT  MEM-SIZE
  8000. DCONSTANT SAVE-SIZE
DECIMAL
CR MEM-SIZE  1024. D/   5 D.R ." K bytes memory on system"  CR
  4 102  THRU  ( Load cross-compiler )
CR CR ." Loading microcode source to CPU/32" CR
 105 203  THRU  ( Load basic microcode )
 205 254  THRU  ( Load extended microcode )
CR CR ." Saving memory image" CR SAVE-ALL CR CR
." Do a SAVE-FORTH to a DOS file name XCOMP.COM if desired" CR
CROSS-COMPILER          FORTH DEFINITIONS
```

SCREEN #3

```
\  NO LOADING DONE FROM CPU/32 FROM THIS FILE
CR CR ." NO LOADING DONE FROM CPU/32 FROM THIS FILE" CR CR
```

```
SCREEN #4
\ CASE STATEMENT -- CASE  IFCASE
DECIMAL
: CASE     ( -> )   ( COMPILE )
           ( FLAG -> FLAG )    ( EXECUTE )
   COMPILE >R   COMPILE R@   0 31  ;
   IMMEDIATE

: IFCASE    ( ..ADDRS.. COUNT 31 -> ... BRANADDR COUNT 32 )
          ( FLAG -> )    ( EXECUTE )
   31 ?PAIRS 32   COMPILE OBRANCH  HERE 0 ,
   ROT 1+ ROT  ;
   IMMEDIATE

SCREEN #5
\   CASE ---  NEXTCASE  ELSECASE
DECIMAL
: NEXTCASE  ( ... BRANADDR COUNT 32 -> .. ELSEADDR COUNT 31 )
     ( -> FLAG ) ( EXECUTE )
   32 ?PAIRS   COMPILE BRANCH  0 ,
   SWAP  HERE OVER -  SWAP !
   HERE 2- SWAP 31  COMPILE R@  ;
   IMMEDIATE

: ELSECASE    ( ... COUNT 32 -> ... COUNT 33 )
   32 ?PAIRS COMPILE BRANCH 0 ,
   SWAP  HERE OVER - SWAP !
   HERE 2- SWAP 33 ;
   IMMEDIATE

SCREEN #6
\   CASE --- ENDCASE   BETWEEN
DECIMAL
: ENDCASE   ( -> )
   DUP 32 =  IF DROP SWAP HERE OVER -  SWAP !
   1- 33 THEN   33 ?PAIRS  BEGIN
   DUP 0> WHILE SWAP HERE OVER - SWAP !
   1- REPEAT  DROP COMPILE R> COMPILE DROP  ;
   IMMEDIATE

: BETWEEN    ( N1 N2 N3 -> N2<=N1<=N3? )
   >R   OVER   > NOT   SWAP
   R>   > NOT    AND  ;

SCREEN #7
\  DEFINE READ0 .. READ7   WRITE0 .. WRITE7
HEX
: READ0   300 P@  ;          : WRITE0   300 P! ;
: READ1   301 P@  ;          : WRITE1   301 P! ;
: READ2   302 P@  ;          : WRITE2   302 P! ;
: READ3   303 P@  ;          : WRITE3   303 P! ;
```

```
: READ4   304 P@  ;          : WRITE4   304 P! ;
: READ5   305 P@  ;          : WRITE5   305 P! ;
: READ6   306 P@  ;          : WRITE6   306 P! ;
: READ7   307 P@  ;          : WRITE7   307 P! ;

DECIMAL
```

SCREEN #8

```
\ FORTH BOARD STOP & GO --  STOP  GO  STATUS?  CYCLE
HEX
: STOP   ( -> )
   0 WRITE4 ;
: GO   ( -> )
   0 WRITE3 ;

: STATUS  ( -> STATUS )    \ Status register contents
   READ2 ;  \   OFF AND  ;
: STATUS?   STATUS U.  ;

: CYCLE  ( -> )       \ Cycle one clock tick
   0 WRITE2  ;
DECIMAL
```

SCREEN #9

```
\ FORTH BOARD   RESET SET-DMA  PCREQ
HEX
: PCREQ  ( N -> )
   WRITE7 ;

: RESET-SEQ  ( -> )
   0 WRITE6  ;

: SET-DMA ( -> )
   0 WRITE5 ;

DECIMAL
```

SCREEN #10

```
\ VARIABLES FOR MICROASSEMBLER -- 1
DECIMAL
\ Following variables are all flags that indicate if fields
\       have been used in current micro-instruction assembly
VARIABLE >SOURCE                VARIABLE >DEST
VARIABLE >DP                    VARIABLE >RP
VARIABLE >ALU-MUX               VARIABLE >ALU
VARIABLE >CIN                   VARIABLE >DLO
VARIABLE >CONDITION             VARIABLE >JMP
VARIABLE >INC-MPC               VARIABLE >DECODE
VARIABLE >INC-ADC
```

SCREEN #11

```
\ VARIABLES FOR MICROASSEMBLER   -- 2
DECIMAL
VARIABLE CURRENT-OPCODE  \ Micromemory page number
VARIABLE CURRENT-OFFSET  \ Micromemory offset value
DVARIABLE MICRO-WORD     \ Current micro-assembler building word
```

SCREEN #12

```
\ INITIALIZE MICROASSEMBLER FLAGS
DECIMAL
: RESET   ( -> )
   0 >SOURCE      !        0 >DEST       !
   0 >DP          !        0 >RP         !
   0 >ALU-MUX     !        0 >ALU        !
   0 >CIN         !        0 >DLO        !
   0 >CONDITION   !        0 >JMP        !
   0 >INC-MPC     !        0 >DECODE     !
   0 >INC-ADC     !
   0. MICRO-WORD D!   ;
```

SCREEN #13

```
\  SET UP DEFAULTS FOR MICROCODE WORD
HEX   MATH
: FINISH     ( -> )    \ Set required bits for default fields
   >DP               @ NOT IF  00000200. MICRO-WORD D+!  THEN
       ( Default ALU operation is pass A side function )
   >ALU              @ NOT IF  00100000. MICRO-WORD D+!  THEN
\  >ALU  @   NOT IF
\     MICRO-WORD D@  SWAP DROP  20 AND
\     IF    ( CYIN=1 )  00000000.
\     ELSE  ( CYIN=0 )  000F0000.    THEN
\  MICRO-WORD D+!  THEN
   >DECODE           @ NOT IF  40000000. MICRO-WORD D+!  THEN ;

DECIMAL
```

SCREEN #14

```
\ SOURCE DEFINITIONS    - 1
DECIMAL   MATH
```

```
: SRC   ( DVALUE -> )      ( PFA -> )
   CREATE  D,
   DOES>      >SOURCE @   ABORT" MULTIPLE SOURCE= STATEMENTS"
              1 >SOURCE !    D@  MICRO-WORD  D+!  ;

    1. SRC SOURCE=DP                 2. SRC SOURCE=DS
    3. SRC SOURCE=DLO                4. SRC SOURCE=DHI
    5. SRC MULTIPLY                  6. SRC DIVIDE-SELECT
    7. SRC SOURCE=FLAGS              8. SRC SOURCE=RP
    9. SRC SOURCE=RS                10. SRC SOURCE=ADDRESS-COUNTER
   11. SRC SOURCE=RAM               12. SRC SOURCE=RAM-BYTE
   13. SRC SOURCE=MPC               14. SRC SOURCE=MRAM
   15. SRC SOURCE=FPU                0. SRC SOURCE=HOST  ( default )
: SOURCE=LATCH ;   ( for readability )
```

SCREEN #15

```
\ DEST DEFINITIONS -- 1
DECIMAL  MATH
: DST   ( DVALUE -> )      ( PFA -> )
   CREATE  4 DLSLN  D,
   DOES>      >DEST @   ABORT" MULTIPLE DEST= STATEMENTS"
              1 >DEST !    D@  MICRO-WORD D+!  ;

    1. DST DEST=DP                  2. DST DEST=DS
 ( 3. is unassigned )               4. DST DEST=PAGE
    5. DST DEST=ADDRESS-LATCH       6. DST DEST=STATUS
    7. DST DEST=FLAGS               8. DST DEST=RP
    9. DST DEST=RS                 10. DST DEST=ADDRESS-COUNTER
   11. DST DEST=RAM                12. DST DEST=RAM-BYTE
   13. DST DEST=DECODE             14. DST DEST=MRAM
   15. DST DEST=FPU       : DEST=LATCH ;   ( for readability )
: DEST=DHI ;   ( DHI is always clocked -- use for readability )
```

SCREEN #16

```
\ DP CONTROL
DECIMAL  MATH
: DPQ   ( DVALUE -> )      ( PFA -> )
   CREATE  8 DLSLN  D,
   DOES>      >DP @   ABORT" MULTIPLE DP STATEMENTS"
              1 >DP !    D@     MICRO-WORD D+! ;

  0. DPQ DEC[DP]
  1. DPQ INC[DP]
```

SCREEN #17

```
\ RP CONTROL
DECIMAL  MATH
: RP   ( DVALUE -> )      ( PFA -> )
   CREATE  10 DLSLN  D,
   DOES>      >RP @   ABORT" MULTIPLE RP STATEMENTS"
              1 >RP !    D@     MICRO-WORD D+! ;

  3. RP DEC[RP]
  2. RP INC[RP]
```

```
SCREEN #18
\ ALU MUX SELECTION DEFINITIONS
DECIMAL
: ALUMUX   ( DVALUE -> )     ( PFA -> )
   CREATE 12 DLSLN  D,
   DOES>      >ALU-MUX @   ABORT" MULTIPLE ALU MUX STATEMENTS"
           1 >ALU-MUX !    D@  MICRO-WORD D+!  ;

  1. ALUMUX SR[ALU]
  2. ALUMUX SL[ALU]
  3. ALUMUX ROLL[ALU]
```

```
SCREEN #19
\ ALU FUNCTION CONTROL  -- LOGICAL
HEX
: ALUL ( DVALUE -> )     ( PFA -> )
\ Automatically compensates for FUNC & CIN inverters on board
\ Function codes used below reflect '181 docn for active hi data
   CREATE  OOF. DXOR    10 DLSLN  D,
   DOES>      >ALU @  ABORT" MULTIPLE ALU STATEMENTS"
           1 >ALU !   D@    MICRO-WORD D+! ;



DECIMAL
```

```
SCREEN #20
\ ALU DEFINITIONS  -- 1
HEX
\ Logical definitions
 10. ALUL ALU=notA
 11. ALUL ALU=AnorB              19. ALUL ALU=AxnorB
                                 1A. ALUL ALU=B
 13. ALUL ALU=0                  1B. ALUL ALU=AandB
 14. ALUL ALU=AnandB             1C. ALUL ALU=-1
 15. ALUL ALU=notB
 16. ALUL ALU=AxorB              1E. ALUL ALU=AorB
                                 1F. ALUL ALU=A
DECIMAL
```

```
SCREEN #21
\ ALU FUNCTION CONTROL  -- ARITHMETIC
HEX
: ALUM   ( DVALUE -> )      ( PFA -> )
\ Automatically compensates for FUNC & CIN inverters on board
\ Function codes used below reflect '181 docn for active hi data
   CREATE  02F. DXOR    10 DLSLN  D,
   DOES>       >ALU @  ABORT" MULTIPLE ALU STATEMENTS"
               >CIN @  ABORT" MULTIPLE CARRY-IN STATEMENTS"
               1 >CIN !   1 >ALU !   D@    MICRO-WORD D+! ;



DECIMAL
```

```
SCREEN #22
\ ALU DEFINITIONS - 2
HEX
\ Arithmetic definitions
 20. ALUM ALU=A+0     \ Passes A through, valid CY out
 26. ALUM ALU=A-B-1
 29. ALUM ALU=A+B
 2C. ALUM ALU=A+A
 2F. ALUM ALU=A-1

 00. ALUM ALU=A+1
 02. ALUM ALU=AornotB+1
 06. ALUM ALU=A-B
 09. ALUM ALU=A+B+1
 0C. ALUM ALU=A+A+1
DECIMAL
```

```
SCREEN #23
\ CARRY IN CONTROL
DECIMAL
: CIN ( DVALUE -> )      ( PFA -> )
   CREATE   21 DLSLN  D,
   DOES>      >CIN @  ABORT" MULTIPLE CARRY-IN STATEMENTS"
            1 >CIN !   D@    MICRO-WORD D+! ;

   0. CIN CIN=0
   1. CIN CIN=1
```

```
SCREEN #24
\ DLO CONTROL DEFINITIONS
DECIMAL
: DLO ( DVALUE -> )      ( PFA -> )
   CREATE  22 DLSLN  D,
   DOES>      >DLO @   ABORT" MULTIPLE DLO STATEMENTS"
            1 >DLO !    D@  MICRO-WORD D+!  ;
```

```
   1. DLO SR[DLO]
   2. DLO SL[DLO]
   3. DLO DEST=DLO

SCREEN #25
\ DIVIDE OPERATION MACRO
HEX
: DIVIDE ( -> )
   DIVIDE-SELECT
   >CIN     @  ABORT" MULTIPLE CARRY-IN STATEMENTS"
   >ALU     @  ABORT" MULTIPLE ALU MUX STATEMENTS"
   1 >ALU !  1 >CIN !
      002F0000.    MICRO-WORD D+! ;

DECIMAL

SCREEN #26
\ NEXT ADDRESS CONSTANT CONTROL
DECIMAL
: JMP   ( DVALUE -> )     ( PFA -> )
   CREATE  24 DLSLN  D,
   DOES>       >JMP @   ABORT" MULTIPLE JMP STATEMENTS"
              1 >JMP !   D@    MICRO-WORD D+! ;
HEX
\ Constant address jumps
   00. JMP JMP=000              07. JMP JMP=001
   08. JMP JMP=010              0F. JMP JMP=011
   10. JMP JMP=100              17. JMP JMP=101
   18. JMP JMP=110              1F. JMP JMP=111

DECIMAL

SCREEN #27
\ JMP STATEMENTS -- 2
HEX
\ Branch on not carry-out
   01. JMP JMP=00C              11. JMP JMP=10C
   09. JMP JMP=01C              19. JMP JMP=11C

\ Branch on ALU output not equal to 0
   02. JMP JMP=00Z              12. JMP JMP=10Z
   0A. JMP JMP=01Z              1A. JMP JMP=11Z

\ Branch on sign bit = 1   (ALU output bit 31)
   03. JMP JMP=00S              13. JMP JMP=10S
   0B. JMP JMP=01S              1B. JMP JMP=11S
```

```
DECIMAL
```

```
SCREEN #28
\ JMP STATEMENTS -- 3
HEX
\ Branch on lowest bit of DLO (shift-out bit)
   04. JMP JMP=00L              14. JMP JMP=10L
   0C. JMP JMP=01L              1C. JMP JMP=11L
DECIMAL
EXIT
\ Branch on ???????????????????????????? CONDITION # 5
   05. JMP JMP=00?              15. JMP JMP=00?
   0D. JMP JMP=01?              1D. JMP JMP=01?

\ Branch on ????????????????????????????????? CONDITION # 6
   06. JMP JMP=00??             16. JMP JMP=00??
   0E. JMP JMP=01??             1E. JMP JMP=01??

DECIMAL
```

```
SCREEN #29
\       MPC CONTROL
DECIMAL    MATH
: MPC  ( DVALUE -> )    ( PFA -> )
   CREATE    29 DLSLN  D,
    DOES>    >INC-MPC @    ABORT" MULTIPLE MPC STATEMENTS"
          1 >INC-MPC !     D@  MICRO-WORD D+!   ;

  1. MPC   INC[MPC]
```

```
SCREEN #30
\  ADDRESS COUNTER  CONTROL
DECIMAL     MATH
: INADC ( DVALUE -> )    ( PFA -> )
   CREATE    31 DLSLN  D,
    DOES>    >INC-ADC @    ABORT" MULTIPLE INC[ADC] STATEMENTS"
          1 >INC-ADC !     D@  MICRO-WORD D+!  ;

  1. INADC INC[ADC]
```

```
SCREEN #31
\  DECODE MACRO   &  END  ' RO
HEX     MATH
: DECODE ( -> )
```

```
   >DECODE @   ABORT" MULTIPLE DECODE STATEMENTS"
   1 >DECODE !    00000000.  MICRO-WORD D+!  ;

: END   ( -> )
   JMP=000 ;


DECIMAL
```

SCREEN #32

```
\ FORTH BOARD I/O PRIMITIVES --   X!  X@
HEX
CODE X!   ( D -> )    \ WRITE WORD TO BOARD
   DX , # 306 MOV   AL , DX  OUT ( Reset sequencer )
   DX , # 300 MOV     BX POP    AX POP
                AL , DX OUT       AL , AH MOV   AL , DX OUT
   AL , BL MOV  AL , DX OUT       AL , BH MOV   AL , DX OUT
   NEXT  JMP    END-CODE

CODE X@   ( D -> )     \ READ WORD FROM BOARD
   DX , # 306 MOV   AL , DX OUT  ( Reset sequencer )
   DX , # 300 MOV                 AL , DX IN    BL , AL MOV
   AL , DX IN   BH , AL MOV       AL , DX IN    CL , AL MOV
   AL , DX IN   CH , AL MOV        BX PUSH   CX PUSH
   NEXT JMP     END-CODE
DECIMAL
```

SCREEN #33

```
\ FORTH BOARD I/O PRIMITIVES --  MIR!  MIR@
HEX
CODE MIR!   ( D -> )    \ WRITE WORD TO BOARD
   DX , # 306 MOV   AL , DX  OUT ( Reset sequencer )
   DX , # 301 MOV     BX POP    AX POP
                AL , DX OUT       AL , AH MOV   AL , DX OUT
   AL , BL MOV  AL , DX OUT       AL , BH MOV   AL , DX OUT
   NEXT  JMP    END-CODE

CODE MIR@   ( D -> )     \ READ WORD FROM BOARD
   DX , # 306 MOV   AL , DX OUT  ( Reset sequencer )
   DX , # 301 MOV                 AL , DX IN    BL , AL MOV
   AL , DX IN   BH , AL MOV       AL , DX IN    CL , AL MOV
   AL , DX IN   CH , AL MOV        BX PUSH   CX PUSH
   NEXT JMP     END-CODE
DECIMAL
```

SCREEN #34

```
\  SET UP MICROCODE WORD --   ;SET  ;DO
DECIMAL
: ;SET   ( -> )     \ Perform MIR!, but don't cycle clock
   FINISH  MICRO-WORD D@  MIR!  ;

: ;DO   ( -> )      \ Load and execute single instruction
   ;SET  CYCLE  ;

: ::  RESET   CURRENT-OFFSET ! ;
```

```
: >>  RESET  -2 CURRENT-OFFSET ! ;
```

SCREEN #35

```
\ AID TO SPEED EXECUTION   -- MIR-SETUP
DECIMAL
: MIR-SETUP  ( -> )    \ Use after [ ] around microcode word
   MICRO-WORD D@
   [COMPILE] DLITERAL
   COMPILE MIR!  ;
   IMMEDIATE
```

SCREEN #36

```
\ AUTOMATIC NEXT ADDRESS GENERATION
DECIMAL
: <AUTO-ADDR>    (  -1..7 -> )
   CASE -1 =  IFCASE   JMP=000   NEXTCASE
         0 =  IFCASE   JMP=001   NEXTCASE
         1 =  IFCASE   JMP=010   NEXTCASE
         2 =  IFCASE   JMP=011   NEXTCASE
         3 =  IFCASE   JMP=100   NEXTCASE
         4 =  IFCASE   JMP=101   NEXTCASE
         5 =  IFCASE   JMP=110   NEXTCASE
         6 =  IFCASE   JMP=111   NEXTCASE
        -2 =  IFCASE   ABORT" MUST USE :: WITH ;;" NEXTCASE
         7 =  IFCASE   ABORT" NO JMP= ON PAGE CROSSING"
   ELSECASE   1 ABORT" ERROR IN AUTO-ADDR"   ENDCASE    ;
```

SCREEN #37

```
\ MICRO-RAM !  AND @
DECIMAL      MATH
: MRAM!    ( DMICRO-WORD  ADDR -> )
   [ >> DEST=DECODE ;SET  ] MIR-SETUP    DUP  0  20 DLSLN   X!
   [ >> DECODE ;SET   ] MIR-SETUP    CYCLE
   [ >>         ;SET   ] MIR-SETUP    CYCLE   CYCLE
   [ >> DEST=MRAM ;SET MICRO-WORD D@ ] DLITERAL  MICRO-WORD D!
   0 >JMP !  7 AND 1-  <AUTO-ADDR>   MICRO-WORD D@ MIR!   X! ;
; MRAM@    ( ADDR -> DMICRO-WORD  )
   [ >> DEST=DECODE ;SET  ] MIR-SETUP    DUP  0  20 DLSLN   X!
   [ >> DECODE ;SET   ] MIR-SETUP    CYCLE
   [ >>         ;SET   ] MIR-SETUP    CYCLE   CYCLE
   [ >> SOURCE=MRAM ;SET MICRO-WORD D@ ] DLITERAL  MICRO-WORD D!
   0 >JMP !  7 AND 1-  <AUTO-ADDR>   MICRO-WORD D@ MIR!  X@ ;
```

SCREEN #38

```
\ PROGRAM RAM !  AND @
DECIMAL     MATH
: RAM!    ( DWORD  DADDR -> )
   [ >> DEST=ADDRESS-COUNTER ;SET ] MIR-SETUP  X!
   [ >>             DEST=RAM  ;SET    ] MIR-SETUP  X!    ;

: RAM@    ( DADDR -> DWORD  )
   [ >> DEST=ADDRESS-COUNTER ;SET ] MIR-SETUP  X!
   [ >> SOURCE=RAM  ;SET        ] MIR-SETUP  X@ ;
```

SCREEN #39

```
\ PROGRAM RAM C!  AND C@
DECIMAL     MATH
: RAMC!    ( B  DADDR -> )
   [ >> DEST=ADDRESS-LATCH ;SET ] MIR-SETUP  X!
   [ >>             DEST=RAM-BYTE  ;SET    ] MIR-SETUP 0 X!   ;

: RAMC@    ( DADDR -> B  )
   [ >> DEST=ADDRESS-LATCH ;SET ] MIR-SETUP  X!
   [ >> SOURCE=RAM-BYTE  ;SET        ] MIR-SETUP  X@  DROP ;
```

SCREEN #40

```
\  STORE MICROCODE WORD --    ;;   INSTRUCTION  END
DECIMAL
: ;;  ( -> )
  >JMP @ NOT   \ Default next address is current word + 1
  IF    CURRENT-OFFSET @   <AUTO-ADDR>  THEN
  FINISH   MICRO-WORD D@
  CURRENT-OPCODE @  8 *   CURRENT-OFFSET @  +  MRAM!  ;
: INSTRUCTION  ( N -> )
     STOP  CURRENT-OPCODE !   -1 CURRENT-OFFSET !  ;

: RESET-BOARD  ( -> )    \ Sets page=0 &
   \ Does 2 dummy cycles to flush out any possible decodes
   STOP RESET-SEQ    [ >> ;SET ] MIR-SETUP  CYCLE CYCLE
   [ >> DEST=DECODE ;SET ] MIR-SETUP 0. X!
   [ >> DEST=PAGE ;SET ] MIR-SETUP 0. X!
   [ >> DEST=FLAGS ;SET ] MIR-SETUP -1. X! ( Mask interrupts ) ;
```

SCREEN #41

```
EXIT  \ INIT DMA REQUEST -- DMA CHANNEL 3
HEX  MATH
( Note:  write means write from PC to the FORTH system )
: SETUP-DMA  ( WRITE-FLAG HI-4-SEG ADDRESS COUNT -> )
   RESET-SEQ    >R        07  0A  ' !   ( disable ch 3 )
   SET-DMA ( set DMA mode )
```

```
    0 OC P!  ( clear byte ptr flip-flop )  \ BIOS places NOP here
    ROT IF ( write ) 4B   ELSE  ( read ) 47  THEN  OB P!
           DUP     OFF AND  06 P!  ( low address )
        BYTESWAP  OFF AND  06 P!  ( high address )
          82 P!  ( set up top 4 bits of address )
    R>     DUP    OFF AND  07 P!  ( high count )
        BYTESWAP  OFF AND  07 P!  ( low count )
    03   OA P!  ( enable channel 3 ) ;
DECIMAL


SCREEN #42
\ INIT DMA REQUEST -- DMA CHANNEL 3  -- ASSEMBLER VERSION --1
HEX
( Note:  write means write from PC to the FORTH system )
CODE  SETUP-DMA  ( WRITE-FLAG HI-4-SEG ADDRESS COUNT -> )
    CLI
    AL , # 07 MOV   DX , # OA MOV   DX , AL OUT  \ Disable ch 3
    DX , # 306 MOV   DX , AL OUT   \  Reset CPU/32 sequencer
    DX , # 305 MOV   DX , AL OUT   \  Set CPU/32 DMA mode
    AL , AL XOR
    DX , # OC MOV   DX , AL OUT   \  Clear DMA contrllr byte
    CX POP   ( Count )  DI POP  ( low addr )  BX POP ( Hi addr )
    AX POP   ( non-0 is write flag )   AX , AX OR
    <>0? IF ( write ) AL , # 4B MOV  ELSE  ( read ) AL , # 47 MOV
       THEN   DX , # OB MOV   DX , AL OUT

DECIMAL

SCREEN #43
\ INIT DMA REQUEST -- DMA CHANNEL 3  -- ASSEMBLER VERSION --2
HEX
    DX , # 6 MOV    \ Set low address
       AX , DI MOV   DX , AL OUT      <>0? IF ELSE THEN
       AL , AH MOV   DX , AL OUT
    <>0?  IF  ELSE  THEN   AL , BL MOV  \  Set DMA page register
    DX , # 82 MOV   DX , AL OUT       <>0? IF ELSE THEN
    DX , # 7 MOV    \ Set count
       AX , CX MOV  DX , AL OUT      <>0? IF ELSE THEN
       AL , AH MOV   DX , AL OUT
    STI                              <>0? IF ELSE THEN
    AL , # 03 MOV   DX , # OA MOV   DX , AL OUT  \ Enable ch 3
    NEXT JMP
END-CODE
DECIMAL


SCREEN #44
\ FORTH BOARD I/O PRIMITIVES --  W->BOARD
HEX
CODE DMA-WAIT     ( -> )
    BEGIN    AL , 8 IN   AL , # 8 AND  <>0? UNTIL  NEXT JMP
END-CODE
HEX      MATH
: W->BOARD    ( PCADDR DBOARD-ADDR WORDCOUNT -> )
    >R  RESET-SEQ
    [ >> DEST=ADDRESS-COUNTER ;SET ]  MIR-SETUP  X!
    [ >> DEST=RAM  INC[ADC] ;SET ]  MIR-SETUP
    >R   1  THIS-SEG  10 U*  R> 0 D+    OVER R@  0 ADC
       ABORT" DMA CROSSES PAGE REG BOUNDARY"  DROP
```

```
   SWAP  R>  2* 2*   SETUP-DMA   DMA-WAIT   ;
\  BEGIN  08 P@  8 AND
\     ( ?TERMINAL  ABORT" ..DMA-1.." )  UNTIL   ;
DECIMAL
```

SCREEN #45

```
EXIT 103 LOAD \  W->BOARD   ** HIGH  LEVEL **
DECIMAL  MATH  \ Transfer words from PC to board
: W->BOARD   ( PCADDR DBOARD-ADDR WORDCOUNT -> )
   O DO
      ROT   DUP XD@   D>R   4 +  ROT ROT
      DR>  DOVER   RAM!   4. D+
   LOOP   DDROP DROP ;
```

SCREEN #46

```
\ FORTH BOARD I/O PRIMITIVES --  BOARD->W
HEX        MATH
: BOARD->W    ( DBOARD-ADDR PCADDR WORDCOUNT -> )
   >R   >R    RESET-SEQ
   [ >> DEST=ADDRESS-COUNTER ;SET ]   MIR-SETUP  X!
   [ >> SOURCE=RAM INC[ADC] ;SET ]  MIR-SETUP
   O  THIS-SEG  10 U*  R> O D+    OVER R@  O ADC
      ABORT" DMA CROSSES PAGE REG BOUNDARY"  DROP
   SWAP  R>  2* 2*   1-    SETUP-DMA      DMA-WAIT ;
\  BEGIN  08 P@  8 AND
\      ( ?TERMINAL  ABORT" ..DMA-2.." )  UNTIL ;
DECIMAL
```

SCREEN #47

```
EXIT \ FORTH BOARD I/O PRIMITIVES --  BOARD->W  ** HIGH LEVEL *
DECIMAL  MATH  \ Transfer words from board to PC
: BOARD->W   ( DBOARD-ADDR PCADDR WORDCOUNT -> )
   O DO
      ROT ROT   DDUP RAM@   D>R   4. D+  ROT
      DR>  3 PICK  XD!   4  +
   LOOP   DDROP DROP ;
```

SCREEN #48

```
EXIT  \  LIBFORTH FILE NAME FOR MICROCODE SAVES
DECIMAL
CREATE SAVE-FILE-NAME   30 ALLOT
: SET-SAVE-FILE
   SAVE-FILE-NAME 30 0 FILL
   BL WORD  SAVE-FILE-NAME OVER C@ 1+  CMOVE ;

SET-SAVE-FILE CPU32.DAT

: OPEN-SAVE-FILE   ( -> FILE# OFFSET#  )
   [COMPILE] MATH    CURRENT-FILE @  OFFSET @
   FILE0  ENSURE-CLOSED
   SAVE-FILE-NAME   FILE-NAME  OVER C@ 1+ CMOVE  OPEN ;

: CLOSE-SAVE-FILE  ( FILE# OFFSET# -> )
   CLOSE   OFFSET !   CURRENT-FILE !  ;
```

SCREEN #49

```
\  SAVE MICROCODE IMAGE ON SCREENS 310-325  -- SAVE-MICROCODE
DECIMAL
: SAVE-MICRO-SCREEN  ( START-uADDR SCREEN# -> )
   DUP  BUFFER  SWAP OFFSET @ + OVER 2- !  OVER  256 +   ROT
   DO  I   MRAM@
           3 PICK D!    4 +   LOOP
   DROP   UPDATE  SAVE-BUFFERS ;

: SAVE-MICROCODE   ( -> )
   ( OPEN-SAVE-FILE  )
   RESET-BOARD   0
   326 310 DO   2 EMIT         DUP  I SAVE-MICRO-SCREEN
                              256 +    LOOP
   DROP    ( CLOSE-SAVE-FILE ) ;
```

SCREEN #50

```
EXIT \  LOAD MICROCODE IMAGE
DECIMAL
: LOAD-MICRO-SCREEN  ( START-uADDR SCREEN# -> )
   BLOCK      OVER  256 +   ROT
   DO  DUP D@  I  MRAM!   4 +   LOOP
   DROP    ;

: LOAD-MICROCODE   ( -> )
   ( OPEN-SAVE-FILE  )
   RESET-BOARD     0
   326 310 DO   2 EMIT       DUP  I LOAD-MICRO-SCREEN
                              256 +    LOOP
   DROP    ( CLOSE-SAVE-FILE ) ;
```

SCREEN #51

```
\ MICRO-RAM !  AND @
HEX MATH \ Store 8 microwords.  ADDR must be offset 0 into page
: MRAM!PAGE    ( ..LO.. 8xDMICRO-WORD ..HI..  ADDR -> )
   [ >> DEST=DECODE ;SET   ] MIR-SETUP    0  14 DLSLN    X!
   [ >> DECODE ;SET    ] MIR-SETUP    CYCLE
   [ >>           ;SET    ] MIR-SETUP    CYCLE   CYCLE
```

```
   [ >> DEST=MRAM ;SET MICRO-WORD D@ ] DLITERAL     D>R
   DR@ 1F00 OR  MIR!  X!      \ Offset 7
   DR@ 1800 OR  MIR!  X!      \ Offset 6
   DR@ 1700 OR  MIR!  X!      \ Offset 5
   DR@ 1000 OR  MIR!  X!      \ Offset 4
   DR@ 0F00 OR  MIR!  X!      \ Offset 3
   DR@ 0800 OR  MIR!  X!      \ Offset 2
   DR@ 0700 OR  MIR!  X!      \ Offset 1
  ( Offset 0 )   DR>   MIR!  X!             ;
DECIMAL

SCREEN #52
\  LOAD MICROCODE IMAGE ON SCREENS 310-325  -- LOAD-MICROCODE
DECIMAL
VARIABLE MICRO-ADDR
: LOAD-MICRO-SCREEN  ( START-uADDR SCREEN# -> )
   BLOCK   MICRO-ADDR !     DUP  256 +  SWAP
   DO      8 0 DO   MICRO-ADDR @ D@  4 MICRO-ADDR +!  LOOP
           I MRAM!PAGE
   8 +LOOP  ;

: LOAD-MICROCODE   ( -> )
   ( OPEN-SAVE-FILE  )
   RESET-BOARD      0
   326 310 DO   2 EMIT       DUP  I LOAD-MICRO-SCREEN
                              256 +    LOOP
   DROP    ( CLOSE-SAVE-FILE ) ;


SCREEN #53
\  SAVE PGM RAM IMAGE ON SCREENS 327 - ... -- SAVE-BOARD-FORTH
DECIMAL  MATH
: SAVE-BOARD-SCREEN  ( DBOARD-ADDR SCREEN# -> )
   DUP  BUFFER  SWAP OFFSET @ + OVER 2- !
   256   BOARD->W  UPDATE SAVE-BUFFERS ;

: SAVE-BOARD-FORTH   ( -> )
   ( OPEN-SAVE-FILE  )
   RESET-BOARD  0.
   SAVE-SIZE 1024.  D/    DROP  327 +   327
   DO  1 EMIT  DDUP  I SAVE-BOARD-SCREEN
                             1024. D+   LOOP
   DDROP    ( CLOSE-SAVE-FILE ) ;




SCREEN #54
\  LOAD PGM RAM IMAGE ON SCREENS 327 - ... -- LOAD-BOARD-FORTH
DECIMAL  MATH
: LOAD-BOARD-SCREEN  ( DBOARD-ADDR SCREEN# -> )
   BLOCK ROT ROT  256    W->BOARD  ;

: LOAD-BOARD-FORTH   ( -> )
   ( OPEN-SAVE-FILE  )
   RESET-BOARD  0.
   SAVE-SIZE 1024.  D/    DROP  327 +   327
   DO  1 EMIT   DDUP  I LOAD-BOARD-SCREEN
                             1024. D+   LOOP
   DDROP    ( CLOSE-SAVE-FILE )  ;
```

SCREEN #55

```
\ LOAD-ALL & SAVE-ALL
DECIMAL
: LOAD-ALL  LOAD-MICROCODE LOAD-BOARD-FORTH  ;

: SAVE-ALL  SAVE-MICROCODE SAVE-BOARD-FORTH  ;
```

SCREEN #56

```
\  DATA STACK TO BOARD
HEX
: DS->BOARD  ( ...DSTACKIN... -> )   \ Assume all 32-bit #'s
   STOP
   DEPTH 2/  1+   NEGATE  OFFF AND   >R
   DEPTH 0=  IF  0 0  THEN
   [ >> DEST=DP ;SET ] MIR-SETUP   R@  0   X!
   OFFF  R@  DO
   [ >> DEST=DS              ;SET ] MIR-SETUP      X!
   [ >>              INC[DP] ;SET ] MIR-SETUP    CYCLE   LOOP
   [ >> DEST=DP  ;SET ] MIR-SETUP    R>  0  X!
   [ >> SOURCE=DS  ALU=B  DEST=DHI ;SET ] MIR-SETUP  CYCLE
   [ >> INC[DP] ;SET ] MIR-SETUP  CYCLE   ;

DECIMAL
```

SCREEN #57

```
\  DATA STACK FROM BOARD
HEX
: BOARD->DS  ( -> ...DSTACKOUT... )
   STOP
   SP!     [ >> SOURCE=DP  ;SET ] MIR-SETUP   X@ DROP OFFF AND
   DUP  000  =  IF    DROP
   ELSE  1-
      DUP OFFE = NOT
      IF  [ >>  DEST=DP  ;SET ] MIR-SETUP    OFFE. X!
         OFFE  SWAP  DO
            [ >> SOURCE=DS  ;SET  ] MIR-SETUP  X@  ?STACK
            [ >>              DEC[DP]  ;SET  ] MIR-SETUP CYCLE LOOP
      ELSE DROP THEN
      [ >> SOURCE=DHI ;SET  ]    MIR-SETUP    X@
   THEN  ;
  DECIMAL
```

SCREEN #58

```
\ BOARD VOCABULARY
DECIMAL   FORTH  DEFINITIONS
: B-RES     [ 'INTERPRET @ ] LITERAL   'INTERPRET !  ;

VARIABLE 'BINTER    'INTERPRET @  'BINTER !

VOCABULARY BOARD-VOC  IMMEDIATE
: {       ( -> )        \  Enter board vocabulary/execution mode
   [COMPILE] BOARD-VOC  DEFINITIONS
   'BINTER @  'INTERPRET !
   ( Get rid of return stack junk )
   R> R> DDROP  'INTERPRET @ EXECUTE ;

FORTH DEFINITIONS
```

SCREEN #59

```
\ NULL FOR BOARD VOCABULARY
HEX   BOARD-VOC  DEFINITIONS
: X   FORTH    BLK @                \ Redefine  null
   IF  STATE @  ?STREAM  THEN        R> DROP   ;

FORTH DEFINITIONS


DECIMAL
```

SCREEN #60

SCREEN #61

```
\ SERVICE ARRAY
DECIMAL  FORTH DEFINITIONS
CREATE SERVICE-ARRAY  512 ALLOT

: SERVICE-ENTRY  ( CFA INDEX -> )
   DUP 255 >   OVER  0<  OR
```

```
      ABORT" INVALID SERVICE-ENTRY INDEX"
   2*  SERVICE-ARRAY + ! ;
```

SCREEN #62

```
\ SERVICE ARRAY  INITIALIZATION
DECIMAL
: BAD-SERVICE-CALL   ( -> )
  1 ABORT" CALL TO BAD SERVICE ROUTINE" ;

: XXX         \ SCRATCH
   256 0 DO
       ' BAD-SERVICE-CALL CFA  I  SERVICE-ENTRY LOOP ;

XXX   FORGET XXX

: BAD-OPCODE    ( Board:   -> )
  CR CR ." ILLEGAL OPCODE -- RETURN TO PC FORTH SYSTEM" ABORT ;

' BAD-OPCODE CFA  254 SERVICE-ENTRY
```

SCREEN #63

```
\ SERVICE CALL PRIMITIVES
HEX
: RESTART   ( -> )     \ Restart FORTH board for concurrent usage
   [ >> JMP=100   ;SET   ]       MIR-SETUP GO ;

: SERV-PAGE    ( Board:   -> )
   RESTART  PAGE ;
' SERV-PAGE CFA   1 SERVICE-ENTRY

: SERV-KEY     ( Board:  0 -> CHAR )
   [ >> ALU=B  DEST=DHI ;SET   ] MIR-SETUP
   KEY 0  X!      RESTART  ;
' SERV-KEY CFA   2 SERVICE-ENTRY

DECIMAL
```

SCREEN #64

```
\ SERVICE CALL PRIMITIVES   - 2
DECIMAL
: SV-2ND   ( -> D2ND.STACK.ITEM )
   [ >> SOURCE=DS ;SET ]  MIR-SETUP   X@  ;

: SERV-READ    ( Board: AD BLK# -> AD BLK# )
   X@  DROP DUP  >R
   BLOCK  SV-2ND   256 W->BOARD     RESTART
\  Perform read of next block to have it available in RAM
   R> 1+ BLOCK DROP  ;
' SEF  READ CFA  3 SERVICE-ENTRY
: SE   WRITE  ( Board: AD BLK# -> AD BLK# )
```

```
   X@  DROP
   SV-2ND  ROT  OFFSET @ +  BUFFER  256 BOARD->W
   RESTART  UPDATE  SAVE-BUFFERS  ;
' SERV-WRITE CFA  4 SERVICE-ENTRY
```

SCREEN #65

```
\ SERVICE CALL PRIMITIVES   - 3
HEX
: SERV-TERM    ( Board:  0 -> FLAG )
   [ >> ALU=B DEST=DHI ;SET  ] MIR-SETUP
   ?TERMINAL
   IF  -1.  ELSE 0.  THEN  X!    RESTART ;
' SERV-TERM CFA  5 SERVICE-ENTRY

DECIMAL
```

SCREEN #66

```
\ SERVICE CALL PRIMITIVES    - 4
HEX
: SERV-CR      ( Board:  EPRINT -> EPRINT )
   EPRINT @       X@  OR  EPRINT !
   RESTART  CR      EPRINT ! ;
' SERV-CR   CFA  7 SERVICE-ENTRY

DECIMAL
```

SCREEN #67

```
\ SERVICE CALL PRIMITIVES    - 4
HEX
: SERV-EMIT    ( Board:  CHAR -> CHAR )
   X@ RESTART    DROP  0 EPRINT !  EMIT ;
' SERV-EMIT CFA  8 SERVICE-ENTRY

: SERV-EMIT-PRINT    ( Board:  CHAR -> CHAR )
   X@ RESTART    DROP  1 EPRINT !  EMIT ;
' SERV-EMIT-PRINT CFA  9 SERVICE-ENTRY

DECIMAL
```

```
SCREEN #68
\ NOP SERVICE CALL WORD
DECIMAL
: NOP ;
' NOP CFA    0 SERVICE-ENTRY      \ False hit on status register
' NOP CFA  255 SERVICE-ENTRY      \ Halt command

SCREEN #69
EXIT  \ SERVICE CALL WAIT LOOP WORD
HEX
\  Uses the DECODE instruction in SYSCALL OFFSET:2 to restart
: BSERVICE   ( -> )
   BEGIN
      BEGIN
         ?TERMINAL 3 =  ABORT" BREAK..."
      STATUS  UNTIL
   STOP    STATUS
   DUP >R  OFF AND  2*  SERVICE-ARRAY  + @  EXECUTE
   R>           OFF =  UNTIL 0 EPRINT ! ;
DECIMAL

SCREEN #70
\ SERVICE CALL WAIT LOOP WORD  -- HIGH SPEED
HEX
\  Uses the DECODE instruction in SYSCALL OFFSET:2 to restart
CODE DO-SERVICE    ( -> STATUS   EXECUTE-ADDRESS )
   DX , # 302 MOV
   BEGIN   DX , AL IN  AL , AL OR  <>0? UNTIL
   DX , # 304 MOV   DX , AL OUT    DX , # 302 MOV
   DX , AL IN    AH , AH XOR     AX PUSH    BX , AX MOV
   BX , BX ADD   AX , SERVICE-ARRAY [BX] MOV    AX PUSH
NEXT JMP  END-CODE
: BSERVICE   ( -> )
   BEGIN   DO-SERVICE
   EXECUTE
   OFF =  UNTIL  0 EPRINT ! ;
DECIMAL

SCREEN #71
\ EXECUTE A PROGRAM ON THE BOARD --  BEXECUTE
HEX   MATH
\  Uses the NOP instruction in OPCODE:0 OFFSET:5 to run
: BEXECUTE   ( ..STACKIN.  DADDR -> ..STACKOUT.. )
      D>R    ?STACK
```

```
    [ >> DEST=STATUS ;SET ] MIR-SETUP  O. X!   ( Reset status )
    [ >> DEST=FLAGS  ;SET ] MIR-SETUP -1. X!   ( Mask intrpts ),
    DS->BOARD
    [ >> DEST=PAGE  ;SET ] MIR-SETUP  DR> DDUP   X!
    [ >> DEST=ADDRESS-LATCH    ;SET ] MIR-SETUP  DDUP X!
    [ >> DEST=DECODE  ;SET ] MIR-SETUP
                 DDUP 7FFFFC. DAND  X!
    [ >> DECODE  ;SET ] MIR-SETUP CYCLE
    [ 5 :: JMP=100 ;SET ] MIR-SETUP CYCLE CYCLE
     ." START.."   GO    BSERVICE      ." END    "
     BOARD->DS   O EPRINT !    ; DECIMAL

SCREEN #72
\ OP-EXECUTE         BOARD
HEX MATH
: OP-EXECUTE   ( D -> )    \ Single step execute a primitive
   ( If addr info present, make it a subroutine call )
   FFBFFFFF.  DAND     8.    4. RAM!       ( nop )
  OC.    8. RAM!        ( nop )
   RESET-BOARD    DDUP  07FFFFC. DAND  DO=
   IF  10. DOR  ELSE  2. DOR  THEN  OC. RAM!
   FF800010. ( HALT = OP-CODE 511 ) 10.  RAM!
   4. BEXECUTE      ;
: OPCODE-EXEC   ( N -> )
   O  17 DLSLN  OP-EXECUTE ;
\  Jump start the board using the COLD execution vector
: BOARD    ( -> )
   RESET-BOARD 14. BEXECUTE  ;
: CPU32   BOARD ;           DECIMAL

SCREEN #73
\ REDEFINE INTERPRET FOR  BOARD VOCABULARY USAGE
DECIMAL
VARIABLE BOARD-FENCE    HERE BOARD-FENCE !
: BOARD-INTERPRET
   BEGIN  -FIND
      IF
         DROP  DUP     BOARD-FENCE @   U< .
         IF    CFA  EXECUTE
         ELSE  D@  OP-EXECUTE
         THEN
      ELSE  HERE  NUMBER        DPL @ 1+
                                NOT  IF  DROP   THEN
      THEN
   ?STACK   AGAIN    ;

' BOARD-INTERPRET  CFA  'BINTER !

SCREEN #74
\ CROSS COMPILER VOCABULARY SETUP
DECIMAL
: C-RES
   [ 'INTERPRET @ ] LITERAL   'INTERPRET ! ; \ Restore vector

VARIABLE 'CINTER    'INTERPRET @  'CINTER !

VOCABULARY CROSS-VOC  IMMEDIATE

: CROSS-COMPILER  ( -> )
   [COMPILE]   ROSS-VOC    'CINTER @  'INTERPRET !   INTERPRET ;
                                   IMMEDIATE
```

```
: CC  [COMPILE]  CROSS-COMPILER ;
```

SCREEN #75

```
\ CROSS COMPILER VOCABULARY SETUP - 2
DECIMAL
CROSS-VOC  DEFINITIONS
: FORTH-VOC   [COMPILE]  FORTH  ;  IMMEDIATE

: FORTH     C-RES    [COMPILE] FORTH  INTERPRET ; IMMEDIATE

: EDIT      C-RES  EDIT    INTERPRET  ;
: EDITOR    C-RES  [COMPILE]  EDITOR INTERPRET ;     IMMEDIATE
FORTH DEFINITIONS
: ;;END  [COMPILE]  CROSS-COMPILER ;
CROSS-COMPILER DEFINITIONS
```

SCREEN #76

```
\  CONSTANTS FOR MICRO-CODE REFERENCES BY CROSS-ASSEMBLER
DECIMAL  CROSS-COMPILER  DEFINITIONS      MATH
: OP-VALUE    00  23 DLSLN  DCONSTANT ;
0        OP-VALUE [NOP]           137  OP-VALUE [1]
34       OP-VALUE [DO]
511      OP-VALUE [HALT]           93  OP-VALUE [SYSCALL]
67       OP-VALUE [DOCON]
: OP-CALL-VALUE    00  23 DLSLN  2. D+ DCONSTANT ;
15  OP-CALL-VALUE [OBRANCH]
25  OP-CALL-VALUE [+LOOP]
167 OP-CALL-VALUE [LOOP]
68  OP-CALL-VALUE [DOVAR]
78  OP-CALL-VALUE [LIT]
: OP-EXIT-VALUE    00  23 DLSLN  1. D+ DCONSTANT ;
00 OP-EXIT-VALUE [EXIT]
```

SCREEN #77

```
SCREEN #78
\ OPTIMIZING COMPILER VARIABLES, ETC.
DECIMAL
VARIABLE OPT-STATUS
   \ 1 = previous instruction is a defaulted JMP
   \ 4 = previous instruction is a CALL
   \ 8 = previous instruction can not be changed

: DEFAULT-JUMP   1 OPT-STATUS ! ;
: IS-A-CALL      4 OPT-STATUS ! ;
: DON'T-DISTURB  8 OPT-STATUS ! ;
```

```
SCREEN #79
\ CROSS-COMPILER DICTIONARY HANDLING   --1
DECIMAL  CROSS-COMPILER  DEFINITIONS          MATH
32 CONSTANT USER-AREA
VARIABLE BDP   200 BDP !      \ 10 .. 200 is USER area
: BHERE   ( -> N )
   BDP @  ;

: DATA,   ( D -> )     \ Send data word to the dictionary
   BHERE  FORTH  0 RAM!  CROSS-COMPILER  4 BDP +! ;

: DATAC,   ( B -> )    \ Send data byte to the dictionary
   BHERE  FORTH  0 RAMC!  CROSS-COMPILER  1 BDP +! ;
```

```
SCREEN #80
\ CROSS-COMPILER DICTIONARY HANDLING   --2
HEX       CROSS-COMPILER  DEFINITIONS          MATH
: OPCODE,   ( D-MICRO-CODE-INSTRUCTION -> )
   FORTH  FFBFFFFF. DAND   CROSS-COMPILER \ Mask "special" bit
   BHERE  4 +    0  DOR   DATA,    DEFAULT-JUMP ;

: CALL,     ( D-Subroutine-address -> )
   OPTIMIZE? @
   IF  OPT-STATUS @ 1 =
      IF  -4 BDP +!  BHERE 0  FORTH RAM@ CROSS-COMPILER
              FF800000. DAND  DOR   THEN
   THEN
   IS-A-CALL    2 0 DOR  DATA, ;
DECIMAL
```

```
SCREEN #81
\ CROSS-COMPILER DICTIONARY HANDLING   --3
HEX       CROSS-COMPILER  DEFINITIONS          MATH
: EXIT,     ( -> )
   1 0
   OPTIMIZE? @
```

```
   IF OPT-STATUS @ 1 =      \ If 1 status, combine the EXIT
      IF  -4 BDP +!  BHERE 0  FORTH RAM@ CROSS-COMPILER
             FF800000. DAND  DOR   THEN
      OPT-STATUS @ 4 =     \ If 4 status, do tail recurs. elim.
      IF  DDROP  -4 BDP +!  BHERE 0  FORTH RAM@ CROSS-COMPILER
             FFFFFFFC. DAND  THEN
   THEN
   DATA, DON'T-DISTURB ;

DECIMAL
```

SCREEN #82

SCREEN #83

```
\ CROSS-COMPILER LITERAL HANDLING
DECIMAL  CROSS-COMPILER  DEFINITIONS
: BLITERAL  ( D -> ../D )
   STATE @
   IF  [LIT]  BHERE  8 + 0  D+  DATA,
                DATA,  DON'T-DISTURB   THEN ;

: DBLITERAL  ( Q -> ../Q )
   STATE @
   IF  DSWAP   BLITERAL  BLITERAL  THEN  ;

HEX
: WORD-ALIGN  ( -> )
   4  BDP @  3 AND  -   3 AND
   ?DUP  IF  0 DO  BL DATAC, LOOP  THEN ;
DECIMAL
```

SCREEN #84

```
\ CREATE  FOR CROSS-COMPILER
HEX   CROSS-COMPILER  DEFINITIONS
VARIABLE  BLATEST               0 BLATEST !
: BCREATE   ( -> )   \ Create a header on both IBM and Board
   [COMPILE] BOARD-VOC  DEFINITIONS FORTH RESET-BOARD CREATE
   CROSS-COMPILER   ( At run time BOARD-VOC is still current )
   WORD-ALIGN   BLATEST  @  0 DATA,   BHERE  BLATEST  !
   LATEST   C@  01F AND  8000  DATA,
   LATEST   DUP  C@  01F AND   0
   DO   1+   DUP C@  7F AND  DATAC,   LOOP    DROP
   WORD-ALIGN   [COMPILE] CROSS-VOC DEFINITIONS DON'T-DISTURB ;
```

```
: BSMUDGE   ( -> )
   BLATEST @    DUP   FORTH   0 RAM@    2000   XOR
   ROT    0 RAM!      CROSS-COMPILER    ;
DECIMAL
```

SCREEN #85

```
\ OPCODE:   --- DEFINE A MICROCODE DEFINITION
HEX  CROSS-COMPILER  DEFINITIONS
: OPCODE:   ( N -> )  ( LOADING: Usage  17 OPCODE: <name> )
   ( Executing <name> gives formatted micro-code reference )
   DUP   INSTRUCTION
   BCREATE         0 17 DLSLN   DDUP D,   OPCODE,    DON'T-DISTURB
   BLATEST @
   FORTH  DUP   0 RAM@   1000   OR   ROT   0 RAM!
   CROSS-COMPILER    EXIT,
   [COMPILE]    FORTH     ;

DECIMAL
```

SCREEN #86

```
\  ABORT"   ."   FOR CROSS-COMPILER
HEX    CROSS-COMPILER  DEFINITIONS
VARIABLE ABORT"-ADDR     VARIABLE  ."-ADDR
BOARD-VOC  DEFINITIONS
: ABORT"    ( FLAG -> )    CROSS-COMPILER    ( Evenly /4 # bytes )
   ABORT"-ADDR @    0    DATA,          22 WORD
   COUNT   DUP 3 + FFFC AND   0 DATA,   OVER + SWAP
   DO   I C@ DATAC,   1 /LOOP   WORD-ALIGN    ( Fills w/blanks )
   DON'T-DISTURB ;    IMMEDIATE

: ."    ( -> )                    CROSS-COMPILER
   ."-ADDR @     0    DATA,         22 WORD
   COUNT   DUP 0 DATA,      OVER +  SWAP
   DO   I C@ DATAC,    1 /LOOP    WORD-ALIGN
   DON'T-DISTURB ;    IMMEDIATE
CROSS-COMPILER   DEFINITIONS      DECIMAL
```

SCREEN #87

```
\ IF..THEN  FOR CROSS-COMPILER
HEX    BOARD-VOC  DEFINITIONS
: IF        ( -> PATCH-ADDR 222 )
   CROSS-COMPILER  BDP @    [0BRANCH] DATA,  222
   DON'T-DISTURB ;    IMMEDIATE

: THEN    ( PATCH-ADDR 222 -> )
   CROSS-COMPILER    222 ?PAIRS     FORTH      DUP 0 RAM@
   CROSS-COMPILER  BDP @ 0  D+     ROT   FORTH   0 RAM!
   CROSS-COMPILER  DON'T-DISTURB ;
IMMEDIATE

DECIMAL
```

```
SCREEN #88
\ ELSE  FOR CROSS-COMPILER
HEX   BOARD-VOC  DEFINITIONS
: ELSE    ( PATCH-ADDR1 222 -> PATCH-ADDR2 222 )
   CROSS-COMPILER  222 ?PAIRS    0 0 DATA,   ( Jump NOP opcode )
   OPTIMIZE? @
   IF  OPT-STATUS @ 1 =
      IF  ( Redirect jump to after the THEN )
         -4 BDP +!     BDP @ 4 - DUP   FORTH  0 RAM@
                    FF800000. DAND ROT 0 RAM!  CROSS-COMPILER
      THEN
   THEN
   BDP @   4 -
   SWAP   222   BOARD-VOC  [COMPILE] THEN    222   ;
IMMEDIATE
DECIMAL

SCREEN #89
\ CROSS COMPILER   BEGIN  AGAIN
HEX   BOARD-VOC DEFINITIONS        MATH
: BEGIN      ( -> JMP-ADDR  333 )
   CROSS-COMPILER   ?COMP  BDP @   333  DON'T-DISTURB  ;
IMMEDIATE

: AGAIN      ( JMP-ADDR 333 -> )
   CROSS-COMPILER   333 ?PAIRS   0
   OPTIMIZE? @
   IF  OPT-STATUS @ 1 =
      IF  ( Redirect jump in previous word )
        -4 BDP +!  BHERE 0  FORTH RAM@
                        FF800000. DAND  DOR.    CROSS-COMPILER
   THEN     THEN
   DATA,   DON'T-DISTURB ;
IMMEDIATE                  DECIMAL

SCREEN #90
\ CROSS COMPILER    UNTIL
HEX   BOARD-VOC DEFINITIONS
: UNTIL      ( JMP-ADDR  333 -> )
   CROSS-COMPILER   333 ?PAIRS   0  [OBRANCH] D+  DATA,
   DON'T-DISTURB ;
IMMEDIATE

CROSS-COMPILER  DEFINITIONS  DECIMAL

SCREEN #91
\ CROSS COMPILER   WHILE  REPEAT
HEX   BOARD-VOC  DEFINITIONS
: WHILE      ( JMP-ADDR 333 ->  JMP-ADDR 333  PATCH-ADDR 224 )
   [COMPILE]  IF   2+  ;
IMMEDIATE
```

```
: REPEAT    ( JMP-ADDR 333  PATCH-ADDR 224 -> )
   >R >R   [COMPILE] AGAIN
   R> R>   2-  [COMPILE] THEN  ;
IMMEDIATE

CROSS-COMPILER  DEFINITIONS  DECIMAL
```

SCREEN #92

```
\ CROSS-COMPILER ...  DO  LOOP  +LOOP
HEX   BOARD-VOC  DEFINITIONS
: DO      ( -> JMP-ADDR 4444 )
   CROSS-COMPILER  [DO] OPCODE, DON'T-DISTURB  BDP @   4444 ;
IMMEDIATE

: LOOP   ( JMP-ADDR  4444 -> )
   CROSS-COMPILER  4444 ?PAIRS  0 [LOOP] D+ DATA,
   DON'T-DISTURB  ;   IMMEDIATE

: +LOOP    ( JMP-ADDR  4444 -> )
   CROSS-COMPILER  4444 ?PAIRS  0 [+LOOP] D+ DATA,
   DON'T-DISTURB  ;   IMMEDIATE

CROSS-COMPILER  DEFINITIONS  DECIMAL
```

SCREEN #93

```
\ CONSTANT VARIABLE USER   FOR CROSS-COMPILER
DECIMAL CROSS-COMPILER  DEFINITIONS
VARIABLE  DOUSE-ADDR   \ MUST be set by cross-compiled code
: USER          ( VALUE -> )
   BCREATE   BHERE 2 OR  0 D,    DOUSE-ADDR @  0  CALL,
    4 *  0 DATA,  [COMPILE] CROSS-COMPILER DEFINITIONS
   DON'T-DISTURB ;
: VARIABLE
   BCREATE   BHERE 2 OR  0  D,
   [DOVAR]  OPCODE,  0 0 DATA,    DON'T-DISTURB
   [COMPILE] CROSS-COMPILER DEFINITIONS ;

: CONSTANT     ( DVALUE -> )
   BCREATE   BHERE 2 OR  0 D,
   [DOCON]  OPCODE,       DATA,   DON'T-DISTURB
   [COMPILE] CROSS-COMPILER DEFINITIONS  ;
```

SCREEN #94

```
\ CROSS-COMPILER     EXIT
HEX   BOARD-VOC  DEFINITIONS
: EXIT    ( -> )
   CROSS-COMPILER  EXIT, ;
IMMEDIATE

CROSS-COMPILER  DEFINITIONS  DECIMAL
```

```
SCREEN #95
\ BOARD VOCABULARY   DEFINITIONS & UTILITIES
DECIMAL   BOARD-VOC  DEFINITIONS
: }    ( -> )        \ Leave board vocabulary/execution mode
   B-RES  [COMPILE] CROSS-VOC   DEFINITIONS
    FORTH  R> R> DDROP
    [COMPILE]  CROSS-COMPILER  ;

CROSS-VOC DEFINITIONS

: BLIST      [COMPILE] BOARD-VOC   VLIST  [COMPILE]  CROSS-VOC ;

: B'         [COMPILE] BOARD-VOC  [COMPILE] '
             [COMPILE] CROSS-VOC  ;   IMMEDIATE
```

```
SCREEN #96
\  (  ; DEFINITION FOR CROSS-COMPILER
HEX   MATH
BOARD-VOC  DEFINITIONS
: (      \ Required to allow stack comments
   -1 >IN +!   29 WORD   C@ 1+  HERE +
   C@  29 =  NOT  ?STREAM   ;    IMMEDIATE

: ;
      CROSS-VOC  EXIT,
      [COMPILE] CROSS-VOC  DEFINITIONS
      BSMUDGE  SMUDGE  [COMPILE]  [  ;    IMMEDIATE

CROSS-COMPILER   DEFINITIONS    DECIMAL
```

```
SCREEN #97
\ SEAL BOARD VOCABULARY
HEX   BOARD-VOC
' X  ( X is the null used in the BOARD vocabulary )
FORTH DEFINITIONS
80C0  OVER  NFA  !      ( Make null header out of X )

               LFA    0 SWAP    !
HERE  BOARD-FENCE !

DECIMAL
```

```
SCREEN #98
\ COLON DEFINITIONS FOR CROSS-COMPILER
HEX
CROSS-COMPILER   DEFINITIONS
: SPECIAL   ( -> )    \ Used for DON'T-disturb tag by CPU/32
   HERE 4 - D@   40 OR  HERE 4 - D!   \ Set "special" bit
   BLATEST  @      FORTH
   DUP  0 RAM@  0800 OR  ROT  0 RAM! FORTH ;    CROSS-COMPILER
: POISON    ( -> )    \ Used for non-interactive tag by CPU/32
\  A poison word crashes system when entered in immediate mode
\    e.g.  LIT, >R, ...        This makes outer interpreter better
   BLATEST  @      FORTH
   DUP  0 RAM@  0400 OR  ROT  0 RAM! FORTH ;  CROSS-COMPILER
CROSS-COMPILER  DECIMAL
```

```
SCREEN #99
\ COLON DEFINITIONS FOR CROSS-COMPILER
HEX
CROSS-COMPILER   DEFINITIONS
: IMMEDIATE   ( -> )
   BLATEST  @      FORTH
   DUP  0 RAM@  4000 OR  ROT  0 RAM!  FORTH ;   CROSS-COMPILER
: :      ( Usage:  : <name> )
   BCREATE    BHERE 2 OR   0 D,    [COMPILE]  BOARD-VOC
     SMUDGE  BSMUDGE   ] FORTH  ;
CROSS-COMPILER  DECIMAL
```

```
SCREEN #100
\ REDEFINE INTERPRET FOR CROSS-COMPILER
HEX       FORTH DEFINITIONS
VARIABLE  CROSS-FENCE     HERE  CROSS-FENCE !
: CROSS-INTERPRET
   BEGIN  -FIND
      IF  STATE @ <
         OVER  CROSS-FENCE @  U>
         IF    IF    D@   CROSS-COMPILER   OVER  2 AND
                     IF  CALL,  ELSE  DUP >R  OPCODE,
( Test "special" bit ) R> 40 AND IF DON'T-DISTURB THEN  THEN
FORTH             ELSE  D@   CROSS-COMPILER  OP-EXECUTE FORTH THEN
         ELSE  ABORT" ILLEGAL COMPILAND"  CFA EXECUTE  THEN
      ELSE  HERE   NUMBER   CROSS-COMPILER BLITERAL FORTH
         DPL @ 1+  0=  STATE @ 0= AND IF  DROP THEN
   THEN  ?STACK   AGAIN    ;
' CROSS-INTERPRET  CFA  'CINTER !  DECIMAL  FORTH DEFINITIONS
```

```
SCREEN #101
```

SCREEN #102

```
\  DUMP-RAM  AND INIT-STACKS   TESTING/UTILITY WORDS
FORTH DEFINITIONS
DECIMAL
: DUMP-RAM   ( START END -> )                  MATH
  HEX CR    4 + SWAP DO
      I . ." ="  I 0 RAM@  8 DU.R CR   4 /LOOP ;

: INIT-STACKS   ( -> )
    0 :: DEST=RS  DEC[RP]  ;SET
    4100 0 DO  0 0 X! LOOP
    0 :: DEST=DS  DEC[DP]  ;SET
    4100 0 DO  0 0 X! LOOP     ;
```

SCREEN #103

```
\ 32-BIT FETCH AND STORE IN PROPER BOARD BYTE ORDER
HEX
CODE XD!  ( D ADDR -> )    \ Stores in lo..hi byte order
    BX POP   DX POP   AX POP
      [BX] , AL MOV      1 [BX] , AH MOV
    2 [BX] , DL MOV      3 [BX] , DH MOV
    NEXT JMP  END-CODE

CODE XD@  ( ADDR -> D )    \ Fetches in lo..hi byte order
    BX POP
    AL , 0 [BX] MOV      AH , 1 [BX] MOV
    DL , 2 [BX] MOV      DH , 3 [BX] MOV
    AX PUSH  DX PUSH
    NEXT JMP  END-CODE
DECIMAL
```

SCREEN #104

SCREEN #105

```
EXIT \  32 BIT MICROCODE SOURCE - NOTES   & LOAD SCREEN
ASSUME: 1. Top element in DS is in DHI reg.


NOTE: THE OP-CODES OF NOP AND HALT
        MUST NOT BE CHANGED!!!!
        NOP = 0
        HALT = 1

1) Return stack too slow to get thru ALU on 1 cycle
        Can copy to DS and to DLO, LATCH, ETC.
2) RAM too slow to go thru ALU during read
3) RS/RP Can't be used on 1st and last cycle (Except SPECIAL)
4) Don't use RS thru address-latch & do RAM on next cycle
5) Don't use Z test after ALU MATH function
      (also means no ALU math function with END)
```

SCREEN #106

```
\  MICROCODE --- NOP(2)                        (n) = # clock cycles
DECIMAL  CROSS-COMPILER
0 OPCODE: NOP     ( -> )     \  MUST be opcode 0 !!!!!!!!!
   0 ::  DECODE ;;
   1 ::  END ;;

\  Special NOP for initialization use in restarting board
   3 :: ;;
   4 :: ;;
   5 :: ;;
   6 ::  DECODE ;;
   7 ::  END  ;;
;;END
SPECIAL
```

SCREEN #107

```
\  MICROCODE --- HALT(4+X)
DECIMAL  CROSS-COMPILER
511 OPCODE: HALT     ( -> )      \ -1 is flag to PC host
   0 ::  SOURCE=DHI DEST=DLO     ALU=-1    DEST=DHI ;;
   1 ::  SOURCE=DLO   DEST=LATCH  ;;
   2 ::  SOURCE=DHI DEST=STATUS
         SOURCE=LATCH ALU=B  DEST=DHI ;;
   3 ::  JMP=011  ;;     \ Infinite loop

;;END
```

```
SCREEN #108
\   MICROCODE --- %DP!%(2)
DECIMAL   CROSS-COMPILER
3 OPCODE: %DP!%    ( N -> )
   0 ::    SOURCE=DHI  DEST=DP                        DECODE  ;;
   1 ::    SOURCE=DS   ALU=B    DEST=DHI   INC[DP]    END   ;;

;;END
```

```
SCREEN #109
\   MICROCODE --- %DP@%(3)
DECIMAL   CROSS-COMPILER
4 OPCODE: %DP@%    ( -> N )
   0 ::   DEC[DP]   ;;
   1 ::   SOURCE=DHI   DEST=DS    DECODE ;;
   2 ::   SOURCE=DP    ALU=B  DEST=DHI      END ;;

;;END
```

```
SCREEN #110
\   MICROCODE --- %RP!%(2)
DECIMAL   CROSS-COMPILER
5 OPCODE: %RP!%    ( N -> )
   0 ::    SOURCE=DHI  DEST=RP                        DECODE  ;;
   1 ::    SOURCE=DS   ALU=B    DEST=DHI   INC[DP]    END   ;;

;;END
POISON SPECIAL
```

```
SCREEN #111
\   MICROCODE --- %RP@%(2)
DECIMAL   CROSS-COMPILER
6 OPCODE: %RP@%    ( -> N )
   0 ::   SOURCE=RP    DEC[DP]                      DECODE ;;
   1 ::   SOURCE=DHI   DEST=DS   ALU=B   DEST=DHI    END ;;
```

```
;;END
SPECIAL
```

```
SCREEN #112
\  MICROCODE --- !(4)      Store within same page
DECIMAL  CROSS-COMPILER
7 OPCODE: !     ( N ADDR -> )
   0 ::   ;;
   1 ::   SOURCE=DHI  DEST=ADDRESS-LATCH ;;
   2 ::   SOURCE=DS   DEST=RAM           INC[DP]  DECODE  ;;
   3 ::   SOURCE=DS  ALU=B  DEST=DHI     INC[DP]    END  ;;

;;END
```

```
SCREEN #113
\  MICROCODE --- +(2)
DECIMAL  CROSS-COMPILER
8  OPCODE: +     ( N1 N2 -> NSUM )
   0 ::    SOURCE=DS  ALU=A+B   DEST=DHI     INC[DP]   DECODE ;;
   1 ::                                                   END  ;;

;;END
```

```
SCREEN #114
\  MICROCODE --- +!(6)
DECIMAL  CROSS-COMPILER
9 OPCODE: +!   ( N  ADDR -> )
 \ Fetch operand
   0 ::  SOURCE=DS  INC[DP]  ;;  \ Load N into bus latch
   1 ::  SOURCE=DHI  DEST=ADDRESS-LATCH   ALU=B  DEST=DHI ;;
   2 ::  SOURCE=RAM   DEST=DLO ;;
   3 ::  SOURCE=DLO  ALU=A+B   DEST=DHI ;;
   4 ::  SOURCE=DHI  DEST=RAM                       DECODE  ;;
   5 ::  SOURCE=DS  ALU=B  DEST=DHI   INC[DP]     END  ;;
;;END
```

```
SCREEN #115
\  MICROCODE --- -(3)
DECIMAL  CROSS-COMPILER
10 OPCODE: -     ( N1 N2 -> NDIF )
    0 ::  SOURCE=DS  ALU=A-B  DEST=DHI INC[DP]  ;;
    1 ::  ALU=A-1   DEST=DHI  DECODE ;;
    2 ::  ALU=notA  DEST=DHI  END ;;

;;END
```

```
SCREEN #116
\  MICROCODE --- -ROT(5)
DECIMAL  CROSS-COMPILER
11  OPCODE: -ROT   ( N1 N2 N3 -> N3 N1 N2 )
    0 ::  INC[DP]  ;;
    1 ::  SOURCE=DS   DEST=DLO ;;           \  LATCH <- N1
 \    DHI <- N1    DS <- N3
    2 ::  SOURCE=DHI  DEST=DS    ALU=B  DEST=DHI DEC[DP] ;;
 \    LATCH <- N2
    3 ::  SOURCE=DS   DEST=DLO DECODE   ;;
 \    DHI <- N2    DS <- N1
    4 ::  SOURCE=DHI  DEST=DS    ALU=B  DEST=DHI  END ;;
;;END
```

```
SCREEN #117
\  MICROCODE --- 0(2)
DECIMAL  CROSS-COMPILER
12 OPCODE: 0 ( -> 0 )
    0 ::  DEC[DP]                              DECODE ;;
    1 ::  SOURCE=DHI  DEST=DS   ALU=0  DEST=DHI  END  ;;

;;END
```

```
SCREEN #118
\  MICROCODE --- 0<(2)
DECIMAL  CROSS-COMPILER
```

```
13 OPCODE: 0<   ( N -> FLAG )
   0 ::  JMP=01S                      DECODE  ;;

( >=0 )    2 ::   ALU=0   DEST=DHI  END  ;;
( <0 )     3 ::   ALU=-1  DEST=DHI  END  ;;
;;END
```

SCREEN #119

```
\  MICROCODE --- 0=(2)
DECIMAL  CROSS-COMPILER
14 OPCODE: 0=  ( N -> FLAG )
   0 ::  JMP=01Z                      DECODE  ;;

(  =0 )  2 ::  ALU=-1  DEST=DHI  END  ;;
( <>0 )  3 ::  ALU=0   DEST=DHI  END  ;;
;;END
```

SCREEN #120

```
\  MICROCODE --- 0BRANCH(3/4)    Favors taking the branch
DECIMAL  CROSS-COMPILER
15 OPCODE: 0BRANCH   ( FLAG -> )
\  0 flag => branch    non-0 flag => go to next instruction
   \ Must ALWAYS be used with a CALL attribute!!!!!
   0 ::  SOURCE=ADDRESS-COUNTER  DEST=DLO  JMP=01Z ;;
\ FLAG=0    Allow compiled branch to take affect
   2 ::  INC[RP] JMP=001  DECODE ;;
   1 ::  SOURCE=DS  ALU=B  DEST=DHI  INC[DP]  END ;;
\ FLAG<>0   Override compiled branch
   3 ::  SOURCE=DLO DEST=ADDRESS-COUNTER ;; ( Also sets latch )
               \ Wait for RAM access
   4 ::  SOURCE=RAM  DEST=DECODE   INC[RP]   DECODE ;;
   5 ::  SOURCE=DS  ALU=B  DEST=DHI  INC[DP]  END ;;
;;END   POISON SPECIAL
```

SCREEN #121

```
\  MICROCODE --- 1+(2)
DECIMAL  CROSS-COMPILER
16 OPCODE: 1+    ( N -> N+1 )
   0 ::  ALU=A+1  DEST=DHI           DECODE  ;;
   1 ::                                END  ;;
;;END
```

```
SCREEN #122
\  MICROCODE --- 1-(2)
DECIMAL  CROSS-COMPILER
17 OPCODE: 1-    ( N -> N-1 )
   0 ::  ALU=A-1   DEST=DHI         DECODE  ;;
   1 ::                              END   ;;
;;END

SCREEN #123
\  MICROCODE --- 2*(2)
DECIMAL  CROSS-COMPILER
18 OPCODE: 2*    ( N -> N+N )
   0 ::  ALU=A+A   DEST=DHI        DECODE  ;;
   1 ::                             END   ;;
;;END

SCREEN #124
\  MICROCODE --- 2/(3)
DECIMAL  CROSS-COMPILER
19 OPCODE: 2/    ( N -> N/2 )
   0 ::  SOURCE=DHI  DEST=DLO  ALU=A+1  DEST=DHI  JMP=01S  ;;

( positive ) 2 ::  SOURCE=DLO ALU=B SR[ALU] CIN=0 DEST=DHI
                                      JMP=111  DECODE ;;
   7 ::  END ;;

( negative ) 3 ::  ALU=A CIN=1  SR[ALU]   DEST=DHI
                JMP=10Z       DECODE ;;

( =-1    )  4 ::  ALU=0  DEST=DHI    END ;;
( <> -1 )  5 ::                      END  ;;
;;END
```

```
SCREEN #125
\  MICROCODE --- <(5)    #### BENEFITS FROM DEST=DHI uBIT ####
DECIMAL  CROSS-COMPILER
20 OPCODE:  <   ( B A -> FLAG )
\ Test for different signs
   0 ::  SOURCE=DS  ALU=AxorB  ;;
   1 ::  SOURCE=DS  ALU=AxorB  JMP=01S ;;
( Same sign inputs )
   2 ::  SOURCE=DS  ALU=A-B-1 JMP=101 ;;
   5 ::  INC[DP]          JMP=11S    DECODE  ;;
         6 ::  ALU=-1  DEST=DHI    END  ;;
         7 ::  ALU=0   DEST=DHI    END  ;;

( Different sign inputs -- < if B is negative )
   3 ::   SOURCE=DS  ALU=notB      JMP=101  ;;
;;END


SCREEN #126
\  MICROCODE --- <$=STEP>(13)
DECIMAL  CROSS-COMPILER    \ Single character string match
23 OPCODE: <$=STEP>
     ( FLG AD1 AD2 CNT -> FLG' AD1' AD2' CNT' )
\  Increments AD1 AD2, Decrements CNT
\   IF <>,  CNT <= -1  FLG <= 0
   0 ::  SOURCE=DHI  DEST=DLO  ;;
   1 ::  SOURCE=DS   ALU=B  DEST=DHI DEST=ADDRESS-LATCH
           DEC[RP] ;;
   2 ::  SOURCE=DLO  DEST=RS              ALU=A+1  DEST=DHI ;;
   3 ::  SOURCE=DHI  DEST=DS   INC[DP]  ALU=0    DEST=DHI ;;
   4 ::  SOURCE=RAM-BYTE  DEST=DLO       ALU=A+1 DEST=DHI ;;
   5 ::  SOURCE=DS  ALU=A+B    DEST=DHI DEST=ADDRESS-LATCH
                                          INC[MPC] ;;
   6 ::  SOURCE=DHI  DEST=DS   JMP=000 ;;


SCREEN #127
\  MICROCODE --- <$=STEP> --2
DECIMAL  CROSS-COMPILER    \ Single character string match
24 CURRENT-OPCODE !
   0 ::  SOURCE=DLO  ALU=B  DEST=DHI  ;;
   1 ::  SOURCE=RAM-BYTE  DEST=DLO  ;;
   2 ::  SOURCE=DLO  ALU=AxorB DEST=DHI ;;
   3 ::  ALU=0  DEST=DHI  INC[DP]
            SOURCE=RS  DEST=DLO  INC[RP]    JMP=10Z ;;
( Bytes are <>  Place 0 in flag, -1 in count )
   5 ::  SOURCE=DHI  DEST=DS    DEC[DP]    DECODE ;;
   6 ::  ALU=notA    DEST=DHI   DEC[DP]    END    ;;

( Bytes are =   Leave flag non-0, decrement count )
   4 ::  SOURCE=DLO ALU=A-B  DEST=DHI
         DEC[DP]                         JMP=110 DECODE  ;;
;;END

SCREEN #128
\  MICROCODE --- <+LOOP>(9/11)     --1
DECIMAL  CROSS-COMPILER
\ Always use with CALL attribute!!!!!
\ IMPLICIT LOOP RANGE SPAN OF 80000000 Hex
25 OPCODE: <+LOOP>   ( N -> )     ( RS: LIMIT COUNT -> ... )
 \ Capture non-looping address in address latch
```

```
    0 ::  INC[RP] ;;
    1 ::  SOURCE=RS   DEST=DLO        INC[MPC] ;;
    2 ::  SOURCE=DLO ALU=A+B  DEST=DHI
                                   JMP=01S ;;    \ Add N to counter
```

SCREEN #129

```
\  MICROCODE --- <+LOOP>  -- 2
DECIMAL  CROSS-COMPILER
26 CURRENT-OPCODE !
( + N )  2 ::  SOURCE=DHI  DEST=RS INC[RP] JMP=000 ;;
  . 0 ::  SOURCE=RS   DEST=DLO          DEC[RP]  ;; \ Test count
    1 ::  SOURCE=DLO  ALU=A-B  INC[MPC]  JMP=111 ;; \ Test count
    7 ::  SOURCE=RS   DEC[RP] JMP=00S ;;

( - N )  3 ::  SOURCE=DHI  DEST=RS INC[RP] ;;
    4 ::  SOURCE=RS   DEST=DLO          DEC[RP] ;; \ Test count
    5 ::  SOURCE=DLO  ALU=A-B  INC[MPC]         ;; \ Test count
    6 ::  SOURCE=RS   DEC[RP] JMP=01S ;;
```

SCREEN #130

```
\  MICROCODE --- <+LOOP>  -- 3
DECIMAL  CROSS-COMPILER
27 CURRENT-OPCODE !
( +N DONE ) 0 :: SOURCE=RS DEST=ADDRESS-COUNTER
                   INC[RP] JMP=100 ;;
( -N DONE ) 3 :: SOURCE=RS DEST=ADDRESS-COUNTER INC[RP] ;;
    4 ::  INC[RP] ;;
    5 :: SOURCE=RAM  DEST=DECODE  DECODE INC[RP]  JMP=111 ;;

( +N LOOP  ) 1 :: INC[RP] DECODE  JMP=111  ;;
( -N LOOP  ) 2 :: INC[RP] DECODE  JMP=111  ;;

    7 ::  SOURCE=DS  ALU=B  DEST=DHI  INC[DP] END ;;
;;END
POISON SPECIAL
```

SCREEN #131

```
\  MICROCODE --- <<ABORT">>(11/3)
DECIMAL  CROSS-COMPILER
29 OPCODE: <<ABORT">>   ( FLAG -> )
\  If flag <> 0, then NOP   if flag = 0, then jump over message
    0 :: JMP=01Z  ALU=A+1  ;;

( FLAG=0 )  2 ::  SOURCE=RS  DEST=DLO  ALU=A+1  JMP=100 ;;
     4 ::  SOURCE=DLO  ALU=A+B     DEST=ADDRESS-LATCH ;;
     5 ::  SOURCE=RAM  DEST=DLO ALU=A+1    INC[RP] INC[MPC]  ;;
     6 ::  SOURCE=DLO  ALU=A+B    DEST=DHI          JMP=000  ;;

( FLAG<>0 )
```

```
     3 ::               JMP=001                     DECODE ;;
     1 :: SOURCE=DS ALU=B DEST=DHI INC[DP]   END      ;;

SCREEN #132
\  MICROCODE --- <<ABORT">> --2
DECIMAL  CROSS-COMPILER
30 CURRENT-OPCODE !
\  If flag <> 0, then NOP   if flag = 0, then jump over message
     0 ::  ALU=A+1  DEST=DHI                       ;;
     1 ::  SOURCE=DHI  DEST=ADDRESS-COUNTER ;;    \ RS+count+7
     2 ::  SOURCE=RAM  DEST=DECODE   DECODE  ;;
     3 ::  SOURCE=DS ALU=B DEST=DHI INC[DP]   END    ;;
;;END  POISON SPECIAL

SCREEN #133
\  MICROCODE --- <DO>(4)
DECIMAL  CROSS-COMPILER
\ Must always be used with a JUMP since it starts a loop
34 OPCODE: <DO>  ( LIMIT  START -> )
\  Return:         ( -> LIMIT  START )
   0 ::    DEC[RP]  ;;
   1 ::    SOURCE=DS  DEST=RS  DEC[RP]  INC[DP]  ;;
   2 ::    SOURCE=DHI DEST=RS           DECODE  ;;
   3 ::    SOURCE=DS  ALU=B    DEST=DHI INC[DP]  END ;;
;;END
POISON SPECIAL

SCREEN #134
\  MICROCODE --- <ENCLA>  (11)
DECIMAL  CROSS-COMPILER \ SCAN TO FIRST NON-DELIMITER
35 OPCODE: <ENCLA>   ( ADDR -> ADDR+1/ADDR  DONE-FLAG )
\                   RETURN STACK  ( DELIM -> DELIM )
   0 ::  DEC[DP] ;;
   1 ::  SOURCE=DHI  DEST=DS   ;;
   2 ::  SOURCE=DHI  DEST=ADDRESS-LATCH ;;
   3 ::  SOURCE=RS   DEST=DLO        ;;
   4 ::  SOURCE=DLO  ALU=B  DEST=DHI ;;
\ Compare with delimiter
   5 ::  SOURCE=RAM-BYTE  DEST=DLO ;;
   6 ::  SOURCE=DLO       ALU=AxorB  DEST=DHI   INC[MPC] ;;
   7 ::  SOURCE=DS   ALU=B  DEST=DHI              JMP=002 ;;
```

SCREEN #135

```
\   MICROCODE --- <ENCLA>   --2
DECIMAL  CROSS-COMPILER \ SCAN TO FIRST NON-DELIMITER
36 CURRENT-OPCODE !
( = DELIMITER )
    0 ::  ALU=A+1  DEST=DHI   JMP=111   DECODE ;;
    7 ::  SOURCE=DHI  DEST=DS  ALU=0   DEST=DHI          END ;;
( <> DELIMITER )
    1 ::  ALU=A    DEST=DHI                DECODE ;;
    2 ::  SOURCE=DHI  DEST=DS  ALU=-1  DEST=DHI          END ;;
;;END
```

SCREEN #136

```
\   MICROCODE --- <ENCLB>   (10/11)
DECIMAL  CROSS-COMPILER \ SCAN TO FIRST DELIMITER
37 OPCODE: <ENCLB>    ( ADDR -> ADDR+1/ADDR  DONE-FLAG )
\                    RETURN STACK   ( DELIM -> DELIM )
    0 ::  DEC[DP] ;;
    1 ::  SOURCE=DHI  DEST=DS ;;
    2 ::  SOURCE=DHI  DEST=ADDRESS-LATCH ;;
    3 ::  SOURCE=RS   DEST=DLO ;;
    4 ::  SOURCE=DLO  ALU=B  DEST=DHI ;;
\ Compare with delimiter
    5 ::  SOURCE=RAM-BYTE  DEST=DLO   ;;
    6 ::  SOURCE=DLO       ALU=AxorB  DEST=DHI  INC[MPC] ;;
\ Compare with 0
    7 ::  SOURCE=DLO       ALU=B      DEST=DHI   JMP=00Z ;;
```

SCREEN #137

```
\   MICROCODE --- <ENCLB>   --2
DECIMAL  CROSS-COMPILER \ SCAN TO FIRST NON-DELIMITER
38 CURRENT-OPCODE !
( = DELIMITER )
    0 ::                        JMP=111   DECODE ;;
    7 ::                         ALU=-1  DEST=DHI          END ;;
( <> DELIMITER )
    1 ::  SOURCE=DS   ALU=B  DEST=DHI   JMP=01Z ;;
    ( = 0 )
    2 ::                        JMP=111   DECODE ;;
    ( <> DELIMITER <>0 -- Go past this character )
    3 ::  ALU=A+1  DEST=DHI                DECODE ;;
    4 ::  SOURCE=DHI  DEST=DS  ALU=0   DEST=DHI          END ;;
;;END
```

SCREEN #138

```
\  MICROCODE --- <PICK>(5) \ Does all of PICK exc. error check
DECIMAL  CROSS-COMPILER
41 OPCODE: <PICK>  ( ..STACK.. A -> ..STACK.. B )
   0 ::  SOURCE=DP  DEST=DLO                \ Save DP value
             ALU=A+B  DEST=DHI ;;
```

```
    1 ::  ALU=A-1   DEST=DHI   ;;
    2 ::  SOURCE=DHI  DEST=DP   ;;
    3 ::  SOURCE=DS   ALU=B    DEST=DHI      DECODE ;;
    4 ::  SOURCE=DLO             DEST=DP      END   ;;

;;END
```

SCREEN #139

```
\  MICROCODE --- <ROLL>(3*N+6)
DECIMAL  CROSS-COMPILER
42 OPCODE: <ROLL>    ( ..STACK.. COUNT-1 -> ..NEW-STACK.. )
   0 ::  SOURCE=DS  DEST=DLO   INC[DP]   ;;
   1 ::  ALU=A-1    DEST=DHI   DEC[RP]      INC[MPC] ;;
   2 ::  SOURCE=DP  DEST=RS    DEC[RP]  JMP=00Z   ;;
```

SCREEN #140

```
\  MICROCODE --- <ROLL>        --2
DECIMAL  CROSS-COMPILER
43 CURRENT-OPCODE !    ( ..STACK.. COUNT-1 -> ..NEW-STACK.. )
( LOOP UNTIL COUNT REACHES 0 )
   1 ::  SOURCE=DS  DEST=RS       ALU=A-1  DEST=DHI ;;
   2 ::  SOURCE=DLO   DEST=DS     ;;
   3 ::  SOURCE=RS  DEST=DLO  INC[DP]    JMP=00Z ;;

( Done )    0 ::   INC[RP]  SOURCE=DLO  ALU=B  DEST=DHI JMP=101 ;;
   5 ::  SOURCE=RS  DEST=DP   INC[RP]  DECODE ;;
   6 ::   END  ;;
;;END
```

SCREEN #141

```
\  MICROCODE --- =(3)
DECIMAL  CROSS-COMPILER
44 OPCODE:  =   ( A B -> FLAG )
   0 ::  SOURCE=DS  ALU=AxorB  ;;    \ Test for =
   1 ::  INC[DP]      JMP=01Z               DECODE  ;;

( <> )    3 ::  ALU=0   DEST=DHI              END  ;;
( =  )    2 ::  ALU=-1  DEST=DHI              END  ;;

;;END
```

```
SCREEN #142
\   MICROCODE --- >(5)     #### BENEFITS FROM DEST=DHI uBIT ####
DECIMAL  CROSS-COMPILER
45 OPCODE:   >   ( B A -> FLAG )
\ Test for different signs
   0 ::  SOURCE=DS  ALU=AxorB  DEST=DHI  ;;
   1 ::  SOURCE=DS  ALU=AxorB  DEST=DHI  JMP=01S ;;
( Same sign inputs )
   2 ::  SOURCE=DS  ALU=A-B   JMP=101 ;;
   5 ::  INC[DP]        JMP=11S    DECODE  ;;
         6 ::  ALU=0   DEST=DHI    END  ;;
         7 ::  ALU=-1  DEST=DHI    END  ;;

( Different sign inputs -- > if B is non-negative )
   3 ::    SOURCE=DS  ALU=notB   DEST=DHI   JMP=101  ;;
;;END
```

```
SCREEN #143
\   MICROCODE --- >R(3)
DECIMAL  CROSS-COMPILER
46 OPCODE: >R     ( N -> )    ( Return: -> N )
   0 ::  DEC[RP] ;;
   1 ::  SOURCE=DHI  DEST=RS  DECODE ;;
   2 ::  SOURCE=DS   ALU=B  DEST=DHI   INC[DP]  END ;;

;;END
POISON SPECIAL
```

```
SCREEN #144
\   MICROCODE --- ?DUP(2)
DECIMAL  CROSS-COMPILER
47 OPCODE:   ?DUP    ( A -> 0 / A A )
   0 ::   DEC[DP]   JMP=01Z                          DECODE  ;;

( =0  )    2 ::  INC[DP]                             END ;;
( <>0 )    3 ::  SOURCE=DHI            DEST=DS       END ;;

;;END
```

```
SCREEN #145
\   MICROCODE --- @(4)
DECIMAL  CROSS-COMPILER
```

```
48 OPCODE: @    ( ADDR -> N )
   0 ::  ;;
   1 ::  SOURCE=DHI   DEST=ADDRESS-LATCH ;;
   2 ::  SOURCE=RAM  DEST=DLO        DECODE ;;
   3 ::  SOURCE=DLO  ALU=B  DEST=DHI          END    ;;

;;END
```

SCREEN #146

```
\  MICROCODE --- ABS(2)
DECIMAL  CROSS-COMPILER
49 OPCODE:  ABS    ( N1 -> N2 )
   0 ::  SOURCE=DHI DEST=DLO   ALU=A-1  DEST=DHI
                                        JMP=01S  DECODE ;;

( >=0 )    2 ::  SOURCE=DLO  ALU=B    DEST=DHI      END  ;;
(  <0 )    3 ::  SOURCE=DLO  ALU=notA DEST=DHI      END  ;;

;;END
```

SCREEN #147

```
\  MICROCODE --- ADC(4)
DECIMAL  CROSS-COMPILER
50 OPCODE: ADC    ( N1 N2 CYIN -> NSUM CYOUT )
   0 ::  SOURCE=DS  ALU=B  DEST=DHI  INC[DP]  JMP=10Z  ;;

( CYIN<>0 )  5 ::  SOURCE=DS ALU=A+B+1  DEST=DHI JMP=011 ;;
( CYIN=0 )   4 ::  SOURCE=DS ALU=A+B    DEST=DHI JMP=011 ;;

   3 :: SOURCE=DHI  DEST=DS  JMP=11C    DECODE ;;

( COUT<>0 )  6 ::  ALU=-1  DEST=DHI   END ;;
( COUT=0  )  7 ::  ALU=0   DEST=DHI   END ;;

;;END
```

SCREEN #148

```
\  MICROCODE --- AND(2)
DECIMAL  CROSS-COMPILER
51 OPCODE: AND  ( N1 N2 -> N3 )
   0 ::  SOURCE=DS  ALU=AandB  DEST=DHI INC[DP]  DECODE ;;
   1 ::                        END  ;;

;;END
```

SCREEN #149

```
\  MICROCODE --- ASR(2)
DECIMAL  CROSS-COMPILER
52 OPCODE: ASR   ( N1 -> N2 )
   0 ::    JMP=01S   DECODE ;;

( POSITIVE )   2 ::  ALU=A CIN=0   SR[ALU]  DEST=DHI  END ;;
( NEGATIVE )   3 ::  ALU=A CIN=1   SR[ALU]  DEST=DHI  END ;;

;;END
```

SCREEN #150

```
\  MICROCODE --- BYTEROLL(2)      (ROLL 8 BITS RIGHT)
DECIMAL  CROSS-COMPILER
53 OPCODE: BYTEROLL     ( N1 -> N2 )
   0 ::   ALU=A   ROLL[ALU]   DEST=DHI      DECODE ;;
   1 ::                                     END ;;

;;END
```

SCREEN #151

```
\  MICROCODE --- C!(4)       Store within same page
DECIMAL  CROSS-COMPILER
54 OPCODE: C!     ( N ADDR -> )
   0 ::   ;;
   1 ::   SOURCE=DHI  DEST=ADDRESS-LATCH ;;
   2 ::   SOURCE=DS   DEST=RAM-BYTE     INC[DP]  DECODE  ;;
   3 ::   SOURCE=DS  ALU=B  DEST=DHI    INC[DP]    END  ;;

;;END
```

```
SCREEN #152
\  MICROCODE --- C@(4)
DECIMAL  CROSS-COMPILER
55 OPCODE: C@     ( ADDR -> N )
    0 ::  ;;
    1 ::  SOURCE=DHI   DEST=ADDRESS-LATCH ;;
    2 ::  SOURCE=RAM-BYTE   DEST=DLO          DECODE ;;
    3 ::  SOURCE=DLO  ALU=B  DEST=DHI          END    ;;

;;END
```

```
SCREEN #153
\  MICROCODE --- D!(7)
DECIMAL  CROSS-COMPILER
\ Lo half in ADDR,  Hi half in ADDR+4
56 OPCODE: D!     ( D ADDR -> )
    0 ::  SOURCE=DHI  DEST=DLO  ALU=A+1  DEST=DHI  ;;
    1 ::  SOURCE=DLO  DEST=ADDRESS-LATCH  ALU=A+1  DEST=DHI
                      INC[DP] ;;
    2 ::  SOURCE=DS   DEST=RAM   ALU=A+1  DEST=DHI
                      DEC[DP] ;;
    3 ::  SOURCE=DS  DEST=DLO  INC[DP]  ALU=A+1  DEST=DHI ;;
    4 ::  SOURCE=DHI  DEST=ADDRESS-LATCH   INC[DP] ;;
    5 ::  SOURCE=DLO  DEST=RAM   DECODE ;;
    6 ::  SOURCE=DS  ALU=B  DEST=DHI   INC[DP]  END ;;

;;END
```

```
SCREEN #154
\  MICROCODE --- D@(7)
DECIMAL  CROSS-COMPILER
\ Lo half in ADDR,  Hi half in ADDR+4
58 OPCODE: D@     ( ADDR -> D )
    0 ::  SOURCE=DHI  DEST=DLO  ALU=A+1  DEST=DHI  DEC[DP] ;;
    1 ::  SOURCE=DLO  DEST=ADDRESS-LATCH  ALU=A+1  DEST=DHI  ;;
    2 ::  SOURCE=RAM  DEST=DLO   ALU=A+1  DEST=DHI   ;;
    3 ::  SOURCE=DLO DEST=DS     ALU=A+1  DEST=DHI ;;
    4 ::  SOURCE=DHI  DEST=ADDRESS-LATCH  ;;
    5 ::  SOURCE=RAM  DEST=DLO   DECODE ;;
    6 ::  SOURCE=DLO ALU=B  DEST=DHI   END ;;

;;END
```

```
SCREEN #155
\  MICROCODE --- DDROP(2)
DECIMAL  CROSS-COMPILER
59 OPCODE: DDROP   ( D -> )
    0 ::  INC[DP]                                DECODE  ;;
    1 ::  SOURCE=DS  ALU=B    DEST=DHI INC[DP]       END  ;;
;;END
```

```
SCREEN #156
\  MICROCODE --- DDUP(3)
DECIMAL  CROSS-COMPILER
60 OPCODE: DDUP   ( D1 -> D1 D1 )
   0 ::  SOURCE=DS  DEST=DLO             DEC[DP]  ;;
   1 ::  SOURCE=DHI             DEST=DS DEC[DP]   DECODE  ;;
   2 ::  SOURCE=DLO      DEST=DS                     END  ;;
;;END
```

```
SCREEN #157
\  MICROCODE --- DLSL(3)
DECIMAL  CROSS-COMPILER
62 OPCODE: DLSL   ( D1 -> D2 )
   0 ::  SOURCE=DS  DEST=DLO ;;
   1 ::  ALU=A CIN=0   SL[DLO] SL[ALU]  DEST=DHI  DECODE ;;
   2 ::  SOURCE=DLO  DEST=DS   END ;;

;;END
```

```
SCREEN #158
\  MICROCODE --- DLSR(3)
DECIMAL  CROSS-COMPILER
63 OPCODE: DLSR   ( D1 -> D2 )
   0 ::  SOURCE=DS  DEST=DLO ;;
   1 ::  ALU=A CIN=0   SR[DLO] SR[ALU]  DEST=DHI  DECODE ;;
   2 ::  SOURCE=DLO  DEST=DS   END ;;

;;END
```

```
SCREEN #159
\  MICROCODE --- DNEGATE(5)
DECIMAL  CROSS-COMPILER
66 OPCODE: DNEGATE  ( D1 -> -D1 )
   0 ::  SOURCE=DHI  DEST=DLO   ALU=0  DEST=DHI ;;
   1 ::  SOURCE=DS   ALU=A-B   DEST=DHI ;;
   2 ::  SOURCE=DHI  DEST=DS
               ALU=0  DEST=DHI  JMP=10C ;;

( CY=1 ) 4 ::  SOURCE=DLO  ALU=AornotB+1  DEST=DHI
                                             JMP=110  DECODE ;;
( CY=0 ) 5 ::  SOURCE=DLO  ALU=notB       DEST=DHI    DECODE ;;

   6 ::  END ;;
;;END


SCREEN #160
\  MICROCODE --- DOCON(5)
\ DOCON Must never be used with either CALL or EXIT attributes
\    Address field for jump points to data word
DECIMAL  CROSS-COMPILER
67 OPCODE: DOCON    ( -> VALUE )
   0 ::  SOURCE=RAM  DEST=DLO              ;;
   1 ::  SOURCE=RS  DEST=ADDRESS-COUNTER  DEC[DP] INC[RP] ;;
   2 ::  SOURCE=DHI  DEST=DS        ;;
   3 ::  SOURCE=RAM  DEST=DECODE      DECODE ;;
   4 ::  SOURCE=DLO  ALU=B  DEST=DHI     END ;;

;;END
POISON SPECIAL


SCREEN #161
\  MICROCODE --- DOVAR(5)
\ DOVAR Must be used with a CALL attribute
\    Address field for jump points to data word
DECIMAL  CROSS-COMPILER
68 OPCODE: DOVAR    ( -> VALUE )
   0 ::  SOURCE=ADDRESS-COUNTER  DEST=DLO  DEC[DP] INC[RP] ;;
   1 ::  SOURCE=RS  DEST=ADDRESS-COUNTER   INC[RP] ;;
   2 ::  SOURCE=DHI  DEST=DS  ;;
   3 ::  SOURCE=RAM  DEST=DECODE    DECODE ;;
   4 ::  SOURCE=DLO ALU=B  DEST=DHI  END ;;
;;END
POISON SPECIAL
```

```
SCREEN #162
\   MICROCODE --- DROP(2)
DECIMAL   CROSS-COMPILER
69 OPCODE: DROP      ( N -> )
    0 ::   SOURCE=DS   ALU=B    DEST=DHI  INC[DP]        DECODE  ;;
    1 ::                                                   END  ;;
;;END

SCREEN #163
\   MICROCODE --- DSWAP(7)
DECIMAL   CROSS-COMPILER
72 OPCODE: DSWAP  ( D1 D2 -> D2 D1 )
    0 ::   SOURCE=DS   DEST=DLO   INC[DP] ;;
    1 ::   SOURCE=DS              DEC[RP] ;;   \ D1(hi) to ALU latch
    2 ::   SOURCE=DHI  DEST=DS     ALU=B   DEST=DHI   INC[DP] ;;
    3 ::   SOURCE=DS   DEST=RS ;;
    4 ::   SOURCE=DLO  DEST=DS    DEC[DP] ;;
    5 ::   SOURCE=RS   DEST=DLO   INC[RP]  DEC[DP]  DECODE  ;;
    6 ::   SOURCE=DLO  DEST=DS                       END    ;;

;;END

SCREEN #164
\   MICROCODE --- DUP(2)
DECIMAL   CROSS-COMPILER
73 OPCODE: DUP    ( N -> N N )
    0 ::    DEC[DP]                           DECODE   ;;
    1 ::    SOURCE=DHI           DEST=DS      END ;;
;;END

SCREEN #165
\   MICROCODE --- I(2)
DECIMAL   CROSS-COMPILER
74 OPCODE: I     ( -> N )
    0 ::   SOURCE=RS    DEC[DP]    DECODE ;;
    1 ::   SOURCE=DHI   DEST=DS    ALU=B   DEST=DHI   END ;;
```

```
;;END
SPECIAL   \  Special forces RS available in 1st clock cycle

SCREEN #166
\  MICROCODE --- R@(3)  -- SAME AS I
DECIMAL  CROSS-COMPILER
74 OPCODE: R@   ( -> N )
;;END
SPECIAL   \  Special forces RS available in 1st clock cycle

SCREEN #167
\  MICROCODE --- I'(3)
DECIMAL  CROSS-COMPILER
75 OPCODE: I'    ( -> N )
   0 ::  DEC[DP] INC[RP] ;;
   1 ::  SOURCE=RS    DEC[RP]                        DECODE ;;
   2 ::  SOURCE=DHI  DEST=DS   ALU=B  DEST=DHI END   ;;
;;END
SPECIAL   \  Special forces RS available in 1st clock cycle

SCREEN #168
\  MICROCODE --- J(5)
DECIMAL  CROSS-COMPILER
76 OPCODE: J    ( -> N )
   0 ::  DEC[DP] INC[RP] ;;
   1 ::  SOURCE=DHI  DEST=DS    INC[RP] ;;
   2 ::  SOURCE=RS  DEST=DLO   DEC[RP]  ;;
   3 ::  DEC[RP]                           DECODE ;;
   4 ::  SOURCE=DLO  ALU=B  DEST=DHI        END  ;;
;;END
SPECIAL   \  Special forces RS available in 1st clock cycle
```

```
SCREEN #169
\  MICROCODE --- LEAVE(4)
DECIMAL  CROSS-COMPILER
77 OPCODE: LEAVE    ( -> )    ( Sets COUNT=LIMIT on return stack )
   0 ::  INC[RP] ;;
   1 ::  SOURCE=RS   DEST=DLO  DEC[RP] ;;
   2 ::  SOURCE=DLO DEST=RS     DECODE ;;
   3 ::  END ;;
;;END
\  Special forces RS available in 1st clock cycle
POISON SPECIAL
```

```
SCREEN #170
\  MICROCODE --- LIT(5)
DECIMAL  CROSS-COMPILER
\ This MUST be used with the CALL attribute pointing next instr
78 OPCODE: LIT    ( -> N )
   0 ::  SOURCE=ADDRESS-COUNTER  DEST=DLO   DEC[DP] ;;
   1 ::  SOURCE=DLO  DEST=ADDRESS-LATCH     INC[RP] ;;
   2 ::  SOURCE=RAM  DEST=DLO  ;;
   3 ::  SOURCE=DLO  DEST=LATCH  DECODE ;;
   4 ::  SOURCE=DHI  DEST=DS
                  SOURCE=LATCH   ALU=B  DEST=DHI      END ;;
;;END
POISON SPECIAL
```

```
SCREEN #171
\  MICROCODE --- LSLN(2*N+3)
DECIMAL  CROSS-COMPILER
\ COUNT TREATED AS AN UNSIGNED INTEGER >= 0
79 OPCODE: LSLN   ( N1 COUNT -> N2 )
   0 ::  SOURCE=DS  DEST=DLO  INC[DP]
                        ALU=A-1 DEST=DHI  JMP=01Z ;;

( LOOP WHILE <> 0 )
   3 ::  CIN=0  SL[DLO]   ;;
   4 ::  ALU=A-1  DEST=DHI  JMP=01Z ;;

( DONE  )
   2 ::  SOURCE=DLO  ALU=B  DEST=DHI    JMP=111 DECODE ;;
   7 ::                                         END ;;
;;END
```

```
SCREEN #172
\  MICROCODE --- LSR(2)
DECIMAL  CROSS-COMPILER
```

```
80 OPCODE: LSR   ( N1 -> N2 )
   0 ::  ALU=A CIN=0   SR[ALU]  DEST=DHI         DECODE ;;
   1 ::                                          END ;;
;;END
```

SCREEN #173

```
\  MICROCODE --- LSRN(3*N+4)
DECIMAL  CROSS-COMPILER
\ COUNT TREATED AS AN UNSIGNED INTEGER >= 0
81 OPCODE: LSRN    ( N1 COUNT -> N2 )
   0 ::  SOURCE=DS  DEST=DLO    ;;
   1 ::  SOURCE=DHI DEST=DS   ALU=0  DEST=DHI   JMP=01Z ;;

( LOOP WHILE <> 0 )
   3 ::  SOURCE=DS ALU=A-B       DEST=DHI  ;;
   4 ::  ALU=notA  DEST=DHI ;;
   5 ::  SOURCE=DHI DEST=DS  CIN=0  SR[DLO]
                       ALU=0  DEST=DHI              JMP=01Z ;;
( DONE  )
   2 ::  SOURCE=DLO  ALU=B  DEST=DHI   JMP=111 DECODE ;;
   7 ::                   INC[DP]              END ;;
;;END
```

SCREEN #174

```
\  MICROCODE --- NEGATE(2)
DECIMAL  CROSS-COMPILER
82 OPCODE: NEGATE   ( N -> -N )
   0 ::  ALU=A-1     DEST=DHI      DECODE  ;;
   1 ::  ALU=notA    DEST=DHI         END  ;;
;;END
```

SCREEN #175

```
\  MICROCODE --- NOT(2)
DECIMAL  CROSS-COMPILER
83 OPCODE: NOT    ( N -> 0=FLAG )
   0 ::  JMP=01Z                      DECODE  ;;

( <>0 )  3 ::   ALU=0   DEST=DHI   END  ;;
(  =0 )  2 ::   ALU=-1  DEST=DHI   END  ;;
;;END
```

```
SCREEN #176
\  MICROCODE --- OR(2)
DECIMAL  CROSS-COMPILER
84 OPCODE: OR    ( N1 N2 -> N3 )
   0 ::  SOURCE=DS  ALU=AorB  DEST=DHI  INC[DP]  DECODE ;;
   1 ::                                          END  ;;

;;END
```

```
SCREEN #177
\  MICROCODE --- OVER(2)
DECIMAL  CROSS-COMPILER
85 OPCODE: OVER    ( N1 N2 -> N1 N2 N1 )
    0 ::  SOURCE=DS  DEC[DP]     DECODE ;;  \ ALU latch <- N1
    1 ::  SOURCE=DHI  DEST=DS   ALU=B  DEST=DHI  END ;;

;;END
```

```
SCREEN #178
\  MICROCODE --- R>(2)
DECIMAL  CROSS-COMPILER
86 OPCODE: R>     ( -> N )    ( return: N -> )
   0 ::  SOURCE=RS  DEST=LATCH   DEC[DP]  INC[RP]  DECODE ;;
   1 ::  SOURCE=DHI  DEST=DS
            SOURCE=LATCH  ALU=B  DEST=DHI          END ;;

;;END
POISON   SPECIAL
```

SCREEN #179
```
\  MICROCODE --- RLC(3)
DECIMAL  CROSS-COMPILER
88 OPCODE: RLC    ( N1 CYIN -> N2 CYOUT )
   0 ::  SOURCE=DS  DEST=DLO  ALU=B  DEST=DHI  JMP=01Z  ;;
( CYIN=0 )
   2 ::  SL[DLO]   CIN=0   JMP=10S  DECODE ;;
( CYIN<>0 )
   3 ::  SL[DLO]   CIN=1   JMP=10S  DECODE ;;
( COUT=0  )  4 :: SOURCE=DLO DEST=DS  ALU=0   DEST=DHI  END ;;
( COUT<>0 )  5 :: SOURCE=DLO DEST=DS  ALU=-1  DEST=DHI  END ;;
;;END
```

SCREEN #180
```
\  MICROCODE --- ROT(4)
DECIMAL  CROSS-COMPILER
89 OPCODE: ROT    ( N1 N2 N3 -> N2 N3 N1 )
   0 ::  SOURCE=DS  ;;
   1 ::  SOURCE=DHI  DEST=DS   ALU=B  DEST=DHI INC[DP] ;;
   2 ::  SOURCE=DS                                 DECODE ;;
   3 ::  SOURCE=DHI  DEST=DS   ALU=B  DEST=DHI DEC[DP] END  ;;
;;END
```

SCREEN #181
```
\  MICROCODE --- RRC(4)
DECIMAL  CROSS-COMPILER
90 OPCODE: RRC    ( N1 CYIN -> N2 CYOUT )
   0 ::  SOURCE=DS   DEST=DLO  JMP=01Z  ;; \ test if CYIN=0
( CYIN=0 )
   2 ::  SOURCE=DS  ALU=B SR[ALU]   CIN=0   JMP=001  ;;
( CYIN<>0 )
   3 ::  SOURCE=DS  ALU=B SR[ALU]   CIN=1   JMP=001  ;;
   1 ::  SOURCE=DHI  DEST=DS   JMP=10L   DECODE ;;
( COUT=0  )  4 :: ALU=0   DEST=DHI  END ;;
( COUT<>0 )  5 :: ALU=-1  DEST=DHI  END ;;
;;END
```

SCREEN #182
```
\  MICROCODE --- S->D(3)
DECIMAL  CROSS-COMPILER
91 OPCODE:  S->D   ( N1 -> D2 )
   0 ::  DEC[DP]  JMP=01S   DECODE  ;;
( >=0 )  2 ::  SOURCE=DHI  DEST=DS ALU=0  DEST=DHI   END  ;;
( <0  )  3 ::  SOURCE=DHI  DEST=DS ALU=-1 DEST=DHI   END  ;;
```

```
;;END
```

SCREEN #183

```
\  MICROCODE --- SWAP(2)
DECIMAL  CROSS-COMPILER
92 OPCODE: SWAP     ( N1 N2 -> N2 N1 )
    0 ::  SOURCE=DS                   DECODE ;;  \ ALU latch <- N1
    1 ::  SOURCE=DHI  DEST=DS   ALU=B  DEST=DHI   END ;;

;;END
```

SCREEN #184

```
\  MICROCODE --- SYSCALL(7+host delay)
DECIMAL  CROSS-COMPILER
93 OPCODE: SYSCALL   ( DATA1  N -> DATA2 )
   0 ::  SOURCE=DS  DEST=LATCH  INC[DP] ;;
   1 ::  SOURCE=LATCH  ALU=B DEST=DHI
                     SOURCE=DHI  DEST=STATUS ;;
   2 ::  SOURCE=DHI  JMP=010  ;;    \ Infinite loop

\  Restart at address 4
   4 ::  ;;
   5 ::  SOURCE=DHI  DEST=DLO   ALU=0   DEST=DHI ;;
   6 ::  SOURCE=DHI  DEST=STATUS              DECODE ;;
   7 ::  SOURCE=DLO  ALU=B   DEST=DHI              END  ;;

;;END
```

SCREEN #185

```
\  MICROCODE --- TOGGLE(6)
DECIMAL  CROSS-COMPILER   \ Works on 8-bit value
94 OPCODE: TOGGLE    ( ADDR B -> )
   0 ::  SOURCE=DS  DEST=DLO ;;
 \ Fetch operand
   1 ::  SOURCE=DLO  DEST=ADDRESS-LATCH   INC[DP] ;;
   2 ::  SOURCE=RAM-BYTE   DEST=DLO ;;
   3 ::  SOURCE=DLO  ALU=AxorB   DEST=DHI ;;
   4 ::  SOURCE=DHI  DEST=RAM-BYTE               DECODE  ;;
   5 ::  SOURCE=DS  ALU=B  DEST=DHI   INC[DP]   END  ;;

;;END
```

SCREEN #186

```
\  MICROCODE --- U*(36)
DECIMAL  CROSS-COMPILER
96 OPCODE: U*   ( U1 U2 -> UD3 )
\  ALU LATCH = U1  DLO = U2    DHI/DLO = PRODUCT
   0 ::  SOURCE=DHI  DEST=DLO    ;;
   1 ::  SR[DLO]  ;;
   2 ::  SOURCE=DS  ALU=0  DEST=DHI SR[DLO]  JMP=10L ;;

\ NOTE:  MULTIPLY sets holds the ALU latch with U1
( BIT 0 )
   4 ::  MULTIPLY  ALU=A+0 SR[ALU] SR[DLO] JMP=11L INC[MPC] ;;
   5 ::  MULTIPLY  ALU=A+B SR[ALU] SR[DLO] JMP=11L INC[MPC] ;;
( BIT 1 )
   6 ::  MULTIPLY  ALU=A+0 SR[ALU] SR[DLO] JMP=00L ;;
   7 ::  MULTIPLY  ALU=A+B SR[ALU] SR[DLO] JMP=00L ;;
```

SCREEN #187

```
\  MICROCODE --- U*  -- 2
DECIMAL  CROSS-COMPILER
97 CURRENT-OPCODE !
( BIT 2 )
   0 ::  MULTIPLY  ALU=A+0 SR[ALU] SR[DLO] JMP=01L ;;
   1 ::  MULTIPLY  ALU=A+B SR[ALU] SR[DLO] JMP=01L ;;
( BIT 3 )
   2 ::  MULTIPLY  ALU=A+0 SR[ALU] SR[DLO] JMP=10L ;;
   3 ::  MULTIPLY  ALU=A+B SR[ALU] SR[DLO] JMP=10L ;;
( BIT 4 )
   4 ::  MULTIPLY  ALU=A+0 SR[ALU] SR[DLO] JMP=11L INC[MPC] ;;
   5 ::  MULTIPLY  ALU=A+B SR[ALU] SR[DLO] JMP=11L INC[MPC] ;;
( BIT 5 )
   6 ::  MULTIPLY  ALU=A+0 SR[ALU] SR[DLO] JMP=00L ;;
   7 ::  MULTIPLY  ALU=A+B SR[ALU] SR[DLO] JMP=00L ;;
```

SCREEN #188

```
\  MICROCODE --- U*  -- 3
DECIMAL  CROSS-COMPILER
98 CURRENT-OPCODE !
( BIT 6 )
   0 ::  MULTIPLY  ALU=A+0 SR[ALU] SR[DLO] JMP=01L ;;
   1 ::  MULTIPLY  ALU=A+B SR[ALU] SR[DLO] JMP=01L ;;
( BIT 7 )
   2 ::  MULTIPLY  ALU=A+0 SR[ALU] SR[DLO] JMP=10L ;;
   3 ::  MULTIPLY  ALU=A+B SR[ALU] SR[DLO] JMP=10L ;;
( BIT 8 )
   4 ::  MULTIPLY  ALU=A+0 SR[ALU] SR[DLO] JMP=11L INC[MPC] ;;
   5 ::  MULTIPLY  ALU=A+B SR[ALU] SR[DLO] JMP=11L INC[MPC] ;;
( BIT 9 )
   6 ::  MULTIPLY  ALU=A+0 SR[ALU] SR[DLO] JMP=00L ;;
   7 ::  MULTIPLY  ALU=A+B SR[ALU] SR[DLO] JMP=00L ;;
```

```
SCREEN #189
\  MICROCODE --- U*  -- 4
DECIMAL  CROSS-COMPILER
99 CURRENT-OPCODE !
( BIT 10 )
   0 ::  MULTIPLY  ALU=A+0 SR[ALU] SR[DLO] JMP=01L ;;
   1 ::  MULTIPLY  ALU=A+B SR[ALU] SR[DLO] JMP=01L ;;
( BIT 11 )
   2 ::  MULTIPLY  ALU=A+0 SR[ALU] SR[DLO] JMP=10L ;;
   3 ::  MULTIPLY  ALU=A+B SR[ALU] SR[DLO] JMP=10L ;;
( BIT 12 )
   4 ::  MULTIPLY  ALU=A+0 SR[ALU] SR[DLO] JMP=11L INC[MPC] ;;
   5 ::  MULTIPLY  ALU=A+B SR[ALU] SR[DLO] JMP=11L INC[MPC] ;;
( BIT 13 )
   6 ::  MULTIPLY  ALU=A+0 SR[ALU] SR[DLO] JMP=00L ;;
   7 ::  MULTIPLY  ALU=A+B SR[ALU] SR[DLO] JMP=00L ;;

SCREEN #190
\  MICROCODE --- U*  -- 5
DECIMAL  CROSS-COMPILER
100 CURRENT-OPCODE !
( BIT 14 )
   0 ::  MULTIPLY  ALU=A+0 SR[ALU] SR[DLO] JMP=01L ;;
   1 ::  MULTIPLY  ALU=A+B SR[ALU] SR[DLO] JMP=01L ;;
( BIT 15 )
   2 ::  MULTIPLY  ALU=A+0 SR[ALU] SR[DLO] JMP=10L ;;
   3 ::  MULTIPLY  ALU=A+B SR[ALU] SR[DLO] JMP=10L ;;
( BIT 16 )
   4 ::  MULTIPLY  ALU=A+0 SR[ALU] SR[DLO] JMP=11L INC[MPC] ;;
   5 ::  MULTIPLY  ALU=A+B SR[ALU] SR[DLO] JMP=11L INC[MPC] ;;
( BIT 17 )
   6 ::  MULTIPLY  ALU=A+0 SR[ALU] SR[DLO] JMP=00L ;;
   7 ::  MULTIPLY  ALU=A+B SR[ALU] SR[DLO] JMP=00L ;;

SCREEN #191
\  MICROCODE --- U*  -- 6
DECIMAL  CROSS-COMPILER
101 CURRENT-OPCODE !
( BIT 18 )
   0 ::  MULTIPLY  ALU=A+0 SR[ALU] SR[DLO] JMP=01L ;;
   1 ::  MULTIPLY  ALU=A+B SR[ALU] SR[DLO] JMP=01L ;;
( BIT 19 )
   2 ::  MULTIPLY  ALU=A+0 SR[ALU] SR[DLO] JMP=10L ;;
   3 ::  MULTIPLY  ALU=A+B SR[ALU] SR[DLO] JMP=10L ;;
( BIT 20 )
   4 ::  MULTIPLY  ALU=A+0 SR[ALU] SR[DLO] JMP=11L INC[MPC] ;;
   5 ::  MULTIPLY  ALU=A+B SR[ALU] SR[DLO] JMP=11L INC[MPC] ;;
( BIT 21 )
   6 ::  MULTIPLY  ALU=A+0 SR[ALU] SR[DLO] JMP=00L ;;
   7 ::  MULTIPLY  ALU=A+B SR[ALU] SR[DLO] JMP=00L ;;

SCREEN #192
\  MICROCODE --- U*  -- 7
DECIMAL  CROSS-COMPILER
102 CURRENT-OPCODE !
( BIT 22 )
```

```
   0 ::  MULTIPLY  ALU=A+O SR[ALU] SR[DLO] JMP=O1L ;;
   1 ::  MULTIPLY  ALU=A+B SR[ALU] SR[DLO] JMP=O1L ;;
( BIT 23 )
   2 ::  MULTIPLY  ALU=A+O SR[ALU] SR[DLO] JMP=1OL ;;
   3 ::  MULTIPLY  ALU=A+B SR[ALU] SR[DLO] JMP=1OL ;;
( BIT 24 )
   4 ::  MULTIPLY  ALU=A+O SR[ALU] SR[DLO] JMP=11L INC[MPC] ;;
   5 ::  MULTIPLY  ALU=A+B SR[ALU] SR[DLO] JMP=11L INC[MPC] ;;
( BIT 25 )
   6 ::  MULTIPLY  ALU=A+O SR[ALU] SR[DLO] JMP=OOL ;;
   7 ::  MULTIPLY  ALU=A+B SR[ALU] SR[DLO] JMP=OOL ;;
```

SCREEN #193

```
\  MICROCODE --- U*  -- 8
DECIMAL  CROSS-COMPILER
103 CURRENT-OPCODE !
( BIT 26 )
   0 ::  MULTIPLY  ALU=A+O SR[ALU] SR[DLO] JMP=O1L ;;
   1 ::  MULTIPLY  ALU=A+B SR[ALU] SR[DLO] JMP=O1L ;;
( BIT 27 )
   2 ::  MULTIPLY  ALU=A+O SR[ALU] SR[DLO] JMP=1OL ;;
   3 ::  MULTIPLY  ALU=A+B SR[ALU] SR[DLO] JMP=1OL ;;
( BIT 28 )
   4 ::  MULTIPLY  ALU=A+O SR[ALU] SR[DLO] JMP=11L INC[MPC] ;;
   5 ::  MULTIPLY  ALU=A+B SR[ALU] SR[DLO] JMP=11L INC[MPC] ;;
( BIT 29 )
   6 ::  MULTIPLY  ALU=A+O SR[ALU] SR[DLO] JMP=OOL ;;
   7 ::  MULTIPLY  ALU=A+B SR[ALU] SR[DLO] JMP=OOL ;;
```

SCREEN #194

```
\  MICROCODE --- U*  -- 9
DECIMAL  CROSS-COMPILER
104 CURRENT-OPCODE !
( BIT 30 )
   0 ::  MULTIPLY  ALU=A+O SR[ALU] SR[DLO] JMP=O1L ;;
   1 ::  MULTIPLY  ALU=A+B SR[ALU] SR[DLO] JMP=O1L ;;
( BIT 31 )
   2 ::  MULTIPLY  ALU=A+O SR[ALU] SR[DLO] JMP=100 DECODE ;;
   3 ::  MULTIPLY  ALU=A+B SR[ALU] SR[DLO] JMP=100 DECODE ;;

   4 ::  SOURCE=DLO  DEST=DS         END ;;

;;END
```

SCREEN #195

```
\  MICROCODE --- U/MOD(39/40)
DECIMAL  CROSS-COMPILER
\  Max divisor is 7FFFFFFF  Max dividend is 7FF...FF
105 OPCODE: U/MOD    ( UD1DVDND U2DIVISOR -> UREM UQUOT )
\ ALU LATCH=DIVISOR
```

```
\ DHI=DIVIDEND(HI)  DLO=DIVIDEND(LO)
\ DHI=REMAINDER     DLO=QUOTIENT

\ Shuffle operands around
   0 ::  SOURCE=DS   DEST=LATCH ;;
   1 ::  SOURCE=DHI  DEST=DS    ALU=B  DEST=DHI INC[DP] ;;
   2 ::  SOURCE=DS  DEST=DLO   DEC[DP]   ;;
\ Initial subtraction
   3 ::  SOURCE=DS  ALU=A-B  DEST=DHI SL[ALU]  SL[DLO] ;;
( *** CONTINUED ON NEXT SCREEN *** )

SCREEN #196
\  MICROCODE --- U/MOD  - 2
DECIMAL  CROSS-COMPILER
( **** Continuation of opcode page # 105 **** )
( BIT 0 )   4 :: DIVIDE SL[DLO] SL[ALU] ;;
( BIT 1 )   5 :: DIVIDE SL[DLO] SL[ALU]   INC[MPC] ;;
( BIT 2 )   6 :: DIVIDE SL[DLO] SL[ALU]   JMP=000 ;;

SCREEN #197
\  MICROCODE --- U/MOD  - 3
DECIMAL  CROSS-COMPILER
106 CURRENT-OPCODE !
( BIT 3 )   0 :: DIVIDE SL[DLO] SL[ALU] ;;
( BIT 4 )   1 :: DIVIDE SL[DLO] SL[ALU] ;;
( BIT 5 )   2 :: DIVIDE SL[DLO] SL[ALU] ;;
( BIT 6 )   3 :: DIVIDE SL[DLO] SL[ALU] ;;
( BIT 7 )   4 :: DIVIDE SL[DLO] SL[ALU] ;;
( BIT 8 )   5 :: DIVIDE SL[DLO] SL[ALU] ;;
( BIT 9 )   6 :: DIVIDE SL[DLO] SL[ALU]   INC[MPC] ;;
( BIT 10 )   7 :: DIVIDE SL[DLO] SL[ALU]   JMP=000 ;;

SCREEN #198
\  MICROCODE --- U/MOD  - 4
DECIMAL  CROSS-COMPILER
107 CURRENT-OPCODE !
( BIT 11 )   0 :: DIVIDE SL[DLO] SL[ALU] ;;
( BIT 12 )   1 :: DIVIDE SL[DLO] SL[ALU] ;;
( BIT 13 )   2 :: DIVIDE SL[DLO] SL[ALU] ;;
( BIT 14 )   3 :: DIVIDE SL[DLO] SL[ALU] ;;
( BIT 15 )   4 :: DIVIDE SL[DLO] SL[ALU] ;;
( BIT 16 )   5 :: DIVIDE SL[DLO] SL[ALU] ;;
( BIT 17 )   6 :: DIVIDE SL[DLO] SL[ALU]   INC[MPC] ;;
( BIT 18 )   7 :: DIVIDE SL[DLO] SL[ALU]   JMP=000 ;;
```

```
SCREEN #199
\  MICROCODE --- U/MOD  - 5
DECIMAL  CROSS-COMPILER
108 CURRENT-OPCODE !
( BIT 19 )   0 :: DIVIDE SL[DLO] SL[ALU] ;;
( BIT 20 )   1 :: DIVIDE SL[DLO] SL[ALU] ;;
( BIT 21 )   2 :: DIVIDE SL[DLO] SL[ALU] ;;
( BIT 22 )   3 :: DIVIDE SL[DLO] SL[ALU] ;;
( BIT 23 )   4 :: DIVIDE SL[DLO] SL[ALU] ;;
( BIT 24 )   5 :: DIVIDE SL[DLO] SL[ALU] ;;
( BIT 25 )   6 :: DIVIDE SL[DLO] SL[ALU]   INC[MPC] ;;
( BIT 26 )   7 :: DIVIDE SL[DLO] SL[ALU]   JMP=000 ;;

SCREEN #200
\  MICROCODE --- U/MOD  - 6
DECIMAL  CROSS-COMPILER
109 CURRENT-OPCODE !
( BIT 27 )   0 :: DIVIDE SL[DLO] SL[ALU] ;;
( BIT 28 )   1 :: DIVIDE SL[DLO] SL[ALU] ;;
( BIT 29 )   2 :: DIVIDE SL[DLO] SL[ALU] ;;
( BIT 30 )   3 :: DIVIDE SL[DLO] SL[ALU] INC[MPC] ;;
( BIT 31 )   4 :: DIVIDE SL[DLO]         JMP=000  ;;

SCREEN #201
\  MICROCODE --- U/MOD  - 7
DECIMAL  CROSS-COMPILER
110 CURRENT-OPCODE !
\ Test sign of result
   0 ::  SOURCE=DHI        INC[DP]  JMP=01S ;;

\ Result >= 0  Don't add divisor back
   2 ::  SOURCE=DHI  DEST=DS  JMP=111  DECODE ;;
   7 ::  SOURCE=DLO  ALU=B  DEST=DHI      END ;;

\ Result < 0  Add divisor to remainder
   3 ::  SOURCE=DHI   ALU=A+B  DEST=DHI  JMP=010    ;;

;;END
```

```
SCREEN #202
 \   MICRODODE --- WORDSWAP(2)      (ROLL 16 BITS RIGHT)
 DECIMAL  CROSS-COMPILER
 111 OPCODE: WORDSWAP     ( N1 -> N2 )
    0 ::  ALU=A  ROLL[ALU]   DEST=DHI    DECODE ;;
    1 ::  ALU=A  ROLL[ALU]   DEST=DHI    END ;;

 ;;END
```

```
SCREEN #203
 \   MICROCODE --- XOR(2)
 DECIMAL  CROSS-COMPILER
 112 OPCODE: XOR   ( N1 N2 -> N3 )
    0 ::  SOURCE=DS  ALU=AxorB  DEST=DHI INC[DP]  DECODE ;;
    1 ::                                            END  ;;

 ;;END
```

```
SCREEN #204
```

```
SCREEN #205
 \   MICROCODE --- SWAP_DROP (2)
 DECIMAL  CROSS-COMPILER
 120 OPCODE: SWAP_DROP     ( N1 N2 -> N1 )
    0 ::  INC[DP]                                  DECODE ;;
    1 ::                                           END ;;
```

```
;;END
```

SCREEN #206

```
\  MICROCODE --- <CM-STEP>(10/3)
DECIMAL  CROSS-COMPILER
\ CMOVE step
121 OPCODE: <CM-STEP> ( SRCADDR DESTADDR U -> S+1 D+1 U-1 DONE?)
   0 ::  ALU=A-1  DEST=DHI   DEC[DP]    JMP=01Z  ;;
( Count not = 0 -- continue )
   3 ::  SOURCE=DHI  DEST=DS INC[DP]     ALU=0  DEST=DHI ;;
   4 ::  INC[DP]  ALU=A+1 ;;
   5 ::  SOURCE=DS  DEST=ADDRESS-LATCH   ALU=A+B    DEST=DHI ;;
\ Fetch source byte
   6 ::  SOURCE=DHI  DEST=DS  DEC[DP]                 INC[MPC] ;;
   7 ::  SOURCE=RAM-BYTE  DEST=DLO   ALU=0 DEST=DHI  JMP=000  ;;

( Count = 0 -- stop )
   2 ::                          DECODE   JMP=001 ;;
   1 ::  SOURCE=DHI  DEST=DS    ALU=-1  DEST=DHI  END ;;
```

SCREEN #207

```
\  MICROCODE --- <CM-STEP> --2
DECIMAL  CROSS-COMPILER
122 CURRENT-OPCODE !
\ Store destination byte
   0 ::  ALU=A+1 ;;
   1 ::  SOURCE=DS DEST=ADDRESS-LATCH   ALU=A+B DEST=DHI ;;
   2 ::  SOURCE=DHI  DEST=DS  DEC[DP]    ;;
   3 ::  SOURCE=DLO DEST=RAM-BYTE       ;;
   4 ::                                       DECODE ;;
   5 ::                         ALU=0  DEST=DHI  END    ;;
;;END
```

SCREEN #208

```
\  MICROCODE --- <<CM-STEP>(11/3)
DECIMAL  CROSS-COMPILER
\ CMOVE step
123 OPCODE: <<CM-STEP> ( SRCAD DSTAD U -> S-1 D-1 U-1 DONE? )
   0 ::  ALU=A-1  DEST=DHI  DEC[RP]     JMP=01Z  ;;
( Count not = 0 -- continue )
   3 ::  SOURCE=DHI  DEST=RS INC[DP]     ALU=-1  DEST=DHI ;;
\ Fetch source byte
   4 ::  SOURCE=DS DEST=ADDRESS-LATCH    ALU=A+B DEST=DHI ;;
   5 ::  SOURCE=DHI  DEST=DS  DEC[DP]                INC[MPC] ;;
   6 ::  SOURCE=RAM-BYTE  DEST=DLO  ALU=-1 DEST=DHI  JMP=000  ;;
```

```
( Count = 0 -- stop )
   2 ::  DEC[DP]      INC[RP]  DECODE   JMP=001 ;;
   1 ::  SOURCE=DHI  DEST=DS     ALU=-1  DEST=DHI  END ;;
```

```
SCREEN #209
\  MICROCODE --- <<CM-STEP> --2
DECIMAL  CROSS-COMPILER
124 CURRENT-OPCODE !
\ Store destination byte
   0 ::  SOURCE=DS DEST=ADDRESS-LATCH ALU=A+B DEST=DHI ;;
   2 ::  SOURCE=DHI  DEST=DS  DEC[DP]    ;;
   1 ::  SOURCE=DLO DEST=RAM-BYTE  ;;
   3 ::  SOURCE=RS  DEST=DLO ALU=0  DEST=DHI INC[RP]   DECODE ;;
   4 ::  SOURCE=DLO DEST=DS  END ;;
;;END
SPECIAL
```

```
SCREEN #210
\  MICROCODE --- ORC!(6)
DECIMAL  CROSS-COMPILER
125 OPCODE: ORC!    ( B  ADDR -> )
 \ Fetch operand
   0 ::  SOURCE=DS  INC[DP]  ;;  \ Load N into bus latc
   1 ::  SOURCE=DHI  DEST=ADDRESS-LATCH   ALU=B  DEST=DHI ;;
   2 ::  SOURCE=RAM-BYTE   DEST=DLO ;;
   3 ::  SOURCE=DLO  ALU=AorB   DEST=DHI ;;
   4 ::  SOURCE=DHI  DEST=RAM-BYTE                DECODE  ;;
   5 ::  SOURCE=DS  ALU=B  DEST=DHI   INC[DP]    END  ;;
;;END
```

```
SCREEN #211
\  MICROCODE --- 4*(2)
DECIMAL  CROSS-COMPILER
126 OPCODE: 4*    ( N -> N+N )
\ Get a 0 into highest bit of DLO for shift operation
   0 ::  ALU=A+A  SR[DLO] DEST=DHI        DECODE  ;;
   1 ::  ALU=A    SL[ALU] DEST=DHI        END     ;;
;;END
```

SCREEN #212

```
\  MICROCODE --- <INTERRUPT>(11)  Interrupt service word
DECIMAL  CROSS-COMPILER    \ MUST be op-code 1 !!!!!!
1 OPCODE: <INTERRUPT>
   ( -> PAGE&ADDR-CNT INT-FLAGS )
   0 ::  ;;
   1 ::  SOURCE=ADDRESS-COUNTER  DEST=DLO DEC[DP] ;;
   2 ::  SOURCE=DHI DEST=DS   DEC[DP] ;;
   3 ::  SOURCE=DLO    DEST=DS   ALU=0  DEST=DHI  ;;
   4 ::  SOURCE=DHI  DEST=ADDRESS-COUNTER    ;;
\ Place -1 in flags to mask interrupts
   5 ::  SOURCE=FLAGS    ALU=-1  DEST=DHI        INC[MPC] ;;
   6 ::  SOURCE=DHI  DEST=FLAGS  ALU=B DEST=DHI    JMP=000 ;;
```

SCREEN #213

```
\  MICROCODE --- <INTERRUPT> --2
DECIMAL  CROSS-COMPILER
2 CURRENT-OPCODE !
\ Execute program at address 0
   0 :: SOURCE=RAM  DEST=DECODE DECODE ;;
   1 ::   END ;;

;;END
POISON  SPECIAL
```

SCREEN #214

```
\  MICROCODE --- SET-FLAGS (6)
DECIMAL  CROSS-COMPILER
127 OPCODE: SET-FLAGS   ( NEW-FLAG-WORD -> OLD-FLAG-WORD )
   0 ::  ;;
   1 ::  SOURCE=FLAGS  DEST=DLO ;;
   2 ::  SOURCE=DHI  DEST=FLAGS    ;;
   3 ::  SOURCE=DLO                ALU=B  DEST=DHI ;;
   4 ::  DECODE ;;
   5 ::  END ;;
;;END
```

SCREEN #215

```
\  MICROCODE --- RTI(6)  Return from interrupt
DECIMAL  CROSS-COMPILER
128 OPCODE: RTI
   ( PAGE&ADDR-CNT INT-FLAGS  -> )
   0 ::  SOURCE=DHI  DEST=FLAGS ;;
   1 ::  SOURCE=DS  DEST=PAGE   ;;
```

```
    2 ::  SOURCE=DS  DEST=ADDRESS-COUNTER  INC[DP] ;;
    3 ::  ;;
    4 ::  SOURCE=RAM  DEST=DECODE     DECODE ;;
    5 ::  SOURCE=DS  ALU=B  DEST=DHI  INC[DP]  END ;;

;;END
POISON  SPECIAL
```

SCREEN #216

```
\  MICROCODE --- WFILL(8+2*N)
DECIMAL  CROSS-COMPILER
129 OPCODE: WFILL  ( ADDR WORD-COUNT WORD -> )
  \  Move count to DHI and value to DS
    0 ::  SOURCE=DS   DEST=LATCH ;;
    1 ::  SOURCE=LATCH  ALU=B  DEST=DHI
                SOURCE=DHI DEST=DS  INC[DP] ;;
  \ Stash ADC value in DLO, set ADC to ADDR for fill
    2 ::  SOURCE=ADDRESS-COUNTER  DEST=DLO ;; \ Save ADC
    3 ::  SOURCE=DS  DEST=ADDRESS-COUNTER  ALU=A-1  DEST=DHI
                   DEC[DP]  INC[MPC] ;;
    4 ::                            JMP=OOS ;;
```

SCREEN #217

```
\  MICROCODE --- WFILL  --2
DECIMAL  CROSS-COMPILER
130 CURRENT-OPCODE !
( Fill another word )
    0 ::  SOURCE=DS  DEST=RAM          ALU=A-1  DEST=DHI
               INC[ADC]     JMP=111 ;;
    7 ::  SOURCE=ADDRESS-COUNTER  DEST=ADDRESS-LATCH JMP=OOS ;;

( Done )
    1 ::  INC[DP] SOURCE=DLO DEST=ADDRESS-COUNTER ;;
    2 ::  INC[DP]   DECODE ;;
    3 ::  SOURCE=DS  ALU=B  DEST=DHI  INC[DP]  END ;;

;;END
```

SCREEN #218

```
\  MICROCODE --- 1(3)
DECIMAL  CROSS-COMPILER       \  ( Used by xcompiler!)
137 OPCODE: 1   ( -> 1 )
    0 ::  DEC[DP]  SOURCE=DHI  DEST=DLO
                 ALU=0 DEST=DHI       ;;
    1 ::  SOURCE=DLO DEST=DS
                 ALU=A+1  DEST=DHI   DECODE  ;;
    2 ::  END ;;
;;END
```

```
SCREEN #219
\  MICROCODE --- COUNT-DOWN (3/4)    Favors taking the branch
DECIMAL  CROSS-COMPILER  \ Similar to DUP_1-_SWAP_0=_0BRANCH
138 OPCODE: <COUNT-DOWN> ( FLAG -> ../FLAG ) \ BUT drops at end!
\   0 flag => branch    non-0 flag => go to next instruction
    \ Must ALWAYS be used with a CALL attribute!|!!!
    0 ::  SOURCE=ADDRESS-COUNTER DEST=DLO  JMP=01Z ;;
\ FLAG=0    Allow compiled branch to take affect
    3 ::  ALU=A-1  DEST=DHI   INC[RP]   DECODE ;;
    4 ::  END ;;
\ FLAG<>0   Override compiled branch
    2 ::  SOURCE=DLO  DEST=ADDRESS-COUNTER JMP=101 ;;
                \ Wait for RAM access
    5 ::  SOURCE=RAM  DEST=DECODE   INC[RP] DECODE ;;
    6 ::  SOURCE=DS  ALU=B  DEST=DHI   INC[DP]  END ;;
;;END   POISON SPECIAL
```

```
SCREEN #220
\  MICROCODE --- @+(5)
DECIMAL  CROSS-COMPILER
139 OPCODE: @+    ( N1 ADDR -> N2 )
    0 ::  SOURCE=DS   ;;
    1 ::  SOURCE=DHI   DEST=ADDRESS-LATCH    ALU=B DEST=DHI ;;
    2 ::  SOURCE=RAM  DEST=DLO     ;;
    3 ::  SOURCE=DLO  ALU=A+B  DEST=DHI  INC[DP] DECODE    ;;
    4 ::  END ;;

;;END
```

```
SCREEN #221
\  MICROCODE --- 3_PICK (4)
DECIMAL  CROSS-COMPILER
140 OPCODE: 3_PICK  ( N1 N2 N3 N4 -> N1 N2 N3 N4  N2 )
    0 ::  SOURCE=DHI  DEST=DLO          INC[DP] ;;
    1 ::  SOURCE=DS   ALU=B  DEST=DHI   DEC[DP] ;;
    2 ::                DEC[DP]                        DECODE ;;
    3 ::  SOURCE=DLO  DEST=DS                          END    ;;

;;END
```

```
SCREEN #222
\   MICROCODE --- 4_PICK (6)
DECIMAL  CROSS-COMPILER
141 OPCODE: 4_PICK   ( N1 N2 N3 N4 -> N1 N2 N3 N4  N1 )
   0 ::  SOURCE=DHI  DEST=DLO            INC[DP] ;;
   1 ::   INC[DP] ;;
   2 ::  SOURCE=DS   ALU=B  DEST=DHI    DEC[DP] ;;
   3 ::                 DEC[DP]       ;;
   4 ::                 DEC[DP]                       DECODE ;;
   5 ::  SOURCE=DLO  DEST=DS                          END    ;;
;;END
```

```
SCREEN #223
\   MICROCODE --- D>R(4)
DECIMAL  CROSS-COMPILER
142 OPCODE: D>R     ( N1 N2  -> )    ( Return: -> N2 N1 )
   0 ::  DEC[RP] ;;
   1 ::  SOURCE=DHI  DEST=RS   DEC[RP] ;;
   2 ::  SOURCE=DS   DEST=RS   INC[DP]  DECODE ;;
   3 ::  SOURCE=DS   ALU=B  DEST=DHI   INC[DP]  END ;;
;;END
POISON SPECIAL
```

```
SCREEN #224
\   MICROCODE --- DR>(5)
DECIMAL  CROSS-COMPILER
143 OPCODE: DR>     ( -> N1 N2 )    ( return: N2 N1 -> )
   0 ::  DEC[DP] ;;
   1 ::  SOURCE=DHI  DEST=DS   DEC[DP] ;;
   2 ::  SOURCE=RS  DEST=DS               INC[RP]   ;;
   3 ::  SOURCE=RS  DEST=DLO              INC[RP]  DECODE ;;
   4 ::  SOURCE=DLO  ALU=B  DEST=DHI                END  ;;
;;END
POISON SPECIAL
```

```
SCREEN #225
\   MICROCODE --- DROT (13)
DECIMAL  CROSS-COMPILER
144 OPCODE: DROT    ( D1 D2 D3 -> D2 D3 D1 )
   0 ::  ;;
   1 ::  DEC[RP] ;;
```

```
  \ Transfer D3 to RS
   2 ::  SOURCE=DHI  DEST=RS  DEC[RP] ;;
   3 ::  SOURCE=DS   DEST=RS   DEC[RP]  INC[DP] ;;
  \ Transfer D2 to RS
   4 ::  SOURCE=DS   DEST=RS   DEC[RP]  INC[DP] ;;
   5 ::  SOURCE=DS   DEST=RS            INC[DP] ;;
  \ Transfer D1 to DHI:DLO
   6 ::  SOURCE=DS   ALU=B DEST=DHI     INC[DP] INC[MPC] ;;
   7 ::  SOURCE=DS   DEST=DLO                   JMP=000 ;;
```

```
SCREEN #226
\  MICROCODE --- DROT --2
DECIMAL  CROSS-COMPILER
145 CURRENT-OPCODE !
  \ Transfer D2 from RS to DS
   0 ::  SOURCE=RS   DEST=DS   INC[RP]  DEC[DP] ;;
   1 ::  SOURCE=RS   DEST=DS   INC[RP]  DEC[DP] ;;
  \ Transfer D3 from RS to DS
   2 ::  SOURCE=RS   DEST=DS   INC[RP]  DEC[DP] ;;
   3 ::  SOURCE=RS   DEST=DS   INC[RP]  DEC[DP]  DECODE ;;
  \ Transfer D1(LO)  from DLO to DS
   4 ::  SOURCE=DLO  DEST=DS   END ;;

;;END
```

```
SCREEN #227
\  MICROCODE --- DOVER (7)
DECIMAL  CROSS-COMPILER
146 OPCODE: DOVER  ( D1 D2 -> D1 D2 D1 )
   0 ::  INC[DP] ;;
\ Save D1 in RS:DLO
   1 ::  DEC[RP] INC[DP]  ;;
   2 ::  SOURCE=DS  DEST=DLO          DEC[DP] ;;
   3 ::  SOURCE=DS  DEST=RS           DEC[DP] ;;
\ Transfer D2hi and D1lo to DS
   4 ::  SOURCE=RS    DEST=LATCH  DEC[DP] INC[RP] ;;
   5 ::  SOURCE=DHI  DEST=DS  ALU=B DEST=DHI   DEC[DP] DECODE ;;
   6 ::  SOURCE=DLO   DEST=DS                          END ;;

;;END
```

```
SCREEN #228
\  MICROCODE --- D= (5/6)
DECIMAL  CROSS-COMPILER
147 OPCODE: D=  ( D1 D2 -> =FLAG )
\ Save D2(lo) in DLO
   0 ::  SOURCE=DS   DEST=DLO    INC[DP] ;;
\ Compare hi halves
   1 ::  SOURCE=DS   ALU=AxorB  DEST=DHI    INC[DP] ;;
   2 ::  SOURCE=DS   ALU=B  DEST=DHI   INC[DP]   JMP=10Z ;;
\ Not =
   5 ::  DECODE JMP=111  ;;
   7 ::  ALU=0  DEST=DHI  END ;;
```

```
\ Hi halves =
   4 ::  SOURCE=DLO   ALU=AxorB  DEST=DHI  JMP=011 ;;
   3 ::  JMP=11Z  DECODE ;;
   6 ::  ALU=-1 DEST=DHI  END ;;     ( Results = )
;;END
```

SCREEN #229

```
\  MICROCODE --- <UNORM> (6+4*X)
DECIMAL  CROSS-COMPILER
148 OPCODE: <UNORM>    ( MANT EXP -> MANT EXP )
   0 ::  SOURCE=DS  DEST=DLO
          ALU=A+1   DEST=DHI    JMP=010 ;;
\ Loop for justifying.  DHI = 0 after shift while in loop
   2 ::  ALU=A-1  DEST=DHI    JMP=100 ;;
   4 ::  SOURCE=DHI  DEST=DS
              ALU=0  CIN=0  SL[DLO]  SL[ALU] DEST=DHI ;;
   5 ::  ALU=A  DEST=DHI ;;  ( Allow Z bit to be set )
   6 ::  SOURCE=DS   ALU=B    DEST=DHI    JMP=01Z ;;

\ Un-shift two bits
   3 ::  ALU=-1  SR[DLO]  JMP=111   INC[MPC] ;;
   7 ::  ALU=0   SR[DLO]             JMP=000  ;;
```

SCREEN #230

```
\  MICROCODE --- <UNORM> --2
DECIMAL  CROSS-COMPILER
149 CURRENT-OPCODE !
\ Finish up at end
   0 ::  SOURCE=DS   ALU=B  DEST=DHI                      ;;
   1 ::  SOURCE=DLO  DEST=DS   ALU=A+1 DEST=DHI  DECODE ;;
   2 ::  END ;;
;;END
```

SCREEN #231

```
\  MICROCODE --- <UDNORM>
DECIMAL  CROSS-COMPILER
150 OPCODE: <UDNORM>   ( DMANT EXP -> DMANT EXP )
\ SETUP:  DLO = DMANTLO  DHI = DMANTHI  DS = EXP
\ Use RS as temp holding location for DMANTHI
   0 ::  SOURCE=DS  DEST=LATCH   ALU=A+1  DEST=DHI ;;
   1 ::  SOURCE=DHI  DEST=DS     INC[DP]     DEC[RP]
            SOURCE=LATCH  ALU=B  DEST=DHI      ;;
   2 ::  SOURCE=DS  DEST=DLO     DEC[DP]     INC[MPC] ;;
   3 ::  SOURCE=DHI  DEST=RS                 JMP=00S ;;
```

```
SCREEN #232
\  MICROCODE --- <UDNORM>  --2
DECIMAL  CROSS-COMPILER
151 CURRENT-OPCODE !
\ SETUP:  DLO = DMANTLO  DHI = RS = DMANTHI  DS = EXP
\ Sign bit zero -- do another shift
   0 ::  SOURCE=DS  DEST=LATCH
           ALU=A  CIN=0 SL[DLO]  SL[ALU]  DEST=DHI JMP=100  ;;
   4 ::  SOURCE=DHI  DEST=RS    SOURCE=LATCH  ALU=B DEST=DHI ;;
   5 ::  SOURCE=RS  DEST=LATCH  ALU=A-1  DEST=DHI  ;;
   6 ::  SOURCE=DHI DEST=DS
                  SOURCE=LATCH ALU=B DEST=DHI ;;
   7 ::  SOURCE=RS  DEST=LATCH      JMP=00S  ;;

SCREEN #233
\  MICROCODE --- <UDNORM>  --3
DECIMAL  CROSS-COMPILER
151 CURRENT-OPCODE !
\ Done -- shift right 1 bit and end
   1 ::  SOURCE=LATCH ALU=B  SR[ALU]  SR[DLO]  CIN=0 DEST=DHI
            SOURCE=DHI   INC[DP] INC[RP]       INC[MPC]  ;;
   2 ::  SOURCE=DLO DEST=DS   DEC[DP]    JMP=000   ;;

152 CURRENT-OPCODE !
   0 ::  SOURCE=DS  DEST=LATCH                  DECODE ;;
   1 ::  SOURCE=DHI  DEST=DS
            SOURCE=LATCH  ALU=B  DEST=DHI    END ;;
;;END

SCREEN #234
\  MICROCODE --- C+!(6)
DECIMAL  CROSS-COMPILER
153 OPCODE: C+!   ( N  ADDR -> )
 \ Fetch operand
   0 ::  SOURCE=DS  INC[DP]  ;;  \ Load N into bus latch
   1 ::  SOURCE=DHI  DEST=ADDRESS-LATCH   ALU=B  DEST=DHI ;;
   2 ::  SOURCE=RAM-BYTE  DEST=DLO ;;
   3 ::  SOURCE=DLO  ALU=A+B  DEST=DHI ;;
   4 ::  SOURCE=DHI  DEST=RAM-BYTE              DECODE  ;;
   5 ::  SOURCE=DS  ALU=B  DEST=DHI   INC[DP]    END.  ;;
;;END

SCREEN #235
\  MICROCODE --- =0_?EXIT_0 (3/6)  Expert system support
DECIMAL  CROSS-COMPILER
154 OPCODE: =0_?EXIT_0   ( TRUE-FLAG -> )      \ Continue
                           ( 0    -> 0 )      \ Exit
```

```
\  0 flag => EXIT   non-0 flag => go to next instruction
\ Must ALWAYS be used with a CALL attribute!!!!!
   0 ::  JMP=01Z ;;

\ FLAG<>0   Allow compiled subroutine call to take effect
   3 ::                                JMP=001  DECODE ;;
   1 ::  SOURCE=DS  ALU=B  DEST=DHI  INC[DP]  END ;;
```

SCREEN #236

```
\  MICROCODE --- =0_?EXIT_0  --2
DECIMAL  CROSS-COMPILER
\ 154 CURRENT-OPCODE !
\ FLAG=0   Override compiled CALL plus do an EXIT
   2 ::  SOURCE=RS INC[RP]  JMP=100   ;;   \ Get 2nd return addr
   4 ::  SOURCE=RS  DEST=ADDRESS-COUNTER ;; ( Also sets latch )
              \ Wait for RAM access
   5 ::  ;;
   6 ::  SOURCE=RAM  DEST=DECODE   INC[RP] DECODE ;;
   7 ::  ALU=0  DEST=DHI  END ;;

;;END    POISON
```

SCREEN #237

```
\  MICROCODE --- <>0_?EXIT_0 (3/6)  Expert system support
DECIMAL  CROSS-COMPILER
155 OPCODE: <>0_?EXIT_0    ( TRUE-FLAG -> )      \ Continue
                            ( 0    -> 0 )      \ Exit

\  0 flag => EXIT   non-0 flag => go to next instruction
\ Must ALWAYS be used with a CALL attribute!!!!!
   0 ::  JMP=01Z ;;

\ FLAG=0    Allow compiled subroutine call to take effect
   2 ::                                JMP=001  DECODE ;;
   1 ::  SOURCE=DS  ALU=B  DEST=DHI  INC[DP]  END ;;
```

SCREEN #238

```
\  MICROCODE --- <>0_?EXIT_0  --2
DECIMAL  CROSS-COMPILER
\ 155 CURRENT-OPCODE !
\ FLAG<>0   Override compiled CALL plus do an EXIT
   3 ::  SOURCE=RS  INC[RP]   ;;   \ Get 2nd return address
   4 ::  SOURCE=RS  DEST=ADDRESS-COUNTER ;; ( Also sets latch )
              \ Wait for RAM access
   5 ::  ;;
   6 ::  SOURCE=RAM  DEST=DECODE   INC[RP] DECODE ;;
   7 ::  ALU=0  DEST=DHI  END ;;
```

```
;;END    POISON
```

SCREEN #239

```
\  MICROCODE --- <>0_?EXIT (3/6)  Expert system support
DECIMAL  CROSS-COMPILER
156 OPCODE: <>0_?EXIT      ( FALSE-FLAG -> )       \ Continue
                           ( TRUE-FLAG ->  )       \ Exit

\  non-0 flag => EXIT   0 flag => go to next instruction
\ Must ALWAYS be used with a CALL attribute!!!!!
   0 ::  JMP=01Z ;;

\ FLAG=0    Allow compiled subroutine call to take effect
   2 ::                             JMP=001  DECODE ;;
   1 ::  SOURCE=DS  ALU=B  DEST=DHI  INC[DP]  END ;;
```

SCREEN #240

```
\  MICROCODE --- <>0_?EXIT  --2
DECIMAL  CROSS-COMPILER
\ 156 CURRENT-OPCODE !
\ FLAG=0   Override compiled CALL plus do an EXIT
   3 ::  SOURCE=RS  INC[RP]   JMP=100 ;;    \ Get 2nd return addr
   4 ::  SOURCE=RS  DEST=ADDRESS-COUNTER ;; ( Also sets latch )
                \ Wait for RAM access
   5 ::  ;;
   6 ::  SOURCE=RAM  DEST=DECODE   INC[RP] DECODE ;;
   7 ::  SOURCE=DS  ALU=B  DEST=DHI  INC[DP]  END ;;

;;END    POISON
```

SCREEN #241

```
\  MICROCODE --- -1(2)
DECIMAL  CROSS-COMPILER        \  ( Used by xcompiler!)
157 OPCODE: -1  ( -> TRUE-FLAG )
   0 ::  DEC[DP]  SOURCE=DHI  DEST=DLO
                                       DECODE ;;
   1 ::  SOURCE=DLO DEST=DS
                    ALU=-1   DEST=DHI    END    ;;
;;END
```

```
SCREEN #242
\  MICROCODE --- 0=_NOT(2)        \ Forces clean flag value
DECIMAL  CROSS-COMPILER
158 OPCODE: 0=_NOT    ( N -> 0/-1 )
   0 ::  JMP=01Z                      DECODE  ;;

( <>0 )  3 ::   ALU=-1  DEST=DHI   END  ;;
(  =0 )  2 ::   ALU=0   DEST=DHI   END  ;;
;;END
```

```
SCREEN #243
\  MICROCODE --- SET-TRUE(8)    \ Expert system support
DECIMAL  CROSS-COMPILER    \ Compile as a normal opcode
159 OPCODE: SET-TRUE    ( -> )
\ In-line parameter is pointer to flag location.  Flag <-  1
\  Also performs an exit
   0 ::  DEC[DP]   SOURCE=RAM  DEST=DLO    ;;
   1 ::  SOURCE=DHI  DEST=DS    ALU=0  DEST=DHI   ;;
   2 ::  SOURCE=DLO  DEST=ADDRESS-COUNTER   ALU=A+1 DEST=DHI ;;
   3 ::  SOURCE=DHI  DEST=RAM ;;
   4 ::  SOURCE=RS  DEST=DLO ;;
   5 ::  SOURCE=DLO DEST=ADDRESS-COUNTER  INC[RP] ;;
   6 ::  SOURCE=RAM  DEST=DECODE              DECODE ;;
   7 ::  SOURCE=DS   ALU=B  DEST=DHI   INC[DP]  END ;;
;;END
POISON SPECIAL
```

```
SCREEN #244
\  MICROCODE --- SET-FALSE(8)   \ Expert system support
DECIMAL  CROSS-COMPILER    \ Compile as a normal opcode
160 OPCODE: SET-FALSE   ( -> )
\ In-line parameter is pointer to flag location.  Flag <- 0
\  Also performs an exit
   0 ::  DEC[DP]   SOURCE=RAM  DEST=DLO    ;;
   1 ::  SOURCE=DLO  DEST=ADDRESS-COUNTER   ;;
   2 ::  SOURCE=DHI  DEST=DS    ALU=0   DEST=DHI   ;;
   3 ::  SOURCE=DHI  DEST=RAM ;;
   4 ::  SOURCE=RS  DEST=DLO ;;
   5 ::  SOURCE=DLO DEST=ADDRESS-COUNTER  INC[RP] ;;
   6 ::  SOURCE=RAM  DEST=DECODE    DECODE ;;
   7 ::  SOURCE=DS   ALU=B  DEST=DHI   INC[DP]  END ;;
;;END
POISON SPECIAL
```

```
SCREEN #245
\  MICROCODE --- EXPERT-B (7)   \ Expert system support
DECIMAL  CROSS-COMPILER    \ Fetch flag value
\ Compile with a jump to the flag address
161 OPCODE: EXPERT-B    ( -> FLAG-VALUE )
```

```
\ In-line flag value fetched as target of jump.
\  Also performs an exit
   0 ::  SOURCE=RAM  DEST=DLO    DEC[DP]  ;;
   1 ::  SOURCE=DHI  DEST=DS  ;;
   2 ::  SOURCE=DLO  ALU=B  DEST=DHI ;;
   3 ::  SOURCE=RS  DEST=DLO ;;
   4 ::  SOURCE=DLO DEST=ADDRESS-COUNTER  INC[RP] ;;
   5 ::  SOURCE=RAM  DEST=DECODE               DECODE  ;;
   6 ::                                        END ;;
;;END
POISON

SCREEN #246
\  MICROCODE --- EXPERT-C (6)  \ Expert system support
DECIMAL  CROSS-COMPILER    \ Store flag value
\ Compile with a call to the flag address
162 OPCODE: EXPERT-C   ( FLAG-VALUE -> )
\ In-line flag value stored as target of jump.
\  Also performs an exit
   0 ::  SOURCE=ADDRESS-COUNTER DEST=ADDRESS-LATCH ;;
   1 ::  SOURCE=DHI  DEST=RAM   INC[RP]     ;;
   2 ::  SOURCE=RS  DEST=DLO ;;
   3 ::  SOURCE=DLO DEST=ADDRESS-COUNTER  INC[RP] ;;
   4 ::  SOURCE=RAM  DEST=DECODE  DECODE    ;;
   5 ::  SOURCE=DS   ALU=B  DEST=DHI  INC[DP]   END ;;
;;END
POISON

SCREEN #247
\  MICROCODE --- EXPERT-A (6/8) \ Expert system support
\   5 clocks if unknown,  7 clocks if known
DECIMAL  CROSS-COMPILER
\ Compile with a CALL to the rule list
163 OPCODE: EXPERT-A   ( -> FLAG-VALUE )  \ If value valid
 ( -> )  \ if value invalid -- perform call to rule list
\ Fetch flag value and test for =0 or =-1
   0 ::  SOURCE=RAM  DEST=DLO  DEC[DP] ;;  \ Get value
   1 ::  SOURCE=DHI  DEST=DS ;;
   2 ::  SOURCE=DLO  ALU=B DEST=DHI
      \ Increment address counter to point to 1st list cell
           INC[ADC]    INC[RP]  INC[MPC] ;;

\ test for flag = -1
   3 ::  SOURCE=ADDRESS-COUNTER  DEST=ADDRESS-LATCH JMP=00S ;;

SCREEN #248
\  MICROCODE --- EXPERT-A --2  \ Expert system support
DECIMAL  CROSS-COMPILER
164 CURRENT-OPCODE !
\ Flag is valid - true or false.  Perform an exit
   0 ::  SOURCE=RS  DEST=ADDRESS-COUNTER           JMP=100 ;;
   4 ::  INC[RP]                                   ;;
   5 ::  SOURCE=RAM  DEST=DECODE  DECODE ;;
   6 ::  END ;;
\ Flag = -1  -- Unknown value
\ Access rule list addr s
```

```
   1 ::  SOURCE=RAM   DEST=DECODE    DEC[RP]   DECODE ;;
\ Flag invalid value -- allow call to take place
\ POP last value from DS
   2 ::  SOURCE=DS  ALU=B  DEST=DHI  INC[DP]   END ;;
;;END    POISON
```

SCREEN #249

```
\   MICROCODE --- UNKNOWN_I_@_12_+_!_4   Expert system initing
DECIMAL  CROSS-COMPILER
165 OPCODE: UNKNOWN_I_@_12_+_!_4  ( -> 4 )
   0 ::  DEC[DP] ;;
   1 ::  SOURCE=RS  DEST=ADDRESS-LATCH ;;
   2 ::  SOURCE=ADDRESS-COUNTER  DEST=DS   ;;
   3 ::  SOURCE=RAM  DEST=DLO ;;
   4 ::  SOURCE=DLO  DEST=ADDRESS-COUNTER ;;
   5 ::  SOURCE=DHI  DEST=DLO  INC[ADC] ;;
   6 ::   INC[ADC]                    INC[MPC] ;;
   7 ::   INC[ADC]  ALU=-1  DEST=DHI   JMP=000 ;;
```

SCREEN #250

```
\   MICROCODE --- UNKNOWN_I_@_12_+_!_4   -- 2
DECIMAL  CROSS-COMPILER
166 CURRENT-OPCODE !
   0 ::  SOURCE=ADDRESS-COUNTER   DEST=ADDRESS-LATCH ;;
   1 ::  SOURCE=DHI  DEST=RAM    ALU=0  DEST=DHI    ;;
   2 ::  SOURCE=DS   DEST=ADDRESS-COUNTER   ALU=A+1 ;;
   3 ::             ALU=A+A    DEST=DHI   ;;
   4 ::     ALU=A+A  DEST=DHI             DECODE ;;
   5 ::   SOURCE=DLO  DEST=DS   END ;;
;;END
POISON
```

SCREEN #251

```
\   MICROCODE --- <LOOP>(10/12)
DECIMAL  CROSS-COMPILER
\ Always use with CALL attribute!!!!!
\ IMPLICIT LOOP RANGE SPAN OF 80000000 Hex
167 OPCODE: <LOOP>    ( -> )     ( RS: LIMIT COUNT -> ... )
\ Load address latch for destination of end-of-loop fall-through
   0 ::  DEC[DP]  ;;
   1 ::  SOURCE=DHI DEST=DS   ALU=0  DEST=DHI INC[RP] ;;
   2 ::  SOURCE=RS DEST=DLO   ALU=A+1  DEST=DHI  ;;
   3 ::  SOURCE=DLO  ALU=A+B  DEST=DHI  ;;  \ Add 1 to counter
   4 ::  SOURCE=DHI  DEST=RS INC[RP] ;;
   5 ::  SOURCE=RS   DEST=DLO   DEC[RP]   ;;
   6 ::  SOURCE=DLO ALU=A-B   DEC[RP] INC[MPC] ;; \ Test count
   7 ::  SOURCE=RS  DEST=DLO  INC[RP]  JMP=005 ;;
```

```
SCREEN #252
\  MICROCODE --- <LOOP>  -- 2
DECIMAL  CROSS-COMPILER
168 CURRENT-OPCODE !
( LOOP  ) 1 ::  DECODE JMP=100 ;;
( DONE ) 0 :: SOURCE=DLO DEST=ADDRESS-COUNTER INC[RP] JMP=010 ;;
         2 :: SOURCE=RAM  DEST=DECODE  INC[RP]
                          DECODE  JMP=100 ;;
   4 ::  SOURCE=DS   ALU=B  DEST=DHI  INC[DP]     END ;;
;;END
POISON SPECIAL
```

```
SCREEN #253
\  MICROCODE --- D+(7)  --1
DECIMAL  CROSS-COMPILER
169 OPCODE: D+    ( D1 D2 -> D3 )
   0 ::  SOURCE=DS   DEST=LATCH    \ Place D2(lo) in ALU latch
                          INC[DP]  ;;
\  Save D2(hi) in DLO register , Place D2(lo) in DHI register
   1 ::  SOURCE=DHI  DEST=DLO    INC[DP]
         SOURCE=LATCH  ALU=B  DEST=DHI  ;;
\ Compute low half of result
   2 ::  SOURCE=DS  ALU=A+B  DEST=DHI     INC[MPC] ;;
   3 ::  SOURCE=DHI  DEST=DS   DEC[DP]    JMP=10C   ;;
```

```
SCREEN #254
\  MICROCODE --- D+ --2
DECIMAL  CROSS-COMPILER
170 CURRENT-OPCODE !
( CY<>0 ) 4 :: SOURCE=DS  ALU=B  DEST=DHI     JMP=000 ;;
          0 :: SOURCE=DLO ALU=A+B+1  DEST=DHI INC[DP] DECODE ;;
          1 ::  END ;;
( CY=0 )  5 :: SOURCE=DS  ALU=B  DEST=DHI      ;;
          6 :: SOURCE=DLO ALU=A+B    DEST=DHI INC[DP] DECODE ;;
          7 ::  END ;;
;;END
```

APPENDIX A

PART II

MVP-FORTH/32 CROSS-COMPILED KERNEL

PROGRAM LISTING

WISC CPU/32 (C) 1987 BY PHIL KOOPMAN JR.

SCREEN #1

```
INDEX --- CPU/32  KERNEL & MATH SOURCE          PHIL KOOPMAN JR.
LIBRARY VERSION    FILE: KERNEL.4TH          LAST UPDATE: 6/1/87
BETA TEST VERSION  (C) COPYRIGHT 1987
BY PHIL KOOPMAN JR.
LOAD      SOURCE
SCREEN    SCREENS     CONTENTS
=======   ========    ========
2 LOAD    4 - 76      CROSS-COMPILED KERNEL SOURCE
3 LOAD    81 - 105    COMPLETED KERNEL SOURCE FOR CPU/32 LOADING
   ...    110 - 141   64-BIT INTEGER MATH PACKAGE
   ...    143 - 199   64-BIT INTEGER MATH PACKAGE
```

SCREEN #2

```
\ KERNEL LOAD SCREEN          FOR CROSS COMPILER
DECIMAL
CR ." (C) Copyright 1987 by Phil Koopman Jr." CR
CR CR ." Cross compiling kernel to CPU/32" CR CR
4 76 THRU
CR CR ." Cross compiliation completed." CR CR
." Type in:  CPU32" CR
."           3 LOAD"  CR CR
CROSS-COMPILER                  FORTH DEFINITIONS
\ LIB-FORTH STUFF
CR CR ." SET UP FILE1 AS KERNEL.4TH" CR
: SETUP  FILE1 OPEN  LOAD-ALL ;
```

SCREEN #3

```
\  MVP-FORTH --  LOAD SCREEN TO FINISH COMPILATION FROM CPU/32
DECIMAL
81 105 THRU     \ Load remainder of kernel
CR CR ." Remainder of CPU/32 kernel loaded." CR
CR ." (C) Copyright 1987 by Phil Koopman Jr." CR
CR CR ." Loading CPU/32 math support." CR
110 141 THRU    \ 64-bit integer support
143 199 THRU    \ 32-bit floating point support
CR CR ." Type in:  BYE"
```

```
   CR ."              SAVE-ALL"  CR CR
." Do a SAVE-FORTH to a DOS file name CPU32.COM if desired" CR
```

SCREEN #4

```
\  MVP-FORTH SOURCE --  DOUSE
HEX   CROSS-COMPILER
VARIABLE UP    20.   { UP ! }

: DOUSE    ( -> ADDR )
   R>  @  UP  @  +  ;

B' DOUSE  FORTH  D@ DROP OFFFC AND CROSS-COMPILER DOUSE-ADDR !
```

SCREEN #5

```
\  MVP-FORTH SOURCE -- USER VARIABLES 0 - 07
HEX   CROSS-COMPILER

( 0 USER )
( 1 USER )
( 2 USER )
 3 USER SPO              OFF.    { SPO ! }
 4 USER RO               OFF.    { RO ! }
05 USER TIB             MEM-SIZE -480. D+  { TIB ! }
06 USER WIDTH            1F.     { WIDTH ! }
07 USER WARNING          1.      { WARNING ! }

DECIMAL
```

SCREEN #6

```
\  MVP-FORTH SOURCE -- USER VARIABLES 08 - OF
HEX   CROSS-COMPILER

08 USER  FENCE
09 USER  DP              2000. { DP ! }
OA USER  VOC-LINK
OB USER  '-FIND
OC USER  '?TERMINAL
OD USER  'ABORT
OE USER  'BLOCK
OF USER  'CR

DECIMAL
```

SCREEN #7
```
\  MVP-FORTH SOURCE -- USER VARIABLES 10 - 17
HEX   CROSS-COMPILER

10 USER 'EMIT
11 USER 'EXPECT
12 USER 'INTERPRET
13 USER 'KEY
14 USER 'LOAD
15 USER 'NUMBER
16 USER 'PAGE
17 USER 'R/W

DECIMAL
```

SCREEN #8
```
\  MVP-FORTH SOURCE -- USER VARIABLES 18 - 1F
HEX   CROSS-COMPILER

18 USER 'T&SCALC
19 USER 'VOCABULARY
1A USER 'WORD
1B USER >IN           0.   ( >IN ! )
1C USER BASE          0A.  ( BASE ! )
1D USER BLK           0.   ( BLK ! )
1E USER CONTEXT
1F USER CSP

DECIMAL
```

SCREEN #9
```
\  MVP-FORTH SOURCE -- USER VARIABLES 20 - 27
HEX   CROSS-COMPILER

20 USER CURRENT
21 USER DPL
22 USER FLD
23 USER HLD
24 USER OFFSET
25 USER OUT           0. ( OUT ! )
26 USER R#
27 USER SCR

DECIMAL
```

SCREEN #10
```
\  MVP-FORTH SOURCE -- USER VARIABLES 28 - 2F
HEX   CROSS-COMPILER

28 USER STATE         0. ( STATE ! )
```

```
29 USER 'ISERVICE    \ Interrupt service vector







DECIMAL


```

```
SCREEN #11
\  MVP-FORTH SOURCE --   SP@  SP!   RP@  RP!    DEPTH
HEX   CROSS-COMPILER
: SP@    ( -> N )
   %DP@%  OFFF  AND  ;

: SP!    ( -> )
   OFFE   %DP!%  ;

: RP@    ( -> N )
   NOP %RP@%  OFFF  AND  ;

: RP!    ( -> )
   R>  OFFF   %RP!%  >R ;

: DEPTH   ( -> N )
    OFFD  SP@  -  ;       DECIMAL
```

```
SCREEN #12
\  MVP-FORTH SOURCE --  >  0>    D<  U<
HEX   CROSS-COMPILER
: 0>    ( N -> FLAG )
   0  >  ;

: D<    ( D1 D2 -> FLAG )
   ROT  DDUP =
   IF     -ROT  DNEGATE  D+  0<
   ELSE   SWAP  <   SWAP_DROP
   THEN   SWAP_DROP   ;

: U<    ( U1 U2 -> FLAG )
   0 SWAP  0 D<  ;

DECIMAL

```

```
SCREEN #13
\  MVP-FORTH SOURCE --  1  2  BL    2+ 2-    EPRINT
HEX   CROSS-COMPILER
VARIABLE EPRINT     ( 0 EPRINT ! )
2. CONSTANT 2
4. CONSTANT 4
20. CONSTANT BL
DECIMAL
: 2+    ( N1 -> N2 )
   1+  1+  ;
```

```
: 2-    ( N1 -> N2 )
   1-  1-  ;
: 4+    ( N1 -> N2 )
   4 +  ;
: 4-    ( N1 -> N2 )
   4 -  ;
```

SCREEN #14

```
\  MVP-FORTH SOURCE --  EXECUTE   <EMIT> <CR> <PAGE>
HEX   CROSS-COMPILER
VARIABLE DO-EXECUTE  -4 BDP +!  1. DATA, 1. DATA,
( DO-EXECUTE 4- )  CONSTANT EXEC-ADDR
: EXECUTE   ( ADDR -> ) ( 2 NOP's allow store before instr fetch)
   2 OR    EXEC-ADDR !  NOP DO-EXECUTE NOP ;

: <EMIT>   ( CHAR -> )
   EPRINT @
   IF  9 SYSCALL  ELSE  8 SYSCALL  THEN   DROP   1 OUT +! ;
: <CR>    ( -> )
   EPRINT @   7 SYSCALL  DROP   0 OUT ! ;

: <PAGE>   ( -> )
   1 SYSCALL   ;
DECIMAL
```

SCREEN #15

```
\  MVP-FORTH SOURCE --  <KEY>   <?TERMINAL>    INDEX
HEX   CROSS-COMPILER
: <KEY>   ( -> CHAR )
   0  2 SYSCALL   ;

: <?TERMINAL>    ( -> FLAG )
   0  5 SYSCALL   ;

DECIMAL
```

SCREEN #16

```
\  MVP-FORTH SOURCE --  DECIMAL  HEX
HEX   CROSS-COMPILER
: DECIMAL     0A   BASE !   ;
: HEX         10   BASE !   ;


DECIMAL
```

SCREEN #17
```
\   MVP-FORTH SOURCE -- +-   D+-   DABS
HEX   CROSS-COMPILER
: +-    ( N1 N2 -> N3 )
    0<    IF    NEGATE   EXIT   THEN ;
: D+-    ( D1 N2 -> D3 )
    0<    IF   DNEGATE   EXIT   THEN ;
: DABS    ( D1 -> D2 )
    DUP   D+-   ;
: MIN    ( N1 N2 -> N3 )
    DDUP >     IF    SWAP_DROP   EXIT   THEN   DROP' ;
: MAX    ( N1 N2 -> N3 )
    DDUP <     IF    SWAP_DROP   EXIT   THEN   DROP   ;
DECIMAL
```

SCREEN #18
```
\   MVP-FORTH SOURCE -- M+ M*   M/
HEX   CROSS-COMPILER
: M+    ( D1   N2   -> D3 )
    S->D   D+   ;
: M*    ( N1 N2 -> D3 )
    DDUP XOR    >R    ABS   SWAP   ABS
    U*   R> D+-   ;
: M/    ( D1 N2 -> N3 N4 )
    OVER   D>R    DUP D+-    R@   ABS   U/MOD
    R>   R@   XOR +-,  SWAP   R>   +-   SWAP   ;
DECIMAL
```

SCREEN #19
```
\   MVP-FORTH SOURCE -- M*/
HEX   CROSS-COMPILER
: M*/   ( D1   N1 N2 -> D2 )
    DDUP   XOR   SWAP    ABS   >R   SWAP
    ABS   >R   OVER XOR   -ROT   DABS
    SWAP R@   U*   ROT   R>   U*   ROT    0 D+
    R@  U/MOD    -ROT    R>   U/MOD
    SWAP_DROP    SWAP   ROT   D+-   ;
DECIMAL
```

SCREEN #20
```
\   MVP-FORTH SOURCE -- *    /MOD   /   MOD
HEX   CROSS-COMPILER
: *    ( N1 N2 -> N3 )
    U*   DROP   ;
```

```
: /MOD    ( N1 N2 -> NREM NQUOT )
   >R  S->D  R>  M/  ;

: /    ( N1 N2 -> N3 )
   /MOD   SWAP_DROP  ;

: MOD    ( N1 N2 -> N3 )
   /MOD   DROP  ;

DECIMAL
```

SCREEN #21

```
\  MVP-FORTH SOURCE -- */MOD  */  M/MOD
HEX   CROSS-COMPILER
: */MOD      ( N1 N2 N3 -> NREM NQUOT )
   >R  M*  R>  M/  ;

: */    ( N1 N2 N3 -> N4 )
   */MOD  SWAP_DROP  ;

: M/MOD    ( UD1 U2 -> U3 UD4 )
   >R 0  R@  U/MOD   R>  SWAP  >R
   U/MOD  R>  ;

DECIMAL
```

SCREEN #22

```
\  MVP-FORTH SOURCE -- EMIT  CR  PAGE
HEX   CROSS-COMPILER
B' <EMIT> FORTH D@ CC  { 'EMIT ! }
: EMIT   ( CHAR -> )
   'EMIT @  EXECUTE  ;

B' <CR> FORTH  D@ CC { 'CR ! }
: CR    ( -> )
   'CR @    EXECUTE  ;

B' <PAGE> FORTH D@ CC { 'PAGE ! }
: PAGE    ( -> )
   'PAGE @  EXECUTE  ;

DECIMAL
```

SCREEN #23

```
\  MVP-FORTH SOURCE -- ?TERMINAL  KEY
HEX   CROSS-COMPILER
B' <?TERMINAL> FORTH D@ CC { '?TERMINAL ! }
: ?TERMINAL    ( -> FLAG )
   '?TERMINAL   @   EXECUTE ;

B' <KEY>  FORTH D@ CC  { 'KEY ! }
: KEY    ( -> CHAR )
   'KEY @    EXECUTE  ;
```

```
DECIMAL
```

SCREEN #24

```
\  MVP-FORTH SOURCE -- SPACE  COUNT  TYPE
HEX   CROSS-COMPILER
: SPACE  ( -> )
   BL  EMIT ;

: COUNT  ( ADDR -> ADDR+4 N )
   DUP  4+   SWAP @ OFFFF AND   ;

: TYPE   ( ADDR N -> )
   DUP O>
   IF  OVER + SWAP
      DO  I C@  EMIT   1 +LOOP
   ELSE  DDROP
   THEN  ;

DECIMAL
```

SCREEN #25

```
\  MVP-FORTH SOURCE --  -TRAILING   SPACES
HEX   CROSS-COMPILER
: -TRAILING  ( ADDR N1 -> ADDR N2 )
   DUP  O
   DO   DDUP +  1-  C@  BL -
      IF  LEAVE   ELSE  1-  THEN
   LOOP ;

: SPACES   ( COUNT -> )
   O  MAX   ?DUP
   IF  O  DO   SPACE  LOOP
   THEN  ;



DECIMAL
```

SCREEN #26

```
\  MVP-FORTH SOURCE --  PAD  HERE
HEX   CROSS-COMPILER
: HERE   ( -> ADDR )
   DP @  ;

: PAD    ( -> ADDR )
   HERE  4C +  ;




DECIMAL
```

SCREEN #27

```
\   MVP-FORTH SOURCE --   HOLD   <#   #>   #
HEX   CROSS-COMPILER
: HOLD    ( CHAR -> )
   1 NEGATE  HLD  +!  HLD @  C!  ;

: <#    ( D1 -> D1 )
   PAD  HLD  !  ;

: #>    ( UD -> ADDR N )
   DDROP  HLD @   PAD   OVER  -  ;

: #    ( UD1 -> UD2 )
   BASE @   M/MOD   ROT   9 OVER <
   IF  7 +   THEN    30 +   HOLD  ;

DECIMAL
```

SCREEN #28

```
\   MVP-FORTH SOURCE --   <ABORT">  <.">      <ABORT'>
HEX   CROSS-COMPILER
VARIABLE <QUIT-ADDR>
VARIABLE <WHERE-ADDR>
: <ABORT">    ( FLAG -> )
  <<ABORT">>   ( Automatically EXIT if FLAG=0 )
   ( IF )  <WHERE-ADDR> @  EXECUTE    CR
   R@  COUNT  TYPE  SP!   <QUIT-ADDR> @  EXECUTE     ;
(        ELSE  R> DUP @  +  4 + >R  THEN ;   )
B' <ABORT"> FORTH D@ CC DROP  ABORT"-ADDR !

: <.">     ( -> )
   R@   COUNT   DUP 7 + R> +  0FFFFFFFC AND  >R   TYPE ;
B' <."> FORTH D@ CC DROP   ."-ADDR !
DECIMAL
```

SCREEN #29

```
\   MVP-FORTH SOURCE --   SIGN   #S   D.R  D.
HEX   CROSS-COMPILER
: SIGN   ( N -> )
   0<   IF   2D  HOLD  EXIT  THEN  ;

: #S   ( UD -> 0 0 )
   BEGIN  #   DDUP   OR  NOT  UNTIL  ;

: D.R    ( D N -> )
   >R   SWAP   OVER  DUP  D+-
   <#   #S   ROT SIGN  #>
   R>  OVER  -   SPACES   TYPE  ;

: D.   ( D -> )
   0  D.R  SPACE ;
DECIMAL
```

SCREEN #30

```
\   MVP-FORTH SOURCE --   .R  U.   .   ?
HEX   CROSS-COMPILER
: .R   ( N1 N2 -> )
   SWAP  S->D  ROT   D.R  ;
```

```
: U.   ( N1 -> )
   0  D. ;

: .    ( N1 -> )
   S->D  D.  ;

: ?    ( N1 -> )
   @ . ;

DECIMAL
```

SCREEN #31

```
\  MVP-FORTH SOURCE --  ?COMP  ?CSP  ?LOADING  ?PAIRS
HEX   CROSS-COMPILER
: ?COMP    ( -> )
   STATE @ NOT   ABORT" COMPILE ONLY"  ;

: ?CSP    ( -> )
   SP@  CSP @  -
   ABORT" DEFINITION NOT FINISHED"  ;

: ?LOADING    ( -> )
   BLK @ NOT   ABORT" LOADING ONLY"  ;

: ?PAIRS    ( N1 N2 -> )
   -   ABORT" CONDITIONALS NOT PAIRED"  ;
DECIMAL
```

SCREEN #32

```
\  MVP-FORTH SOURCE --  ?STREAM   ?STACK
HEX   CROSS-COMPILER
: ?STREAM    ( -> )
   ABORT" INPUT STREAM EXHAUSTED" ;

: ?STACK    ( -> )
   SP@     OFFF AND  0080 <  ABORT" STACK EMPTY"
   SP@     OFFF AND  0100 <  ABORT" STACK FULL"  ;

DECIMAL
```

SCREEN #33

```
\  MVP-FORTH SOURCE --  PICK  ROLL
HEX   CROSS-COMPILER
: PICK    ( N1 -> N2 )
   DUP 1 <   ABORT" PICK ARGUMENT < 1"
   <PICK> ;

: ROLL    ( N1 -> )
   DUP 1 <   ABORT" ROLL ARGUMENT < 1"
   <ROLL> ;
```

```
DECIMAL
```

SCREEN #34

```
\  MVP-FORTH SOURCE --  <CMOVE>   CMOVE
HEX   CROSS-COMPILER
\ : <CMOVE>    ( ADDR1 ADDR2 U -> )
\      OVER + SWAP
\      DO  DUP C@  I C!  1+  LOOP   DROP ;

\ : CMOVE    ( ADDR1  ADDR2  N -> )
\    DUP 1 <
\    IF  DDROP   DROP
\    ELSE  <CMOVE>  THEN  ;

: CMOVE    ( ADDR1 ADDR2 COUNT -> )
  BEGIN  <CM-STEP>  UNTIL   DROP DDROP ;

DECIMAL
```

SCREEN #35

```
\  MVP-FORTH SOURCE --  <<CMOVE>   <CMOVE
HEX   CROSS-COMPILER
\ : <<CMOVE>    ( ADDR1 ADDR2 U -> )
\    >R   SWAP   R@ + 1-    SWAP  R@ + 1-  R>
\    BEGIN   ?DUP    WHILE    <<CM-STEP>  REPEAT
\    DDROP  ;
\
\ : <CMOVE    ( ADDR1  ADDR2  N -> )
\    DUP 1 <
\    IF  DDROP   DROP
\    ELSE  <<CMOVE>   THEN  ;

: <CMOVE    ( ADDR1 ADDR2 COUNT -> )
  >R   SWAP   R@ + 1-    SWAP  R@ + 1-  R>
  BEGIN  <<CM-STEP>  UNTIL   DROP DDROP ;
DECIMAL
```

SCREEN #36

```
\  MVP-FORTH SOURCE --  DISK ACCESS CONSTANTS/VARIABLES
HEX   MATH CROSS-COMPILER
MEM-SIZE  -4. D+  CONSTANT LIMIT

1. CONSTANT #BUFF
408. CONSTANT BUF-SIZE

{ LIMIT  #BUFF  BUF-SIZE }  FORTH  D*  D- OFFFFFF. DAND
     CC CONSTANT FIRST

40. CONSTANT C/L
VARIABLE USE     {  FIRST  USE !  }
VARIABLE PREV    {  FIRST  PREV !  }
{ 0  OFFSET ! }

DECIMAL
```

SCREEN #37

```
\  MVP-FORTH SOURCE --  <R/W>  R/W
HEX   CROSS-COMPILER
: <R/W>    ( ADDR BLK FLAG -> )     ( No wrap over drive limits )
    IF     3 SYSCALL    ( Read )
    ELSE   4 SYSCALL    ( Write )
    THEN    DDROP   ;
B' <R/W> FORTH D@ CC ( 'R'W ! )
: R/W    ( ADDR BLK FLAG -> )
    'R/W @   EXECUTE ;
DECIMAL
```

SCREEN #38

```
\  MVP-FORTH SOURCE --  +BUF   BUFFER  UPDATE
HEX   CROSS-COMPILER
: +BUF    ( ADDR -> ADDR2 FLAG )
    BUF-SIZE  +  DUP  LIMIT =
    IF   DROP  FIRST  THEN
    DUP  PREV @  -  ;
: BUFFER    ( N -> ADDR )    ( Single buffer support only!!!!! )
    USE @   >R    R@ @   0<
    IF    R@ 4+  R@ @   7FFFFFFF AND   0 R/W    THEN
    R@ !    R@ PREV !   R>   4+ ;
: UPDATE   ( -> )
    PREV @ @    80000000 OR    PREV   @   !   ;
DECIMAL
```

SCREEN #39

```
\  MVP-FORTH SOURCE --  <BLOCK>   BLOCK
HEX   CROSS-COMPILER
: <BLOCK>    ( N -> ADDR )    ( Supports only one block buffer )
    PREV @   @   7FFFFFFF AND    OVER =
    IF    DROP
    ELSE    DUP  BUFFER    SWAP    1   R/W
    THEN     PREV @   4+   ;
B' <BLOCK> FORTH D@ CC ( 'BLOCK ! )
: BLOCK    ( N -> ADDR )
    'BLOCK @    EXECUTE   ;
DECIMAL
```

SCREEN #40

```
\ FILL                               (Character based)
DECIMAL  CROSS-COMPILER
: FILL   (   ADDR COUNT VALUE -> )
    OVER 0>
    IF
```

```
       -ROT  OVER + SWAP  DO  DUP I C!  LOOP   DROP
    ELSE   DDROP  DROP  THEN ;
```

```
SCREEN #41
 \  MVP-FORTH SOURCE --  SAVE-BUFFERS  EMPTY-BUFFERS  CLEAR
 HEX   CROSS-COMPILER
 : SAVE-BUFFERS   ( -> )
    #BUFF  1+  0 DO    7FFFFFFF  BUFFER   DROP  LOOP  ;

 : EMPTY-BUFFERS   ( -> )
    FIRST LIMIT  OVER -   0  FILL
  ( #BUFF 0 DO )  7FFFFFFF ( BUF-SIZE I * ) 0 FIRST + ! ( LOOP) ;

 ( { EMPTY-BUFFERS }   )

 : CLEAR    ( N -> )
    OFFSET @  +   BUFFER   400  BL FILL  UPDATE ;

 DECIMAL
```

```
SCREEN #42
 \  MVP-FORTH SOURCE --  <LINE>  .LINE  LIST
 HEX   CROSS-COMPILER
 : <LINE>    ( N1  N2  -> ADDR  COUNT )
    BLOCK  SWAP  C/L  *  +  C/L  ;

 : .LINE    ( LINE SCR -> )
    <LINE>  -TRAILING  TYPE  ;

 : LIST    ( SCR -> )
    CR   DUP  SCR !
   ." SCREEN #" U.  10   0
   DO   CR  I  3 .R   SPACE I SCR @ .LINE
          ?TERMINAL  IF  <QUIT-ADDR> @ EXECUTE  THEN
     LOOP    CR  ;
 DECIMAL
```

```
SCREEN #43
 \  MVP-FORTH SOURCE --.  DIGIT  CONVERT
 HEX   CROSS-COMPILER
 : DIGIT    ( C N1 -> N2 TF / FF )
    SWAP  30 -      DUP  9 >
    IF     DUP  11 <  IF   DROP -1  ELSE  7 -  THEN  THEN
    DUP  ROT  < NOT   IF  DROP -1  THEN
    DUP  0<  IF   DROP 0  ELSE  -1  THEN  ;

 : CONVERT    ( UD1 ADDR1 -> UD2 ADDR2 )
    BEGIN  1+ DUP  >R  C@   BASE @  DIGIT
```

```
    WHILE   SWAP  BASE  @ U*  DROP   ROT  BASE @  U*
       D+  DPL @  1+
       IF  1 DPL +!  THEN
       R>
    REPEAT   R>  ;
DECIMAL
```

SCREEN #44

```
\  MVP-FORTH SOURCE --   <NUMBER>  NUMBER
HEX   CROSS-COMPILER
: <NUMBER>   ( ADDR -> D )
    3 +  0 0 ROT  DUP 1+  C@    02D =   DUP >R  -   -1  DPL !
    CONVERT   DUP C@ BL >
    IF   DUP C@  02E =  NOT
       ABORT" NOT RECOGNIZED"   0 DPL  !
       CONVERT   DUP C@  BL >    ABORT" NOT RECOGNIZED"
    THEN   DROP  R>
    IF  DNEGATE  THEN  ;
B' <NUMBER> FORTH D@ CC ( 'NUMBER ! )
: NUMBER   ( ADDR -> D )
    'NUMBER @ EXECUTE  ;
DECIMAL
```

SCREEN #45

```
\  MVP-FORTH SOURCE --   <EXPECT>
HEX   CROSS-COMPILER
: <EXPECT>   ( ADDR N -> )
    OVER  0 SWAP  DDUP 1+ C! C!
    OVER + OVER
    DO  KEY  DUP  8 =
       IF  DROP  DUP  I =  1 AND  DUP  R>  2-  + >R
          IF    07
          ELSE  8  DUP  EMIT  BL EMIT  -3 OUT +!  THEN
       ELSE   DUP  0D =
          IF    LEAVE  DROP  BL  0
          ELSE  DUP  THEN   I C!     0 I 1+  DDUP 1+ C! C!
       THEN   EMIT
    LOOP   DROP ;
B' <EXPECT> FORTH D@ CC ( 'EXPECT ! )
DECIMAL
```

SCREEN #46

```
\  MVP-FORTH SOURCE --   'STREAM   EXPECT   QUERY
HEX   CROSS-COMPILER
: 'STREAM   ( -> ADDR )
    BLK @  ?DUP
    IF  BLOCK  ELSE   TIB @   THEN
    >IN  @  +  ;
: EXPECT   ( ADDR N -> )
    'EXPECT @  EXECUTE ;
: QUERY   ( -> )
    TIB @  50 EXPECT   0 >IN  !  ;
DECIMAL
```

```
SCREEN #47
\  MVP-FORTH SOURCE --  ENCLOSE
HEX   CROSS-COMPILER
: ENCLOSE   ( ADDR1 C ->  ADDR1  N1 N2 N3 )
   >R DUP  BEGIN  <ENCLA> UNTIL      DDUP SWAP -  SWAP
        ( ..-> ADDR1 N1 ADDR1+N1 )  ( Return: ..-> C )
( >R    -1   OVER  1-                                           )
( BEGIN  SWAP 1+ SWAP 1+  DUP C@ R@ = NOT UNTIL    ( #### )
    BEGIN    <ENCLB>    UNTIL
              ( ..-> ADDR1 N1 ADDRN2 )
(  BEGIN  DUP C@  DUP  R@ =  NOT  SWAP 0= NOT AND              )
(                 WHILE  1+  REPEAT    ( ######## )
   3_PICK  -
   OVER   4_PICK  +  C@   IF  DUP 1+  ELSE  0  THEN
   R>  DROP  ;
DECIMAL

SCREEN #48
\  MVP-FORTH SOURCE --  DOVOC  FORTH
HEX   CROSS-COMPILER
: DOVOC    ( -> )
   R>  CONTEXT !  ;

: FORTH   ( -> )    ;
 -4 BDP +!
   B' DOVOC  FORTH D@ CC  DATA,
   O. DATA,      ( LINK ADDR TO LAST WORD IN DICTIONARY )
   80000001.  DATA,
   BL  0 DATA,
   O. DATA,      ( VOCABULARY LINK  )

DECIMAL

SCREEN #49
\ OPTIMIZING COMPILER VARIABLES, ETC.
DECIMAL CROSS-COMPILER

VARIABLE OPTIMIZE?     -1. ( OPTIMIZE? ! )

VARIABLE OPT-STATUS
  \ 1 = previous instruction is a defaulted JMP
  \ 4 = previous instruction is a CALL
  \ 8 = previous instruction can not be changed

: DEFAULT-JUMP   1 OPT-STATUS ! ;
: IS-A-CALL      4 OPT-STATUS ! ;
: DON'T-DISTURB  8 OPT-STATUS ! ;

SCREEN #50
\  MVP-FORTH SOURCE --     ALLOT   ,  LATEST, DEFINITIONS
DECIMAL CROSS-COMPILER

: ALLOT   ( N -> )
   DP +!  ;
```

```
: C,  ( B -> )   HERE C!  1 ALLOT DON'T-DISTURB ;
: WORD-ALIGN  ( -> )
   4  DP @  3 AND  -   3 AND
   ?DUP  IF  0 DO BL C, LOOP  THEN ;
: ,    ( N -> )
   WORD-ALIGN HERE !  4 ALLOT  DON'T-DISTURB ;
: X,    ( N -> )
   WORD-ALIGN HERE !  4 ALLOT   ;
```

SCREEN #51

```
\  MVP-FORTH SOURCE --      LATEST  DEFINITIONS
DECIMAL CROSS-COMPILER
: LATEST    ( -> )
   CURRENT  @  @  ;
: DEFINITIONS  ( -> )
   CONTEXT @  CURRENT ! ;
{ FORTH  DEFINITIONS }
```

SCREEN #52

```
\ COMPILER DICTIONARY HANDLING   --1
HEX      CROSS-COMPILER
: OPCODE,   ( MICRO-CODE-INSTRUCTION -> )
   FF800000 AND   HERE  4+  OR    X,   DEFAULT-JUMP ;
: CALL,     ( Subroutine-address -> )
   007FFFFC AND   OPTIMIZE? @
   IF  OPT-STATUS @ 1 =
      IF  -4 ALLOT  HERE @
            FF800000 AND  OR   THEN
   THEN
   2 OR X,  IS-A-CALL   ;
DECIMAL
```

SCREEN #53

```
\ COMPILER DICTIONARY HANDLING   --2
HEX      CROSS-COMPILER
: EXIT,     ( -> )
   1
   OPTIMIZE? @
   IF OPT-STATUS @ 1 =     ( If 1 status, combine the EXIT     )
      IF  -4 ALLOT  HERE @
            FF800000   AND   OR   THEN
      OPT-STATUS @ 4 =     ( If 4 status, do tail recurs. elim.)
      IF  DROP  -4 ALLOT  HERE   @
            FFFFFFFC   AND  THEN
```

```
   THEN
   X, DON'T-DISTURB ;

DECIMAL

```

SCREEN #54

```
\  MVP-FORTH SOURCE --  <WORD>  WORD
HEX   CROSS-COMPILER
: <WORD>    ( CHAR -> ADDR )
   WORD-ALIGN
   'STREAM   SWAP   ENCLOSE   DDUP >
   IF  ( end-stream ) DDROP DDROP  0 HERE 4+ DDUP 4+ ! !
   ELSE   >IN  +!   OVER  -   DUP  >R
      HERE 4+ !   +   HERE  8 +   R>  DUP  OFFFF >
      ABORT" INPUT > 65535"  1+  CMOVE
   THEN  HERE  4+ ;

B' <WORD> FORTH D@ CC ( 'WORD ! )

: WORD    ( CHAR -> ADDR )
   'WORD @  EXECUTE  ;
DECIMAL
```

SCREEN #55

```
\  MVP-FORTH SOURCE --   TRAVERSE
HEX   CROSS-COMPILER
\ ADDR1 is presumed to be a word address
: TRAVERSE  ( ADDR1  N ->  ADDR2 )
   0<
   IF   ( To length word   ADDR1 is last char in header string )
      BEGIN   4-   DUP  @  0<  UNTIL
   ELSE  ( To end of name string  ADDR1 is length word )
      DUP  C@   1 MAX  +  3 +   FFFFFFFC  AND
   THEN  ;

DECIMAL
```

SCREEN #56

```
\  MVP-FORTH SOURCE --   LFA PFA NFA     CFA
HEX   CROSS-COMPILER
\  Header structure:
\   LFA    NFA    ..TEXT..   PFA     ( Note: NO CFA !! )
: NFA    ( PFA -> NFA )
   -1 TRAVERSE   ;

: LFA    ( PFA -> LFA )
   NFA  4-   ;

: PFA    ( NFA -> PFA )
   1 TRAVERSE  4+ ;

: CFA    ( PFA -> CFA  )  ;   ( This will work most of the time )
DECIMAL

```

SCREEN #57

```
\  MVP-FORTH SOURCE --   <$MATCH>
HEX   CROSS-COMPILER
: <$MATCH>  ( TXTADDR1 NFAADDR2 -> MATCH-FLAG ) ( ADDR-LENGTH )
   OVER @ OFFFF AND    OVER @  2000FFFF AND  =
   IF    ( same length )
      -1  -ROT  4+  SWAP  DUP  4+  SWAP   @  OFFFF AND  1-
     BEGIN  <$=STEP>  DUP O<  UNTIL
(  BEGIN  ROT DUP C@ >R 1+   ROT DUP C@ >R 1+  ROT  R> R> =   )
(          IF 1-  ELSE DROP >R >R  DROP O R> R> -1 THEN        )
(       DUP O< UNTIL                                          )
      DROP  DDROP
   ELSE
      ( Different lengths ) DDROP  O
   THEN  ;
DECIMAL
```

SCREEN #58

```
\  MVP-FORTH SOURCE --   <FIND>  <-FIND>
HEX   CROSS-COMPILER
: <FIND>   ( TEXT-ADDR  NFA-ADDR -> PFA STATUS -1 / O )
   BEGIN   DDUP  <$MATCH>
      IF    SWAP DROP   DUP  PFA  SWAP  @  -1    -1
      ELSE  4-  @
            DUP  IF   O     ELSE   DDROP  O  -1   THEN
      THEN
     UNTIL    ;

: <-FIND>   ( -> PFA STATUS -1 / O )
   BL WORD  CONTEXT  @ @   <FIND> ;

B' <-FIND> FORTH D@ CC ( '-FIND ! )

DECIMAL
```

SCREEN #59

```
\  MVP-FORTH SOURCE --  -FIND   FIND
HEX   CROSS-COMPILER
: -FIND   ( -> PFA STATUS -1 / O )
   '-FIND @  EXECUTE ;

: FIND   ( -> ADDR )
   -FIND   IF  DROP  ELSE  O  THEN  ;






DECIMAL
```

SCREEN #60

```
\  MVP-FORTH SOURCE --  COMPILE  [COMPILE]   [  ]
HEX   CROSS-COMPILER
: COMPILE  ( -> )
    R>  DUP 4+  >R  @
    DUP 3 AND  IF , ELSE  FF800003  AND  HERE 4+ OR  , THEN
```

```
         DON'T-DISTURB ;
: [COMPILE]    ( -> )           ( Not required when in cross-comp )
   ?COMP  -FIND  NOT    ABORT" NOT FOUND"
      10000000 AND IF    @  FF800000 AND   HERE 4 + OR
          ELSE  2 OR THEN    ,    DON'T-DISTURB ;    IMMEDIATE

: [    ( -> )
   0 STATE !   ;     IMMEDIATE
: ]    ( -> )
   C0000000  STATE !   ;   IMMEDIATE
DECIMAL
```

SCREEN #61

```
\  MVP-FORTH SOURCE --  SMUDGE       SO  BLANK
HEX   CROSS-COMPILER
: SMUDGE    ( -> )
   LATEST  3 + 20  TOGGLE  ;

: SO    ( -> )
   SPO  @  ;

: BLANK    ( -> )
   BL FILL  ;

DECIMAL
```

SCREEN #62

```
\  MVP-FORTH SOURCE --  DLITERAL  LITERAL
HEX   CROSS-COMPILER
: LITERAL    ( N -> N /   )
   STATE @
   IF   COMPILE  LIT      ,
        HERE 8 - @  FF800000 AND  HERE OR  2 OR
        HERE 8 -  !  DON'T-DISTURB  THEN  ;  IMMEDIATE

: DLITERAL    ( N -> N /   )
   STATE @
   IF  SWAP   ( [COMPILE] )  LITERAL   ( [COMPILE] )  LITERAL
   THEN ;   IMMEDIATE

DECIMAL
```

SCREEN #63

```
\  MVP-FORTH SOURCE --  <INTERPRET>
HEX   CROSS-COMPILER
: <INTERPRET>    ( -> )
   BEGIN  -FIND
      IF  DUP  STATE @  U<
         IF   DUP  10000000 AND
            IF SWAP @ OPCODE, ELSE  SWAP CALL,  THEN
            8000000 AND  IF  DON'T-DISTURB THEN
         ELSE  4000000 AND  ABORT" POISON WORD"  EXECUTE THEN
      ELSE   HERE 4+  NUMBER  DPL @  1+
```

```
          IF   ( [COMPILE] )   DLITERAL
          ELSE  DROP   ( [COMPILE] )  LITERAL    THEN
       THEN  ?STACK     AGAIN  ;
B' <INTERPRET> FORTH D@ CC { 'INTERPRET ! }
DECIMAL

SCREEN #64
\  MVP-FORTH SOURCE --      INTERPRET &  NULL
HEX   CROSS-COMPILER
: INTERPRET   ( -> )
   'INTERPRET @ EXECUTE   ;

: X    ( -> )      (   NULL )
   BLK @
   IF    STATE @    ?STREAM   THEN
   DR> DDROP R> DROP   ;     IMMEDIATE

B'  X   FORTH D@ CC
 { FFFFFFFC. AND   NFA  C0000000.   OVER !    0 SWAP 4+ !    }

DECIMAL

SCREEN #65
\  MVP-FORTH SOURCE --   QUIT   <ABORT>
HEX   CROSS-COMPILER
: QUIT    ( -> )
   0 BLK !       ( [COMPILE] )   [
   BEGIN    RP!   CR   QUERY   INTERPRET
      STATE @   NOT
      IF   ."    (CPU/32)OK"    THEN
   AGAIN ;
B' QUIT FORTH D@ CC { <QUIT-ADDR> ! }     \ Vector for <ABORT">

: <ABORT>    ( -> )
   RP!  SP!     0 SET-FLAGS DROP   ( enable interrupts )
   ( [COMPILE] )  FORTH  DEFINITIONS   QUIT  ;

B' <ABORT> FORTH D@ CC {   'ABORT ! }
DECIMAL

SCREEN #66
\  MVP-FORTH SOURCE --   ABORT
HEX   CROSS-COMPILER
: ABORT   ( -> )
   'ABORT @   EXECUTE ;

: COLD   ( -> )
   EMPTY-BUFFERS  PAGE
   20 SPACES ." The WISC CPU/32" CR
   20 SPACES ." with MVPFORTH/32" CR
   25 SPACES ." 6/1/87" CR  CR
   19 SPACES ." (C) 1987  By: Phil Koopman Jr." CR CR
    0 EPRINT !
    FIRST  USE !   FIRST  PREV !  0 OFFSET !
    ."    (CPU/32)OK"
   DECIMAL    ABORT  ;
DECIMAL
```

```
SCREEN #67
\ INTERRUPT SERVICE ROUTINES  --1
HEX      CROSS-COMPILER
: INTERRUPT-DECODE ( FLAG -> )
( Assume stack pointers are close to value that cause problem )
   DUP   01000000 AND  IF CR ." DATA STACK ERROR="
     SP@ 80 + 0FFF AND  0100 <  IF ." STACK EMPTY"
                              ELSE ." STACK FULL"  THEN  THEN
   DUP   02000000 AND  IF CR ." RETURN STACK ERROR="
     RP@ 80 + 0FFF AND  0100 <  IF ." STACK EMPTY"
                              ELSE ." STACK FULL"  THEN  THEN
   DUP   04000000 AND  IF CR ." HOST REQUEST=" DUP FF AND . THEN
   DUP   08000000 AND  IF CR ." PARITY ERROR" THEN
   DUP   70000000 AND  IF CR ." SOFTWARE INTERRUPT" THEN
   DROP ;
DECIMAL

SCREEN #68
\ INTERRUPT SERVICE ROUTINES
DECIMAL  CROSS-COMPILER
: ISERVICE    'ISERVICE @ EXECUTE ;
: INTERRUPT-SERV   ( ADDRESS FLAGS -> )
   -1 SET-FLAGS DROP  ( Clear & mask interrupts )
   CR CR ." ***** INTERRUPT *****" CR     HEX
   DUP ." FLAGS=" U.   SWAP ." ADDRESS=" U.
   INTERRUPT-DECODE  DECIMAL
   ABORT ;
HEX
B' ISERVICE FORTH D@  DROP FFFC AND 0
CC ( 0 ! )    \ Vector for INTERRUPT SERVICE
   \ Initialize to a JUMP to INTERRUPT-SERV
B' INTERRUPT-SERV  FORTH D@  CC ( 'ISERVICE ! )
DECIMAL

SCREEN #69
\  MVP-FORTH SOURCE --   <LOAD>  LOAD   THRU
HEX   CROSS-COMPILER
: <LOAD>    ( N -> )
   ?DUP NOT   ABORT" UNLOADABLE"
   BLK @   >R   >IN  @  >R
   0 >IN !    BLK !  INTERPRET
   R>  >IN  !  R>  BLK !  ;
B' <LOAD> FORTH D@ CC ( 'LOAD ! )
: LOAD    ( N -> )
   'LOAD @  EXECUTE ;
: THRU  ( N1 N2 -> )
   1+ SWAP   DO I U.  I LOAD
      ?TERMINAL  ABORT" BREAK..."  LOOP  ;
DECIMAL

SCREEN #70
\  MVP-FORTH SOURCE --   CREATE
HEX   CROSS-COMPILER
: CREATE    ( -> )
   WORD-ALIGN   BL WORD    DUP   4+  C@
   0= ABORT" ATTEMPTED TO REDEFINE NULL"
```

```
   DUP  CONTEXT @  @  <FIND>
   IF  DDROP  WARNING @
      IF  DUP  COUNT  TYPE  SPACE  ." ISN'T UNIQUE" CR
      THEN
   THEN
   LATEST ,  ( Store LFA )    HERE  CURRENT  @  !
   C@      DUP   80000000 OR  ,
   ALLOT   ( HERE happens to align with text of string )
   WORD-ALIGN     22000002 ( Call DOVAR )  HERE 4 +  OR   ,
   DON'T-DISTURB      ;
DECIMAL
```

SCREEN #71

```
\  MVP-FORTH SOURCE --   WHERE
HEX   CROSS-COMPILER
: WHERE   ( -> )
   BLK @
   IF  BLK @  DUP  SCR !   CR  CR   ." SCREEN #"
      DUP .   >IN @   3FF MIN  C/L  /MOD  DUP
      ." LINE #"  .  C/L  *  ROT  BLOCK  +
      CR CR  C/L  -TRAILING  TYPE
      >IN  @   3FF >  1 AND  +
   ELSE  >IN @
   THEN   CR  HERE 4+  @   DUP >R  -  HERE 4+ R@  +
   DROP  1-  SPACES  R>  0
   DO  5E  EMIT  LOOP  ;
B' WHERE FORTH D@ CC ( <WHERE-ADDR> ! )   \ Vector for <ABORT">
DECIMAL
```

SCREEN #72

```
\  MVP-FORTH SOURCE --    :      VARIABLE
HEX   CROSS-COMPILER
: :    ( -> )
   SP@  CSP !    CURRENT @  CONTEXT !
   CREATE  -4  ALLOT  SMUDGE  ]  ;

: VARIABLE  ( -> )
   CREATE  4 ALLOT  ;

DECIMAL
```

SCREEN #73

```
\  MVP-FORTH SOURCE --    \    (
HEX   CROSS-COMPILER
: $    ( -> )      ( alias for "("   )
   -1 >IN +!   29  WORD  DUP @  +  4+
   C@  29 =   NOT  ?STREAM  ;    IMMEDIATE

28.  BLATEST @ 4 +  0 ( ! )

: %    ( -> )      ( alias for "\" )
   ?LOADING  >IN   @  C/L  /   1+
   C/L   *  >IN  !  ;          IMMEDIATE
```

```
5C.  BLATEST @  4 +  0 { ! }

DECIMAL

SCREEN #74
\  MVP-FORTH SOURCE --   '
HEX   CROSS-COMPILER
: '     ( -> ADDR )
   -FIND  NOT     ABORT" NOT FOUND"
   DROP  ( [COMPILE] ) LITERAL  ;  IMMEDIATE




DECIMAL






SCREEN #75
\  MVP-FORTH SOURCE --    BYE  ;
HEX   CROSS-COMPILER
: BYE  ( -> )
      SAVE-BUFFERS  HALT  ;

: &    ( -> )           ( Redefine this word to be ,; on board )
   ?CSP   ( COMPILE  EXIT )  EXIT,  SMUDGE
   ( [COMPILE] )  [    ;        IMMEDIATE
03B. ( ";" )    BLATEST @ 4 +   0 { ! }

DECIMAL





SCREEN #76
\  MVP-FORTH SOURCE --   LAST SCREEN LOADED
HEX   CROSS-COMPILER
BLATEST @   0 { CONTEXT @   !   }
BHERE  0 { DP ! }
\ Set up COLD vector for cold entry point at addr 5
B' COLD FORTH D@ CC { 14. !    FF800018. 18. ! }
DECIMAL
```

SCREEN #77

SCREEN #78

SCREEN #79

SCREEN #80

```
SCREEN #81
\  BOARD FORTH  ---   CONSTANT      USER     IMMEDIATE
HEX
: CONSTANT  ( N -> )
   CREATE  -4 ALLOT
   [  ' DOCON  @     3C0000 AND  ] LITERAL
         OPCODE,     ,  DON'T-DISTURB  ;

: USER    ( N -> )
   CREATE   -4 ALLOT
   [ ' DOUSE  2 OR  ]   LITERAL  CALL,
                           4 *    ,     DON'T-DISTURB ;

: IMMEDIATE    ( -> )
   LATEST 3 +  40 TOGGLE  ;
DECIMAL
```

```
SCREEN #82
\  BOARD FORTH  ---   DOES>     POISON  SPECIAL
HEX
: POISON       ( -> )
   LATEST 3 + 04 TOGGLE  ;

: SPECIAL      ( -> )
   LATEST 3 + 08 TOGGLE  ;

: <DOES>   ( -> )    ( Compilation helper for DOES> )
   R>  07FFFFC AND   2 OR  LATEST PFA   !  DON'T-DISTURB  ;

: DOES>    ( -> PFA )
   ?CSP   COMPILE <DOES>
   COMPILE  R>   ;   IMMEDIATE

DECIMAL
```

```
SCREEN #83
\ IF..THEN
HEX
: IF      ( -> PATCH-ADDR 2 2 )
   HERE  COMPILE 0BRANCH   2 2  ;
IMMEDIATE

: THEN   ( PATCH-ADDR OR-VALUE 2 -> )
   ?COMP   2 ?PAIRS
   HERE  3 PICK @  FFB00000 AND    OR
      OR   SWAP ! DON'T-DISTURB ;
IMMEDIATE
```

```
DECIMAL
```

SCREEN #84

```
\ ELSE
HEX
: ELSE   ( PATCH-ADDR1 2 2 -> PATCH-ADDR2 0 2 )
   2 ?PAIRS            0 ,   ( Place for JUMP instruction )
   OPTIMIZE? @
   IF  OPT-STATUS @    1 =
      IF  ( Redirect jump to after the THEN )
          -4 ALLOT      HERE 4- DUP @
                  FF800000  AND  SWAP !
      THEN
   THEN
   HERE  4-
   -ROT   2  [COMPILE] THEN    0  2   ;
IMMEDIATE
DECIMAL
```

SCREEN #85

```
\ BEGIN  AGAIN
HEX
: BEGIN      ( -> JMP-ADDR  1 )
   ?COMP  HERE   1  DON'T-DISTURB  ;
IMMEDIATE

: AGAIN      ( JMP-ADDR 1 -> )
   1 ?PAIRS
   ,   DON'T-DISTURB ;
IMMEDIATE                DECIMAL
```

SCREEN #86

```
\   UNTIL   & COUNT-DOWN
HEX
: UNTIL      ( JMP-ADDR  1 -> )
   1 ?PAIRS   COMPILE 0BRANCH   -4 ALLOT
   HERE @  FF800000  AND   OR  2 OR   , ;
IMMEDIATE

\ Count-down top of stack element & exit/drop when 0
: COUNT-DOWN  ( JMP-ADDR  1 -> )
   1 ?PAIRS   COMPILE <COUNT-DOWN>   -4 ALLOT
   HERE @  FF800000  AND   OR  2 OR   , ;
IMMEDIATE

DECIMAL
```

```
SCREEN #87
  \  WHILE  REPEAT
 HEX
 : WHILE      ( JMP-ADDR 1 ->  JMP-ADDR 1  PATCH-ADDR 2 3 )
    [COMPILE]  IF   2+  ;
 IMMEDIATE

 : REPEAT     ( JMP-ADDR 1  PATCH-ADDR 2 3 -> )
    >R >R >R  [COMPILE] AGAIN
    R> R> R>  2-  [COMPILE] THEN  ;
 IMMEDIATE

 : EXIT  ( -> )
    STATE @
    IF ( compiling )  EXIT,
    ELSE ( interpretting ) R> R> R> DDROP DROP THEN ;
 IMMEDIATE              DECIMAL

SCREEN #88
 \    DO
 HEX
 : DO      ( -> JMP-ADDR 4 )
    COMPILE <DO>    HERE  4  ;
 IMMEDIATE

 DECIMAL

SCREEN #89
 \  LOOP  /LOOP  +LOOP
 HEX
 : +LOOP    ( JMP-ADDR  4 -> )
    4 ?PAIRS  COMPILE <+LOOP>   -4 ALLOT
    HERE @  FF800000  AND   OR  2 OR   , ;
 IMMEDIATE

 : LOOP     ( JMP-ADDR  4 -> )
    4 ?PAIRS  COMPILE <LOOP>   -4 ALLOT
    HERE @  FF800000  AND   OR  2 OR   , ;
 IMMEDIATE

 : /LOOP    ( JMP-ADDR  4 -> )
    [COMPILE] +LOOP ;
 IMMEDIATE
 DECIMAL

SCREEN #90
 \  BOARD FORTH  ---   ABORT"
 HEX
 : ABORT"    ( FLAG -> )
    ?COMP    'STREAM   C@  22 =
    IF   1 >IN  +!    0 ,
    ELSE  22  WORD  DUP  @  4+   SWAP  OVER
```

```
      +  C@  22 =  NOT  ?STREAM  COMPILE <ABORT">
 ( Even multiple of 4 bytes )  HERE @  3 + FFFC AND  HERE !
      ALLOT  WORD-ALIGN
    THEN  DON'T-DISTURB  ;   IMMEDIATE
DECIMAL
```

SCREEN #91

```
 \  BOARD FORTH  ---   ."
HEX
: ."    ( -> )
   'STREAM   C@  22 =
   IF     1 >IN  +!  0 ,
   ELSE  22 WORD  DUP  @  4+  OVER  + C@
      22 = NOT  ?STREAM   STATE @
      IF   @ 4+   COMPILE <."> ALLOT   WORD-ALIGN
      ELSE  COUNT TYPE
      THEN
   THEN  DON'T-DISTURB  ;   IMMEDIATE
DECIMAL
```

SCREEN #92

```
 \  WORD DUMP  FOR CPU/32
HEX          \ Dump 32-bit words
: WDUMP       ( waddr wcount --- )
   SWAP FFFFFFFC AND  SWAP   BASE @ >R   HEX   4 *  0
   DO  CR DUP I + DUP 0 6 D.R 2 SPACES DUP
     10 0  DO DUP I + @   0 9 D.R   4 /LOOP
     DROP 3 SPACES   10 0
     DO DUP I + C@ DUP 20 < OVER 7E > OR
       IF DROP 2E THEN    EMIT
     LOOP  DROP
     ?TERMINAL IF LEAVE THEN      10
   /LOOP   DROP  CR R> BASE ! ;
 DECIMAL
```

SCREEN #93

```
 \  DUMP  FOR CPU/32
HEX
: DUMP      ( addr count --- )
   BASE @ >R   HEX      0
   DO  CR DUP I + DUP 0 6 D.R 2 SPACES DUP   8 0
     DO DUP I + C@    3 .R  LOOP
     DROP SPACE  DUP 8 +    8 0
     DO DUP I + C@    3 .R  LOOP
     DROP 3 SPACES   10 0
     DO DUP I + C@ DUP 20 < OVER 7E > OR
       IF DROP 2E THEN    EMIT
     LOOP  DROP
```

```
     ?TERMINAL IF LEAVE THEN  10
   /LOOP   DROP  CR R> BASE ! ;

DECIMAL
```

SCREEN #94

```
\  VOCABULARY -- fig
HEX
: VOCABULARY
   CREATE
      CURRENT @  4+  ,
      80000001 ,
      BL ,
      HERE  VOC-LINK @ ,   VOC-LINK !
   DOES> CONTEXT  ! ;
DECIMAL

' FORTH  16 + VOC-LINK !
```

SCREEN #95

```
\  FORGET
DECIMAL
: FORGET      BL WORD CURRENT @ @ <FIND> 0=
   ABORT" Not in current vocabulary."
   DROP  NFA DUP FENCE @ U<   ABORT" In protected dictionary."
   >R  R@ CONTEXT @ U<
   IF [COMPILE] FORTH THEN
   R@ CURRENT @ U<
   IF [COMPILE] FORTH DEFINITIONS THEN
   VOC-LINK @
   BEGIN R@ OVER U< WHILE @ REPEAT
   DUP VOC-LINK !
   BEGIN DUP 8 -
      BEGIN 4- @ DUP R@ U< UNTIL
      OVER 12 - ! @ ?DUP 0=
   UNTIL   R>  DP ! ;          ' FORGET  NFA  FENCE !
```

SCREEN #96

```
\ TEXT  PP  COPY
HEX
: TEXT     ( c -> )
   HERE C/L 8 +  BLANK  WORD  BL OVER
   DUP @  +  4+  C!    PAD  C/L   4+  CMOVE ;

: PP      ( n -> <text> )
   DUP  FFFFFFF0 AND
   ABORT" Off screen."
   0 TEXT   PAD  4+ SWAP
   SCR @ <LINE>  CMOVE  UPDATE  ;

: COPY
   SWAP BLOCK 4-  !  UPDATE ;
DECIMAL
```

```
SCREEN #97
\  DOUBLE PRECISION MATH --- DU<  D-  DO=  D>
HEX
: DU<    ( ud1 ud2 -> flag )   ( MVP-FORTH UTILITY )
  D>R  80000000 +  DR>  80000000 +  D<  ;

: D-    ( d1 d2 -> d3 )  ( MVP-FORTH UTILITY )
  DNEGATE  D+  ;

: DO=    ( d1 -> flag )
  OR 0= ;

: D>    ( d1 d2 -> flag )     ( MVP-FORTH UTILITY )
  DSWAP D< ;
DECIMAL
```

```
SCREEN #98
\  DOUBLE PRECISION MATH --- D,  DCONSTANT  DMAX  DMIN
DECIMAL
: D,    ( d -> )
   SWAP ,  ,  ;

: DCONSTANT    ( d -> )  ( compiling )
               ( -> d )  ( executing )
  CREATE  D,
   DOES>  D@ ;

: DMAX    ( d1 d2 -> d3 )  ( MVP-FORTH UTILITY )
  DOVER DOVER  D<  IF  DSWAP  THEN   DDROP  ;

: DMIN    ( d1 d2 -> d3 )  ( MVP-FORTH UTILITY )
  DOVER DOVER  D< NOT   IF  DSWAP  THEN   DDROP ;
```

```
SCREEN #99
\ PAUSE
DECIMAL
: PAUSE   ?TERMINAL
   IF   100000 0 DO LOOP
        BEGIN ?TERMINAL UNTIL
        170000 0 DO   LOOP
   THEN ;
```

```
SCREEN #100
\  DVARIABLE  ID.  INDEX
DECIMAL
: DVARIABLE    ( -> )       ( compiling )
               ( -> addr )  ( executing )
  CREATE  8 ALLOT ;
```

```
: ID.   COUNT  255 AND  OVER  + SWAP
   DO  I C@ 127 AND EMIT  LOOP  32 EMIT ;

: INDEX   ( First  Last -> )
   1+ SWAP
   DO  CR  I 4 .R  2 SPACES  I BLOCK 64  -TRAILING TYPE
      PAUSE  ?TERMINAL IF  LEAVE THEN
   LOOP  CR ;
```

SCREEN #101

```
\  BOARD FORTH  ---   VLIST
HEX
: VLIST  ( -> )
     C/L  OUT !   CONTEXT  @ @
   BEGIN      C/L  OUT @ -  OVER  C@  03F AND   4 + <
      IF   CR   0 OUT !   THEN
      DUP  ID.  SPACE  SPACE   4- @  DUP
      0=   PAUSE   ?TERMINAL  OR
   UNTIL  DROP ;

DECIMAL
```

SCREEN #102

```
\  .S
VARIABLE .SS
: .SL 1 .SS ! ;

: .SR 0 .SS ! ;

.SR

: .S  DEPTH
     IF
      .SS @ IF  1  DEPTH 1+  2   ELSE  -1  2  DEPTH 1-  THEN
      DO I PICK U. DUP +LOOP DROP
     ELSE ." Empty Stack. "
     THEN CR ;
```

SCREEN #103

```
\  'S  -TEXT  2!  2@  2CONSTANT  2DROP  2DUP
DECIMAL
: 'S   SP@ ;

: -TEXT  DDUP +  SWAP DO DROP 1+ DUP 1- C@  I C@ - DUP
   IF  DUP ABS / LEAVE  THEN LOOP  SWAP DROP ;

: 2!      D! ;
: 2@      D@ ;

: 2CONSTANT     DCONSTANT ;
: 2DROP         DDROP ;
```

```
: 2DUP           DDUP ;
```

SCREEN #104

```
\  2OVER 2SWAP 2VARIABLE  >BINARY  >TYPE
DECIMAL
: 2OVER          DOVER         ;
: 2SWAP          DSWAP         ;
: 2VARIABLE      DVARIABLE     ;
: >BINARY        CONVERT       ;
: >TYPE      ."  >TYPE USED IN MULTIPROGRAMMED SYSTEMS ONLY. " ;
IMMEDIATE
```

SCREEN #105

```
\  ERASE  FLUSH  H  OCTAL  U.R  [']
DECIMAL
: ERASE          0 FILL        ;
: FLUSH          SAVE-BUFFERS ;
: H              DP            ;
: OCTAL          8 BASE !      ;
: U.R            0  SWAP  D.R ;
: [']            ?COMP   [COMPILE]  '  ;  IMMEDIATE
```

SCREEN #106

SCREEN #107

```
SCREEN #108

SCREEN #109

SCREEN #110
( internal use only variables and holding places )
DECIMAL
VARIABLE TEMP-ADDR  ( temporary address storage )

VARIABLE TSUML 16 ALLOT    ( division temp storage - quotient )
TSUML 8 + CONSTANT TSUMH  ( division temp storage - remainder )

VARIABLE TSUMQ 8 ALLOT ( quad precision temp storage )
```

```
VARIABLE TEMP-CARRY  ( temporary carry storage )
VARIABLE SIGDIG   ( number significant digits )
      7 SIGDIG !
VARIABLE TERM  4 ALLOT  ( temp storage for trànscendentals )
VARIABLE FTERM 4 ALLOT  ( temp storage for transcendentals )
VARIABLE <?MODE>  ( numeric input mode )
```

SCREEN #111

```
( shift/rotate operations  LSL  ASR  LSR )
HEX   ( may be replaced with CODE definitions )
\  : 2/   2  / ;

: LSL   ( n1 -> n2 )
  2*    ;

\  : ASR   ( n1 -> n2 )
\     FFFFFFFE AND  2/  ;

\  : LSR   ( n1 -> n2 )
\     ASR  7FFFFFFF AND  ;

DECIMAL
```

SCREEN #112

```
( SGN  U>  )
DECIMAL
: SGN    ( n -> signum.of.n )
  DUP  IF   0<  IF -1 ELSE 1 THEN THEN ;

: U>     ( un1 un2 -> flag )
  SWAP U< ;
```

SCREEN #113

```
( RRC  RLC  ADC  )
HEX     ( may be replaced with CODE definitions )
\ : RRC    ( n1 carry.in -> n2 carry.out )
\    SWAP  DUP LSR  ROT
\    IF  8000 OR  THEN    SWAP 1 AND ;

\ : RLC    ( n1 carry.in -> n2 carry.out )
\  SWAP  DUP LSL  ROT
\  IF  1 OR  THEN     SWAP 0< ;

\ : ADC  ( n1 n2 carry.in -> n3  carry.out )
\  >R  0 ROT 0  D+  R> IF  1 0 D+  THEN ;

DECIMAL
```

```
SCREEN #114
( single precision multiple rotates  ASRN  LSRN  LSLN )
DECIMAL
: ASRN    ( n1 count -> n2 )
  DUP 0>  IF     0 DO  ASR  LOOP
          ELSE  DROP  THEN ;

\ : LSRN    ( n1 count -> n2 )
\   DUP 0>  IF     0 DO  LSR  LOOP
\           ELSE  DROP  THEN  ;

\ : LSLN    ( n1 count -> n2 )
\   DUP 0>  IF     0 DO  LSL  LOOP
\         ELSE  DROP  THEN  ;



SCREEN #115
( conversions   S->Q  D->Q  D->S  Q->S  Q->D  )
DECIMAL
\ : S->Q    ( n -> q )
\   S->D  DUP DUP ;

\ : D->Q    ( d -> q )
\   S->D  DUP ;

: D->S    ( d -> n )
  DROP ;

\ : Q->S    ( q -> n )
\   DDROP    DROP ;

\ : Q->D    ( q -> d )
\   DDROP ;

SCREEN #116
( double stack ops  DOVER  DSWAP  DROT  )
DECIMAL       ( may be replaced with CODE definitions )
\ : DOVER    ( d1 d2 -> d1 d2 d1 )   ( MVP-FORTH UTILITY )
\   4_PICK  4_PICK  ;

\ : DSWAP    ( d1 d2 -> d2 d1 )   ( MVP-FORTH UTILITY )
\   4 ROLL  4 ROLL ;

\ : DROT  ( d1 d2 d3 -> d2 d3 d1 )  ( MVP-FORTH UTILITY )
\    6 ROLL  6 ROLL ;







SCREEN #117
( double precision stack ops  D@  D>R  DR>  DR@  )
DECIMAL       ( may be replaced with CODE definitions )
\ : D>R    ( d -> )
\   R>  SWAP >R  SWAP >R  >R  ;
```

```
\ : DR>  ( -> d )
\    R>  R> R>  ROT  >R  ;

: DR@   ( -> d )
  I' J  ;
```

SCREEN #118

```
( double precision stack ops  DPICK  DROLL  D? )
HEX
: DPICK   ( d1 .. dn count -> d1 .. dn dm )
  DUP 1 <  ABORT" DPICK ARGUMENT < 1"
  2*  DUP 1+   PICK  SWAP PICK  ;

: DROLL   ( d1 .. dn count -> d1 ..<omit dm>.. dn dm )
  DUP 1 <  ABORT" DROLL ARGUMENT < 1"
  2*  DUP 1+  ROLL  SWAP ROLL  ;

: D?   ( addr -> )
  D@  D.  ;

DECIMAL
```

SCREEN #119

```
EXIT  ( D,  DCONSTANT DVARIABLE )
DECIMAL
: D,   ( d -> )
   SWAP ,  ,  ;

: DCONSTANT     ( d -> )  ( compiling )
                ( -> d )  ( executing )
  CREATE  D,
   DOES>  D@ ;

: DVARIABLE     ( -> )         ( compiling )
                ( -> addr )    ( executing )
  CREATE  8 ALLOT ;
```

SCREEN #120

```
( D-   D+!     )
DECIMAL
\ : D-   ( d1 d2 -> d3 )   ( MVP-FORTH UTILITY )
\    DNEGATE  D+  ;

: D+!   ( d1 addr -> )
   DUP >R  D@ D+  R> D!  ;
```

```
SCREEN #121
( double precision rotates/add  DADC  DRRC  DRLC )
HEX
: DADC    ( d1 d2 carry.in -> d3 carry.out )
   SWAP  >R  ROT  >R
   ADC  DR>   ROT   ADC ;

: DRRC  ( d1 carry.in -> d2 carry.out )
  RRC  SWAP >R  RRC  R> SWAP  ;

: DRLC   ( d1 carry.in -> d2 carry.out )
  SWAP >R  RLC  R> SWAP  RLC ;

DECIMAL

SCREEN #122
( double precision shifts  DASR  DLSR  DLSL  )
HEX
: DASR    ( d1 -> d2 )
 SWAP LSR  OVER 1 AND
 IF 80000000 OR  THEN    SWAP ASR  ;

\ : DLSR    ( d1 -> d2 )
\     DASR  7FFF AND  ;

\ : DLSL    ( D1 -> D2 )
\    DDUP D+ ;

DECIMAL

SCREEN #123
( double precision multiple shifts  DASRN  DLSRN  DLSLN )
DECIMAL
: DASRN    ( d1 n -> d2 )
  DUP 0>   IF     0 DO  DASR LOOP
           ELSE  DROP  THEN  ;

: DLSRN    ( d1 n -> d2 )
  DUP 0>   IF     0 DO  DLSR  LOOP
           ELSE  DROP  THEN  ;

: DLSLN    ( d1 n -> d2 )
  DUP 0>   IF     0 DO  DLSL  LOOP
           ELSE  DROP  THEN  ;

SCREEN #124
( DOR  DAND  DXOR  BYTESWAP  )
DECIMAL
```

```
: DOR    ( d1 d2 -> d3 )
 >R  SWAP >R  OR  DR> OR  ;
: DAND   ( d1 d2 -> d3 )
 >R  SWAP >R  AND  DR>  AND ;
: DXOR   ( d1 d2 -> d3 )
 >R  SWAP >R  XOR  DR> XOR ;
\ : BYTESWAP  ( n1 -> n2 )
\    DUP  8 DLSRN DROP  ;

SCREEN #125
\ double precision comparisons  D0<  D0>  D0=  D>  D= )
DECIMAL
: D0<   ( d1 -> flag )
  SWAP_DROP  0<  ;
: D0>   ( d1 -> flag )
  DNEGATE D0<  ;
\ : D0=   ( d1 -> flag )
\   OR 0= ;
\ : D>   ( d1 d2 -> flag )    ( MVP-FORTH UTILITY )
\   DSWAP D< ;
\ : D=   ( d1 d2 -> flag )  ( MVP-FORTH UTILITY )
\     D- D0= ;

SCREEN #126
( DMAX  DMIN  DU<  DU> )
HEX
\ : DMAX   ( d1 d2 -> d3 )  ( MVP-FORTH UTILITY )
\   DOVER DOVER  D<  IF  DSWAP  THEN   DDROP  ;
\ : DMIN   ( d1 d2 -> d3 )  ( MVP-FORTH UTILITY )
\   DOVER DOVER  D< NOT   IF  DSWAP  THEN   DDROP ;
\ : DU<   ( ud1 ud2 -> flag )  ( MVP-FORTH UTILITY )
\   D>R  80000000 +  DR>  80000000 +  D<  ;
: DU>   ( ud1 ud2 -> flag )
  DSWAP DU<  ;
DECIMAL

SCREEN #127
( quad precision stack ops  QDROP QDUP QOVER QSWAP QROT )
DECIMAL     ( may be replaced with CODE definitions )
: QDROP   ( q -> )
  DDROP DDROP  ;
: QDUP   ( q1 -> q1 q1 )
  DOVER DOVER  ;
: QOVER   ( q1 q2 -> q1 q2 q1 )
```

```
  4 DPICK  4 DPICK  ;
: QSWAP   ( q1 q2 -> q2 q1 )
  4 DROLL  4 DROLL  ;
: QROT   ( q1 q2 q3 -> q2 q3 q1 )
  6 DROLL  6 DROLL  ;
```

SCREEN #128

```
( quad precision store and fetch  Q!  Q@  )
DECIMAL      ( may be replaced with CODE definitions )
\ Bytes stored in low to high order, offset 0 = first byte
: Q!   ( q addr -> )
   DUP  >R  8 + D!  R>  D! ;
: Q@   ( addr -> q )
  DUP  D@  ROT  8
```

SCREEN #129

```
( quad return stack operations  Q>R  QR>  QR@  )
DECIMAL      ( may be replaced with CODE definitions )
: Q>R   ( q -> )
  R> TEMP-ADDR !  D>R D>R  TEMP-ADDR @  >R  ;
: QR>   ( -> q )
  R> TEMP-ADDR !  DR> DR>  TEMP-ADDR @  >R  ;
: QR@  ( -> Q )
  R>  TEMP-ADDR !  DR> DR>
  QDUP  D>R D>R  TEMP-ADDR @  >R  ;
```

SCREEN #130

```
( quad logical ops  QOR  QAND  QXOR )
DECIMAL
: QOR          ( q1 q2 -> q3 )
   D>R  DSWAP   D>R  DOR    DR>   DR> DOR  ;
: QAND         ( q1 q2 -> q3 )
   D>R  DSWAP   D>R  DAND   DR>   DR> DAND  ;
: QXOR         ( q1 q2 -> q3 )
   D>R  DSWAP   D>R  DXOR   DR>   DR> DXOR  ;
```

SCREEN #131

```
( QADC )
DECIMAL      ( may be replaced with CODE definitions )
: QADC   ( q1 q2 carry.in -> q3 carry.out )
  TEMP-CARRY !  D>R  DSWAP D>R  TEMP-CARRY @   DADC
   DR> DR>  5 ROLL  DADC  ;
```

SCREEN #132

```
( Q+  QNEGATE  Q-   DM+  )
DECIMAL
: Q+   ( q1 q2 -> qsum )
   0 QADC  DROP  ;

: QNEGATE     ( q1 -> -q1 )
  -1. -1. QXOR    1. 0. Q+    ;

: Q-   ( q1 q2 -> q3 )
  QNEGATE Q+   ;

\ : DM+     ( q1 d2 -> q3 )
\    D->Q Q+   ;
```

SCREEN #133

```
( Q+!  Q+-  QABS )
DECIMAL
: Q+!    ( q addr -> )
  DUP >R  Q@ Q+  R> Q!   ;

: Q+-   ( q1 n2 -> q3 )
  0<  IF  QNEGATE  THEN  ;

: QABS   ( q1 -> q2 )
  DUP Q+-   ;
```

SCREEN #134

```
( QASR  QLSR  QLSL )
HEX
: QASR    ( q1 -> q2 )
  DSWAP  DLSR  4_PICK  1 AND
  IF  80000000 OR  THEN    DSWAP DASR  ;
```

```
: QLSR    ( q1 -> q2 )
  QASR  7FFFFFFF AND ;

: QLSL    ( q1 -> q2 )
   QDUP Q+  ;

DECIMAL
```

SCREEN #135

```
EXIT ( QASRN  QLSRN  QLSLN  )
DECIMAL
: QASRN    ( q1 n2 -> q3 )
  DUP 0>   IF     0 DO   QASR  LOOP
           ELSE  DROP  THEN  ;

: QLSRN    ( q1 n2 -> q3 )
  DUP 0>   IF     0 DO   QLSR  LOOP
           ELSE  DROP  THEN  ;

: QLSLN    ( q1 n2 -> q3 )
  DUP 0>   IF     0 DO   QLSL  LOOP
           ELSE  DROP  THEN  ;
```

SCREEN #136

```
( basic double multiplication  DU* )
DECIMAL      ( may be replaced with CODE definitions )
: DU*   ( ud1 ud2 -> uq3 )
  ( adds 4 partial products to get result )
  OVER  5 PICK  U*  D>R  SWAP  3 PICK  U*  D>R
  ROT  OVER  U*  D>R  U*  0 0  DSWAP
  0  DR>  0 Q+  0 DR>  0 Q+  DR>  0 0 Q+  ;
```

SCREEN #137

```
( double precision multiplication  D*  DM* )
DECIMAL
: D*    ( d1 d2 -> d3 )
  DU* DDROP  ;

: DM*    ( d1 d2 -> q3 )
  DUP  4_PICK  XOR >R
  DABS  DSWAP DABS  DU*  R> Q+-  ;
```

```
SCREEN #138
( double precision unsigned division  DU/MOD )
HEX      ( may be replaced with CODE definitions )
: DU/MOD    ( uq1 ud2 -> ud3 ud4 )
  >R >R TSUML Q! R> R>
  DDUP  DNEGATE  TSUMH D+!  41 >R
  BEGIN   TSUMH 4+ @  0<  R> 1- DUP >R
  WHILE  TSUML Q@  QLSL  TSUML Q!
     IF  DDUP
     ELSE  DDUP DNEGATE    1 TSUML +!  THEN
     TSUMH  D+!  REPEAT
  R> DROP
  TSUML D@  3_PICK NOT   DRLC DROP  ROT
  IF  DSWAP  TSUMH D@ D+
  ELSE   DSWAP DDROP   TSUMH D@  THEN  DSWAP ;

DECIMAL

SCREEN #139
( double precision mixed division  DM/MOD  DM/  D/MOD  D*/MOD )
DECIMAL
: DM/MOD    ( uq1 ud2 -> ud3 uq4 )
  D>R  0 0 DR@  DU/MOD  DR> DSWAP D>R  DU/MOD DR>  ;

: DM/    ( q1 d2 -> d3 d4 )
  3_PICK >R  D>R  QABS  R> R@  DABS  DU/MOD
  R> R@  XOR D+-  DSWAP  R>  D+-  DSWAP  ;

: D/MOD    ( d1 d2 -> d3 d4 )
  D>R  S->D  S->D  DR>  DM/  ;

: D*/MOD    ( d1 d2 d3 -> d4 d5 )
  D>R  DM*  DR>  DM/  ;

SCREEN #140
( D/  D*/  DMOD )
DECIMAL
: D/    ( d1 d2 -> d3 )
  D/MOD  DSWAP DDROP  ;

: D*/    ( d1 d2 d3 -> d4 )
  D*/MOD  DSWAP DDROP  ;

: DMOD    ( d1 d2 -> d3 )
  D/MOD DDROP  ;
```

SCREEN #141

```
( DINP#  DMODE  ?MODE )
DECIMAL
: DINP#     ( -> D )   ( "state-smart" word )
   BL WORD  <NUMBER>
   [COMPILE] DLITERAL  ;  IMMEDIATE

: DMODE  ( -> )
   0 <?MODE> !
   ' <NUMBER> CFA      'NUMBER !
   ' <INTERPRET> CFA  'INTERPRET !
   R> DROP  INTERPRET  ;     IMMEDIATE

: ?MODE    ( -> flag=0,1,2 )
   <?MODE> @ ;
DMODE
```

SCREEN #142

SCREEN #143

```
EXIT  \ Note:  32-bit floating point number is 1 stack element!!
\ And temporary numbers are d-nums!!!
```

SCREEN #144

```
EXIT \ floating point return stack operations  F>R  FR>  FR@  )
DECIMAL      ( may be replaced with CODE definitions )
: F>R    ( f1 -> )
   R>  SWAP >R  SWAP >R   >R ;

: FR>    ( -> f1 )
```

```
R> R> R>  ROT  >R  ;

: FR@   ( -> f1 )
  I' J ;
```

SCREEN #145

```
EXIT ( floating aliases -- NOT NEEDED -- 32 BITS=SINGLE PREC )
DECIMAL
: F@           @  ;
: F!           !  ;
: FDROP        DROP  ;
: FDUP         DUP  ;
: FSWAP        SWAP  ;
: FOVER        OVER  ;
: FROT         ROT  ;
: FPICK        PICK  ;
: FROLL        ROLL  ;
: FCONSTANT    CONSTANT  ;
: FVARIABLE    VARIABLE  ;
: FLITERAL     [COMPILE] LITERAL  ;   IMMEDIATE
: F,           ,  ;
```

SCREEN #146

```
( FABS  F0=  and temporary absolute values & zero test )
HEX
: FABS   ( f1 -> f2 )
  7FFFFFFF AND  ;

: F0=   ( f1 -> flag )
  FABS  0=  ;

: TABS   ( t1 -> t2 )
   >R FABS R>  ;

: T0=   ( t1 -> t1 flag )
  ( Note:  does NOT remove t1 from stack !!! )
  >R  DUP F0= R> SWAP  ;

DECIMAL
```

SCREEN #147

```
( various T operations )
HEX
\ : TDROP    ( t1 -> )
\    DDROP  ;

: CHK0    ( t1 -> t2 )   ( forces clean zero )
   T0=  IF  DDROP 0 0  THEN  ;

: TNEGATE    ( t1 -> t2 )
   >R  80000000 XOR  R> CHK0  ;

: T+-   ( t1 n2 -> t3 )
```

```
   O< IF  TNEGATE  THEN  ;
 DECIMAL
```

```
SCREEN #148
 EXIT ( TSWAP  TOVER  TDUP  T@  T! )
 DECIMAL      ( may be replaced with CODE definitions )
 : TSWAP    ( t1 t2 -> t2 t1 )
    DSWAP ;
 : TOVER    ( t1 t2 -> t1 t2 t1 )
    DOVER ;
 : TDUP    ( t1 -> t1 t1 )
    DDUP ;
 : T@    ( addr -> t1 )
    D@ ;
 : T!    ( t1 addr -> )
    D!  ;
```

```
SCREEN #149
 ( floating point to temporary conversion )
 HEX       ( may be replaced with CODE definitions )
 : F->T    ( f1 -> t2 )
   DUP  F0=
   IF  DROP  0 0
   ELSE  DUP 7F800000 AND  17 LSRN  7F -  >R  DUP >R
     7FFFFF AND  800000 OR  7 LSLN  R> R>
     SWAP T+-  THEN  ;
 DECIMAL
```

```
SCREEN #150
 \ 32-bit normalization of mantissa
 HEX       ( may be replaced with CODE definitions )
 : UTNORMALIZE    ( ut1 -> ut2 )
   OVER  IF  <UNORM>    ELSE  DROP 0 THEN ;
 \ >R  DUP 0<
 \ IF  ( shift right )  LSR R>  1+
 \ ELSE  DUP 0=
 \     IF  ( zero )  R> DROP 0
 \     ELSE  ( shift left )
 \         \   BEGIN   DUP  40000000 AND NOT
 \         \   WHILE   LSL  R> 1- >R    REPEAT
 \         \   R>
 \     THEN
 \ THEN  ;
 DECIMAL
```

SCREEN #151

```
( temporary to floating point conversion )
HEX      ( may be replaced with CODE definitions )
: T->F    ( t1 -> f2 )
  CHK0  OVER ( sign ) >R  7F +  ( exponent )  >R   FABS
  DUP 0=
  IF  R> R> DDROP
  ELSE  ( round )  40 + R> UTNORMALIZE
        17 LSLN  7F800000 AND
        SWAP 7 LSRN   7FFFFF AND OR
     R> 80000000 AND OR     THEN ;

DECIMAL
```

SCREEN #152

```
( floating to temp conversions and quad normalize )
HEX
: SEPARATE2   ( f1 f2 -> t1 t2 )
  >R  F->T   R>  F->T  ;

: UDNORMALIZE  ( ud1 n2 -> ud3 n4 )
  >R DDUP D0=  IF R> DROP 0   ELSE  R> <UDNORM> THEN ;
\ >R  DUP  0<
\ IF  DLSR  R>  1+
\ ELSE DDUP  D0=
\    IF  ( zero ) R> DROP 0
\    ELSE ( shift left )
\      BEGIN  DUP  40000000 AND  NOT
\      WHILE  DLSL  R> 1- >R  REPEAT   R>  THEN  THEN ;
\      R>  <UDNORM>   THEN ;
 DECIMAL
```

SCREEN #153

```
( temporary floating point addition )
DECIMAL      ( may be replaced with CODE definitions )
: T+    ( t1 t2 -> t3 )
  T0=  IF  DDROP
  ELSE  DSWAP  T0=
     IF  DDROP
     ELSE  ROT   DDUP >
        IF  D>R SWAP DR>  ELSE  SWAP  THEN
        OVER >R  4_PICK  DUP >R  4_PICK  XOR  0< >R
        4 ROLL FABS  4 ROLL  FABS  DSWAP  -  32 MIN LSRN
        DUP 0= IF R> DROP 0 >R  THEN     R>
        IF R> 0<     IF SWAP THEN
           NEGATE  0 ADC NOT      >R ABS R>
        ELSE  + R>  0<   THEN
        R> SWAP >R UTNORMALIZE R>   IF TNEGATE THEN
  THEN THEN   CHK0  ;
```

SCREEN #154

```
( temporary floating point multiplication )
HEX          ( may be replaced with CODE definitions )
: T*    ( t1 t2 -> t3 )
  ROT  +  OVER  4_PICK  XOR  D>R
  FABS  SWAP  FABS  U* R> 2+ UDNORMALIZE
```

```
  TO= NOT  IF
     >R  ( round )  80000000 0 D+  R> UDNORMALIZE  THEN
  >R   SWAP_DROP  DR>  T+-   CHKO  ;
DECIMAL
```

SCREEN #155

```
( temporary floating point division )
HEX      ( may be replaced with CODE definitions )
: T/    ( t1 t2 -> t3 )
  ( check for divide by zero )  TO=
  IF  DSWAP DDROP  ( result is zero )
  ELSE  ROT SWAP  - OVER  4_PICK  XOR   >R >R
     FABS  SWAP  FABS  0 SWAP  DLSR ROT
     U/MOD SWAP_DROP
     R> 1- UTNORMALIZE  R>  T+-  THEN   CHKO  ;
DECIMAL
```

SCREEN #156

```
( F+  F*  F/  F2/  F2* )
DECIMAL
: F+    ( f1 f2 -> f3 )
  SEPARATE2  T+ T->F  ;
: F*    ( f1 f2 -> f3 )
  SEPARATE2  T* T->F  ;
: F/    ( f1 f2 -> f3 )
  SEPARATE2  T/ T->F  ;
: F2/    ( f1 -> f2 )
  F->T  1-  T->F  ;
: F2*    ( f1 -> f2 )
  F->T  1+  T->F  ;
```

SCREEN #157

```
( FNEGATE  F-  F+! )
HEX
: FNEGATE    ( f1 -> f2 )
  DUP IF  80000000 XOR  THEN  ;
DECIMAL
: T-    ( t1 t2 -> t3 )
  TNEGATE  T+  ;
: F-    ( f1 f2 -> f3 )
  FNEGATE F+  ;
```

```
: F+!    ( f1 addr -> )
  DUP  >R  @ F+  R>  !  ;
: T+!  ( t1 addr -> )
  DUP >R  D@ T+  R>  D! ;
```

SCREEN #158

```
( conversions  D->F )
HEX      ( may be replaced with CODE definitions )
: N->T    ( n1 -> t2 )    ( floats the integer value )
  DUP >R  ABS  01E UTNORMALIZE   R> T+-  CHKO  ;
: N->F    ( n1 -> f2 )
   N->T  T->F  ;
: T->N    ( t1 -> n2 )
  CHKO  01E -  DUP ABS  01E >
  IF  DDROP 0
  ELSE  DUP 0>
     IF  LSLN
     ELSE  OVER  D>R  7FFFFFFF AND  R> ABS LSRN
        R> +-  THEN THEN ;
DECIMAL
```

SCREEN #159

```
( conversions  F->N    )
DECIMAL
: F->N    ( f1 -> d2 )
   F->T T->N  ;
```

SCREEN #160

```
\ floating comparisons  F0< F0>   F= F< F> )
DECIMAL
: F0<          0<  ;
: F0>          0>  ;
: F=           =   ;
: F<    ( f1 f2 -> flag )
  F- F0<  ;
: F>    ( f1 f2 -> flag )
  SWAP  F<  ;
```

```
SCREEN #161
( FMIN  FMAX  F+-  FSGN  )
DECIMAL
: FMIN    ( f1 f2 -> f3 )
  OVER OVER  F>  IF  SWAP  THEN  DROP  ;

: FMAX    ( f1 f2 -> f3 )
  OVER OVER  F<  IF  SWAP  THEN  DROP  ;

: F+-    ( f1 n2 -> f3 )
  0<  IF  FNEGATE  THEN  ;

: FSGN    ( f1 -> n2 )
  SGN  ;


SCREEN #162
( integer & fractional portion  INT  FRAC  REM )
HEX
: INT    ( f1 -> f2 )
  F->T  DUP  01F <  IF  T->N N->T THEN   T->F  ;

: TFRAC    ( t1 -> t2 )
  DUP 01F <  IF  DDUP T->N N->T T-
             ELSE  DDROP 0 0  THEN  ;

: FRAC    ( f1 -> f2 )
  F->T TFRAC  T->F  ;

: REM    ( f1 f2 -> f3 )
   OVER OVER   F/   INT  F* F-  ;

DECIMAL

SCREEN #163
( floating point input  FCONVERT )
DECIMAL
: FCONVERT    ( f1 addr2 -> f3 addr4 )
  >R F->T   BASE @  N->T  DSWAP R>
  BEGIN  1+ DUP >R   C@ BASE @ DIGIT
  WHILE  >R DOVER T*  R> N->T  T+   DPL @ 1+
     IF  1 DPL +!  THEN      R>
  REPEAT  DSWAP DDROP T->F  R> ;


SCREEN #164
( floating point input  <FNUMBER> )
HEX
: <FNUMBER>    ( addr1 -> f2 )
  3 +  0 SWAP  DUP 1+  C@  2D = DUP >R  ABS  +  -1 DPL  !
  FCONVERT  DUP  C@ BL >
```

```
IF DUP  C@ 2E =  NOT  ABORT" NOT RECOGNIZED"
   0 DPL !  FCONVERT DUP C@ BL >  ABORT" NOT RECOGNIZED"
THEN    DROP R>
IF  FNEGATE  THEN     F->T     DPL @
BEGIN   DUP 0>
WHILE  >R  BASE @ N->T  T/  R> 1-
REPEAT           DROP T->F  ;

DECIMAL
```

SCREEN #165

```
\  <FINTERPRET>   - FLOATING POINT VERSION OF <INTERPRET>
HEX
: <FINTERPRET>   ( -> )
   BEGIN  -FIND
      IF  DUP  STATE @  U<
         IF   DUP  10000000 AND
            IF SWAP @ OPCODE, ELSE  SWAP CALL,  THEN
            8000000 AND  IF  DON'T-DISTURB THEN
         ELSE  4000000 AND  ABORT" POISON WORD"  EXECUTE THEN
      ELSE   HERE 4+  NUMBER  DPL @  1+
         IF    [COMPILE]  LITERAL
         ELSE  F->N   [COMPILE]  LITERAL    THEN
      THEN  ?STACK    AGAIN  ;

DECIMAL
```

SCREEN #166

```
\ FMODE  FINP# )
DECIMAL
: FMODE    ( -> )
   2 <?MODE> !
   ' <FNUMBER> CFA      'NUMBER !
   ' <FINTERPRET> CFA  'INTERPRET !
   R> DROP   INTERPRET  ;      IMMEDIATE

: FINP#   ( -> f )   ( "state-smart" word )
  BL WORD  <FNUMBER>
  [COMPILE] LITERAL  ;      IMMEDIATE
```

SCREEN #167

```
( floating point input  TCONVERT )
DECIMAL
: TCONVERT   ( t1 addr2 -> t3 addr4 )
  >R    BASE @  N->T  DSWAP R>
  BEGIN  1+ DUP >R   C@ BASE @ DIGIT
  WHILE  >R DOVER T*  R> N->T  T+   DPL @ 1+
     IF  1 DPL +!  THEN       R>
  REPEAT  DSWAP DDROP   R> ;
```

SCREEN #168

```
( floating point input  <TNUMBER> )
HEX
: <TNUMBER>    ( addr1 -> t2 )
   3 +  0 SWAP  DUP 1+  C@  2D = DUP >R  ABS  +  -1 DPL !
   FCONVERT  DUP  C@ BL >
   IF DUP  C@ 2E =  NOT  ABORT" NOT RECOGNIZED"
      0 DPL !  FCONVERT DUP C@ BL >  ABORT" NOT RECOGNIZED"
   THEN    DROP R>
   IF  FNEGATE  THEN     F->T     DPL @
   BEGIN   DUP 0>
   WHILE  >R  BASE @ N->T  T/  R> 1-
   REPEAT          DROP  ;

DECIMAL
```

SCREEN #169

```
( TINP# )
DECIMAL
: TINP#    ( -> f )   ( "state-smart" word )
   BL WORD  <TNUMBER>
   STATE @   IF
      [COMPILE] DLITERAL
   THEN ;    IMMEDIATE



: T.   TINP# 100000 T* T->N . ;
```

SCREEN #170

```
\ TSLOG2 calculation  0.5 <= x <= 1.0  taylor series ln/ln2 )
DECIMAL
: TSLOG2      ( t1 -> t2 )        ( 0.5 <= t1 <=1 )
    TABS   T0= NOT  IF
    DDUP  TINP# -1 T+   DSWAP   TINP# 1 T+  T/
    DDUP DDUP T* TERM D!
    DDUP TINP# 2.885390082 ( 2/ln2 ) T*  FTERM D! TERM D@ T*
    DDUP TINP# .9617966939 T*  ( 2/3ln2 ) FTERM T+!  TERM D@ T*
    DDUP TINP# .5770780164 T*  ( 2/5ln2 ) FTERM T+!  TERM D@ T*
    DDUP TINP# .4121985831 T*  ( 2/7ln2 ) FTERM T+!  TERM D@ T*
    DDUP TINP# .3205988980 T*  ( 2/9ln2 ) FTERM T+!  TERM D@ T*
    DDUP TINP# .2623081893 T*  ( 2/11ln2 ) FTERM T+! TERM D@ T*
    DDUP TINP# .2219530832 T*  ( 2/13ln2 ) FTERM T+! TERM D@ T*
    DDUP TINP# .1923593388 T*  ( 2/15ln2 ) FTERM T+! TERM D@ T*
    TINP# .1697288283 T*  ( 2/17ln2 ) FTERM D@ T+  THEN ;
```

```
SCREEN #171
( chebyshev TS2**   calculation   0.0 <= x <= 1.0 )
DECIMAL
: TS2**        ( t1 -> t2 )         ( 0 <= t1 <=1 )
  TABS   DDUP TERM D!      TINP# 1.0  FTERM D!    ( x**0 )
  DDUP TINP# .69314718 T*   ( x**1 ) FTERM T+!   TERM D@ T*
  DDUP TINP# .24022636 T*   ( x**2 ) FTERM T+!   TERM D@ T*
  DDUP TINP# .055505294 T*   ( x**3 ) FTERM T+!   TERM D@ T*
  DDUP TINP# .0096135358 T*   ( x**4 ) FTERM T+!   TERM D@ T*
  DDUP TINP# .0013429811 T*   ( x**5 ) FTERM T+!   TERM D@ T*
  DDUP TINP# .00014299401 T*   ( x**6 ) FTERM T+!   TERM D@ T*
  TINP# .000021651724 T*   ( x**7 ) FTERM D@ T+   ;

SCREEN #172
( basic logarithm  LOG2 )
DECIMAL
: TLOG2    ( t1 -> t2 )
  TO=  OVER 0< OR   DUP
  IF ( BAD OPERATION )    DROP TABS TO= THEN
  NOT    IF   >R  -1 TSLOG2
     R> 1+  N->T  T+  THEN  ;

: LOG2    ( f1 -> f2 )
   F->T  TLOG2  T->F  ;

SCREEN #173
( basic exponentiation  2** )
HEX
: T2**    ( t1 -> t2 )
  OVER >R ( sign )
  TABS  DDUP T->N  DUP >R  N->T  T-
  TS2**   R>  +   R> 0<
  IF  40000000  0 ( t=1.0 )    DSWAP T/  THEN  ;

: 2**    ( f1 -> f2 )
  F->T  T2**  T->F  ;

DECIMAL

SCREEN #174
( LOGB  F** )
DECIMAL
: TLOGB    ( t1 tbase -> t3 )    ( log to a base )
  DSWAP  TLOG2  DSWAP  TLOG2  T/  ;
```

```
: LOGB   ( f1 f2 -> f3 )
  SEPARATE2  TLOGB  T->F  ;

: F**   ( f1 f2 -> f3 )
  SWAP  SEPARATE2  TLOG2  T*  T2**   T->F  ;

SCREEN #175
( LOG  LN  10**  E**  )
HEX
: LOG   ( f1 -> f2 )
  41200000   ( f=10.0 )  LOGB  ;

: LN   ( f1 -> f2 )
  402DF854   ( f=2.7182818 )   LOGB ;

: 10**   ( f1 -> f2 )
  41200000   ( f=10.0 ) SWAP  F**  ;

: E**   ( f1 -> f2 )
  402DF854   ( f=2.7182818 )  SWAP  F**  ;

DECIMAL

SCREEN #176
( ROOT  **2  1/X  EXP  )
DECIMAL
: ROOT   ( f1 f2 -> f3 )
  SEPARATE2 DSWAP  TLOG2  DSWAP T/  T2**  T->F  ;

: **2   ( f1 -> f2 )
  DUP F*  ;

: 1/X   ( f1 -> f2 )
  FINP# 1  SWAP F/  ;

: EXP   ( f1 n -> f2 )
  N->F  BASE @ N->F  SWAP  F**  F*  ;

SCREEN #177
( floating to alpha conversion  F->ME )
HEX
: F->ME   ( f1 -> d2 n3 )
  F->T  T0= NOT
  IF  OVER >R TABS  BASE @ N->T DSWAP DOVER
      TLOGB  DDUP TFRAC  DSWAP  T->N  3_PICK 0<
      IF  1- >R  40000000 0 ( t=1.0 ) T+  R> THEN
      >R  ( log almost 1? ) BASE @ DUP
      SIGDIG @  1  DO  OVER *  LOOP
      -1 +  >R N->T R>  N->T
      DSWAP TLOGB TFRAC  DOVER  T- DROP F0<
```

```
      IF  DDROP 0 0  R> 1+ >R  THEN
      SIGDIG @ 1-  N->T
      T+ DSWAP TLOG2 T* T2**   40000000  -1  ( 0.5 )
      T+ T->N S->D  R> R> SWAP  >R D+- R>  ELSE 0 THEN ;
DECIMAL
```

SCREEN #178

```
( exponent print  F.ER  F.E  )
HEX
: F.ER    ( f1 n2 -> )
  >R  F->ME   DUP >R ABS  S->D
  <# #S  DDROP  R> SIGN  BL HOLD
  50 HOLD  58 HOLD  45 HOLD  BL HOLD   DUP >R DABS
  SIGDIG @  1  DO  #  LOOP
  2E HOLD  #  R> SIGN  #>
  R>  OVER -  SPACES TYPE  ;

: F.E    ( f1 -> )
  0 F.ER  SPACE  ;

DECIMAL
```

SCREEN #179

```
( fixed point numeric printing  <F.>  F.XR  F.X )
HEX
: <F.>    ( d1 n2 -> addr3 n4 n5 )
  SIGDIG @ - 1+  NEGATE DUP  0 MAX  >R OVER >R
  >R  DABS   <#  R@ 0 MAX    ?DUP
  IF  0  DO  #  LOOP  THEN
  2E HOLD    R@ 0<
  IF  R@ ABS  0  DO  30 HOLD  LOOP  THEN
  R> DROP   #S  R> SIGN  #>   R>  ;

: F.XR   ( f1 n2 -> )
  >R F->ME  <F.> DROP  R> OVER -  SPACES TYPE  ;

: F.X    ( f1 -> )
  0 F.XR  SPACE  ;
DECIMAL
```

SCREEN #180

```
( aligned fixed point print  F.AR  F.A )
HEX
: F.AR    ( f1 n2 n3 -> )
  >R  0 MAX  >R  F->ME   SIGDIG @  OVER - 1-   R@ -  DUP 0>
  IF  SWAP >R  N->F  10**  F2/  F->N 0  D+
     R>  <F.>  R> - -
     ELSE  DROP <F.>  R>   DDUP <
        IF  SWAP -  3_PICK 3_PICK +  OVER  30 FILL +
        ELSE  DDROP   THEN    THEN
  R>  OVER -  SPACES TYPE  ;

: F.A    ( f1 n2 -> )
  0 F.AR  SPACE  ;

DECIMAL
```

```
SCREEN #181
( smart floating point prints  F.R  F.  F?  )
HEX
: F.R    ( f1 n2 -> )
  >R  DUP F->T   DUP 17 >  SWAP -4 <  OR
  IF  DROP R>  F.ER
  ELSE  DROP  F->ME  <F.>  DROP
     BEGIN  DDUP + 1- C@     30 =
     WHILE  1-  REPEAT
  R>  OVER -  SPACES TYPE  THEN  ;
: F.   ( FP# -> )
  0 F.R SPACE ;
: F?     @ F. ;
DECIMAL

SCREEN #182
( SQRT  FACTORIAL )
DECIMAL
: SQRT    ( f1 -> f2 )
  FABS    F->T  DDUP TERM D!
  ( initial approximation is f1/2 )     ASR 1-
  5 0  DO  TERM D@  DOVER T/  T+  1-  LOOP
  T->F  ;
: FACTORIAL    ( f1 -> f2 )
  FINP# 1  SWAP  F->N  ABS
  1+ 2 DO    I  N->F  F*   LOOP  ;

SCREEN #183
( PI  PI/2  PI/4  2*PI  RAD->DEG  DEG->RAD )
DECIMAL
FINP# 3.14159265 CONSTANT PI
PI   F2/ CONSTANT PI/2
PI/2 F2/ CONSTANT PI/4
PI   F2* CONSTANT 2*PI
: RAD->DEG    ( f1 -> f2 )
  FINP# 57.29577951 F* ;
: DEG->RAD    ( f1 -> f2 )
  FINP# 0.0174532925 F*  ;

SCREEN #184
( chebyshev sine routine )
DECIMAL
: TSIN    ( t1 -> t2 )
  ( input from -pi/4 TO pi/4 )
  DDUP  DDUP T* TERM D!
```

```
   DDUP TINP# .9999999995 ( x**1 ) T*  FTERM D!
   TERM D@ T*  DDUP  TINP# -.1666666663 ( x**3 ) T* FTERM T+!
   TERM D@ T*  DDUP  TINP# .008333328785 ( x**5 ) T* FTERM T+!
   TERM D@ T*  DDUP  TINP# -.0001983920268 ( x**7 ) T* FTERM T+!
   TERM D@ T*  TINP# .000002717349463 ( x**9 )  T* FTERM D@ T+ ;
```

```
SCREEN #185
( chebyshev cosine routine )
DECIMAL
: TCOS    ( t1 -> t2 )
  ( input from -pi/4 to pi/4 )
  DDUP T* DDUP TERM D!
  DDUP TINP# -.4999999943 ( x**2 ) T*  FTERM D!
  TERM D@ T*  DDUP  TINP# .0416666167 ( x**4 ) T* FTERM T+!
  TERM D@ T*  DDUP  TINP# -0.001388661862 ( x**6 ) T* FTERM T+!
  TERM D@ T*  TINP# .00002437988031 ( x**8 )  T* FTERM D@ T+
  TINP# 1.0  T+ ;
```

```
SCREEN #186
( full range cosine and sine  <COS>  <SIN>  )
DECIMAL
: <COS>   ( FP# -> FP# )
  FABS  2*PI REM   DUP PI F>
  IF  FNEGATE  2*PI F+  THEN
  DUP  PI/2  F>
  IF  FNEGATE  PI F+  -1 >R   ELSE   1 >R  THEN
  DUP  PI/4 F>
  IF  FNEGATE  PI/2 F+  F->T TSIN T->F
  ELSE  F->T TCOS T->F  THEN
  R> F+-  ;

: <SIN>   ( f1 -> f2 )
  FNEGATE   PI/2 F+   <COS>  ;
```

```
SCREEN #187
( derived trig functions  <TAN>  <SEC>  <CSC>  <COT> )
DECIMAL
: <TAN>   ( f1 -> f2 )
  DUP <SIN>  SWAP <COS>  F/  ;

: <SEC>   ( f1 -> f2 )
  <COS>  1/X  ;

: <CSC>   ( f1 -> f2 )
  <SIN>  1/X  ;
```

```
: <COT>    ( f1 -> f2 )
  DUP <COS>  SWAP <SIN>  F/  ;
```

```
SCREEN #188
( trig functions  COS  SIN  TAN  SEC  CSC  COT  )
DECIMAL
: COS    ( f1 -> f2 )
  DEG->RAD  <COS>  ;
: SIN    ( f1 -> f2 )
  DEG->RAD  <SIN>  ;
: TAN    ( f1 -> f2 )
  DEG->RAD  <TAN>  ;

: SEC    ( f1 -> f2 )
  DEG->RAD  <SEC>  ;
: CSC    ( f1 -> f2 )
  DEG->RAD  <CSC>  ;
: COT    ( f1 -> f2 )
  DEG->RAD  <COT>  ;
```

```
SCREEN #189
( chebyshev arctangent routine )
DECIMAL
: TATAN    ( t1 -> t2 )
  ( input from -1 to 1 )
  DDUP  DDUP T* TERM D!
  DDUP TINP# .9999999842 ( x**1 ) T*  FTERM D!
  TERM D@ T*  DDUP  TINP# -.3333306679 ( x**3 ) T* FTERM T+!
  TERM D@ T*  DDUP  TINP# .1999248354 ( x**5 ) T* FTERM T+!
  TERM D@ T*  DDUP  TINP# -.1420257041 ( x**7 ) T* FTERM T+!
  TERM D@ T*  DDUP  TINP# .1063675406 ( x**9 ) T* FTERM T+!
  TERM D@ T*  DDUP  TINP# -.0749544546 ( x**11 ) T* FTERM T+!
  TERM D@ T*  DDUP  TINP# .0425876076 ( x**13 ) T* FTERM T+!
  TERM D@ T*  DDUP  TINP# -.0160050306 ( x**15 ) T* FTERM T+!
  TERM D@ T*  TINP# .0028340643 ( x**17 )  T* FTERM D@ T+ ;
```

```
SCREEN #190
( basic inverse trig function  <ATAN> <ATAN2>  )
DECIMAL
: <ATAN>    ( f1 -> f2 )
  DUP FABS  FINP# 1  F>
  IF  DUP >R  FINP# 1  SWAP F/  F->T TATAN T->F
      FNEGATE  PI/2  R> F+-  F+
  ELSE  F->T TATAN T->F  THEN  ;

: <ATAN2>    ( fx fy -> f3 )
  OVER F0=
  IF  >R DROP DROP  PI/2  R> F+-
  ELSE  OVER F0<
     IF  DUP F0<  >R  SWAP F/  <ATAN>  PI  R>
        IF  F-  ELSE  F+  THEN
     ELSE  SWAP F/  <ATAN>  THEN THEN ;
```

SCREEN #191

```
( derived inverse trig  <ASIN>  <ACOS>  <ACOT>  )
DECIMAL
: <ASIN>    ( f1 -> f2 )
  DUP FABS  FINP# 1  F=
  IF  SWAP DROP  PI/2  ROT F+-
  ELSE  FINP# 1  OVER  **2  F-  SQRT F/  <ATAN>  THEN  ;

: <ACOS>    ( f1 -> f2 )
  <ASIN> FNEGATE   PI/2 F+  ;

: <ACOT>    ( f1 -> f2 )
  <ATAN> FNEGATE   PI/2 F+  ;
```

SCREEN #192

```
( derived inverse trig  <ASEC>  <ACSC>  )
DECIMAL
: <ASEC>    ( f1 -> f2 )
  DUP  **2  FINP# -1  F+  SQRT  <ATAN> SWAP   FO<
  IF  PI F- THEN   ;

: <ACSC>   ( FP# -> FP# )
  DUP  FABS  FINP# 1  F=
  IF  SWAP DROP  PI/2  ROT F+-
  ELSE  DUP  **2 FINP# -1  F+
     SQRT 1/X    <ATAN> SWAP   FO<
     IF  PI F- THEN  THEN  ;
```

SCREEN #193

```
( trig functions  ACOS  ASIN  ATAN  ASEC  ACSC  ACOT  ATAN2 )
DECIMAL
: ACOS    ( f1 -> f2 )
  <ACOS>  RAD->DEG  ;
: ASIN    ( f1 -> f2 )
  <ASIN>  RAD->DEG  ;
: ATAN    ( f1 -> f2 )
  <ATAN>  RAD->DEG  ;
: ASEC    ( f1 -> f2 )
  <ACSC>  RAD->DEG  ;
: ACSC    ( f1 -> f2 )
  <ACSC>  RAD->DEG  ;
: ACOT    ( f1 -> f2 )
  <ACOT>  RAD->DEG  ;
: ATAN2    ( fx fy -> f3 )
  <ATAN2>  RAD->DEG  ;
```

SCREEN #194

```
( <P->R>  <R->P>  P->R  R->P  )
DECIMAL
: <P->R>    ( frad fang -> fx fy )
  OVER OVER  <SIN>  F* >R
  <COS>  F* R>  ;
```

```
: <R->P>    ( fx fy -> frad fang )
  OVER OVER  <ATAN2> >R
  **2 SWAP  **2 F+  SQRT R>  ;

: P->R    ( frad fang -> fx fy )
  DEG->RAD  <P->R>  ;

: R->P    ( fx fy -> frad fang )
  <R->P>  RAD->DEG ;
```

SCREEN #195

SCREEN #196

```
( Calculation speed and accuracy benchmark )
( Adapted from BYTE magazine )
(   Volume 10, No. 5, MAY 1985, page 282 )
FINP# 2.71828 CONSTANT FA
FINP# 3.14159 CONSTANT FB

: CALCULATIONS    ( -> )
   FINP# 1.0
   5000 0 DO     FA F*   FB  F*
                 FA F/   FB  F/    LOOP
   ( CR  ." DONE"  CR )   ."      ERROR="  FINP# 1.0  F- F.   ;
```

SCREEN #197

```
\ Trig table test  -- This is a good stress of the board!
DECIMAL
: TEST-TRIG   ( -> )
   CR
   ."    X       SIN(X)      COS(X)              TAN(X)" CR
   ."   ====  ==========  ==========          ===========" CR
   361 0 DO
      I N->F  DUP   5 F.R
      DUP  SIN  7 12 F.AR
      DUP  COS  7 12 F.AR
            TAN  7 19 F.AR    CR
```

```
      ?TERMINAL ABORT" ..BREAK.."
   LOOP ;
```

SCREEN #198

```
\ Stress test based on trig functions - 1
DECIMAL
: STRESS-COMPARE    ( D1 N2 D3 N4 -> )
   >R  ROT >R
   D=  R> R> =  AND
   NOT  ABORT" BAD COMPARE" ;
```

SCREEN #199

```
\ Stress test based on trig functions - 2
DECIMAL
: STRESS  ( -> )
   1000 0 DO CR I .
   361 0 DO     ." ."
      I N->F  DUP   F->ME  4 PICK F->ME  STRESS-COMPARE
        DUP SIN  F->ME  4 PICK  SIN F->ME  STRESS-COMPARE
        DUP COS  F->ME  4 PICK  COS F->ME  STRESS-COMPARE
        DUP TAN  F->ME  4 PICK  TAN F->ME  STRESS-COMPARE
      DROP
      ?TERMINAL ABORT" ..BREAK.."
   LOOP LOOP ;
```

APPENDIX A

PART III

DIAGNOSTICS & TESTS

PROGRAM LISTING

```
SCREEN #1
INDEX --- CPU/32 TEST SOURCE                            PHIL KOOPMAN JR.
LIBRARY VERSION    FILE: TEST.4TH                  LAST UPDATE: 6/1/87

BETA TEST VERSION  (C) COPYRIGHT 1987
BY PHIL KOOPMAN JR.

LOAD      SOURCE
SCREEN    SCREENS    CONTENTS
=======   ========   ========
  2       2 - 66     COMPREHENSIVE STATIC TEST SUITE FROM HOST
                     NOTE: TRASHES CPU/32 MEMORY!!!!!!!!!!!!!!
  3       70 - 75    RAM TEST FROM CPU/32
 ...      80 - 124   STRESS TEST FROM CPU32


SCREEN #2
\  STATIC TEST SUITE FOR FORTH BOARD -- LOAD FROM HOST PC
DECIMAL          MATH       STOP       : TASKZZ ;
VARIABLE DISP-PASS    1 DISP-PASS !
: ZZ      ( DVALUE  DVALUE  N -> )
     >R  QDUP  D=
     IF    DISP-PASS @  IF    ." PASS "   THEN    QDROP  R> DROP 0
     ELSE    CR ."  *** ERROR #" R> .
               ." EXPECTED: "  DU.
              ."     ACTUAL: "  DU.  KEY 13 = CR THEN
   ?TERMINAL  OR  ABORT" BREAK" ;
: QZ 66 4 DO CR  1 0 DO CR J 3 .R ." :"  J LOAD
   ?TERMINAL ABORT" BREAK" LOOP LOOP ;          CR CR
( ERROR MESSAGE HERE IF BREAK KEY USED ==> )  QZ
FORGET TASKZZ  CR CR
LOAD-ALL CR CR ." Test complete." CR CR ." Type:  CPU32" CR
."         3 LOAD" CR ." for stress testing." CR CR

SCREEN #3
\  STRESS TEST LOAD SCREEN   -- ** DO A LOAD-ALL FIRST!! **
DECIMAL
10 CONSTANT REPS                    100000 CONSTANT #TIMES
CR CR ." STRESS TEST.  ITERATIONS = "    REPS #TIMES * . CR CR
70 75 THRU      \ Load RAM TEST
: FORGET-MARKER ;
CR ." Executing 1 RAM test." CR
HEX CR RAM-TEST CR CR DECIMAL   \ Run single RAM test
CR ." Executing stress tests." CR
80 124 THRU      \ Load & execute other stress tests
FORGET  FORGET   RKER
CR ." Executing ' REPS . ." RAM tests." CR
```

```
HEX REPEAT-RAM-TEST  DECIMAL   \ Run N RAM-TESTS
CR ." Executing trig function stress test." CR
." Press any key to stop." CR
STRESS                         \ Run trig stress test
```

SCREEN #4

```
." TEST MIR REGISTER" CR
HEX   MATH
00000000. MIR!  MIR@    00000000.   1 ZZ
FFFFFFFF. MIR!  MIR@    FFFFFFFF.   2 ZZ
12345678. MIR!  MIR@    12345678.   3 ZZ
EDCBA987. MIR!  MIR@    EDCBA987.   4 ZZ


DECIMAL
```

SCREEN #5

```
." TEST STATUS REGISTER" CR
HEX           MATH
: XXA   0 ::  DEST=STATUS  ;SET   X!  ;
: XXB   STATUS  0 ;

0000. XXA   XXB  OFF. DAND    0000.       1 ZZ
00FF. XXA   XXB  OFF. DAND    00FF.       2 ZZ
0012. XXA   XXB  OFF. DAND    0012.       3 ZZ
00ED. XXA   XXB  OFF. DAND    00ED.       4 ZZ

DECIMAL
```

SCREEN #6

```
." TEST PC REQUEST REGISTER" CR
HEX           MATH
: XXC   DROP  PCREQ  ;
: XXD   0 :: SOURCE=FLAGS ;SET X@ ;

0000. XXC   XXD  OFF. DAND    0000.       1 ZZ
005A. XXC   XXD  OFF. DAND    005A.       2 ZZ
00A5. XXC   XXD  OFF. DAND    00A5.       3 ZZ
00DE. XXC   XXD  OFF. DAND    00DE.       4 ZZ

DECIMAL
```

SCREEN #7

```
." DP TEST" CR
HEX            MATH
: XXE   0 :: DEST=DP   ;SET  X!  ;
: XXF   1 :: SOURCE=DP  ;SET  X@  ;
5A5.  XXE  XXF   00FFF. DAND   05A5.  1 ZZ
A5A.  XXE  XXF   00FFF. DAND   0A5A.  2 ZZ
000. XXE  0 :: INC[DP] ;DO     XXF  OFFF. DAND   0001.  3 ZZ
00F. XXE  0 :: INC[DP] ;DO     XXF  OFFF. DAND   0010.  4 ZZ
0FF. XXE  0 :: INC[DP] ;DO     XXF  OFFF. DAND   0100.  5 ZZ
FFF. XXE  0 :: INC[DP] ;DO     XXF  OFFF. DAND   0000.  6 ZZ
000. XXE  0 :: DEC[DP] ;DO     XXF  OFFF. DAND   OFFF.  7 ZZ
100. XXE  0 :: DEC[DP] ;DO     XXF  OFFF. DAND   00FF.  8 ZZ
010. XXE  0 :: DEC[DP] ;DO     XXF  OFFF. DAND   000F.  9 ZZ
001. XXE  0 :: DEC[DP] ;DO     XXF  OFFF. DAND   0000. 0A ZZ
DECIMAL
 .
```

SCREEN #8

```
." RP TEST"  CR
HEX            MATH
: XXG   0 :: DEST=RP   ;SET  X!  ;
: XXH   1 :: SOURCE=RP  ;SET  X@  ;

05A5.  XXG  XXH   00FFF. DAND   05A5.  1 ZZ
0A5A.  XXG  XXH   00FFF. DAND   0A5A.  2 ZZ
0000. XXG  0 :: INC[RP] ;DO     XXH  OFFF. DAND   0001.  3 ZZ
000F. XXG  0 :: INC[RP] ;DO     XXH  OFFF. DAND   0010.  4 ZZ
00FF. XXG  0 :: INC[RP] ;DO     XXH  OFFF. DAND   0100.  5 ZZ
0FFF. XXG  0 :: INC[RP] ;DO     XXH  OFFF. DAND   0000.  6 ZZ
0000. XXG  0 :: DEC[RP] ;DO     XXH  OFFF. DAND   OFFF.  7 ZZ
0100. XXG  0 :: DEC[RP] ;DO     XXH  OFFF. DAND   00FF.  8 ZZ
0010. XXG  0 :: DEC[RP] ;DO     XXH  OFFF. DAND   000F.  9 ZZ
0001. XXG  0 :: DEC[RP] ;DO     XXH  OFFF. DAND   0000. 0A ZZ
DECIMAL
```

SCREEN #9

```
." TEST DLO REGISTER (STORE/FETCH)" CR
HEX
: XXJ   0 ::  DEST=DLO  ;SET   X!  ;
: XXK   1 :: SOURCE=DLO  ;SET   X@ ;

\ : XXQ HEX BEGIN  0 DISP-PASS !
00000000. XXJ  XXK   00000000. ( D= NOT IF ." X"  THEN ) 1 ZZ
FFFFFFFF. XXJ  XXK   FFFFFFFF. ( D= NOT IF ." Y"  THEN ) 2 ZZ
12345678. XXJ  XXK   12345678. ( D= NOT IF ." Z"  THEN ) 3 ZZ
EDCBA987. XXJ  XXK   EDCBA987. ( D= NOT IF ." W"  THEN ) 4 ZZ
\   ?TERMINAL UNTIL 1 DISP-PASS ! DECIMAL  ;



DECIMAL
```

SCREEN #10

```
." TEST DHI REGISTER (STORE/FETCH)" CR
HEX
: XXL   0 :: ALU=B  DEST=DHI    ;SET  X!  ;
: XXM   1 :: SOURCE=DHI         ;SET  X@  ;
```

```
55555555. XXL   XXM    55555555.        1 ZZ
AAAAAAAA. XXL   XXM    AAAAAAAA.        2 ZZ
23456789. XXL   XXM    23456789.        3 ZZ
DCBA9876. XXL   XXM    DCBA9876.        4 ZZ
DECIMAL
```

SCREEN #11

SCREEN #12

SCREEN #13

```
." ALU CONSTANTS" CR
HEX
: XXW   ( A B -> )
      0 ::  DEST=DLO   ;SET   X!
      1 ::  ALU=B DEST=DHI   ;SET   X!
      2 ::  SOURCE=DLO   ;

: XXX    ( ->  RESULT )
                             DEST=DHI   ;DO
      3 ::  SOURCE=DHI              ;SET   X@    ;
```

```
O :: SOURCE=DHI  ALU=O  DEST=DHI ;DO  X@  00000000.  1 ZZ
1 :: SOURCE=DHI  ALU=-1 DEST=DHI ;DO  X@  FFFFFFFF.  2 ZZ
DECIMAL
```

SCREEN #14

```
." ALU A & B SIDE PASS THRU" CR
HEX
84512347.  00000000. XXW  ALU=A     XXX  84512347.  1 ZZ
84512347.  FFFFFFFF. XXW  ALU=A     XXX  84512347.  2 ZZ
7BAEDCB8.  FFFFFFFF. XXW  ALU=A     XXX  7BAEDCB8.  3 ZZ
00000000.  84512347. XXW  ALU=B     XXX  84512347.  4 ZZ
FFFFFFFF.  84512347. XXW  ALU=B     XXX  84512347.  5 ZZ
FFFFFFFF.  7BAEDCB8. XXW  ALU=B     XXX  7BAEDCB8.  6 ZZ
FFFFFFFF.  7BAEDCB8. XXW  ALU=A     XXX  FFFFFFFF.  7 ZZ
DECIMAL
```

SCREEN #15

```
." ALU A & B SIDE COMPLEMENT" CR
HEX
00000001.    0.   XXW  ALU=notA  XXX   FFFFFFFE.  1 ZZ
FFFFFFFE.    0.   XXW  ALU=notA  XXX   00000001.  2 ZZ
12345678.   00.   XXW  ALU=notA  XXX   EDCBA987.  3 ZZ
12345678.   FFFFFFFF.  XXW  ALU=notA  XXX   EDCBA987.  4 ZZ
0.   00000000.    XXW  ALU=notB  XXX   FFFFFFFF.  5 ZZ
0.   FFFFFFFF.    XXW  ALU=notB  XXX   00000000.  6 ZZ
0.   12345678.    XXW  ALU=notB  XXX   EDCBA987.  7 ZZ
-1.  12345678.    XXW  ALU=notB  XXX   EDCBA987.  8 ZZ
DECIMAL
```

SCREEN #16

```
." ALU NOR & NAND" CR
HEX
FFFFFFFF. FFFFFFFF.  XXW  ALU=AnorB   XXX  00000000.  1 ZZ
00000000. FFFFFFFF.  XXW  ALU=AnorB   XXX  00000000.  2 ZZ
FFFFFFFF. 00000000.  XXW  ALU=AnorB   XXX  00000000.  3 ZZ
00000000. 00000000.  XXW  ALU=AnorB   XXX  FFFFFFFF.  4 ZZ
6432ACE4. 43221252.  XXW  ALU=AnorB   XXX  98CD4109.  5 ZZ
00000000. 00000000.  XXW  ALU=AnandB  XXX  FFFFFFFF.  6 ZZ
FFFFFFFF. 00000000.  XXW  ALU=AnandB  XXX  FFFFFFFF.  7 ZZ
00000000. FFFFFFFF.  XXW  ALU=AnandB  XXX  FFFFFFFF.  8 ZZ
FFFFFFFF. FFFFFFFF.  XXW  ALU=AnandB  XXX  00000000.  9 ZZ
43239835. 436587AE.  XXW  ALU=AnandB  XXX  BCDE7FDB.  A ZZ
DECIMAL
```

SCREEN #17

```
." ALU XOR & XNOR" CR
HEX
FFFFFFFF. FFFFFFFF.  XXW  ALU=AxorB    XXX   00000000.  1 ZZ
00000000. FFFFFFFF.  XXW  ALU=AxorB    XXX   FFFFFFFF.  2 ZZ
FFFFFFFF. 00000000.  XXW  ALU=AxorB    XXX   FFFFFFFF.  3 ZZ
00000000. 00000000.  XXW  ALU=AxorB    XXX   00000000.  4 ZZ
6432ACE4. 43221252.  XXW  ALU=AxorB    XXX   2710BEB6.  5 ZZ

00000000. 00000000.  XXW  ALU=AxnorB   XXX   FFFFFFFF.  6 ZZ
FFFFFFFF. 00000000.  XXW  ALU=AxnorB   XXX   00000000.  7 ZZ
00000000. FFFFFFFF.  XXW  ALU=AxnorB   XXX   00000000.  8 ZZ
FFFFFFFF. FFFFFFFF.  XXW  ALU=AxnorB   XXX   FFFFFFFF.  9 ZZ
43239835. 436587AE.  XXW  ALU=AxnorB   XXX   FFB9E064.  A ZZ

DECIMAL
```

SCREEN #18

```
." ALU OR & AND" CR
HEX
FFFFFFFF. FFFFFFFF.  XXW  ALU=AorB    XXX   FFFFFFFF.  1 ZZ
00000000. FFFFFFFF.  XXW  ALU=AorB    XXX   FFFFFFFF.  2 ZZ
FFFFFFFF. 00000000.  XXW  ALU=AorB    XXX   FFFFFFFF.  3 ZZ
00000000. 00000000.  XXW  ALU=AorB    XXX   00000000.  4 ZZ
6432ACE4. 43221252.  XXW  ALU=AorB    XXX   6732BEF6.  5 ZZ

00000000. 00000000.  XXW  ALU=AandB   XXX   00000000.  6 ZZ
FFFFFFFF. 00000000.  XXW  ALU=AandB   XXX   00000000.  7 ZZ
00000000. FFFFFFFF.  XXW  ALU=AandB   XXX   00000000.  8 ZZ
FFFFFFFF. FFFFFFFF.  XXW  ALU=AandB   XXX   FFFFFFFF.  9 ZZ
43239835. 436587AE.  XXW  ALU=AandB   XXX   43218024.  A ZZ

DECIMAL
```

SCREEN #19

```
." ALU A+1 & CARRY PROPAGATE TEST" CR
HEX
12345678.  0. XXW  ALU=A+1  XXX  12345679.  1 ZZ
00000000.  0. XXW  ALU=A+1  XXX  00000001.  2 ZZ
0000000F.  0. XXW  ALU=A+1  XXX  00000010.  3 ZZ
000000FF.  0. XXW  ALU=A+1  XXX  00000100.  4 ZZ
00000FFF.  0. XXW  ALU=A+1  XXX  00001000.  5 ZZ
0000FFFF.  0. XXW  ALU=A+1  XXX  00010000.  6 ZZ
000FFFFF.  0. XXW  ALU=A+1  XXX  00100000.  7 ZZ
00FFFFFF.  0. XXW  ALU=A+1  XXX  01000000.  8 ZZ
0FFFFFFF.  0. XXW  ALU=A+1  XXX  10000000.  9 ZZ
FFFFFFFF.  0. XXW  ALU=A+1  XXX  00000000. 10 ZZ

DECIMAL
```

SCREEN #20

```
." ALU A+1 & BORROW PROPAGATE TEST" CR
HEX
12345678.  0. XXW  ALU=A-1  XXX  12345677.  1 ZZ
00000001.  0. XXW  ALU=A-1  XXX  00000000.  2 ZZ
00000010.  0. XXW  ALU=A-1  XXX  0000000F.  3 ZZ
```

```
00000100.  0. XXW  ALU=A-1  XXX  000000FF.  4 ZZ
00001000.  0. XXW  ALU=A-1  XXX  00000FFF.  5 ZZ
00010000.  0. XXW  ALU=A-1  XXX  0000FFFF.  6 ZZ
00100000.  0. XXW  ALU=A-1  XXX  000FFFFF.  7 ZZ
01000000.  0. XXW  ALU=A-1  XXX  00FFFFFF.  8 ZZ
10000000.  0. XXW  ALU=A-1  XXX  0FFFFFFF.  9 ZZ
00000000.  0. XXW  ALU=A-1  XXX  FFFFFFFF. 10 ZZ

DECIMAL
```

```
SCREEN #21
." ALU  A-B  A-B-1" CR
HEX
FFFFFFFF. FFFFFFFF.  XXW  ALU=A-B    XXX  00000000.  1 ZZ
00000000. FFFFFFFF.  XXW  ALU=A-B    XXX  00000001.  2 ZZ
FFFFFFFF. 00000000.  XXW  ALU=A-B    XXX  FFFFFFFF.  3 ZZ
00000000. 00000000.  XXW  ALU=A-B    XXX  00000000.  4 ZZ
6432ACE4. 43221252.  XXW  ALU=A-B    XXX  21109A92.  5 ZZ

00000000. 00000000.  XXW  ALU=A-B-1  XXX  FFFFFFFF.  6 ZZ
FFFFFFFF. 00000000.  XXW  ALU=A-B-1  XXX  FFFFFFFE.  7 ZZ
00000000. FFFFFFFF.  XXW  ALU=A-B-1  XXX  00000000.  8 ZZ
FFFFFFFF. FFFFFFFF.  XXW  ALU=A-B-1  XXX  FFFFFFFF.  9 ZZ
43239835. 436587AE.  XXW  ALU=A-B-1  XXX  FFBE1086.  A ZZ

DECIMAL
```

```
SCREEN #22
." ALU  A+B  A+B+1" CR
HEX
FFFFFFFF. FFFFFFFF.  XXW  ALU=A+B    XXX  FFFFFFFE.  1 ZZ
00000000. FFFFFFFF.  XXW  ALU=A+B    XXX  FFFFFFFF.  2 ZZ
FFFFFFFF. 00000000.  XXW  ALU=A+B    XXX  FFFFFFFF.  3 ZZ
00000000. 00000000.  XXW  ALU=A+B    XXX  00000000.  4 ZZ
6432ACE4. 43221252.  XXW  ALU=A+B    XXX  A754BF36.  5 ZZ

00000000. 00000000.  XXW  ALU=A+B+1  XXX  00000001.  6 ZZ
FFFFFFFF. 00000000.  XXW  ALU=A+B+1  XXX  00000000.  7 ZZ
00000000. FFFFFFFF.  XXW  ALU=A+B+1  XXX  00000000.  8 ZZ
FFFFFFFF. FFFFFFFF.  XXW  ALU=A+B+1  XXX  FFFFFFFF.  9 ZZ
43239835. 436587AE.  XXW  ALU=A+B+1  XXX  86891FE4.  A ZZ

DECIMAL
```

```
SCREEN #23
." ALU  A+A  A+A+1" CR
HEX
FFFFFFFF. FFFFFFFF.  XXW  ALU=A+A    XXX  FFFFFFFE.  1 ZZ
00000000. FFFFFFFF.  XXW  ALU=A+A    XXX  00000000.  2 ZZ
FFFFFFFF. 00000000.  XXW  ALU=A+A    XXX  FFFFFFFE.  3 ZZ
00000000. 00000000.  XXW  ALU=A+A    XXX  00000000.  4 ZZ
6432ACE4. 43221252.  XXW  ALU=A+A    XXX  C86559C8.  5 ZZ

00000000. 00000000.  XXW  ALU=A+A+1  XXX  00000001.  6 ZZ
FFFFFFFF. 00000000.  XXW  ALU=A+A+1  XXX  FFFFFFFF.  7 ZZ
00000000. FFFFFFFF.  XXW  ALU=A+A+1  XXX  00000001.  8 ZZ
```

```
FFFFFFFF. FFFFFFFF.  XXW  ALU=A+A+1  XXX   FFFFFFFF.  9 ZZ
43239835. 436587AE.  XXW  ALU=A+A+1  XXX   8647306B.  A ZZ
DECIMAL
```

SCREEN #24

```
." TEST 32-BIT BYTE ROTATE FROM ALU" CR
HEX
: YYA  0 :: ALU=B ROLL[ALU] DEST=DHI ;SET X!
       1 :: SOURCE=DHI ;SET X@  ;
12345678. YYA          78123456.        1 ZZ
EDCBA987. YYA          87EDCBA9.        2 ZZ
DECIMAL
```

SCREEN #25

```
." TEST 64-BIT SHIFT LEFT OF DLO/DHI -- 1" CR
HEX
: XXN  0 ::  ALU=B  DEST=DHI  ;SET   X!
       1 ::  DEST=DLO  ;SET   X!  ;
: XXP  2 :: SOURCE=DLO  ;SET  X@
       3 :: SOURCE=DHI  ;SET  X@  ;
: XXQ 0 DO   4 ::  SL[DLO] ALU=A CIN=0  SL[ALU] ;DO   LOOP  ;
00000000. 00000000.  XXN  XXP  00000000. 1 ZZ  00000000. 2 ZZ
0 :: SL[DLO]  ALU=A CIN=1  SL[ALU]  ;DO
           XXP   00000000. 3 ZZ   00000001. 4 ZZ
  7 XXQ    XXP   00000000. 5 ZZ   00000080. 6 ZZ
  1 XXQ    XXP   00000000. 7 ZZ   00000100. 8 ZZ
  7 XXQ    XXP   00000000. 9 ZZ   00008000. A ZZ
  1 XXQ    XXP   00000000. B ZZ   00010000. C ZZ
  7 XXQ    XXP   00000000. D ZZ   00800000. E ZZ
DECIMAL
```

SCREEN #26

```
." TEST 64-BIT SHIFT LEFT OF DLO/DHI -- 2" CR
HEX
 00800000.  00000000. XXN
  1 XXQ    XXP   00000000.  1 ZZ   01000000.  2 ZZ
  7 XXQ    XXP   00000000.  3 ZZ   80000000.  4 ZZ
  1 XXQ    XXP   00000001.  5 ZZ   00000000.  6 ZZ
  7 XXQ    XXP   00000080.  7 ZZ   00000000.  8 ZZ
  1 XXQ    XXP   00000100.  9 ZZ   00000000.  A ZZ
  7 XXQ    XXP   00008000.  B ZZ   00000000.  C ZZ
  1 XXQ    XXP   00010000.  D ZZ   00000000.  E ZZ
  7 XXQ    XXP   00800000.  F ZZ   00000000. 10 ZZ
  1 XXQ    XXP   01000000. 11 ZZ   00000000. 12 ZZ
  7 XXQ    XXP   80000000. 13 ZZ   00000000. 14 ZZ
  1 XXQ    XXP   00000000. 15 ZZ   00000000. 16 ZZ
DECIMAL
```

SCREEN #27

```
." TEST 64-BIT SHIFT RIGHT OF DLO/DHI -- 1" CR
HEX
: XXR  0 ::  ALU=B  DEST=DHI  ;SET   X!
       1 ::  DEST=DLO  ;SET   X!  ;
: XXS  2 :: SOURCE=DLO  ;SET  X@
       3 :: SOURCE=DHI  ;SET  X@  ;
: XXT 0 DO   4 ::  SR[DLO] ALU=A CIN=0  SR[ALU] ;DO   LOOP ;
00000000. 00000000.  XXR  XXS  00000000. 1 ZZ  00000000. 2 ZZ
0 :: SR[DLO]  ALU=A CIN=1  SR[ALU]   ;DO
           XXS   80000000. 3 ZZ   00000000. 4 ZZ
 7 XXT    XXS   01000000. 5 ZZ   00000000. 6 ZZ
 1 XXT    XXS   00800000. 7 ZZ   00000000. 8 ZZ
 7 XXT    XXS   00010000. 9 ZZ   00000000. A ZZ
 1 XXT    XXS   00008000. B ZZ   00000000. C ZZ
DECIMAL
  .
```

SCREEN #28

```
." TEST 64-BIT SHIFT RIGHT OF DLO/DHI -- 2" CR
HEX
 00000000.  00008000. XXR
 7 XXT    XXS   00000100.  1 ZZ   00000000.  2 ZZ
 1 XXT    XXS   00000080.  3 ZZ   00000000.  4 ZZ
 7 XXT    XXS   00000001.  5 ZZ   00000000.  6 ZZ
 1 XXT    XXS   00000000.  7 ZZ   80000000.  8 ZZ
 7 XXT    XXS   00000000.  9 ZZ   01000000.  A ZZ
 1 XXT    XXS   00000000.  B ZZ   00800000.  C ZZ
 7 XXT    XXS   00000000.  D ZZ   00010000.  E ZZ
 1 XXT    XXS   00000000.  F ZZ   00008000. 10 ZZ
 7 XXT    XXS   00000000. 11 ZZ   00000100. 12 ZZ
 1 XXT    XXS   00000000. 13 ZZ   00000080. 14 ZZ
 7 XXT    XXS   00000000. 15 ZZ   00000001. 16 ZZ
 1 XXT    XXS   00000000. 17 ZZ   00000000. 18 ZZ
DECIMAL
```

SCREEN #29

SCREEN #30

SCREEN #31

SCREEN #32

```
." TEST RAM ADDRESS LATCH VIA ADDR COUNTER" CR
HEX                 MATH
: YYG  0 :: DEST=ADDRESS-COUNTER ;SET X!
       1 :: SOURCE=ADDRESS-COUNTER ;SET X@ ;

12345678. YYG  07FFFFC. DAND   00345678.        1 ZZ
EDCBA987. YYG  07FFFFC. DAND   004BA984.        1 ZZ

DECIMAL
```

SCREEN #33

```
." TEST ADDR COUNTER VIA RAM ADDRESS LATCH" CR
HEX
: YYH  0 :: DEST=ADDRESS-COUNTER ;SET X!
       2 :: INC[ADC] ;DO
       3 :: SOURCE=ADDRESS-COUNTER ;SET X@ ;

12545978. YYH  07FFFFC. DAND   0054597C.        1 ZZ
00000000. YYH  07FFFFC. DAND   00000004.        2 ZZ
0000003C. YYH  07FFFFC. DAND   00000040.        3 ZZ
000003FC. YYH  07FFFFC. DAND   00000400.        4 ZZ
00003FFC. YYH  07FFFFC. DAND   00004000.        5 ZZ
0003FFFC. YYH  07FFFFC. DAND   00040000.        6 ZZ
003FFFFC. YYH  07FFFFC. DAND   00400000.        7 ZZ
```

```
007FFFFC. YYH  07FFFFC. DAND   00000000.          8 ZZ
DECIMAL
```

SCREEN #34

```
." TEST ADDR COUNTER TO RAM ADDRESS LATCH" CR
HEX
: YYHA  ( RAM.BIT.PATTERN  ADDRESS -> BIT.PATTERN   )
        >> DEST=PAGE ;SET 0. X!
        DSWAP DOVER   RAM!
        >> DEST=ADDRESS-COUNTER ;SET X!
        >> SOURCE=ADDRESS-COUNTER  DEST=ADDRESS-LATCH ;DO
        >> SOURCE=RAM ;SET  X@ ;
00000000. 432C. YYHA  00000000.        1 ZZ
FFFFFFFF. 432C. YYHA  FFFFFFFF.        2 ZZ
AA55AA55. 432C. YYHA  AA55AA55.        3 ZZ
55AA55AA. 432C. YYHA  55AA55AA.        4 ZZ
DECIMAL
```

SCREEN #35

```
." TEST PAGE REGISTER" CR
HEX
: YYJ  0 :: DEST=PAGE ;SET X!
       1 :: SOURCE=ADDRESS-COUNTER ;SET X@ ;
000000000. YYJ  07F800000. DAND   000000000.          1 ZZ
0FFFFFFFF. YYJ  07F800000. DAND   07F800000.          2 ZZ
012345678. YYJ  07F800000. DAND   012000000.          3 ZZ
0EDCBA987. YYJ  07F800000. DAND   06D800000.          4 ZZ
DECIMAL
```

SCREEN #36

```
." ALU INPUT HOLDING LATCH" CR
HEX
: YYK     ( N1 -> notN1  N1 )
       1 ::  ALU=notB DEST=DHI  ;SET  X!
       2 ::  SOURCE=DHI ALU=B DEST=DHI  ;SET X@
       CYCLE  X@ ;
55555555. YYK     55555555.  1 ZZ
                  AAAAAAAA.  2 ZZ
AAAAAAAA. YYK     AAAAAAAA.  3 ZZ
                  55555555.  4 ZZ
12345678. YYK     12345678.  5 ZZ
                  EDCBA987.  6 ZZ
DECIMAL
```

SCREEN #37

```
." TEST FLAG REGISTER" CR
HEX
```

```
: YYL     ( Clear all possible errors before testing flags )
        0 :: DEST=DP ;SET  -1. X!    1 :: DEST=RP ;SET -1. X!
        2 :: SOURCE=FLAGS ;DO
        3 :: DEST=FLAGS ;SET X!
        4 :: SOURCE=FLAGS ;SET  X@ ;

00000000. YYL  0FF000000. DAND   000000000.        1 ZZ
FFFFFFFF. YYL  0FF000000. DAND   0FF000000.        2 ZZ
5A345678. YYL  0FF000000. DAND   05A000000.        3 ZZ
A5CBA980. YYL  0FF000000. DAND   0A5000000.        4 ZZ

DECIMAL
```

```
SCREEN #38
." TEST DP & RP OVERFLOW ERROR INTERRUPTS" CR
HEX
: YYM  0 :: DEST=DP ;SET X!
       1 :: DEST=FLAGS ;SET 0. X!
       2 :: SOURCE=FLAGS ;SET X@ ;
: YYN  0 :: DEST=RP ;SET X!
       1 :: DEST=FLAGS ;SET 0. X!
       2 :: SOURCE=FLAGS ;SET X@ ;

0FFF. YYM  01000000. DAND   00000000.       1 ZZ
0000. YYM  01000000. DAND   01000000.       2 ZZ

0FFF. YYN  02000000. DAND   00000000.       3 ZZ
0000. YYN  02000000. DAND   02000000.       4 ZZ

DECIMAL
```

```
SCREEN #39
." TEST HOST INTERRUPTS" CR
HEX
\  NOTE: Parity interrupt currently untestable
: YYP  1 :: DEST=FLAGS ;SET 0. X!
       2 :: SOURCE=FLAGS ;SET X@ ;

0 :: SOURCE=FLAGS ;DO
YYP  04000000. DAND   00000000.       1 ZZ
-1 PCREQ
YYP  04000000. DAND   04000000.       2 ZZ
0 :: SOURCE=FLAGS ;DO


DECIMAL
```

```
SCREEN #40
." TEST NEXT ADDRESS REGISTER VIA DEST=" CR
HEX   MATH
: YYQ  0 :: DEST=FLAGS ;SET -1. X!  ( Mask interrupts )
       ( Ensure JMP instruction )    FFFFFFFC. DAND
       2 :: ALU=B DEST=DHI ;SET  X!
          ( Automatically clk into counter during decode )
       3 :: SOURCE=DHI DEST=DECODE ;DO
       4 :: DECODE ;DO
```

```
        5 ::          ;DO  CYCLE
        6 :: SOURCE=ADDRESS-COUNTER ;SET X@ ;

00000000. YYQ  007FFFF8. DAND   00000000.        1 ZZ
7FFFFFFF. YYQ  007FFFF8. DAND   007FFFF8.        2 ZZ
12345678. YYQ  007FFFF8. DAND   00345678.        3 ZZ
EDCBA987. YYQ  007FFFF8. DAND   004BA980.        4 ZZ
DECIMAL
```

SCREEN #41

```
." TEST NEXT ADDRESS REGISTER VIA DECODE" CR
HEX
: YYR  0 :: DEST=FLAGS ;SET -1. X!  ( Mask interrupts )
       1 :: DEST=DLO ;SET  X!
          ( Automatically clk into counter during decode )
       2 :: DECODE SOURCE=DLO DEST=RAM         ;DO
       3 ::        SOURCE=DLO DEST=RAM         ;DO  CYCLE
       4 :: DECODE SOURCE=DLO DEST=RAM         ;DO
       5 ::        SOURCE=DLO DEST=RAM         ;DO  CYCLE
       6 :: SOURCE=ADDRESS-COUNTER ;SET X@ ;

00000000. YYR  007FFFF8. DAND   00000000.        1 ZZ
7FFFFFF8. YYR  007FFFF8. DAND   007FFFF8.        2 ZZ
12345678. YYR  007FFFF8. DAND   00345678.        3 ZZ
EDCBA980. YYR  007FFFF8. DAND   004BA980.        4 ZZ
DECIMAL
```

SCREEN #42

```
." TEST INSTRUCTION LATCH & CALL/EXIT BITS VIA DEST=" CR
HEX   MATH
: YYS   >> DEST=FLAGS ;SET 80000000. X!  ( Mask interrupts )
        >> DEST=DECODE ;SET X!
        >> SOURCE=MPC ;SET X@ ;

00000000. YYS  FF800003. DAND   00000000.        1 ZZ
FFFFFFFF. YYS  FF800003. DAND   FF800003.        2 ZZ
12345679. YYS  FF800003. DAND   12000001.        3 ZZ
EDCBA986. YYS  FF800003. DAND   ED800002.        4 ZZ
80000000. YYS  FF800003. DAND   80000000.        5 ZZ
40000000. YYS  FF800003. DAND   40000000.        6 ZZ
20000000. YYS  FF800003. DAND   20000000.        7 ZZ
DECIMAL
```

SCREEN #43

```
." TEST INSTRUCTION LATCH & CALL/EXIT BITS VIA DECODE" CR
HEX
: YYT  0 :: DEST=FLAGS ;SET -1. X!  ( Mask interrupts )
       1 :: DEST=DLO ;SET  X!
          ( Automatically clk into counter during decode )
       2 :: DECODE SOURCE=DLO DEST=RAM ;DO
       3 ::        SOURCE=DLO DEST=RAM ;DO  CYCLE
       4 :: SOURCE=MPC ;SET X@ ;

00000000. YYT  F8000003. DAND   00000000.        1 ZZ
FFFFFFFF. YYT  F8000003. DAND   F8000003.        2 ZZ
12345679. YYT  F8000003. DAND   10000001.        3 ZZ
EDCBA986. YYT  F8000003. DAND   E8000002.        4 ZZ
DECIMAL
```

SCREEN #44

```
." TEST MICROPROGRAM COUNTER -- LOAD/READ" CR
HEX
: YYU  0 :: DEST=FLAGS ;SET -1. X!   ( Mask interrupts )
       1 :: DEST=DLO ;SET  X!
       2 :: DECODE  SOURCE=DLO  DEST=RAM  JMP=000 ;DO
       3 ::         SOURCE=DLO  DEST=RAM  JMP=000 ;DO
       4 :: DECODE  SOURCE=DLO  DEST=RAM  JMP=000 ;DO
       5 :: SOURCE=MPC ;SET X@ ;
00000000. YYU  000FF800. DAND   00000000.      1 ZZ
FFFFFFFF. YYU  000FF800. DAND   000FF800.      2 ZZ
12345679. YYU  000FF800. DAND   00012000.      3 ZZ
EDCBA986. YYU  000FF800. DAND   000ED800.      4 ZZ
DECIMAL
```

SCREEN #45

```
." TEST MICROPROGRAM COUNTER -- INCREMENT" CR
HEX
: YYUA  0 :: DEST=FLAGS ;SET -1. X!   ( Mask interrupts )
        1 :: DEST=DLO ;SET  X!
        2 :: DECODE  SOURCE=DLO  DEST=RAM  JMP=000 ;DO
        3 ::         SOURCE=DLO  DEST=RAM  JMP=000 ;DO
        4 :: DECODE  SOURCE=DLO  DEST=RAM  JMP=000 ;DO
        6 :: INC[MPC]  ;DO    6 :: ;DO
        6 :: SOURCE=MPC ;SET X@ ;
00000000. YYUA  000FF800. DAND   00000800.      1 ZZ
FFFFFFFF. YYUA  000FF800. DAND   000F8000.      2 ZZ
12345679. YYUA  000FF800. DAND   00012800.      3 ZZ
EDCBA986. YYUA  000FF800. DAND   000EE000.      4 ZZ
DECIMAL
```

SCREEN #46

```
." TEST INTERRUPT INSTRUCTION LATCH & CALL/EXIT BITS" CR
HEX
: YYV  0 :: DEST=FLAGS ;SET 40000000. X!   ( UN-Mask interrupts )
       1 :: DEST=DLO ;SET  X!
          ( Automatically clk into counter during decode )
       2 :: DECODE SOURCE=DLO DEST=RAM ;DO
       3 ::        SOURCE=DLO DEST=RAM ;DO  CYCLE
       4 :: SOURCE=MPC ;SET X@ ;
00000000. YYV  F8000003. DAND   00000000.      1 ZZ
FFFFFFFF. YYV  F8000003. DAND   00000000.      2 ZZ
12345679. YYV  F8000003. DAND   00000000.      3 ZZ
EDCBA986. YYV  F8000003. DAND   00000000.      4 ZZ
DECIMAL
```

SCREEN #47

```
." TEST CARRY CONDITION CODE" CR
HEX
: YYW  0 :: DEST=FLAGS ;SET -1. X!   ( Mask interrupts )
```

```
         1 :: ALU=B     DEST=DHI   ;SET        X!
         2 :: ALU=A+B   DEST=DHI   ;SET        X!
         6 :: JMP=00C   SOURCE=MPC ;SET X@ ;

 10.  20.   YYW   00000700. DAND   00000100.   1 ZZ
-10. -20.   YYW   00000700. DAND   00000000.   2 ZZ


DECIMAL
```

SCREEN #48

```
." TEST ALU=0 CONDITION CODE" CR
HEX
: YYX  0 :: DEST=FLAGS ;SET -1. X!  ( Mask interrupts )
       1 :: ALU=B     DEST=DHI   ;SET        X!
       6 :: JMP=01Z   SOURCE=MPC ;SET X@ ;

 10.  YYX   00000700. DAND   00000300.   1 ZZ
  0.  YYX   00000700. DAND   00000200.   2 ZZ


DECIMAL
```

SCREEN #49

```
." TEST ALU SIGN CONDITION CODE" CR
HEX
: YYY  0 :: DEST=FLAGS ;SET -1. X!  ( Mask interrupts )
       1 :: ALU=B     DEST=DHI   ;SET        X!
       6 :: JMP=10S   SOURCE=MPC ;SET X@ ;

80000000.   YYY   00000700. DAND   00000500.   1 ZZ
00000000.   YYY   00000700. DAND   00000400.   2 ZZ


DECIMAL
```

SCREEN #50

```
." TEST DLO SHIFT OUT LOW BIT CONDITION CODE" CR
HEX
: YYZ  0 :: DEST=FLAGS ;SET -1. X!  ( Mask interrupts )
       1 :: DEST=DLO ;SET        X!
       2 :: ;DO
       6 :: JMP=11L   SOURCE=MPC ;SET X@ ;

  1.  YYZ   00000700. DAND   00000700.   1 ZZ
  0.  YYZ   00000700. DAND   00000600.   2 ZZ
```

```
DECIMAL
```

SCREEN #51

```
\  PRIMITIVE TO FORM 32-BIT PATTERN FROM A 0..4K #
HEX
\ Repeat the 12 bits to form full 32-bit pattern for RAM testing
CODE 4KWD   ( N=0..4K -> DPATTERN )
    AX POP    BX , AX MOV     CX , AX MOV
    BX , 1 SHL    BX , 1 SHL    BX , 1 SHL   BX , 1 SHL
    AH , BL OR
    CX , 1 SHR    CX , 1 SHR    CX , 1 SHR   CX , 1 SHR
    CH , AL MOV
    AX PUSH   CX PUSH
    NEXT JMP  END-CODE
DECIMAL
```

SCREEN #52

```
." TEST MRAM " CR
HEX
: WWA 1000 0 DO   I 4KWD   I MRAM!
                               I OFF AND 0= IF ." !" THEN  LOOP
   CR 1000 0 DO   I MRAM@     I 4KWD I   ZZ
                               I OFF AND 0= IF ." @" THEN  LOOP
   CR 1000 0 DO   I OFFFF XOR   4KWD I MRAM!
                               I OFF AND 0= IF ." !" THEN  LOOP
   CR 1000 0 DO   I MRAM@     I OFFFF XOR 4KWD I   ZZ
                               I OFF AND 0= IF ." @" THEN  LOOP ;

0 DISP-PASS !   WWA    1 DISP-PASS !
CR
12345678. 0 MRAM!    0 MRAM@    12345678. 999 ZZ

DECIMAL
```

SCREEN #53

```
." TEST DATA STACK --1" CR
HEX
: WWB   ( Ddata addr -> )       0 :: DEST=DP ;SET   0 X!
         0 :: DEST=DS   ;SET   X! ;
: WWC   ( addr -> Ddata )       0 :: DEST=DP ;SET   0 X!
        0 :: SOURCE=DS ;SET X@ ;
: WWD 1000 0 DO   I 4KWD   I WWB
                               I OFF AND 0= IF ." !" THEN  LOOP
   CR 1000 0 DO   I WWC       I 4KWD I   ZZ
                               I OFF AND 0= IF ." @" THEN  LOOP ;

0 DISP-PASS !   WWD    1 DISP-PASS !
CR
12345678.   0 WWB   0 WWC    12345678.   999 ZZ

DECIMAL
```

```
SCREEN #54
." TEST DATA STACK --2" CR
HEX
: WWE  ( Ddata addr -> )       0 :: DEST=DP ;SET  0 X!
       0 :: DEST=DS  ;SET  X! ;
: WWF  ( addr -> Ddata )       0 :: DEST=DP ;SET  0 X!
      0 :: SOURCE=DS ;SET X@ ;
: WWG 1000 0 DO  I OFFFF XOR  4KWD  I WWE
                              I OFF AND 0= IF ." !" THEN  LOOP
   CR 1000 0 DO  I WWF       I OFFFF XOR 4KWD I  ZZ
                              I OFF AND 0= IF ." @" THEN  LOOP ;
0 DISP-PASS !  WWG   1 DISP-PASS !
CR
456789AB.  0 WWE  0 WWF   456789AB.  999 ZZ
DECIMAL

SCREEN #55
." TEST RETURN STACK --1" CR
HEX
: WWH  ( Ddata addr -> )       0 :: DEST=RP ;SET  0 X!
       0 :: DEST=RS  ;SET  X! ;
: WWJ  ( addr -> Ddata )       0 :: DEST=RP ;SET  0 X!
      0 :: SOURCE=RS ;SET X@ ;
: WWK 1000 0 DO  I 4KWD  I WWH
                              I OFF AND 0= IF ." !" THEN  LOOP
   CR 1000 0 DO  I WWJ       I 4KWD I  ZZ
                              I OFF AND 0= IF ." @" THEN  LOOP ;
0 DISP-PASS !  WWK   1 DISP-PASS !
CR
12345678.  0 WWH  0 WWJ   12345678.  999 ZZ
DECIMAL

SCREEN #56
." TEST RETURN STACK --2" CR
HEX
: WWL  ( Ddata addr -> )       0 :: DEST=RP ;SET  0 X!
       0 :: DEST=RS  ;SET  X! ;
: WWM  ( addr -> Ddata )       0 :: DEST=RP ;SET  0 X!
      0 :: SOURCE=RS ;SET X@ ;
: WWN 1000 0 DO  I OFFFF XOR  4KWD  I WWL
                              I OFF AND 0= IF ." !" THEN  LOOP
   CR 1000 0 DO  I WWM       I OFFFF XOR 4KWD I  ZZ
                              I OFF AND 0= IF ." @" THEN  LOOP ;
0 DISP-PASS !  WWN   1 DISP-PASS !
CR
456789AB.  0 WWL  0 WWM   456789AB.  999 ZZ
DECIMAL

SCREEN #57
." TEST EXIT MECHANISM" CR
HEX         MATH
0 :: DEST=FLAGS ;SET -1. X!  ( Mask interrupts )
0 :: DEST=RP ;SET  201. X!
0 :: DEST=RS ;SET  12345678. X!
```

```
0 :: DEST=RP ;SET  200. X!
0 :: DEST=RS ;SET  67893453. X!
0 :: DEST=DLO ;SET  0075A5AD. X!
0 ::        SOURCE=DLO DEST=DECODE   ;DO
0 :: DECODE SOURCE=DLO DEST=RAM  ;DO
0 ::        SOURCE=DLO DEST=RAM  ;DO   CYCLE
0 :: SOURCE=RP ;SET  X@       OFFF. DAND        201.  1 ZZ
0 :: SOURCE=RS ;SET  X@                    12345678.  2 ZZ

DECIMAL

```

SCREEN #58

```
." TEST CALL MECHANISM" CR
HEX                   MATH
0 :: DEST=FLAGS ;SET -1. X!  ( Mask interrupts )
567C. 2. D+    1238. RAM!      7BCDEF80.  567C. RAM!
>> DEST=RP ;SET  200. X!
>> DEST=RS ;SET  12345678. X!
>> DEST=PAGE ;SET   0. X!
>> DEST=DECODE ;SET   0000123A.   X!
>> DEST=ADDRESS-COUNTER ;SET   0000123A.   X!
>> DECODE ;DO
>>         ;DO   CYCLE          CYCLE
>> SOURCE=RP ;SET  X@               OFFF.  DAND   1FF.  1 ZZ
>> SOURCE=RS ;SET  X@                          0000123C.  2 ZZ
>> DEST=RP ;SET  200. X!
>> SOURCE=RS ;SET  X@                          12345678.  3 ZZ
DECIMAL
```

SCREEN #59

```
." TEST RAM -- 1ST 32K BYTES " CR
HEX
: WWF 8000 0 DO  I 4KWD  I 0 RAM!
                                I 3FF AND 0= IF ." !" THEN  4 /LOOP
   CR 8000 0 DO  I 0 RAM@    I 4KWD I  ZZ
                                I 3FF AND 0= IF ." @" THEN  4 /LOOP
   CR 8000 0 DO  I OFFFF XOR   4KWD I 0 RAM!
                                I 3FF AND 0= IF ." !" THEN  4 /LOOP
   CR 8000 0 DO  I 0 RAM@    I OFFFF XOR 4KWD I  ZZ
                                I 3FF AND 0= IF ." @" THEN  4 /LOOP ;

0 DISP-PASS !  WWF   1 DISP-PASS !
CR
12345678. 0. RAM!   0. RAM@   12345678. 999 ZZ

DECIMAL
```

SCREEN #60

```
." TEST RAM BYTE ALIGNMENT FOR READ" CR
HEX
: WWQ  RAM!
       0 :: SOURCE=RAM-BYTE ;SET  X@ ;

12345678.  0.  WWQ   00000078.  1 ZZ
12345678.  1.  WWQ   00000056.  2 ZZ
12345678.  2.  WWQ   00000034.  3 ZZ
12345678.  3.  WWQ   00000012.  4 ZZ

EDCBA987.  4.  WWQ   00000087.  5 ZZ
```

```
EDCBA987.  5.  WWQ   000000A9.  6 ZZ
EDCBA987.  6.  WWQ   000000CB.  7 ZZ
EDCBA987.  7.  WWQ   000000ED.  8 ZZ
DECIMAL
```

SCREEN #61

```
." TEST RAM BYTE ALIGNMENT FOR WRITE" CR
HEX              MATH
: WWR     ECDBAFCB.  DOVER RAM!    ( Set testing background )
       0 :: DEST=RAM-BYTE ;SET   DSWAP   X!
       RAM@   ;
43212435.  0.   WWR   ECDBAF35.  1 ZZ
432[illegible]435.  1.   WWR   ECDB35CB.  2 ZZ
432[illegible]  [illegible]   WWR   EC35AFCB.  3 ZZ
432[illegible]   WWR   35DBAFCB.  4 ZZ
432124CA.  4.   WWR   ECDBAFCA.  5 ZZ
432124CA.  5.   WWR   ECDBCACB.  6 ZZ
432124CA.  6.   WWR   ECCAAFCB.  7 ZZ
432124CA.  7.   WWR   CADBAFCB.  8 ZZ
DECIMAL
```

SCREEN #62

```
\ TESTING 32-BIT FETCH AND STORE IN PROPER BOARD BYTE ORDER
HEX
CODE XD!  ( D ADDR -> )     \ Stores in lo..hi byte order
   BX POP   DX POP   AX POP
     [BX] , AL MOV      1 [BX] , AH MOV
   2 [BX] , DL MOV      3 [BX] , DH MOV
   NEXT JMP  END-CODE

CODE XD@  ( ADDR -> D )     \ Fetches in lo..hi byte order
   BX POP
   AL , 0 [BX] MOV      AH , 1 [BX] MOV
   DL , 2 [BX] MOV      DH , 3 [BX] MOV
   AX PUSH  DX PUSH
   NEXT JMP  END-CODE
DECIMAL
```

SCREEN #63

```
." TEST RAM DMA WRITE " CR
HEX
: WWS RESET-BOARD    0 DISP-PASS !
       500 0 DO  12345678. I 0 1230. D+  RAM!    4 /LOOP
   CR 500 4 DO  I 4KWD  I PAD  + XD!    4 /LOOP
   PAD 4 +  1234.  100 W->BOARD
   CR 404 4 DO  I 0 1230. D+  RAM@     I 4KWD   I   ZZ
                             4 /LOOP
   1 DISP-PASS !
    -4. 1234. D+ RAM@  12345678.      0  ZZ
   404. 1234. D+ RAM@  12345678.    404  ZZ
   408. 1234. D+ RAM@  12345678.    408  ZZ ;
WWS
: WRITE-LOOP  BEGIN WWS ?TERMINAL UNTIL ;
DECIMAL
```

```
SCREEN #64
." TEST RAM DMA READ " CR
HEX
: WWT RESET-BOARD    0 DISP-PASS !
      500 0 DO  12345678.  PAD I +    XD!    4 /LOOP
   CR 400 0 DO  I 4KWD  I 0 2350. D+  RAM!   4 /LOOP
   2350.  PAD  4 +   100 BOARD->W
   CR 400 0 DO  PAD I + 4 +  XD@    I 4KWD   I  ZZ  4 /LOOP
   1 DISP-PASS !
   PAD  0  +  XD@  12345678.   -1  ZZ
   PAD 404 +  XD@  12345678.  404  ZZ
   PAD 408 +  XD@  12345678.  408  ZZ  ;
WWT
: READ-LOOP  BEGIN WWT ?TERMINAL UNTIL ;
: ##R  BEGIN  RESET-BOARD  2350. PAD 4 + 100 BOARD->W
   ?TERMINAL UNTIL ;   DECIMAL

SCREEN #65
: ##W  BEGIN  RESET-BOARD  PAD 4 + 2350. 100 W->BOARD
   ?TERMINAL UNTIL ;   DECIMAL

SCREEN #66
." TEST RAM DMA WRITE/READ " CR
HEX
: WWW RESET-BOARD    0 DISP-PASS !
   500 0 DO  I 4KWD  I PAD  + XD!    4 /LOOP
   PAD 4 +  3320.  400 W->BOARD
   3320.  PAD  18 +   400 BOARD->W
   400 4 DO  PAD I + 14 +  XD@    I 4KWD   I  ZZ  4 /LOOP
   1 DISP-PASS !          ;
WWW   CR ." PASS"
DECIMAL
: R/W-LOOP  BEGIN WWW ." ." ?TERMINAL UNTIL ;

SCREEN #67
```

SCREEN #68

SCREEN #69

SCREEN #70

```
\ Word to zero RAM in anticipation of a ram test
: HI-ADDR  FIRST 100 - ;

: FLUSH-RAM
   WORD-ALIGN
   HI-ADDR  PAD 50 +
   DO  0   I !
      4 +LOOP ;
```

```
SCREEN #71
\ ADDRESS WRITE/READ RAM TEST
DECIMAL  VARIABLE FX
: ADDR-RW-TEST  ( -> )  SAVE-BUFFERS    0 FX !
   CR ." ADDRESS STORAGE RAM TEST"
   HI-ADDR 3 OR  3 XOR   PAD    3 OR  3 XOR
   DO  I NEGATE  I !
       I @ NEGATE  DUP  I  = NOT
      IF  CR ." FAILURE A  ADDR=" I . ."  VALUE=" U.  1 FX !
        KEY 13 =   ABORT" ABORTED"  ELSE DROP THEN
   4 /LOOP
   HI-ADDR 3 OR  3 XOR   PAD    3 OR  3 XOR
   DO  I @ NEGATE  DUP I  = NOT
      IF  CR ." FAILURE B  ADDR=" I . ." VALUE=" U.   1 FX !
        KEY 13 =   ABORT" ABORTED"  ELSE DROP THEN
   4 /LOOP EMPTY-BUFFERS  ;
: ZZ BEGIN FLUSH-RAM ADDR-RW-TEST ?TERMINAL FX @ OR UNTIL ;

SCREEN #72
\ ADDRESS WRITE/READ RAM TEST
HEX
: VAL-RW-TEST  ( VALUE -> )            SAVE-BUFFERS
   CR ." VALUE STORAGE RAM TEST   VALUE=" DUP U.
   HI-ADDR 3 OR  3 XOR   PAD    3 OR  3 XOR
   DO  DUP I !  ( I 70000 = IF ." 70000" THEN  )
      4 +LOOP
   HI-ADDR 3 OR  3 XOR   PAD    3 OR  3 XOR
   DO  I NOP @ NOP DDUP = NOT
      IF  CR ." FAILURE B  ADDR=" I U.  ."  VALUE=" DUP U.
         KEY OD = ABORT" ABORTED"   ELSE DROP THEN
   4 +LOOP     DROP  EMPTY-BUFFERS  ;
DECIMAL

SCREEN #73
\ MASTER WRITE/READ RAM TEST
HEX
: CHECK    ?TERMINAL ABORT" BREAK" ;
: RAM-TESTA  ( -> )     HEX
  ADDR-RW-TEST      CHECK
    1      VAL-RW-TEST  CHECK        2      VAL-RW-TEST  CHECK
    4      VAL-RW-TEST  CHECK        8      VAL-RW-TEST  CHECK
    10     VAL-RW-TEST  CHECK        20     VAL-RW-TEST  CHECK
    40     VAL-RW-TEST  CHECK        80     VAL-RW-TEST  CHECK
    100    VAL-RW-TEST  CHECK        200    VAL-RW-TEST  CHECK
    400    VAL-RW-TEST  CHECK        800    VAL-RW-TEST  CHECK
    1000   VAL-RW-TEST  CHECK        2000   VAL-RW-TEST  CHECK
    4000   VAL-RW-TEST  CHECK        8000   VAL-RW-TEST  CHECK
    0000   VAL-RW-TEST  CHECK    FFFFFFFF   VAL-RW-TEST  CHECK
 55555555  VAL-RW-TEST  CHECK    AAAAAAAA   VAL-RW-TEST  CHECK
  DECIMAL ;        DECIMAL

SCREEN #74
\ MASTER WRITE/READ RAM TEST
HEX
```

```
: RAM-TEST   ( -> )  RAM-TESTA   HEX
   ADDR-RW-TEST       CHECK
10000       VAL-RW-TEST   CHECK      20000      VAL-RW-TEST   CHECK
40000       VAL-RW-TEST   CHECK      80000      VAL-RW-TEST   CHECK
100000      VAL-RW-TEST   CHECK      200000     VAL-RW-TEST   CHECK
400000      VAL-RW-TEST   CHECK      800000     VAL-RW-TEST   CHECK
1000000     VAL-RW-TEST   CHECK      2000000    VAL-RW-TEST   CHECK
4000000     VAL-RW-TEST   CHECK      8000000    VAL-RW-TEST   CHECK
10000000    VAL-RW-TEST   CHECK      20000000   VAL-RW-TEST   CHECK
40000000    VAL-RW-TEST   CHECK      80000000   VAL-RW-TEST   CHECK
    DECIMAL ;
DECIMAL
```

SCREEN #75

```
\ REPEAT RAM TEST
DECIMAL
: REPEAT RAM-TEST
   REPS 0 DO CR CR ." RAM TEST #" I .
                                        RAM-TEST LOOP ;
```

SCREEN #76

SCREEN #77

SCREEN #78

SCREEN #79

SCREEN #80

```
\ MICROCODE TESTING       DO  LOOP
DECIMAL
: XLOOP
   1 2 3 4 5
    REPS 0 DO  0   200000  -100000  DO
         1+     LOOP
         DUP  300000 = NOT IF . 1 ABORT" LOOPA"
         ELSE DROP THEN
           ." ."  ?TERMINAL IF  ABORT" BREAK"  THEN LOOP
   CR . . . . .  CR ;

XLOOP
```

SCREEN #81

```
\ MICROCODE TESTING      DOVAR  DOCON
DECIMAL
12345678 CONSTANT CONA
VARIABLE VARA

: XVARCON
  1 2 3 4 5
   REPS  0 DO     #TIMES 0 DO
     CONA I + VARA !   VARA @ I -   CONA = NOT
        IF 1 ABORT" DOVAR/DOCON"   THEN
     0 VARA !
  LOOP  ." ."  ?TERMINAL IF  1 ABORT" BREAK"  THEN  LOOP
  CR  . . . . .  CR ;

XVARCON
```

SCREEN #82

```
\ MICROCODE TESTING       ABORT"
DECIMAL
: XABORT
  1 2 3 4 5
   REPS  0 DO               #TIMES 0  DO
      1 NOT  ABORT" ABORTA"
      0      ABORT" ABORTB"
  LOOP  ." ."  ?TERMINAL ABORT" BREAK"    LOOP
  CR . . . . .  CR ;

XABORT
```

SCREEN #83

```
\ MICROCODE TESTING       =
DECIMAL
: X=
  1 2 3 4 5
   REPS  0 DO                #TIMES 0 DO
      I      I          =  NOT  ABORT" =A"
      I      I 1+       =       ABORT" =C"
  LOOP  ." ."  ?TERMINAL ABORT" BREAK"    LOOP
  CR . . . . .  CR ;

X=
```

SCREEN #84

```
\ MICROCODE TESTING      +  -
DECIMAL
: X+-
  1 2 3 4 5
   REPS  0 DO   #TIMES 0 DO
     12343456 56787654 +  69131110 = NOT  ABORT" +A"
```

```
            -1           1 +      0 = NOT  ABORT" +B"
      12346545 56782345 - -44435800 = NOT  ABORT" -A"
             0           1 -     -1 = NOT  ABORT" -B"
   LOOP  ." ."  ?TERMINAL ABORT" BREAK"    LOOP
   CR . . . . . .  CR ;
X+-
```

```
SCREEN #85
\ MICROCODE TESTING      +!
DECIMAL
VARIABLE VARB
: X+!
   1 2 3 4 5
    REPS 0 DO  12345678 DUP VARB !   #TIMES 0 DO
      I +         I  VARB  +!
      DUP   VARB @ = NOT  ABORT" +!"
   LOOP  DROP ." ."  ?TERMINAL ABORT" BREAK"    LOOP
   CR . . . . . .  CR ;
X+!
```

```
SCREEN #86
\ MICROCODE TESTING      -ROT
DECIMAL
: X-ROT
   1 2 3 4 5
    REPS 0 DO                  #TIMES  0 DO
      I  I'  J      -ROT
      I'        = NOT  ABORT" -ROTA"
      I         = NOT  ABORT" -ROTB"
      J         = NOT  ABORT" -ROTC"
   LOOP  ." ."  ?TERMINAL ABORT" BREAK"    LOOP
   CR . . . . . .  CR ;
X-ROT
```

```
SCREEN #87
\ MICROCODE TESTING       ROT
DECIMAL
: XROT
   1 2 3 4 5
    REPS 0 DO                  #TIMES  0 DO
      J   I     12345678                ROT
      J         = NOT  ABORT" ROTA"
      12345678  = NOT  ABORT" ROTB"
      I         = NOT  ABORT" ROTC"
   LOOP  ." ."  ?TERMINAL ABORT" BREAK"   LOOP
   CR . . . . . .  CR ;
XROT
```

```
SCREEN #88
\ MICROCODE TESTING        0     OBRANCH   BRANCH
DECIMAL
: XO
   1 2 3 4 5
    REPS O DO                   #TIMES   O DO
      O   IF   1 ABORT" OBRANCH"   THEN
      1   IF   ELSE   1 ABORT" BRANCH"   THEN
   LOOP   ." ."  ?TERMINAL ABORT" BREAK"     LOOP
   CR . . . . . .   CR ;

XO
```

```
SCREEN #89
\ MICROCODE TESTING        1+  1-   2*
HEX
: X1
   1 2 3 4 5
    REPS O DO        #TIMES   O DO
         7FFFFFFF   1+   80000000 =    NOT   ABORT" 1+"
         FFFFFFFF   1+                       ABORT" 1+"
         00000000   1-   FFFFFFFF =    NOT   ABORT" 1-"
         3FFFFFFF   2*   7FFFFFFE =    NOT   ABORT" 2*"
   LOOP   ." ."  ?TERMINAL ABORT" BREAK"     LOOP
   CR . . . . . .   CR ;
DECIMAL
X1
```

```
SCREEN #90
\ MICROCODE TESTING        <
DECIMAL
: X<
   1 2 3 4 5
    REPS O DO                        #TIMES O DO
      I I 1+ <   NOT   ABORT" <A"
      I I    <         ABORT" <B"
   LOOP   ." ."  ?TERMINAL ABORT" BREAK"     LOOP
   CR . . . . . .   CR ;

X<
```

```
SCREEN #91
\ MICROCODE TESTING       DO +LOOP
DECIMAL
```

```
: X+LOOP
   1 2 3 4 5
    REPS 0 DO   0    200000 -100000    DO
         1+   3 +LOOP
         100000 = NOT ABORT" +LOOPA"
           ." ."  ?TERMINAL ABORT" BREAK"     LOOP
   CR . . . . .  CR ;
X+LOOP
```

SCREEN #92

```
\ MICROCODE TESTING    I  I'  J
HEX
: XIIJ
   1 2 3 4 5
    REPS 0 DO  #TIMES 0 DO
      11111111  22222222   33333333  >R >R >R       J  I'  I
      R>  = NOT ABORT" I"
      R>  = NOT ABORT" I'"
      R>  = NOT ABORT" J"
   LOOP  ." ."  ?TERMINAL ABORT" BREAK"     LOOP
   CR . . . . .  CR ;
DECIMAL
XIIJ
```

SCREEN #93

```
\ MICROCODE TESTING       0<
DECIMAL
: X0<
   1 2 3 4 5
    REPS 0 DO  #TIMES 1+  1 DO
           I         0<       ABORT" 0<A"
           I NEGATE 0< NOT   ABORT" 0<B"
   LOOP  ." ."  ?TERMINAL ABORT" BREAK"     LOOP
   CR . . . . .  CR ;
X0<
```

SCREEN #94

```
\ MICROCODE TESTING       AND   OR   XOR
HEX
100 ALLOT
: XAOX
   1 2 3 4 5
    REPS 0 DO  #TIMES 0 DO
      05AF05AF 5AF05AF0  AND    00A000A0 = NOT  ABORT" AND"
      05AF05AF 5AF05AF0  OR     5FFF5FFF = NOT  ABORT" OR"
      05AF05AF 5AF05AF0  XOR    5F5F5F5F = NOT  ABORT" XOR"
```

```
    LOOP  ." ."  ?TERMINAL ABORT" BREAK"    LOOP
    CR . . . . . .  CR ;
DECIMAL
XAOX
```

SCREEN #95

```
\ MICROCODE TESTING       D@   D!
DECIMAL
VARIABLE VARC      4 ALLOT
: XD@!
    1 2 3 4 5
     REPS 0 DO  #TIMES 0 DO
        I  J   VARC  D!
        VARC      D@    J = NOT  ABORT" D@!A"
                        I = NOT  ABORT" D@!B"
    LOOP  ." ."  ?TERMINAL ABORT" BREAK"    LOOP
    CR . . . . . .  CR ;

 XD@!
```

SCREEN #96

```
\ MICROCODE TESTING       D+
DECIMAL
: XD+
    1 2 3 4 5
     REPS 0 DO  #TIMES 1000 -      -1000 DO
        I I'  J I   D+    J I    I I'  D+      \ Test for consistency
        ROT = NOT  ABORT" D+A"
              = NOT  ABORT" D+B"
    LOOP  ." ."  ?TERMINAL ABORT" BREAK"    LOOP
    CR . . . . . .  CR ;

XD+
```

SCREEN #97

```
\ MICROCODE TESTING      DSWAP  DDROP DDUP
DECIMAL
: XDD
    1 2 3 4 5
     REPS 0 DO  #TIMES 0 DO
        I I 100 +      1111 2222 DSWAP    DDUP
        I 100 +  = NOT  ABORT" DDA"     I = NOT ABORT" DDB"
        DSWAP DDROP
        I 100 + = NOT  ABORT" DDC"     I = NOT ABORT" DDD"
    LOOP  ." ."  ?TERMINAL ABORT" BREAK"    LOOP
    CR . . . . . .  CR ;

XDD
```

```
SCREEN #98
\ MICROCODE TESTING      DUP  DROP   SWAP  OVER
HEX
: XDDSO
   1 2 3 4 5
    REPS 0 DO  #TIMES 0 DO
      I   -1234  OVER  SWAP  DROP
      = NOT  ABORT" DDSO"
   LOOP  ." ."  ?TERMINAL ABORT" BREAK"    LOOP
   CR . . . . . .  CR ;
DECIMAL
XDDSO

SCREEN #99
\ MICROCODE TESTING     NEGATE  NOT
HEX
: XNN
   1 2 3 4 5
    REPS 0 DO  #TIMES 0 DO
      0 NEGATE  ABORT" NEGATEA"
   -56789876 NEGATE 56789876 = NOT  ABORT" NEGATEB"
    12341267 NEGATE -12341267 = NOT  ABORT" NEGATEC"
    I 1+ NOT NOT             NOT  ABORT" NOTA"
    0        NOT             NOT  ABORT" NOTB"
  LOOP  ." ."  ?TERMINAL ABORT" BREAK"    LOOP
   CR . . . . . .  CR ;
DECIMAL
XNN

SCREEN #100
\ MICROCODE TESTING      TOGGLE
VARIABLE VARF
HEX
: XTOGGLE
   1 2 3 4 5
    REPS 0 DO  56781234 DUP VARF !   #TIMES 0 DO
      I OFF AND XOR      VARF  I TOGGLE
      DUP   OFF AND VARF C@ = NOT  ABORT" TOGGLE"
   LOOP  DROP ." ."  ?TERMINAL ABORT" BREAK"    LOOP
   CR . . . . . .  CR ;
DECIMAL

XTOGGLE

SCREEN #101
\ MICROCODE TESTING      U*
HEX
: XU*
   1 2 3 4 5
    REPS 0 DO  #TIMES 1000 -   -1000 DO
      I J U*   J  I  U*     \ Test for consistency
```

```
       RU* = NOT  ABORT" U*A"
             = NUT  ABORT" U*B"
   LOOP  ." ."  ?TERMINAL ABORT" BREAK"    LOOP
   CR . . . . .  CR ;
DECIMAL
XU*
```

```
SCREEN #102
\ MICROCODE TESTING      RRC
HEX
: XRRC
 . 1 2 3 4 5
    REPS 0 DO  #TIMES 0 DO
 0 1   RRC  0  = NOT ABORT" RRCA"  80000000 = NOT ABORT" RRCB"
 1 0   RRC  -1 = NOT ABORT" RRCC"   0    = NOT ABORT" RRCD"
100 0  RRC  0  = NOT ABORT" RRCE"   80   = NOT ABORT" RRCF"
   LOOP  ." ."  ?TERMINAL ABORT" BREAK"    LOOP
   CR . . . . .  CR ;
DECIMAL
XRRC
```

```
SCREEN #103
\ MICROCODE TESTING      RLC
HEX
: XRLC
   1 2 3 4 5
    REPS 0 DO  #TIMES 0 DO
     0 1 RLC    0  = NOT ABORT" RLCA"     1 = NOT ABORT" RLCB"
  80000000 0 RLC  -1  = NOT ABORT" RLCC"   0 = NOT ABORT" RLCD"
    80 0 RLC    0  = NOT ABORT" RLCE"   100 = NOT ABORT" RLCF"
   LOOP  ." ."  ?TERMINAL ABORT" BREAK"    LOOP
   CR . . . . .  CR ;
DECIMAL
XRLC
```

```
SCREEN #104
\ MICROCODE TESTING      ADC                     JMP=xxCA
HEX
: XADC
   1 2 3 4 5
    REPS 0 DO  #TIMES 0 DO
 0 0 1       ADC   0  = NOT ABORT" ADCA"     1 = NOT ABORT" ADCB"
     1234 5678 0 ADC  0  = NOT ABORT" ADCC"
                   68AC = NOT ABORT" ADCD"
FFFFE234 5678 1 ADC  -1 = NOT ABORT" ADCE"
                   38AD = NOT ABORT" ADCF"
1235 FFFFEDCB 0 ADC  -1 = NOT ABORT" ADCG"
                        = NOT ABORT" ADCH"
```

```
   LOOP  ." ."  ?TERMINAL ABORT" BREAK"    LOOP
   CR . . . . . .  CR ;
DECIMAL
XADC
```

SCREEN #105

```
\ MICROCODE TESTING      WORDSWAP   & BYTE-ROLL
HEX
: XBS
   1 2 3 4 5
    REPS 0 DO  #TIMES 0 DO
       12345678   WORDSWAP  56781234 = NOT  ABORT" WORDSWAP"
       12345678   BYTEROLL  78123456 = NOT  ABORT" BYTEROLL"
   LOOP  ." ."  ?TERMINAL ABORT" BREAK"    LOOP
   CR . . . . . .  CR ;
DECIMAL
XBS
```

SCREEN #106

```
\ MICROCODE TESTING      >R R@  R>
HEX
: XRRR
   1 2 3 4 5
    REPS 0 DO  #TIMES 0 DO
     12345678  9876ABCD  >R    12345678 = NOT  ABORT" >R"
     R@                        9876ABCD = NOT  ABORT" R@"
     42345678   R>             9876ABCD = NOT  ABORT" R>A"
                               42345678 = NOT  ABORT" R>B"
   LOOP  ." ."  ?TERMINAL ABORT" BREAK"    LOOP
   CR . . . . . .  CR ;
DECIMAL
XRRR
```

SCREEN #107

```
\ MICROCODE TESTING      U/MOD
HEX
: X-UM
   1 2 3 4 5
    REPS 0 DO  #TIMES 1000 -  -1000 DO
        I' I   I J +   U/MOD          I' I   I J +  U/MOD
        ROT       = NOT ABORT" U/MODA"
                  = NOT ABORT" U/MODB"
   LOOP  ." ."  ?TERMINAL ABORT" BREAK"    LOOP
   CR . . . . . .  CR ;
DECIMAL
X-UM
```

SCREEN #108

```
\ MICROCODE TESTING   LIT
HEX
: XLIT
   1 2 3 4 5
    REPS 0 DO  #TIMES 0 DO
      111111  111111  2222222 2222222  33333 33333  44444 44444
      = NOT ABORT" LITA"
      = NOT ABORT" LITB"
      = NOT ABORT" LITC"
      = NOT ABORT" LITD"
   LOOP  ." ."  ?TERMINAL ABORT" BREAK"    LOOP
   CR . . . . .  CR ;
DECIMAL
XLIT
```

SCREEN #109

```
\ MICROCODE TESTING     <PICK>
DECIMAL
: X-PICK
   1 2 3 4 5
   1 REPS  DO   I NEGATE  -1 +LOOP   \ Leave stuff on stack
    REPS 1+ 1 DO  #TIMES 0 DO
         J PICK  J NEGATE  = NOT   ABORT" <PICK>"
   LOOP  ." ."  ?TERMINAL ABORT" BREAK"    LOOP
   REPS 0 DO DROP LOOP   \ Take stuff from stack
   CR . . . . .  CR ;
X-PICK
```

SCREEN #110

```
\ MICROCODE TESTING     ROLL
DECIMAL
: X-ROLL
   1 2 3 4 5
    REPS 0 DO  #TIMES 0 DO
         I  0  J  -1   4 ROLL
          I = NOT   ABORT" <ROLL>A"
         -1 = NOT   ABORT" <ROLL>D"
          J = NOT   ABORT" <ROLL>C"
          0 = NOT   ABORT" <ROLL>B"
   LOOP  ." ."  ?TERMINAL ABORT" BREAK"    LOOP
   CR . . . . .  CR ;
X-ROLL
```

SCREEN #111

```
\ MICROCODE TESTING     ?DUP
DECIMAL
: X-QDUP
   1 2 3 4 5
    REPS 0 DO  #TIMES 0 DO
         I  0 ?DUP   ABORT" ?DUPA"  I = NO   ABORT" ?DUPB"
```

```
        13131  I 1+ ?DUP
         I 1+ = NOT  ABORT" ?DUPC"  I 1+ = NOT ABORT" ?DUPD"
        13131 = NOT  ABORT" ?DUPE"
    LOOP  ." ."  ?TERMINAL ABORT" BREAK"    LOOP
    CR . . . . . .  CR ;

X-QDUP
```

SCREEN #112

```
\ MICROCODE TESTING     S->D
DECIMAL
: X-SD
   1 2 3 4 5
    REPS 0 DO  #TIMES 0 DO
      134  S->D   ABORT" S->DA"  134 = NOT ABORT" S->DB"
     -134  S->D -1 = NOT ABORT" S->DC" -134 = NOT ABORT" S->DD"
   LOOP  ." ."  ?TERMINAL ABORT" BREAK"    LOOP
   CR . . . . . .  CR ;

X-SD
```

SCREEN #113

```
\ MICROCODE TESTING     ABS
DECIMAL
: X-ABS
   1 2 3 4 5
    REPS 0 DO  #TIMES 0 DO
      I          ABS  I = NOT ABORT" ABSA"
      I NEGATE   ABS  I = NOT ABORT" ABSB"
   LOOP  ." ."  ?TERMINAL ABORT" BREAK"    LOOP
   CR . . . . . .  CR ;

X-ABS
```

SCREEN #114

```
\ MICROCODE TESTING  CMOVE
HEX
CREATE TEXTD  10 ALLOT    CREATE TEXTE 10 ALLOT
: X-CMOVE
   1 2 3 4 5
   11 TEXTE C!  22 TEXTE 1+ C!
    REPS 0 DO   #TIMES 0 DO
       0 TEXTD !
       TEXTE  TEXTD 1+  2 CMOVE
       TEXTD  @  00221100 = NOT ABORT" CMOVE"
   LOOP  ." ."  ?TERMINAL ABORT" BREAK"    LOOP
   CR . . . . . .  CR ;
DECIMAL
```

```
X-CMOVE
```

SCREEN #115

```
\ MICROCODE TESTING  2/
DECIMAL
: X-2/
   1 2 3 4 5
    REPS 0 DO  #TIMES 0 DO
        5  2/  2 = NOT ABORT" 2/A"
       -5  2/  -2 = NOT ABORT" 2/B"
       -6  2/  -3 = NOT ABORT" 2/C"
       -1  2/           ABORT" 2/D"
        I  2/  I 2/ = NOT ABORT" 2/D"
   LOOP  ." ."  ?TERMINAL ABORT" BREAK"    LOOP
   CR . . . . .  CR ;
X-2/
```

SCREEN #116

```
\ MICROCODE TESTING   @  !
DECIMAL
VARIABLE VARXA
: X-@!
   1 2 3 4 5
    REPS 0 DO  #TIMES 0 DO
         I VARXA !   VARXA @   I = NOT ABORT" !@A"
         J VARXA !   VARXA @   J = NOT ABORT" !@B"
   LOOP  ." ."  ?TERMINAL ABORT" BREAK"    LOOP
   CR . . . . .  CR ;
X-@!
```

SCREEN #117

```
\ MICROCODE TESTING      DROT
DECIMAL
: XDROT
   1 2 3 4 5
    REPS 0 DO  #TIMES 0 DO
      1111111111111111. 2222222222222222. 3333333333333. DROT
      1111111111111111. D= NOT  ABORT" DROTA"
         3333333333333. D= NOT  ABORT" DROTB"
      2222222222222222. D= NOT  ABORT" DROTC"
    LOOP  ." ."  ?TERMINAL ABORT" BREAK"     LOOP
   CR . . . . .  CR ;
XDROT
```

SCREEN #118

```
\ MICROCODE TESTING   LSLN
HEX
: XLSLN
```

```
   1 2 3 4 5
    REPS 0 DO  #TIMES 0 DO
      1           01F      LSLN
      80000000       =      NOT      ABORT" LSLN"
  LOOP  ." ."  ?TERMINAL ABORT" BREAK"    LOOP
  CR . . . . . .  CR ;

DECIMAL
XLSLN
```

SCREEN #119

```
\ MICROCODE TESTING   LSRN
HEX
: XLSRN
   1 2 3 4 5
    REPS 0 DO  #TIMES 0 DO
      8FFF0F0F 1F LSRN  1 = NOT ABORT" LSRN"
  LOOP  ." ."  ?TERMINAL ABORT" BREAK"    LOOP
  CR . . . . . .  CR ;

DECIMAL
XLSRN
```

SCREEN #120

```
\ MICROCODE TESTING       DLSL
HEX
: XDLSL
   1 2 3 4 5
    REPS 0 DO  #TIMES 0 DO
      80028001 90080004   DLSL
      20100009      = NOT  ABORT" DLSLA"
      00050002      = NOT  ABORT" DLSLB"
  LOOP  ." ."  ?TERMINAL ABORT" BREAK"    LOOP
  CR . . . . . .  CR ;
DECIMAL
XDLSL
```

SCREEN #121

```
\ MICROCODE TESTING   LSR
HEX
: XLSR
   1 2 3 4 5
    REPS 0 DO  #TIMES 0 DO
      84123456 LSR  42091A2B  = NOT ABORT" LSR"
  LOOP  ." ."  ?TERMINAL ABORT" BREAK"    LOOP
  CR . . . . . .  CR ;
```

```
DECIMAL
XLSR
```

SCREEN #122

```
\ MICROCODE TESTING   ASR
HEX
: XASR
   1 2 3 4 5
    REFS 0 DO  #TIMES 0 DO
       84122443 ASR  C2091221  = NOT ABORT" ASRA"
       44125434 ASR  22092A1A  = NOT ABORT" ASRB"
   LOOP  ." ."  ?TERMINAL ABORT" BREAK"    LOOP
   CR . . . . .  CR ;

DECIMAL
XASR
```

SCREEN #123

```
\ MICROCODE TESTING      <UNORM>
HEX
: XUNORM
   1 2 3 4 5
    REFS 0 DO   #TIMES 0 DO
      1   10   <UNORM>
          -0E     = NOT  ABORT" <UNORMA>"
        40000000 = NOT  ABORT" <UNORMB>"
   LOOP  ." ."  ?TERMINAL ABORT" BREAK"    LOOP
   CR . . . . .  CR ;
DECIMAL
XUNORM
```

SCREEN #124

```
\ MICROCODE TESTING      <UDNORM>
HEX
: XUDNORM
   1 2 3 4 5
    REFS 0 DO   #TIMES 0 DO
      1 0  10   <UDNORM>
          -2E      = NOT  ABORT" <UDNORMA>"
     0  40000000 D= NOT  ABORT" <UDNORMB>"
   LOOP  ." ."  ?TERMINAL ABORT" BREAK"    LOOP
   CR . . . . .  CR ;
DECIMAL
XUDNORM
```

BEST AVAILABLE COPY

ıemonic ass ALU unchanged) (default)
[ALU]
[ALU]
L[ALU]

: Summary

Mode=1)
=notA
=AnorB
ısed)
0
AnandB
notB
AxorB
sed)
ed)
xnorB andB
l
d)
rB
(default)

Mode=0, CIN=0)

)
notB+1

SELECT
TION SELECT
NTROL
NTROL
LEXER SHIFT CONTROL

ION RAW INPUT

CARRY-IN
/DEST CONTROL

CODE SELECT BITS
RO-ADDRESS CONSTANT BITS 1-2
T-MPC CONTROL
DE BIT
T ADDRESS COUNTER BIT

| Micro-operation field | Value | Mnemonic |
|---|---|---|
| (arithmetic ALU functions Mode=0, CIN=1) | | |
| ALUFx | 0 | ALU=A+0 |
| | 1 | (unused) |
| | 2 | ALU=A-B-1 |
| | 3 | (unused) |
| | 4 | (unused) |
| | 5 | (unused) |
| | 6 | ALU=A-B |
| | 7 | (unused) |
| | 8 | (unused) |
| | 9 | ALU=A+B+1 |
| | 10 | (unused) |
| | 11 | (unused) |
| | 12 | ALU=A+A+1 |
| | 13 | (unused) |
| | 14 | (unused) |
| | 15 | (unused) |
| CIN | 0 | CIN=0 (default for logical ALU operations) |
| | 1 | CIN=1 |
| DSHx | 0 | (no-op) (default |
| | 1 | SR[DLO] |
| | 2 | SL[DLO] |
| | 3 | DEST=DLO |

| | | | |
|---|---|---|---|
| CONDx | 0 | JMP=xx0 | |
| | 1 | JMP=xxC | |
| | 2 | JMP=xxZ | |
| | 3 | JMP=xxS | |
| | 4 | JMP=xxL | |
| | 5 | (unused) | |
| | 6 | (unused) | |
| | 7 | JMP=xx1 | |
| MADx | 0 | JMP=00x | |
| | 1 | JMP=01x | |
| | 2 | JMP=10x | |
| | 3 | JMP=11x | |
| INMPC | 0 | (no-op) | (default) |
| | 1 | INC[MPC] | |

| Micro-operation field | Value | Mnemonic | |
|---|---|---|---|
| NDEC0 | 0 | DECODE | |
| | 1 | (no-op) | (default) |
| INAD | 0 | (no-op) | (default) |
| | 1 | INC[ADC] | |

APPENDIX C

WISC TECHNOLOGIES CPU/32 USER MANUAL

W I S C C P U / 3 2

P R E L I M I N A R Y

D O C U M E N T A T I O N

WISC Technologies, Inc.

La Honda, CA 94020

Preliminary: 2 June 1987

Copyright 1986,1987
Patent Applied For
WISC Technologies, Inc.
La Honda, CA 94020

PREFACE

This is a preliminary document in which we have endeavored to provide you with the necessary and sufficient information to make full use of the CPU/32 product. At this time, it will be necessary for program developers to understand the Forth language to follow the source code provided. We look forward to having other languages implemented.

Hopefully, you will find this new experience as stimulating and rewarding as we have in developing it. You will find Phil Koopman's January 1987 BYTE article "Microcoded versus Hard-wired Control" and his April 1987 BYTE article "The WISC Concept" useful as additional support material. We recommend reading this document twice. On the first pass, do all the examples and don't worry about details that are not clear. On the second pass, concentrate on putting all the pieces together to form a clear over-all picture.

CPU/32 developers are licensed to include any or all of the run-time MVP-FORTH/32 program as a part of their products. Reasonable support for developers will be provided.

P.K. and G.B.H.

June 1987

CONTENTS

Preface .................................................... i

Part One

OVERVIEW .................................................... 1

Part Two

HARDWARE DESIGN .................................................... 10

Part Three

DEVELOPMENT SOFTWARE .................................................... 38

APPENDIX A

Host Data Bus Interface .................................................... 43

APPENDIX B

Micro-Instruction Format Summary .................................................... 45

APPENDIX C

Summary of Hardware Characteristics .................................................... 50

APPENDIX D

Schematic Diagrams ....................................................

APPENDIX E

Source Code for the Cross-Compiler,
Micro-Assembler, and MVP-FORTH/32 Microcode....................

APPENDIX F

Source Code for the Cross-Compiled MVP-FORTH/32 Kernel .....

APPENDIX G

Source Code for Diagnostic Programs ....................

Part One
OVERVIEW

Introduction
Getting Started
- Install the Hardware
- Distribution Software
- Troubleshooting
- Problem Resolution Host PC Software
- Cross-Compiler/Microcode Disk
- MVP-FORTH/32 Kernel Disk
- Tests and Demonstrations
- General Notes on MVP-FORTH/32
- Other Forth Dialects

Introduction

Most of today's common microprocessors fall into the category of "complex instruction set computers" (CISC). Efforts to improve the technology have lead, on one front, to "reduced instruction set computers" (RISC). The CPU/32 represents a third alternative, the stack-oriented "writable instruction set computer" (WISC).

The most significant potential offered by the WISC CPU/32 is the new way of addressing a problem found in classical CISC and RISC architectures: that of semantic mismatch between the computational needs of an application program and the CPU's instruction set. This mismatch limits the ultimate throughput of such systems. The WISC CPU/32 allows an opcode's semantic content to be harmonious with the hardware structure and application program's needs, vastly improving throughput.

The concept of the writable instruction set computer, incorporated in the WISC CPU/32, will be a new experience for most users. Complete access to the processor's logic control lines is available. Custom opcodes can be implemented easily and integrated into applications. In contrast to writable "control store" options available on some computers, the CPU/32's instruction set has a simple format for easy modification. The writable instruction set can be employed to make an application's fundamental operations the native code of the WISC processor.

Another significant feature of the CPU/32 is the use of independent hardware stacks for handling operands and subroutine return addresses. The use of these stacks simplifies the CPU/32 hardware by eliminating the need for decoding operand location information - all operands are implicit in the op-code. In addition, hardware stacks greatly increase the speed of the frequent subroutine calls demanded by modern structured programming. A unique feature of the CPU/32 is the combination of an opcode with a subroutine call, subroutine return, or unconditional branch within each instruction. This allows processing subroutines and branches in parallel with other operations, further increasing the speed of subroutine calls. In many cases, subroutine calls actually take no time at all.

The documentation includes everything that was used to produce the hardware and software systems: complete circuit drawings, details of the microcode format, and source code for all the software. This may be more than you need, but it is our intention to be as open with the product as possible. Note that the boards, documentation, and software are copyrighted. No restriction is placed on the use of this software with applications using the CPU/32. A patent has been applied for.

Not all users of the WISC CPU/32 need to master the most detailed information that is provided. Executable code and complete source listings are included for a micro-assembler, a cross-compiler, and the completely functional development language. All are ready to run, permitting productive use of the system from the beginning. Eventually, you will want to study and understand all facets of the WISC CPU/32 system. Our experience teaches that understanding all parts of a problem and its solution is the ultimate approach to problem-solving. For tutorial purposes, you may skip to the parts of this documentation which interest you most.

Getting Started

Install the Hardware

To install the CPU/32, first thread the two ribbon cables coming out of the CPU/32 box through the back of the IBM PC/AT or compatible's box. Then attach them to the headers marked "CN1" and "CN2" on the HOST card. The color-marked end of the cable sockets should go nearest the "CN1" and "CN2" markings on each cable. If you have to pull the cable back over the connector to get the cable out of the PC box, the connector is on backwards.

************************ WARNING ************************
Placing the ribbon cables on incorrectly will damage the HOST card. It will not, however, damage the PC or the CPU/32 box.
************************************************************

Next, place the HOST card into any slot on the IBM PC/AT or compatible. The HOST card will work equally well in an 8-bit slot or a 16-bit slot. The HOST card will also work in some IBM PC's and IBM PC XT's, but operation is not guaranteed. This is because many of the earlier PC's have a hardware bug that produces a significant amount of "noise" on the bus address lines which violates published IBM PC design specifications.

The CPU/32 comes configured to address the PC's I/O port numbers 300 through 307 (hex). If this causes a conflict in your system, see the section on reconfiguring the HOST card I/O ports.

Distribution Software

Several diskettes are provided with the CPU/32. We suggest that you make backups of them using the DOS DISKCOPY program before proceeding any further.

The disk labelled "WISC System" is the run-time disk that brings up MVP-FORTH on the CPU/32. To run MVP-FORTH on the CPU/32, boot DOS in the normal manner, then insert the "WISC System" disk in the A drive. From the DOS prompt, type:

```
A:CPU32
```

This places you in an MVP-FORTH kernel that has the microcode assembler, c ss-compiler, and other utilities pre-loaded. To load the microcode memory and the first 32k of program memory (which contains the kernel and floating-point package for the CPU/32), turn on the CPU/32 box's power nd type in:

```
DR0  LOAD-ALL
```

You will see a series of "happy faces" indicating that the loading process is progressing. Note that the CPU/32 memory image is stored as Forth screens at the high end of the "WISC System" disk, so no additional DOS files should be added to this disk to avoid overwriting the Forth screens.

The CPU/32 is now ready for operation. To transfer system control to the CPU/32, type in:

```
CPU32
```

You will see a "(CPU/32) OK" prompt. You are now running a 32-bit version of MVP-FORTH directly from the CPU32. Try typing in VLIST or any other function desired. To return control to the PC, type in BYE and notice the return to the normal Forth "OK" prompt.

A note about CPU/32 Forth: DR0, DR1, etc. are not defined in MVP-FORTH/32. In order to change the default disk drive, return to the PC Forth with a BYE, perform the disk assignment (e.g. DR1), then return to the CPU32. This decision was made to isolate the CPU32's Forth from the many possible effects of enhanced disk interfaces for DOS files, etc.

Troubleshooting

If everything did not go smoothly, first double-check that the ribbon cables are on snugly and in the proper orientation. If the PC shows a "START.." and then dies, the CPU/32 is not responding properly to the "CPU32" command. If this happens, or anytime that you want to verify correct operation of the system, run the single-stepping diagnostics.

The "Diagnostics" disk contains two sets of diagnostics. The first set is the single-stepping diagnostics that uses the PC host to exercise all the resources of the CPU/32 in a slave mode. To run these diagnostics, run the CPU32.COM file from the "WISC System" disk as described above, but do not do a LOAD-ALL. Next, place the diagnostics disk in the A drive, and from the PC's Forth, type in:

```
DR0  2 LOAD
```

The diagnostics will then exercise each portion of the system, displaying messages as the tests progress. If the tests complete without a failure message, the CPU/32 has passed the single-stepping diagnostic. (If a failure is generated, see the section on problem resolution below.)

The second set of diagnostics on this disk is the stress test. To run the stress test, run MVP-FORTH/32 using the CPU32--LOAD-ALL--CPU32 sequence as described previously. From the "(CPU/32) OK" prompt, type in:

```
DRO 3 LOAD
```

This test first does a memory addressability and stuck-bit failure test, then repetitively exercises the critical microcoded definitions. The test takes a while to run. The CPU/32 will run an infinite number of floating point stress tests at the end of the sequence. Pressing any key on the keyboard will terminate testing. If your system passes this test successfully, then everything should be operating correctly.

Problem Resolution

Your system was completely tested before shipping using the same floppy disks you have. If any problems arise during installation or operation of your system, please complete the following steps, in order, to resolve the problem.

1) Please check for obvious problems with the hardware: unplugged power cables, connectors, etc.

2) Please re-read the applicable sections of the documentation.

3) If the hardware does not pass diagnostics, or seems unreliable in operation, ensure that all connecting ribbon cables inside the CPU/32 box are securely plugged in, and that all cards are properly seated in the motherboard.

4) If you still can not resolve the problem after re-reading the documentation, please call us any time at (415) 747-0760.

Host PC Software

The PC host communicates with the WISC CPU/32 system with up to 8 I/O ports. Any program or language that can address these ports can run the CPU/32. For example, the IN and OUT functions of BASIC, or user-written procedures in C, Pascal, etc. may be used to control the system, even when the CPU/32 is running Forth. Currently, we are providing all development and support software in MVP-FORTH.

The Host PC software is organized as a micro-assembler, a cross-compiler, and the source code to cross-compile the MVP-FORTH/32 kernel. Complete source code for this software is provided in Forth screen format on the disks marked "Cross-Compiler/Microcode" and "CPU/32 Kernel".

Cross-Compiler/Microcode Disk

The "Cross-Compiler/Microcode" disk contains the source code for the cross-compiler, microcode assembler, and the microcoded primitives used by MVP-FORTH/32. To reload these screens, run the FORTH.COM file from the "WISC System" disk under DOS by typing:

```
FORTH
```

This is the MVP-FORTH kernel which has the assembler and double precision word set from the MVP-FORTH math package (MVP-FORTH series volume 3) pre-loaded. Place the "Cross-Compiler/Microcode" disk in the A drive. Turn on the CPU/32, then type in:

```
DRO  2 LOAD
```

Screen 2 loads all the source code, compiles the microcode directly into the CPU/32 microcode memory, and creates the basic Forth dictionary structure with headers for the microcode words on the CPU/32. When the loading is completed, screen 2 does a SAVE-ALL, which saves the new memory images onto the highest screens of the A disk.

When the loading is completed, you may wish to do a SAVE-FORTH to a DOS files disk to save the revised version of the cross-compiler/micro-assembler. File XCOMP.COM on the "WISC System" disk corresponds to the host PC Forth system you have at this point.

The most straightforward way to add or modify microcoded primitives is by following the above procedure, then recompiling the MVP-FORTH/32 kernel as described in the next section.

MVP-FORTH/32 Kernel Disk

The "MVP-FORTH/32 Kernel" disk contains the source code for the cross-compiled MVP-FORTH/32 kernel. To reload the kernel, continue on from the previous section using the XCOMP.COM MVP-FORTH kernel used to load the cross-compiler and microcode from the host PC. Place the "MVP-FORTH/32 Kernel" disk in the A drive, then type in:

```
2 LOAD
```

This will start the kernel cross-compilation process. The cross compiler actually builds the target image in the CPU/32's program memory. The messages "START.." followed by ." END" indicate a transfer of control to the CPU/32 to execute functions during the compilation process (see the section on the usage of "" and "" for more information about this.)

When the cross-compilation is completed, transfer control to the CPU/32 and complete compilation of the kernel by typing in:

```
CPU32
3 LOAD
```

Do a VLIST to satisfy yourself that the dictionary is complete, then return control to the host and save the new CPU/32 memory image by typing in:

```
BYE
SAVE-ALL
```

If desired, you may do a SAVE-FORTH to save a copy of the MVP-FORTH kernel for later use. The host Forth kernel you are using now corresponds to the file CPU32.COM on the "WISC System" disk, and is well-suited for experimenting with single-stepping CPU/32 functions from the host PC.

Tests and Demonstrations

The CPU/32 comes with some demonstration disks in addition to the disks already talked about. While the function and the content of the demonstration disks may change, they are all set up with the same format for consistency.

Each demonstration disk should be placed in the A drive after running the CPU32 command from DOS. Each disk has a Forth memory image that should be transferred to the CPU/32 using the LOAD-ALL command. Each disk has screen 2 reserved as a host loading screen. From the host PC, type in:

```
DRO 2 LOAD   ( Automatically does a LOAD-ALL)
CPU32
```

Next, load the application program from the CPU/32 by typing in:

```
3 LOAD
```

When the load is completed, instructions for running the demonstration will be displayed. Typing in HELP will re-display the instructions.

Most of the graphics demonstrations require an Enhanced Graphics Adapter (EGA). The other demonstrations assume the use of a Color Graphics Adapter (CGA) with 80 columns of text. Changing the segment number from B800 hex to B000 hex in the host PC's source code will make the non-graphics demonstrations work on a monochrome display.

General Notes on MVP-FORTH/32

The differences between MVP-FORTH/32 and the functional descriptions in ALL ABOUT FORTH are minor. To make the most of the software tools available, you should become familiar with MVP-FORTH. In most cases, the high-level and low-level functions are the same. The kernel's implementation is different in that microcoded definitions replace the machine language used in the original MVP-FORTH.

The following notes cover the major differences between MVP-FORTH and MVP-FORTH/32. Further details will come from study of the source code.

* The arrangement of the header fields is different.

* The link field comes before the name field.

* There is no code field. In most cases, the PFA is the same as the CFA.

* The value for variables and constants is stored 4 bytes after the PFA.

* The name field count is a 4-byte value with flag bits in the highest byte.

* All strings including the name fields are blank-padded to fill up an evenly divisible by 4 number of bytes. The name field counts still reflect the actual name length.

* For colon definitions, the array of pointers to lower level subroutines is automatically executed in sequence. A DOCOL operation is not needed.

* Each instruction consists of an opcode value in the highest 9 bits and an address for subroutine call or jump (or a subroutine exit bit) in the low 23 bits. Forth sequences of opcodes followed by subroutine calls (and/or subroutine exits) are automatically compacted into a single instruction by the compiler.

* All operations that are 16 bit operations in MVP-FORTH work on 32 bits in MVP-FORTH/32

* All 32-bit memory operations (including @ and !) and instructions must be aligned on word boundaries. This means that the memory address used must be evenly divisible by 4. The compiler automatically performs this alignment in virtually all cases.

* A single screen buffer is used (little, if any, difference will be noted).

* The user variables are at low memory addresses and do not change addresses with disk buffer changes.

* The stack address space is not accessible with @ and !. Therefore, the MVP-FORTH implementation for .S has been modified.

The elemental editor command FP is available from the CPU/32. The standard Forth line editor, however, is available from the host. Identical screens can be read by either system. Change the editor to suit your own needs and desires.

MVP-FORTH/32 has no disk utilities. There are no direct disk functions. Only system function calls to the currently active drive on the host are required. This approach eliminates confusion that results when using a DOS interface or other enhancement to the host PC's Forth.

There is no assembler - with the supplied microcode the CPU/32's native language is Forth. High speed words may be written in microcode if desired, corresponding to the assembly language used in other Forth systems.

In addition to the included standard wordset from MVP-FORTH, the MVP-FORTH/32 system has a number of additional words in microcode. Some of these are simple primitives for common combinations of words and math functions. Others are completely new words that are useful in the demonstration programs.

Other Forth Dialects

We realize the limitations of the standard distrubuted version of MVP-FORTH, especially when using a hard-disk based system under DOS. We have used an optimized version of MVP-FORTH known as LIB-FORTH for our development efforts. Among other things, LIB-FORTH has support for DOS screen files, faster execution speed, and a full-screen editor. LIB-FORTH is in the public domain and is available from Mountain View Press. LIB-FORTH functions correctly, but is not a fully polished, fully supported product. If you wish to use LIB-FORTH, contact us for a copy of the CPU/32 files in the DOS screens format.

We plan to develop a more powerful Forth that allows the use of one or more CPU/32's on a single host PC within an integrated software environment. We are also pursuing porting other languages to the CPU/32. Until these products are ready, however, MVP-FORTH remains the only the fully supported host language.

Part Two
HARDWARE DESIGN

Introduction
Specifications
Capabilities
    Operating Speed
    General Architecture
The Host Interface
    Master/Slave Modes
    Write Ports
    Read Ports
    The Status Register - STATUS
    The Host Request Register - HOST
The Data Stack
    The Data Stack Pointer - DP
    The Data Stack - DS
    Restrictions
The Arithmetic Logic Unit Complex
    The Arithmetic Logic Unit and Multiplexer - ALU
    The Data Hi Register - DHI
    The Bus Latch - LATCH
    The Data Low Register - DLO
    Multiplication and Division
    Restrictions
The Return Stack
    The Return Stack Pointer - RP
    The Return Stack - RS
    Restrictions
Memory Addressing and Subroutine Control
    The RAM Address Latch - ADDRESS-LATCH
    The Address counter - ADDRESS-COUNTER
    The Next Address Register - NAR
    The Page Register - PAGE
    Restrictions
Program Memory
    Program Memory - RAM
    Byte Addressing Program Memory
    Restrictions
Instruction Latch
    The Instruction Latch - IL
The Micro-program Counter, Condition Codes & Interrupts
    The Micro-Program Counter - MPC
    The Condition Code Register - CCR
    The Interrupt Register - FLAGS Restrictions
Micro-Program Memory & Micro-Instruction Register
Micro-Program Memory - MRAM
The Micro-Instruction Register - MIR
Restrictions
Program & Micro-Program Execution
Instruction Format
Instruction Processing
Micro-Instruction Processing
Bus Source and Destination

Introduction

This section describes the operation of the har[illegible] [illegible] detail. Appendix A contains a summary of the host [illegible] interface. The tables in Appendix B contain the a[illegible]mmary o[illegible] the micro-instruction format and micro-assembler mnemonics. Appendix C contains a summary of some of the CPU/32's important characteristics. Appendix D contains complete schematics for the CPU/32. The reader should immediately look at Appendix D, Figures 1 and 2 to see the CPU/32 block diagrams before proceeding.

Specifications

* Clock cycle: 150 ns (jumper and oscillator selectable) micro-instruction cycle.

* Throughput: Approximately 3.5 million Forth operations per second (varies depending on instruction mix)

* Architecture: 32-bit data paths. Writable 32-bit horizontal microcode memory. Two independent 32-bit hardware stack memories. Overlapped micro-instruction execution and fetch. Overlapped macro-instruction execution and fetch, with direct execution of subroutines calls.

* Host Computer Requirements: One full-size expansion slot, with two ribbon cables to the CPU/32 box. All CPU/32 cards may be relocated inside the host PC/AT case if desired. Requires an IBM PC/AT or compatible. May work on some IBM PC compatibles if the address bus meets published PC design specifications.

* Technology: Most logic is 74ALS series TTL chips. The ALU is implemented with 74F181 chips using carry-lookahead logic. Stack and microcode memories use 4k x 4, 35 ns static RAM chips. Program memory uses 32k x 8, 120 ns static RAM chips.

* Hardware stacks: Independent 4k-element, 32-bit data and return stacks with hardware stack pointers. Stack pointers can be incremented or decremented in parallel with other operations.

* Microcode Memory: 4k x 32-bit words divided into 512 opcode pages of up to 8 instructions each. Microcode memory is changeable by the host PC.

* Program Memory: 1 megabyte of 120 ns static program memory standard. Expandible to up to 8 megabytes of static memory. Capability to address up to 2 gigabytes of dynamic program memory in 8 megabyte pages. Memory is organized into 32-bit words, accessible as either bytes or words.

* Interrupts: CPU/32 interrupts are available for data stack underflow/overflow, return stack underflow/overflow and host attention request.

* DMA Memory Transfer: CPU/32 program memory may be loaded from or to host PC memory (including video memory) using the host PC DMA controller.

Capabilities

Operating Speed

The WISC CPU/32 runs at a 33% duty cycle micro-instruction clock of 150 ns (6.67 MHz.) as derived from a 20 MHz crystal. Since most primitives are only 2 clock cycles long, this gives a best-case operating speed of 3.33 MOPS million high level operations per second (MOPS). In addition, subroutine calls, exits, and unconditional branches that can be combined with opcodes are processed at zero time cost. In actual programs, the average primitive will be somewhat more than 2 clock cycles, but the availability of zero-cost subroutines will probably yield an effective instruction rate of better than 3 MOPS including subroutine call instructions. This figure will be adversely affected in programs that perform many multiplications, divisions, or other complicated operations.

Various benchmarks have shown speed increases of 5 to 10 times over LIB-FORTH (a speed-optimized version of MVP-FORTH) running on an 80286 at 8 MHz, with zero-wait-state memory. Programs that perform a lot of 32-bit arithmetic or have a higher than average number of subroutine calls will perform even better than this 5 to 10 times improvement. Programs with a lot of floating point math will not perform as well, but will still be faster than the 80286.

General Architecture

The WISC CPU/32's general architecture is shown in Appendix D, figures 1 and 2. The CPU/32 uses 32-bit horizontal microcode to drive a 32-bit, stack oriented processor. The CPU/32 is capable of overlapped micro-instruction fetching and execution, and overlapped macro-instruction fetching and execution. Several functional units are implemented in hardware and connected by a single 32-bit, 3-state data bus. Additionally, the instruction addressing and decoding data paths are connected 32-bit memory address and memory data paths.

Since the micro-assembler is the primary means of controlling the hardware resources, control signals will be described in terms of their micro-assembler mnemonics. The function of each micro-operation will be described in the corresponding hardware section.

BEST AVAILABLE COPY

The Host Interface

The host interface is shown at the top of figure 2. The host adapter card plugged into the PC host contains logic to convert 8-bit PC data to 32-bit CPU/32 data, as well as logic to control the operation of the CPU/32.

Master/Slave Modes

The CPU/32 has two modes: Master and Slave. In Master mode, the CPU/32 runs programs with a continuously cycling clock. Typically, the host PC monitors the CPU/32 status register, waiting for a non-zero value, then returns the CPU/32 to Slave mode for servicing.

To enter Slave [illegible], use the STOP command (better yet, use the RESET-BOARD c[illegible] up or the CPU/32's internal state is unknown) [illegible] ave mode, the CPU/32 waits for IN and OUT command[illegible] rom the host to receive or send information. It will also re[illegible]nd to DMA transfers on DMA channel 3.

While in slave mode, the CPU/32 responds to the port addresses shown in Appendix A. In the normal configuration, the port addresses are in the range 300 to 307 hex. Jumpers J1 through J14 on the host interface card may be changed to modify this address to any otherwise unused bank of 8 ports as shown in Appendix A.

Write Ports

Ports 300 through 307 are used as "write" ports with the assembly language OUT command. Each port accepts 8 bits of data, and may be written to using the WRITE0...WRITE7 words from the micro-assembler. Each WRITE word accepts an 8-bit value from the stack and writes it to the appropriate port.

Port 0 is used to write data to the 32-bit data bus. Four bytes are written successively (lowest order byte first, highest last) to this port. As the fourth byte is written, the CPU/32's clock is automatically cycled once to clock the results in to the destination determined by the contents of the micro-instruction register. The X! micro-assembler word takes a 32-bit number from the data stack and writes it to the CPU/32 data bus. In DMA operations, a WRITE0 is simulated by the host interface card hardware for each data transfer, automatically arranging each quartet of DMA'ed bytes into 32-bit words for memory storage.

Port 1 is used to write data to the 32-bit micro-instruction register (MIR). It requires 4 successive WRITE1 operations, just like port 0, but always places the results in the MIR. The micro-assembler word MIR! takes a 32-bit value and places it in the MIR. Typically, the MIR value is set using a micro-assembler construction (accessed from the normal FORTH vocabulary within the CPU32 version of the MVP-FORTH kernel on the host PC) such as:

```
>> DEST=DLO ;SET
```

which automatically determines bit values for the micro-instruction. The ">>" is a prefix that indicates the start of a micro-instruction definition, and ";SET" indicates the end of the definition, and directs the micro-assembler to load the assembled micro-instruction into the micro-instruction register using the MIR! primitive. Subsequently typing in:

```
12345678. X!
```

will store the 32-bit quantity 12345678 in the DLO register. To read back the value, enter the following commands:

```
>> SOURCE=DLO ;SET   X@   D.
```

Note that all values used are 32-bit integers, since the CPU/32 is a 32-bit machine.

Port 2 single-steps the CPU/32's clock. WRITE2 has the same effect as the single-step that automatically occurs with X!, except the host does not drive the bus data lines. The data written to the port is ignored. The micro-assembler word CYCLE writes a dummy value to port 2.

Port 3 starts the board in Master mode. The data written to the port is ignored. The micro-assembler word GO writes a dummy value to port 3.

Port 4 stops the board and places it in Slave mode. The data written to the port is ignored. The micro-assembler word STOP writes a dummy value to port 4.

Port 5 sets the board in DMA mode. The data written to the port is ignored. The micro-assembler word SET-DMA writes a dummy value to port 6. Typically this port is not directly used by application programs.

Port 6 resets the data bus sequencer used by WRITE0, WRITE1, READ0, and READ1. It also takes the board out of DMA mode. As a matter of good programming practice, use RESET-SEQ command, which writes a dummy value to port 6, before each series of reads or writes. The words X@, X!, MIR@, and MIR! do this automatically Port 7 writes to the 8-bit service register on the CPU/32. This register may be written even when the CPU/32 is in Master mode. If interrupts are enabled, writing to this register will generate a CPU/32 interrupt. The micro-assembler word PCREQ takes an 8-bit value from the stack and writes it to port 7.

Read Ports

Ports 300 through 302 are used as "read" ports with the assembly language IN command. Each port returns 8 bits of data, and may be read using the READ0...READ2 words from the micro-assembler. Each READ word returns a 16-bit value with the high 8 bits zeroed to the stack.

Port 0 is used to read data to the 32-bit data bus. Four bytes are read successively (lowest order byte first, highest last) from this port. As the fourth byte is read, the CPU/32's clock is automatically cycled once to adjust any counters that may be affected by the MIR contents. The bus source is etermined by the contents of the MIR. The X@ micro-assembler ord reads the contents of the data bu. nd returns a 32-bit alue to the data stack. In DMA operations, a READ0 is simulated y the host interface card hardware for each data transfer, utomatically retrieving successive 32-bit bus bytes to form uartets of 8-bit values.

Port 1 i- used to read data from the 32-bit micro-nstruction register (MIR). It requires 4 successive READ1 perations, just like port 0, but always returns the result from he MIR. The micro-assembler MIR@ returns a 32-bit value from he MIR. Typically, MIR@ is only useful for diagnostic purposes.

Port 2 reads the CPU/32's 8-bit status register. STATUS is he micro- assembler word that returns a 16-bit value with the igh 8 bits zeroed. The status register typically has a zero alue while the CPU/32 is in Master mode. The CPU/32 sets the tatus register to a non-zero value to indicate a request to be eturned to Slave mode for service.

he Status Register - STATUS

The STATUS register is an 8 bit register that allows the PU/32 to communicate requests for service to the host while in aster mode. Typically, the STATUS register is 0, with a non-ero value indicating a request for one of 255 possible user-lefined services from the host. The STATUS register is set using he DEST=STATUS micro-operation, and is queried from the host ising the STATUS word. There is no way to read the STATUS egister from the CPU/32. An example of setting a STATUS value s:

```
>> DEST=STATUS ;SET   12. X!
STATUS .   ( Returned value is 12)
```

he Host Request Register - HOST

The 8-bit HOST register allows the host PC to make requests or attention to the CPU/32. The host PC may write to the host egister using the PCREQ word. The CPU/32 may read the HOST egister value using the SOURCE=FLAGS micro-operation:

```
HEX
45 PCREQ
>> SOURCE=FLAGS ;SET   X@  DROP OFF AND .
     ( Display lowest 8 bits of value, giving 45)
DECIMAL
```

The upper bits of the FLAGS register contain interrupt status nformation described in a later section.

The Data Stack

The data stack is one of two hardware stacks in the CPU/32. In the MVP-FORTH/32 implementation, the data stack contains the Forth data stack elements (except for the top-most stack element, which is contained in the DHI register described in the next section.) The data stack consists of the data stack memory and the data stack pointer.

The Data Stack Pointer - DP

The data stack pointer (DP - not to be confused with the MVP-FORTH user variable dictionary pointer DP) is a 12-bit up/down counter that may be incremented, decremented, or loaded on each micro-instruction. The following micro-assembler commands load the DP, read it back, and show results of increment and decrement operations:

```
>> DEST=DP ;SET  200. X!
>> SOURCE=DP ;SET  X@ D.        ( Display 200)
>> INC[DP] ;SET    CYCLE
>> SOURCE=DP ;SET  X@ D.        ( Display 201)
>> SOURCE=DP  DEC[DP] ;SET  X@ D. X@ D. X@ D.
                ( Display 201, 200, 199)
```

Notice that X@ cycles the clock on each read operation. The DP increment or decrement operations take place at the end of each clock cycle. This means that the data stack itself may be read, then the DP incremented or decremented at the end of the very same cycle.

The Data Stack - DS

The data stack (DS) is a 4k by 32-bit fast memory. The DS value may be read or written on each cycle, with the DP value changed at the end of each cycle. In MVP-FORTH/32, the DP points to the second to topmost stack element, with an INC[DP] acting as a "pop" operation, and a DEC[DP] followed on the next clock cycle with a DEST=DS operation acting as a "push" operation. The following sequence of commands pushes two items on the DS, then pops them off again:

```
>> DEC[DP]  ;SET  CYCLE
>> DEST=DS  DEC[DP] ;SET  11111. X!  ( Push 11111)
>> DEST=DS  ;SET          22222. X!  ( Push 22222)
>> SOURCE=DS  INC[DP] ;SET  X@ D. X@ D.
                ( Pop 22222 then 11111)
```

Restrictions

Any time the DP value is between 0 and 1FF hex, a data stack underflow/overflow interrupt is generated. The DS positions between 0 and 1FF are still usable if interrupts are masked, however. This provides run-time stack size checking with no speed penalty. In a sophisticated software environment, the DP interrupt could be used to page portions of a larger than 4k-word data stack in and out of the DS memory. The starting value for DP with an empty stack must be initialized to FFF hex.

The Arithmetic Logic Unit Complex

The Arithmetic Logic Unit complex consists of the Data Hi register (DHI), bus data latch (LATCH), arithmetic and logic unit (ALU) with associated multiplexer, and Data Low register (DLO). All these have 32-bit data paths. The ALU multiplexer and DLO registers may be connected to form a 64-bit shifting mechanism.

The Arithmetic and Logic Unit and Multiplexer - ALU

The ALU performs 32-bit addition, subtraction, and Boolean logic operations on one or both of two inputs, denoted the A-side and B-side inputs. The result of the arithmetic or logical operation are passed through the multiplexer and may be shifted right or left one bit, rolled right 8 bits (with the lowest 8 bits moving to the highest 8 bit position), or passed through unchanged.

ALU operations are broken up into logical operations and arithmetic operations (corresponding to the 2 mode selects of the 74F181 chip). Logical ALU micro-operations leave the carry in bit CIN uncommitted, and result in an indeterminate carry-out bit. Allowable logical operations are:

| FUNCTION | DESCRIPTION |
|---|---|
| ALU=A | Pass A side through unchanged |
| ALU=B | Pass B side through unchanged |
| ALU=notA | One's complement of A side |
| ALU=notB | One's complement of B side |
| ALU=AorB | A logical "or" B |
| ALU=AandB | A logical "and" |
| ALU=AxorB | A logical "xor" B |
| ALU=AnorB | A logical "nor" B |
| ALU=AnandB | A logical "nand" B |
| ALU=AnxorB | A logical "xnor" B |
| ALU=0 | Force ALU outputs to all 0 |
| ALU=-1 | Force ALU outputs to all 1 (two's complement negative 1) |

All arithmetic operations are performed with two's complement integers. These operations automatically set the carry-in bit value as required to generate functions, and result in a valid carry-out value at the end of the clock cycle in which they are used. Allowable arithmetic operations are:

| FUNCTION | DESCRIPTION |
|---|---|
| ALU=A+0 | Pass A side through unchanged (set carry-out to 0) |
| ALU=A+1 | Add 1 to A side |
| ALU=A-1 | Subtract 1 from A side |
| ALU=A+A | Multiply A side by 2 |
| ALU=A+A+1 | Multiply A by 2 and add 1 |
| ALU=A+B | Add A side to B side |
| ALU=A+B+1 | Add A side to B side plus 1 |
| ALU=A-B | Subtract B side from A side |
| ALU=A-B-1 | Subtract B side from A side, then subtract 1 |
| ALU=AornotB+1 | (Special purpose function) If the A side is 0, this takes the two's complement of the B side |

Some examples of ALU functions are given below (note that the word <u>;DO</u> is equivalent to the sequence <u>;SET CYCLE</u>):

```
>> ALU=B  DEST=DHI   ;SET  5. X!  ( Set DHI to 5)
>> DEST=DLO          ;SET  3. X!  ( Set DLO to 3)
>> SOURCE=DLO ALU=A+B DEST=DHI ;DO  ( Add DLO to DHI)
>> SOURCE=DHI        ;SET  X@ D.  ( New DHI value is 8)
>> ALU=A+1 DEST=DHI  ;DO          ( Add 1 to DHI)
>> SOURCE=DHI        ;SET  X@ D.  ( New DHI value is 9)
```

The output of the ALU function is passed through the multiplexer. The SL[ALU] micro-operation shifts the ALU output one bit left, discarding the highest bit, and inserting the highest bit from the DLO register into the lowest bit position of the multiplexer output. The SR[ALU] micro-operation shifts the ALU output right one bit, discarding the lowest bit (or shifting it into the DLO register if SR[DLO] is used) and shifting in the carry-in bit described in the next paragraph. The ROLL[ALU] operation does a right-rotate by 8 bits. Some examples are:

```
>> DEST=DLO        ;SET  0. X!  ( Zero highest bit )
>> ALU=B DEST=DHI ;SET  400. X! ( Store 400 in DHI)
>> ALU=A  SL[ALU] DEST=DHI ;DO
>> SOURCE=DHI      ;SET  X@  D.    ( Result is 800 )
>> ALU=A  CIN=0 SR[ALU] ;SET CYCLE  CYCLE
>> SOURCE=DHI      ;SET  X@  D.    ( Result is 200 )
HEX
>> ALU=B DEST=DHI ;SET  12345678. X!
>> ALU=A  ROLL[ALU] ;DO
>> SOURCE=DHI ;SET X@ D.     ( Result is 78123456 )
DECIMAL
```

The carry-in bit is used for both arithmetic and shifting operations. CIN=0 or CIN=1 generate a 0 or 1 value for the carry-in bit respectively for shifting operations. ALU arithmetic functions automatically generate their own carry bit values.

The output of the ALU (NOT the multiplexer) serves as the source of the sign bit and zero bit for conditional branching. Since the default operation for the ALU is ALU=A, and since the DHI register value is clocked on each cycle, the zero and sign conditions always apply to the value in the DHI register <u>The Data Hi Register - DHI</u>

The DHI register is the 32-bit register that is attached to the ALU A side and is the receiver of the ALU output on each clock cycle. The default micro-assembler ALU function is ALU=A, meaning that if no ALU function is specified, the DHI contents simply flow through the ALU on each clock cycle. Since DHI is clocked each cycle, the micro-operation DEST=DHI is only used for clarity, and may be used freely even when another bus destination is specified in the micro-instruction.

The DHI register may be driven onto the bus using the SOURCE=DHI micro-operation. Note that the "old" value of DHI may be placed on the bus even while the ALU is computing a new value to be placed in DHI on the same clock cycle:

```
>> ALU=B DEST=DHI ;SET  123. X!  ( Set DHI to 123)
>> SOURCE=DHI  ALU=0 DEST=DHI ;SET
X@ D.        ( Fetch 123 & clock 0 into DHI )
X@ D.        ( Fetch the 0 from DHI )
```

The DHI register may hold any quantity during the course of a microcoded primitive's execution. By convention, the DHI register always contains the top stack element at the start or end of a word when executing MVP-FORTH/32.

The Bus Latch - LATCH

The LATCH is a 32-bit transparent latch that connects the data bus to the B side of the ALU. In normal operation, the LATCH is transparent: it simply allows the data bus to flow directly into the ALU. Thus, in the previous examples that stored data in DHI by using the ALU=B construct, the latch just passed data through.

However, there is another function for the LATCH. At the end of each clock cycle, the LATCH captures whatever data was on the bus (whether it was used by the ALU or not). Then, if the subsequent bus source is SOURCE=DHI on the next cycle, the LATCH retains and supplies to the ALU B side the data from the previous clock cycle. This is extremely useful for exchanging the contents of the DHI register with the contents of any other system resource. For example, exchanging the current DS value and DHI without using the LATCH would be accomplished by:

```
>> SOURCE=DHI DEST=DLO ;DO
>> SOURCE=DS  ALU=B  DEST=DHI ;DO
>> SOURCE=DLO  DEST=DS ;DO
```

However, using the LATCH, this exchange can be accomplished in only two cycles:

```
>> SOURCE=DS  DEST=LATCH ;DO
>> SOURCE=DHI DEST=DS  SOURCE=LATCH ALU=B DEST=DHI ;DO
```

On the first cycle, the DS value is simply placed on the bus for retention in the LATCH. If desired, the DS value could also be written to any other bus destination, or even used by the ALU to compute a new DHI value before the exchange occurs. On the second clock cycle, DHI is written to the DS, and the retained LATCH value is written to DHI, accomplishing the exchange. Note that the micro-operation SOURCE=LATCH is just for readability (just like DEST=DHI). The micro-operation SOURCE=DHI is what causes the LATCH to retain its data. The LATCH will retain its data indefinitely, as long as SOURCE=DHI is used in consecutive clock cycles.

The Data Low Register - DLO

The DLO register is a 32-bit shift register that is used both as a temporary holding register and as a low half of a 64-bit shifting mechanism. As a holding register, SOURCE=DLO and DEST=DLO allow storing any 32-bit value in DLO and reading it back:

```
>> DEST=DLO ;SET  123456. X!
>> SOURCE=DLO ;SET X@ D.  ( Display 123456)
```

When used as a shift register, DLO may be shifted independently using SR[DLO] or SL[DLO], and may be combined with the ALU multiplexer to form a 64-bit shift register if desired. DLO may not be set and shifted in the same clock cycle, but it may be read and then shifted (after reading) in the same micro-cycle. When shifting left, the lowest bit of DLO is set by the CIN bit. When shifting right, the highest bit of DLO is set by the output of the lowest bit of the ALU (not the ALU multiplexer):

```
>> DEST=DLO ;SET   4. X!  ( Set DLO to 4)
>> CIN=1 SL[DLO] ;DO      ( Shift in a 1)
>> SOURCE=DLO ;SET X@ D.  ( Result is 9)
>> DEST=DLO ;SET  -8. X!  ( Set DLO to -8)
>> ALU=-1 SR[DLO] ;DO     ( Shift right, high bit -1)
>> SOURCE=DLO ;SET  X@ D. ( Result is -4)
```

The single-stepping diagnostics have good examples of shifting a single bit across all 64 bits of DLO and the ALU/multiplexer/DHI circle in both directions.

Multiplication and Division

Two very special modes of operation of the LATCH and ALU are provided for multiplication and division. When the special bus source designation MULTIPLY is used, the ALU multiplexer performs an arithmetic shift right operation on the partial sum (which works by feeding in the arithmetic carry-out bit into the multiplexer.) In addition, the LATCH retains previous data. This capability allows performing a 32-bit multiply in one cycle per bit, plus a few cycles of overhead for setup. See the microcode definition of U* for an example of a shift and conditional add algorithm using this capability.

The special bus source designation DIVIDE not only shifts the logical complement of the ALU sign bit into the DLO shift left input, but also manipulates the ALU function inputs to provide either an ALU=A+B or an ALU=A-B operation as required. This results in a one-clock cycle per bit (plus setup overhead) non-restoring division algorithm for unsigned numbers as demonstrated by the microcoded definition for U/MOD.

Restrictions

Due to time constraints, the zero condition value is not valid after an arithmetic operation (but is valid after logical operations). If necessary, allow the DHI value to cycle through the ALU using the default ALU=A operation, then do a microcoded branch based on the Z bit. Alternately, when comparing two numbers for equality, use the ALU=AxorB function to avoid this limitation. In MVP-FORTH/32, since OBRANCH and other words may test the Z bit on the very first micro-instruction, this means that only logical operations may be performed on the ALU on the ENDing micro-instruction of any word.

Since arithmetic operations set the CIN bit, do not specify an explicit CIN value for shifting while doing an arithmetic operation. Clever micro-programmers may be able to use the CIN value set by the arithmetic operation as the shifting input.

Be sure to specify a SOURCE=DHI micro-operation when using the LATCH for a retained value. The micro-operations SOURCE=LATCH and DEST=LATCH are used only for readability; they do not enforce this constraint.

The Return Stack

The return address stack is the second of two hardware stacks in the CPU/32. In the MVP-FORTH/32 implementation, the eturn stack contains the Forth return addresses and loop ariables. The return stack implementation consists of the data tack memory and the data stack pointer.

he Return Stack Pointer - RP

The return stack pointer (RP) is a 12-bit up/down counter hat may be incremented, decremented, or loaded on each micro- nstruction. The following micro-assembler commands load the RP, ead it back, and show results of increment and decrement perations:

```
>> DEST=RP ;SET  200. X!
>> SOURCE=RP ;SET  X@ D.    ( Read back 200)
>> INC[RP] ;SET    CYCLE
>> SOURCE=RP  DEC[RP] ;SET  X@ D. X@ D. X@ D.
              ( Read back 201, 200, 199)
```

lotice that X@ cycles the clock on each read operation. The RP ncrement or decrement operations take place at the end of each lock cycle. This means that the return stack itself may be ead, then the RP incremented or decremented at the end of the ery same cycle. The astute reader will notice that the RP works xactly the same as the DP.

he Return Stack - RS

The data stack (RS) is a 4k by 32-bit fast memory. The RS alue may be read or written on each cycle, with the RP value hanged at the end of each cycle. In MVP-FORTH/32, the RP points o the topmost stack element, with an INC[RP] acting as a "pop" peration, and a DEC[RP] followed on the next clock cycle with a EST=RS operation acting as a "push" operation. The following equence of commands pushes two items on the RS, then pops them ff again:

```
>> DEC[RP]   ;DO
>> DEST=RS  DEC[RP] ;SET  11111. X!   ( Push 11111)
>> DEST=RS  ;SET          22222. X!   ( Push 22222)
>> SOURCE=RS  INC[RP] ;SET  X@ D. X@ D.
              ( Pop 22222 then 11111)
```

The return stack is very similar in operation to the data tack, except that the data to and from the return stack may ither be routed from/to the system data bus, or may routed from he address counter or to the address latch and address counter. his added routing capability is crucial in that it supports arallel subroutine processing in conjunction with other perations. It does have a slight drawback in that due to extra hip enabling logic delays, the return stack is too slow to be ritten through the ALU on a single clock cycle.

estrictions

Any time the RP value is between 0 and 1FF hex, a return tack underflow/overflow interrupt is generated. The RS ositions between 0 and 1FF are still usable if interrupts are asked, however. This provides run-time stack size checking with o speed penalty. In a sophisticated software environment, the P interrupt could be used to page portions of a larger than 4k- ord return stack in and out of the RS memory. The starting alue for RP with an empty stack must be initialized to FFF hex.

Since the RS is used for subroutine call processing, in general SOURCE=RS and DEST=RS should never be used on the very first or very last (ENDing) micro-instruction within a microcoded word definition. Also, DEST=RP and SOURCE=RP should never be used during these micro-instructions since they can produce results that are difficult to predict. THe discussion on instruction decoding contains some special cases when these rules do not apply.

Due to timing constraints, the RS value may not be written through the ALU to the DHI register directly, nor may it be written to RAM. The RS value may be captured by the LATCH for use in the subsequent clock cycle, may be written to the DS, and may be written to DLO (or to DP or RP for that matter). RS may be written to the address latch or the address counter on a single clock cycle, but the address latch value will be written too late for RAM to be available for use on the very next clock cycle - wait one clock cycle before accessing RAM. The hardware subroutine return function that copies the RS contents to the address latch does allow RAM to be read on the subsequent clock cycle, however, since it uses different control circuitry.

Memory Addressing and Subroutine Control

The data paths used for memory addressing and subroutine control are shown in the bottom half of figure 1. The memory addressing data paths connect to the return stack (RS), the memory address counter (ADDRESS-COUNTER), the memory address latch (ADDRESS-LATCH), the next address register (NAR), and the memory page register (PAGE). The ADDRESS-COUNTER, ADDRESS-LATCH, and NAR all manipulate the lowest 23 bits of program data, while the PAGE register holds the next highest 8 bits of data, giving a 31 bit address space consisting of 256 pages of 8 megabytes. The 32nd memory address bit is ignored by the program memory cards.

There are several important limitations to using the memory address path resources, most of which are designed to avoid interfering with the automatic subroutine processing logic.

The RAM Address Latch - ADDRESS-LATCH

The RAM address latch (ADDRESS-LATCH, not to be confused with LATCH which is attached to the ALU) is a 23-bit transparent latch that is used to address memory for all functions except automatic instruction decoding. Its outputs are enabled to address program memory during all micro-instructions except the first and last within a microcoded word. Data written to ADDRESS-LATCH becomes a valid memory address approximately half-way through the cycle in which it is written with DEST=ADDRESS-LATCH. This leaves enough time for program memory to be addressed and read or written during the very next clock cycle:

```
123456.  100. RAM!   ( Store 123456 at addr 100)
>> DEST=ADDRESS-LATCH ;SET  100. X!  ( addr 100 )
>> SOURCE=RAM ;SET  X@ D.   ( Fetch value 123456)
```

Once set, the ADDRESS-LATCH retains its value until the next instruction is fetched by the DECODE micro-operation, or until a DEST=ADDRESS-LATCH or DEST=ADDRESS-COUNTER is used again.

The Address Counter - ADDRESS-COUNTER

The ADDRESS-COUNTER is a 23-bit count-by-4 register which has the lowest two bits always forced to zero. Its primary purpose is to increment by one word address the values to be stored on the return address stack, thus generating a return address that points to the instruction after the subroutine call. The ADDRESS-COUNTER may be set using the DEST=ADDRESS-COUNTER micro-operation. This micro-operation causes whatever data is on the bus to flow through the ADDRESS-LATCH and into the ADDRESS-COUNTER. This means that a DEST=ADDRESS-COUNTER micro-operation also implicitly performs a DEST=ADDRESS- LATCH operation.

The ADDRESS-COUNTER may be incremented by 4 during any but the first and last micro-instructions within a microcoded word definition. The increment, which is specified by the INC[ADC] micro-operation, occurs at the end of the clock cycle, and may be combined with a SOURCE=ADDRESS-COUNTER micro-operation to read the value present before incrementing. An interesting use of the ADDRESS-COUNTER is to perform an INC[ADC] followed by the next cycle with a SOURCE=ADDRESS-COUNTER DEST=ADDRESS-LATCH. This provides a capability to step through words of program memory for reading or writing. An example of using the ADDRESS-COUNTER is:

```
RESET-BOARD   ( Among other things, this
                zeros the page register)
>> DEST=ADDRESS-COUNTER ;SET  100. X!
             ( Also sets ADDRESS-LATCH to same value)
>> INC[ADC] ;DO
>> SOURCE=ADDRESS-COUNTER ;SET X@ D.  ( Value of 104)
```

The Next Address Register - NAR

The next address register (NAR) is the closest thing there is to a program counter in the CPU/32. The NAR is a 23-bit holding register for the address of the next instruction. Each CPU/32 instruction specifies the next instruction to be executed with a subroutine call, subroutine exit, or unconditional branch. This means that the NAR does not increment to determine instruction addresses, but rather is reloaded at the end of the instruction fetching process. The section on instruction decoding will clarify this point.

The NAR is loaded using the DEST=DECODE instruction, which is only useful for purposes discussed in the section on instruction decoding. The NAR may not be read back directly, but its contents may be accessed in single-stepping mode by performing a dummy instruction decode that copies its contents into the ADDRESS-COUNTER. The NAR's outputs are enabled for program memory addressing only during the first and last micro-instructions within a microcoded word definition.

The Page Register - PAGE

The PAGE register is used to extend the memory address range beyond the 23 bits provided by ADDRESS-COUNTER, ADDRESS-LATCH, and NAR. The PAGE register is set to zero by the RESET-BOARD command, and may only be changed with the DEST=PAGE micro-operation. The PAGE register contents are always appended to the high end of the ADDRESS-COUNTER value, and may be examined by reading the ADDRESS-COUNTER:

```
HEX
>> DEST=ADDRESS-COUNTER ;SET 0045678C. X!
        ( Set ADDRESS-COUNTER 23-bit value)
>> DEST=PAGE ;SET  74800000. X!
        ( 8-bit PAGE register value is E9 hex,
          starting with bit 23 of value)
>> SOURCE=ADDRESS-COUNTER ;SET X@ D.
        ( Returned value is 74C5678C. )
DECIMAL RESET-BOARD
```

Since the page register contents are used for generating bits 23-31 of the memory address, the page register selects which of 256 non-overlapping banks of 8 megabytes is in use at any given time. Inter-segment memory accesses may be accomplished by saving the PAGE register value for the program, setting PAGE to accessed the desired memory location, then restoring the PAGE register value before the next instruction is decoded.

Restrictions

As discussed in the return stack section, the sequences SOURCE=RS DEST=ADDRESS-LATCH and SOURCE=RS DEST=ADDRESS-COUNTER are valid, but result in a memory address which is set up too slowly to provide valid RAM accessing during the next clock cycle. Wait one clock cycle before reading or writing RAM when using these constructions.

Never perform a SOURCE=RS, DEST=RS, DEST=PAGE, DEST=DECODE, SOURCE=ADDRESS-COUNTER, DEST=ADDRESS-COUNTER, DEST=ADDRESS-LATCH or INC[ADC] during the first or last clock cycles of a microcoded instruction. Doing so will interfere with instruction decoding and crash whatever program is executing. Exceptions: on a SPECIAL instruction (which is guaranteed not to contain a subroutine call or return) SOURCE=RS, DEST=RS, and SOURCE=ADDRESS-COUNTER may be used in the first micro-instruction; and on an instruction that is known to be a subroutine call (such as the Forth LIT word implementation in MVP-FORTH/32) SOURCE=ADDRESS-COUNTER may be used to access the value being written to the return stack on the first micro-instruction. The section on instruction decoding explains the reason for these limitations.

The ADDRESS-COUNTER must be restored to its original value before the last micro-instruction of a word if it has been used for memory addressing, otherwise subroutine calling on the subsequent word will not work properly. If a DEST=DECODE micro-operation is used, the ADDRESS-COUNTER must be set to the memory address used to fetch the macro-instruction. A typical two micro-instruction sequence to accomplish this is:

```
... DEST=ADDRESS-COUNTER ...   ( Set address to decode)
                               ( set ADDRESS-LATCH too)
... SOURCE=RAM DEST=DECODE ... ( Decode instruction)
```

Program Memory

The CPU/32 comes with a standard 1 megabyte of program memory occupying two memory expansion boards of 512k bytes each. Each board takes 16 pieces of Hitachi HM62256 32k by 8 bit 120 ns static memory chips (or equivalent), arranged as 128k words of 32-bits. Up to a total of sixteen static memory expansion boards may be used with the CPU/32 by setting jumpers on each board as shown in Appendix A. In the future, dynamic memory boards will allow addressability of up to 2 gigabytes of program memory.

Program Memory - RAM

The program memory is organized as up to 2 gigabytes of 32-bit words, and is addressable as either bytes or words. Words must always be aligned on word boundaries (evenly divisible by 4 memory addresses). For example, memory addresses 0, 4, 8, 12, and 16 are aligned on word boundaries, while addresses 1, 2, 3, 5, 6, and 7 are not. Program memory is accessed by first setting the memory address in the ADDRESS-LATCH, then performing a SOURCE=RAM or DEST=RAM operation. In order to write and then read a 32-bit RAM value:

```
>> DEST=ADDRESS-LATCH ;SET  100. X!
>> DEST=RAM ;SET 12345678. X!
         ( Store 12345678 at address 100)
>> SOURCE=RAM ;SET X@ D.   ( Fetch 12345678)
```

Program memory data takes one cycle to become valid after an address is established. However, since the ADDRESS-LATCH outputs are valid approximately halfway through the cycle in which they are set, RAM may be read or written on the very next micro-instruction.

In word access mode, the lowest two bits of the ADDRESS-LATCH value are ignored treated as if zero, forcing access on even word boundaries.

Byte Addressing Program Memory

Program memory may be accessed as an array of bytes instead of full-words. If SOURCE=RAM-BYTE or DEST=RAM-BYTE are used, the lowest 8 bits of the data bus are mapped onto the appropriate RAM byte in the word being addressed. If writing to RAM, the highest 24 bits of the data bus are ignored. If reading from RAM, the highest 24 bits of the data bus are set to zero. Byte accessing to RAM is controlled at the memory chip level, so a read/modify/write operation is not required to change a single memory byte:

```
HEX
>> DEST=ADDRESS-LATCH ;SET  102. X!   ( Address 102)
>> DEST=RAM ;SET  12345678. X!
         ( Set 32-bit word 100 to 12345678 )
>> SOURCE=RAM-BYTE ;SET X@ D.
         ( Byte 102 value is 34)
>> DEST=RAM-BYTE   ;SET  99. X!
>> SOURCE=RAM      ;SET  X@ D.
         ( New 32-bit word 100 value is 12995678)
DECIMAL
```

Restrictions

The output of the RAM is too slow to be fed directly through the ALU on a single clock cycle. It may, however, be captured by the LATCH for use on the cycle subsequent to the READ=RAM or READ=RAM-BYTE micro-operation. As discussed in the section on the return stack, do not read or write RAM directly from the RS.

RAM is available for use on the cycle immediately after a DEST=ADDRESS-LATCH or DEST=ADDRESS-COUNTER micro-operation, except when the source is the RS (in which case a one clock cycle wait is required). Feeding the output of RAM directly to the ADDRESS-LATCH may appear to work in simple test cases, but will lead to unreliable operation since the program memory's data path will be directly feeding back to its address path.

Instruction Latch

The Instruction Latch - IL

The instruction latch (IL) is an 11 bit transparent latch that is used to contain a 9 bit opcode and 2 bits of subroutine control information for an instruction. Opcode information is written to the IL from bits 23-31 of the RAM data bus, and subroutine control information is written from bits 0-1 of the RAM data bus (according to the CPU/32's standard instruction format.) The micro-operation to do this is DEST=DECODE, which also writes bits 2-22 to the NAR. Since the IL is a transparent latch, information written to it is available as an input to the micro-program counter during the cycle in which it is written. This has important implications for instruction decoding as discussed in a later section.

The IL contents may be read to the data bus using the SOURCE=MPC micro-operation. This is only useful for diagnostics and interrupt processing. When reading back the IL, bits 23-31 and bits 0-1 contain the IL information, and bits 8-19 contain micro-program counter information.

The Micro-Program Counter, Condition Codes & Interrupts

The CPU/32 has a micro-program "counter" (MPC) to address micro-program memory. The value that addresses micro-program memory actually consists of an assembly of 12 bits from different sources. Bit 0 (the lowest bit) is the output of the condition code multiplexer. Bits 1 and 2 are constants from the micro-instruction register. Bits 3-6 come from a 4-bit counter within the MPC, and bits 7-11 come from a register in the MPC.

The Micro-Program Counter - MPC

The micro-program counter is a 9 bit register whose lowest 4 bits may be incremented if desired. When an instruction is decoded, the opcode is directly set into the MPC. This means that micro-program memory is accessed as 512 opcodes, with each opcode having a page of 8 micro-instructions available to it.

Within a page of micro-program memory, the MPC value is left undisturbed while the lowest three bits are manipulated by JMP=xxx micro-operations within the page as described below.

If a microcoded operation requires more than 8 words of micro-program memory, the INC[MPC] micro-operation may be used to increment the lowest 4 bits of the MPC to jump to the next page. The INC[MPC] must be used on the next to last micro-instruction executed within a page, and the last micro-instruction must contain a JMP=xxx micro-operation to the micro-instruction of the next page that is to be executed on the succeeding clock cycle.

The MPC may be read with the SOURCE=MPC micro-operation. Bits 11-19 contain the current MPC value. Other bits contain other information about the IL and micro-program memory address. In particular, bits 9-10 contain the two micro-instruction register bits used to form bits 1-2 of the micro-program memory address.

The Condition Code Register - CCR

The condition code register (CCR) is used to hold status information for use in conditional microcode branches. It is updated at the end of every clock cycle, and is not directly accessible to high level language programs. The value of one of the 8 possible condition codes is selected by the 3-bit micro-instruction register conditional branching field to form the lowest bit of the micro-program memory address for the subsequent micro-instruction. The 8 condition code values are:

| CCR number | micro-assembler notation | description |
|---|---|---|
| 0 | 0 | always has a 0 value |
| 1 | C | logical inverse of ALU carry-out valid only when an arithmetic ALU operation is used during the preceding clock cycle. A carry-out of 0 sets this condition code to 1. |
| 2 | Z | logical inverse of ALU zero test. When the ALU output is zero, this bit is set to 0. |
| 3 | S | Sign bit of ALU output. When ALU output bit 31 (before shifting) is 1, this bit is 1. |
| 4 | L | Lowest bit of DLO register. When DLO bit 0 is a 1, this bit is a 1. Bit reflects contents of DLO before any shifting or loading operation during a clock cycle. |
| 5 | | Unused - reserved for future expansion |
| 6 | | Unused - reserved for future expansion |
| 7 | 1 | Always 1 |

The CCR value may be read for diagnostic purposes in single-step mode by selecting the CCR addressing number 0-7 with the appropriate bits of the MIR, and using the SOURCE=MPC micro-operation. Bit 8 contains the current CCR value for the condition selected. Other bits contain other information about the IL and micro-program memory address.

The section on micro-instruction processing contains an explanation of how to use condition codes in a microcoded word definition.

The Interrupt Register - FLAGS

The CPU/32 supports interrupts for DS underflow/overflow, RS underflow/overflow, and host service request, as well as a software interrupt capability. The interrupt status register forms the highest 8 bits of the FLAGS register (the lowest 8 bits are formed by the host service register). The FLAGS register may be set using the DEST=FLAGS micro-operation and may be read using the SOURCE=FLAGS micro-operation. Each bit of the FLAGS register has a specific meaning:

| FLAGS BIT | MEANING |
|---|---|
| 24 | Data stack pointer underflow/overflow |
| 25 | Return stack pointer underflow/overflow |
| 26 | Host service request |
| 27 | Dynamic RAM parity error (currently unused) |
| 28 | Software interrupt #2 |
| 29 | Software interrupt #1 |
| 30 | Software interrupt #0 |
| 31 | Interrupt mask bit 1=masked, 0=unmasked |

Interrupts are inactive when their corresponding bits are 0. These bits must be set to 0 using a DEST=FLAGS micro-operation when clearing an interrupt. The effect of any interrupts is masked whenever bit 31 of the FLAGS register is 1, but the values may still be read if desired using the SOURCE=FLAGS micro-operation. Bits 24 through 30 may be set to any value desired using the DEST=FLAGS micro-operation to reset interrupt bits, simulate interrupts or generate software interrupts. Care should be taken not to over-write pending interrupt bit when setting the FLAGS register.

If interrupts are unmasked, any interrupt bit that is non-0 will force an opcode of 1 to be executed at the next instruction decoding cycle, and will disable any instruction fetching, subroutine calling, exiting, and unconditional branching operations that may be in progress. Opcode 1 is defined in MVP-FORTH/32 to mask interrupts and invoke an interrupt handler.

Restrictions

Since only the lowest 4 bits of the MPC form a counter, the INC[MPC] micro-operation must not be used from an MRAM page number that is 1 less than evenly divisible by 16 (i.e. don't use INC[MPC] from MRAM pages 15, 31, 47, 63, etc.)

Any microcoded word that masks the interrupts by setting bit 31 of the FLAGS register must wait for a clock cycle before executing a DECODE micro- operation to avoid generating another interrupt.

Micro-Program Memory & Micro-Instruction Register

1icro-Program Memory - MRAM

The MRAM is a 4k word by 32-bit memory used to store all ıicrocode in the system. As discussed previously, MRAM is :onceptually broken up into 512 pages of 8 words, with each page :orresponding to an opcode. MRAM may be accessed in Slave mode ›y using the SOURCE=MRAM and DEST=MRAM micro-operations. łowever, setting up the correct micro-program address involves ȷetting the appropriate page number into the MPC and the ıppropriate offset value and condition code selection value into :he micro-instruction register. Therefore, use of the micro- ıssembler words MRAM! and MRAM@ is highly recommended:

```
12345678. 503 MRAM!   ( Store value in location 503)
503 MRAM@ D.   ( Retrieve value 12345678)
```

:he Micro-Instruction Register - MIR

The MIR holds the micro-instructions that actually make the :PU/32 perform all other functions. The MIR is a 32-bit register :hat sends control signals throughout the CPU/32 hardware. The 1IR is broken up into fields as shown in Appendix B. Each group ›f micro-assembler directives controls one or more fields within .he MIR.

The MIR may be written using the MIR! micro-assembler word, ınd read for diagnostic purposes using the MIR@ word:

```
HEX
12345678. MIR!    ( Store value in MIR)
MIR@ D.           ( Returned value is 12345678)
>> DEST=DLO ;SET
MIR@ D.           ( Microcoded bit pattern from ;SET )
              ( is fetched, value is 40D00200)
DECIMAL
```

The MIR is loaded on each clock cycle while in Master mode rom the contents of MRAM. However, during slave mode, it is ›nly loaded by the MIR! instruction, not by clock cycling from :YCLE, X@, or X!. This allows retention of a valid micro- nstruction during repeated Slave mode operations.

:estrictions

MRAM may not be modified by the CPU/32 in Master mode, since .he MRAM supplies instructions to maintain Master mode operation. .f the CPU/32 needs to modify MRAM while executing a program, set .p a service request to the host to make the desired change in ;lave mode, then return the CPU/32 to Master mode.

Program & Micro-Program Execution

Up until this point we have examined only the functions of ach resource of the CPU/32 in Slave mode.' This section escribes how instructions and micro-instructions are executed in aster mode.

Instruction Format

The CPU/32 instruction format consists of three fields: two bits of subroutine control information in bits 0-1 (lowest two bits), a program address field in bits 2-23, and an opcode in bits 24-31 (highest nine bits).

```
Bit:  31 ... 23 22 ...................... 2 1..0
     +---------+---------------------------+----+
     + Opcode  + Address                   +Subr+
     +         +                           +Ctl +
     +------------------------------------------+
```

The Subroutine control bits allow each instruction to be either an unconditional jump (value of 0), a subroutine return (value of 1), or a subroutine call (value of 2). The value 3 is illegal for these 2 bits.

The 21-bit address field is the word address that has an implicit lowest 2 bit value of 0 appended to form a word-aligned 23-bit byte address for addressing the next instruction to be executed. This field is used for subroutine calls and unconditional branches. The field is ignored during subroutine return operations.

The opcode is a 9-bit value that directly addresses a page of MRAM. Opcode 0 is reserved for use as a No-op, and opcode 1 is reserved for use as the interrupt service opcode. The opcode is executed as the subroutine call, subroutine return, or unconditional branch is processed, making subroutine processing "free".

Instruction Processing

High level instructions, called macro-instructions, consist of the 32-bit opcode plus address and control format just described. The macro-instructions are fetched and decoded during a three-clock-cycle sequence, called the decoding sequence. The sequence is started by the DECODE micro-operation, which is referred to as the DEC0 cycle. The END micro-assembler word is used to denote the cycle after DECODE (referred to as the DEC1 cycle). The first clock cycle of the subsequent instruction is the last cycle of the decoding sequence, known as the DEC2 cycle.

The DEC0 cycle, initiated by the DECODE micro-operation, must always occur in the next-to-last micro-instruction executed within a microcoded word. During the DEC0 cycle, the interrupt flag registers are examined for pending interrupts, and the MPC is clocked with the value of the Instruction Latch (IL). If a non-masked interrupt is pending, the MPC value is forced to 1 instead of the IL value and the call and exit control bits are set to 0, causing an interrupt service word to start execution.

The DEC1 cycle, denoted by the END micro-assembler word, must always occur in the last micro-instruction executed within a microcoded word. During the DEC1 cycle, the ADDRESS-COUNTER is incremented to form a subroutine return address pointing to the next sequential word. If a subroutine call or unconditional branch is specified by the instruction in the IL, the NAR outputs are enabled to drive the RAM address bus. If a subroutine call is being processed, then an INC[RP] is automatically performed.

If a subroutine exit is being processed, then the ADDRESS-LATCH is loaded from the RS, and the ADDRESS-LATCH outputs are used to drive the RAM address bus. The END micro-assembler word forces a JMP=000 micro-operation to ensure that the 0th offset micro-instruction is the first micro-instruction executed by the next opcode.

The DEC2 cycle occurs during execution of the first micro-instruction of the word that was held in the IL during the DEC0 cycle. During the DEC2 cycle, if an interrupt is not being processed, the ADDRESS-COUNTER is loaded from whatever value is present on the RAM address bus, and the IL and NAR are loaded with whatever value is on the program RAM data bus. All these loads occur at the end of the clock cycle. Additionally, if an unconditional branch is being processed, the NAR is used to drive the RAM address bus. If a subroutine call is being processed, the NAR is used to drive the RAM address bus and the RS is written with the contents of the ADDRESS-COUNTER. If a subroutine exit is being processed, then the contents of the ADDRESS-LATCH register are used to drive the RAM address bus and the RP is incremented.

Each microcoded instruction must be at least two clock cycles long. Since the IL is a transparent latch that contains valid data before the end of a clock cycle, the opcode may be read from RAM during the DEC2 cycle and clocked into the MPC in the same clock cycle if desired. This means that the DEC2 cycle of one instruction may occur simultaneously with the DEC0 cycle of the next instruction.

In the instruction decoding process, the <u>next</u> instruction to be executed is being loaded into NAR and IL as the first micro-instruction of the <u>current</u> instruction is being executed. Use of the micro-operation DEST=DECODE allows changing the contents of the NAR, IL, and subroutine control bits during the middle of a microcoded word, just as if those registers had been loaded with the normal decoding sequence. The MVP-FORTH/32 word 0BRANCH and other words exploit this fact.

There are some micro-operations that, while prohibited under most circumstances, are essential for efficient program execution for special cases. Be very careful when exploiting these special cases, and do not rely on a single test to ensure correct operations, since some violations of usage rules manifest themselves as relatively infrequent random failures:

1) SOURCE=RAM will place the contents being fetched to the NAR and IL during the DEC2 cycle onto the data bus. This can be used to fetch a data cell instead of an instruction by using a subroutine call to the data cell. A manual subroutine exit function using a DEST=DECODE must then be performed.

2) SOURCE=ADDRESS-COUNTER may be used during the DEC2 cycle to fetch the contents about to be saved on the RS if the instruction being executed is <u>guaranteed</u> to be a subroutine call. This is accomplished by having a special compiling word for the microcoded word in the Forth kernel.

3) SOURCE=RS, DEST=RS, SOURCE=RP, DEST=RP may all be used during the DEC2 cycle if the instruction being executed is guaranteed to be an unconditional jump. This is accomplished by denoting the microcoded word as SPECIAL with the micro-assembler.

Micro-Instruction Processing

Each CPU/32 opcode is implemented as a series of two or more micro-instructions. Each opcode starts on the MRAM page number corresponding to the opcode number 0-511. Each opcode may take one to sixteen consecutive MRAM pages as required.

Within each page, the order of the micro-instructions is unimportant, except that the first micro-instruction on the opcode's first page must be located at offset 0. The micro-assembler assumes that instructions are to be processed in sequential order (i.e. 0,1,2,3,4,5,6,7) unless instructed otherwise with the JMP=xxx micro-instruction.

The JMP=xxx micro-instruction, where the "xxx" may be replaced with a large variety of binary bit patterns, allows non-sequential conditional branching within and between micro-program memory pages. As an example, consider the microcode sequence:

```
3 ::  ALU=A+1 DEST=DHI ;;
4 ::  ALU=A+1 DEST=DHI JMP=110 ;;
6 ::  ALU=A+1 DEST=DHI ;;
```

In this sequence, the characters "3 ::" replace the familiar ">>" which we have been using to load the MIR. Any number between 0 and 7 followed by a "::" begins a micro-instruction definition and sets the offset within the current micro-program memory page (set by the OPCODE: command described in part 3). The command ";;" replaces ";SET" and actually writes the micro-instruction to MRAM in the current page instead of to the MIR. In this example the DHI register is incremented three times, with non-sequential flow of control to MRAM offsets 3, 4, and 6. The "JMP=110" micro-operation specifies the lowest three bits of the next micro-instruction to be 110, which is 6 decimal. Other unconditional jump micro-operations are: JMP=000, JMP=001, ... , JMP=111.

Conditional jump micro-operations allow the lowest bit of the subsequent micro-instruction's address to be determined by a condition code, resulting in a two-way branch. For example:

```
0 :: ALU=A   DEST=DHI ;;
1 :: JMP=11S       DECODE ;;
6 :: ALU=0   DEST=DHI    END ;;
7 :: ALU=-1  DEST=DHI    END ;;
```

jumps from location 1 to location 6 if the ALU sign bit is 0 (binary offset 110) and location 7 if the ALU sign bit is 1 (binary offset 111). This microcoded word tests the DHI register and sets it to 0 if the DHI value is non-negative, but sets DHI to -1 if the initial DHI value is negative. Notice that there are two possible last micro-instructions for execution, both of which have an END micro-assembler directive.

During micro-program execution, the MPC/MRAM/MIR arrangement forms a two-stage micro-program pipeline. The micro-instruction to be executed next is being fetched while the MIR controls the system with the current micro-instruction. This means that conditional branching is accomplished using the condition code that was set at the end of the cycle before the branch is executed. This means that, in the above example, the JMP=11S acted on the value at the ALU output at the end of the previous micro-instruction (in this case, the micro-instruction at offset 0.)

Allowable microcode branches are:

| | | | |
|---|---|---|---|
| JMP=000 | JMP=001 | JMP=010 | JMP=011 |
| JMP=100 | JMP=101 | JMP=110 | JMP=111 |
| JMP=00Z | JMP=01Z | JMP=10Z | JMP=11Z |
| JMP=00C | JMP=01C | JMP=10C | JMP=11C |
| JMP=00S | JMP=01S | JMP=10S | JMP=11S |
| JMP=00L | JMP=01L | JMP=10L | JMP=11L |

see the section on condition codes for an explanation of the codes "Z", "C", "S", and "L".

In MVP-FORTH/32, each microcoded definition is defined to place the top of stack element in the DHI register (without using an arithmetic ALU operation) at the END micro-instruction of each word. That means that the very first micro-instruction of each word may execute a conditional branch using the Z or S condition on its very first micro-instruction.

Bus Source and Destination

In the preceding sections, we have been taking for granted the availability of micro-operations to designate bus sources and bus destinations. A maximum of one bus source (specified by a SOURCE=... micro-operation) may be enabled within any given micro-instruction. If no bus source is specified, the X! micro-assembler command may be used in single-step mode to drive the data bus. The SOURCE=HOST micro-operation explicitly specifies this same micro-operation. The micro-assembler word SOURCE=LATCH is a dummy operation to be used to explicitly give a source for the B side of the ALU, and must be used in the same micro-instruction as a SOURCE=DHI micro-operation.

One bus destination may also be specified within a micro-operation. As a special case, DEST=DLO may be used simultaneously with any other DEST=.... micro-operations due to the way DLO is implemented in hardware. The micro-assembler words DEST=LATCH and DEST=DHI are dummy operations for documentation purposes. This means that whatever data is on the bus may be used for the ALU B side input and be written to DHI as well as any other desired bus destination.

Part Three
DEVELOPMENT SOFTWARE

Introduction
Interactive Development
The Cross Compiler
Sealed Vocabulary
Exercising New Commands
Current Limitations
The Micro-Assembler
Defining Microcoded Definitions
Examples

Introduction

All software used to develop the WISC CPU/32 was written in MVP-FORTH. Any programming language with access to the host adapter card's 8 ports could have been used, but Forth's power and degree of control made it ideal for the task.

Interactive Development

The unique interactivity of Forth made possible the step-by-step development of the system software along with the CPU/32 hardware. Each part of the hardware was immediately tested with simple Forth functions in a single-stepping mode from the host computer. When the hardware implementation was complete, the necessary software also was essentially complete. The fully functional system could be immediately tested with this boot-strapped software.

The cross-compiler and micro-assembler are closely interrelated to each other as well as to the hardware. We have described the hardware first since understanding the hardware is essential to understanding the software beyond the high level Forth source code level of detail.

As was demonstrated in the hardware portion of this documentation, interactive testing using the single-step Slave mode of the CPU/32 is the best way to learn the system. In the case of other software, the best way to learn the use of the software is by experimenting with the functions of various words from the Forth interpreter.

The Cross Compiler

The cross-compiler is used by the host to generate a run-time, object code kernel on the CPU/32. It links primitives created by the micro-assembler with any required program structures and functions. When finished, an image of the first 32k bytes of RAM and all micro-program memory MRAM residing in the CPU/32 is saved by the host to Forth blocks on disk using the SAVE-ALL function. When performing a cold start, the LOAD-ALL function must be used to initialize the CPU/32's memory.

Sealed Vocabulary

The cross-compiler maintains a sealed vocabulary containing all the macro functions currently defined for the board. At the base of this dictionary are special cross-compiler words such as IF, ELSE, THEN, : (colon), and ; (semi-colon). After cross-compilation has started, words are added to this sealed vocabulary and are cross-compiled on the the CPU/32. Whenever the keyword CROSS-COMPILER is used, any word definitions, constants, variables, etc. will be compiled to the board.

Exercising New Commands

By entering the Forth word { (left brace,) the cross-compiler enters immediate-CPU/32-execution mode from the host. Any words subsequently typed in are searched for in the sealed vocabulary and, if found, are executed by the CPU/32. Numbers must be entered with a decimal point (32-bit integer in MVP-FORTH) to be correctly transferred to the CPU/32's data stack. As an example, from the host PC type in:

```
CROSS-COMPILER
{ 3. 6. + }     ( Displays START..END)
D.              ( Displays 9)
FORTH
```

"START.." and "END" are displayed for each word executed on the CPU/32 in this mode of operation. If execution freezes between these two displays, the execution of a cross-compiled word from the host has failed and the CPU/32 is hung. A soft reboot of the host PC is recommended.

The immediate execution mode works by building a special Forth word on the CPU/32 to execute the desired function, copying the data stack to the CPU/32, transferring control to the CPU/32 in Master mode, then stopping the CPU/32 and transferring back the resulting data stack. Entering the Forth word } (right brace) will leave the immediate execution mode and return to the cross-compiler. No colon definitions or other creation of dictionary entries should be attempted while between { and }.

Current Limitations

The current cross-compiler cannot keep track of the dictionary pointer, etc. on the CPU/32 if any changes are made to the dictionary by the CPU/32's kernel. This means that no cross-compiling or micro-assembly may be done after MVP-FORTH/32 has altered the dictionary in any way. This could be changed by modifying the cross-compiler to query key variables from the CPU/32 after each BYE command from MVP-FORTH/32.

Cross-compiled code should be kept to a minimum, because it is time-consuming and tricky to write. After a minimal kernel has been generated, the CPU/32 should do all further Forth compilation.

The Micro-Assembler

The micro-assembler is a tool to save the programmer from having to set all the bits for microcode by hand. It allows the use of mnemonics for setting the micro-operation fields in a micro-instruction and, for the most part, automatically handles the micro-instruction addressing scheme. The micro-assembler and cross-compiler are co-resident. They share routines for accessing the CPU/32's resources and the sealed host dictionary.

Caution: writing microcode is not for the faint of heart! When using microcode, you are directly controlling signals on the wires of the printed circuit boards. If your microcode does not work as expected, you should re-read the applicable portions of Part Two of this documentation. It may, in some exceptionally tricky cases, be necessary to consult with the hardware schematics to resolve a tough question about what the hardware will and will not do. Pay particular attention to the "limitation" sections in applicable documentation. Some timing constraint violations will not show up with complete consistency. We recommend that you test each new microcoded definition with a DO LOOP that executes at least ten million times, using worst-case (and/or random) data and checking for correct and consistent results.

Defining Microcoded Definitions

Part Two of this document goes into detail about the meanings of the various micro-operations that may be combined to make up each micro-instruction. This section covers how to actually run the micro-assembler to define microcoded words on the CPU/32.

The word OPCODE: starts all microcoded definitions. The input parameter is the page number (from 0 to 511 decimal) in which the opcode resides. For example, the word + is opcode 8. This means that whenever an 8 appears in an opcode field (which would look like 040xxxxx hex in a 32-bit word,) the word + will be executed while any concurrent subroutine call, subroutine exit, or unconditional branch is being processed. The character string after OPCODE: is the name of the opcode that will be added to the cross-compiler and CPU/32 dictionaries. It is the programmer's responsibility to ensure that two opcodes are not assigned to the same MRAM page.

The word ;;END signifies the end of the definition of a microcoded primitive. Its main purpose is to return to the cross-compiler vocabulary.

The variable CURRENT-OPCODE contains the MRAM page currently assigned by OP-CODE: . It may be changed using the Forth ! (store) word to facilitate multi-page definitions in conjunction with the INC[MPC] micro-operation.

The word :: (double colon) marks the start of the definition of a micro-instruction. The number before :: must be from 0 to 7, and signifies the offset from 0 to 7 within the current MRAM page for that micro-instruction. Micro-instructions may be defined within the page in any order desired. the word ";;" (double semi-colon) is used to end each micro-instruction definition and copy the assembled bit pattern to MRAM.

When single-stepping microcode via the MIR instead of loading MRAM, the word ">>" may be used instead of "0 ::" since the offset within a page is irrelevant. Additionally, the word ";SET" must be used instead of ";;" to direct the micro-instruction to the MIR instead of MRAM. The word ";DO" may be used instead of the sequence ";SET CYCLE".

Examples

At this point, the next step towards learning the CPU/32 is to read and understand the examples provided in the source code given in Appendices E through G. The single-stepping test code in Appendix G provides examples of about every conceivable way to route data around in the CPU/32.

Most custom microcoded words that are needed in applications can be created by simply copying one of the pre-defined words to a new source screen, changing the opcode number, and modifying the definition. As an example, the word ORC! differs from +! only in that the ALU=A+B function was changed to ALU=AorB, and that the RAM word accesses were changed to RAM-BYTE accesses.

APPENDIX A

Host Data Bus Interface

WRITE PORT ADDRESSES

```
300 WRITE0 - DATA BUS (AUTOMATICALLY SEQUENCED)
301 WRITE1 - MIR   (WRITE 4 TIMES JUST LIKE WRITE0)
302 WRITE2 - SINGLE STEP BOARD CLOCK
303 WRITE3 - START BOARD
304 WRITE4 - STOP BOARD
305 WRITE5 - SET DMA MODE
306 WRITE6 - RESET DATA BUS SEQUENCER & DMA MODE
307 WRITE7 - SERVICE REQUEST REG & INTERRUPT
```

READ PORT ADDRESSES

```
300 READ0 - DATA BUS  (AUTOMATICALLY SEQUENCED)
301 READ1 - MIR  (READ 4 TIMES JUST LIKE READ0)
302 READ2 - STATUS REGISTER (8 BITS)
303 READ3 -
304 READ4 -
305 READ5 -
306 READ6 -
307 READ7 -
```

Example Host Card Jumper Positions
("x" denotes jumper in place)

Hex Starting Port Address

| | 300 | 308 | 310 | 318 | 320 | 328 | 330 | 338 | 340 | 348 | etc. |
|---|---|---|---|---|---|---|---|---|---|---|---|
| J1 | x | . | x | . | x | . | x | . | x | . | |
| J2 | . | x | . | x | . | x | . | x | . | x | |
| J3 | x | x | . | . | x | x | . | . | x | x | |
| J4 | . | . | x | x | . | . | x | x | . | . | |
| J5 | x | x | x | x | . | . | . | . | x | x | |
| J6 | . | . | . | . | x | x | x | x | . | . | |
| J7 | x | x | x | x | x | x | x | x | . | . | |
| J8 | . | . | . | . | . | . | . | . | x | x | |
| J9 | x | x | x | x | x | x | x | x | x | x | |
| J10 | . | . | . | . | . | . | . | . | . | . | |
| J11 | . | . | . | . | . | . | . | . | . | . | |
| J12 | x | x | x | x | x | x | x | x | x | x | |
| J13 | . | . | . | . | . | . | . | . | . | . | |
| J14 | x | x | x | x | x | x | x | x | x | x | |

Example Memory Card Jumper Positions
("x" denotes jumper in place)

Memory card number

| | 0 | 1 | 2 | 3 | 4 | 5 | 6 | 7 | 8 | 9 | etc. |
|---|---|---|---|---|---|---|---|---|---|---|---|
| J0 | . | x | . | x | . | x | . | x | . | x | |
| J1 | x | . | x | . | x | . | x | . | x | . | |
| J2 | . | . | x | x | . | . | x | x | . | . | |
| J3 | x | x | . | . | x | x | . | . | x | x | |
| J4 | . | . | . | . | x | x | x | x | . | . | |
| J5 | x | x | x | x | . | . | . | . | x | x | |
| J6 | . | . | . | . | . | . | . | . | x | x | |
| J7 | x | x | x | x | x | x | x | x | . | . | |

APPENDIX B

Micro-Instruction Format Summary

Microcode Bit Assignments

| BOARD | #BITS | BITS | NAME | FUNCTION |
|---|---|---|---|---|
| INT | 4 | 0-3 | SRCx | BUS SOURCE SELECT |
| INT | 4 | 4-7 | DSTx | BUS DESTINATION SELECT |
| INT | 2 | 8-9 | DCTLx | DP COUNT CONTROL |
| INT | 2 | 10-11 | RCTLx | RP COUNT CONTROL |
| INT | 2 | 12-13 | SSELx | ALU MULTIPLEXER SHIFT CONTROL |
| INT | 1 | 14 | unused | -- MIR14 |
| INT | 1 | 15 | unused | -- MIR15 |
| DATA | 4 | 16-19 | ALUFx | ALU FUNCTION RAW INPUT |
| DATA | 1 | 20 | MODE | ALU MODE |
| DATA | 1 | 21 | CIN | ALU/SHIFT CARRY-IN |
| DATA | 2 | 22-23 | DSHx | DLO SHIFT/DEST CONTROL |
| ADDR | 3 | 24-26 | CONDx | CONDITION CODE SELECT BITS |
| ADDR | 2 | 27-28 | MADx | NEXT MICRO-ADDRESS CONSTANT BITS 1-2 |
| ADDR | 1 | 29 | INMPC | INCREMENT-MPC CONTROL |
| ADDR | 1 | 30 | NDECO | NOT-DECODE BIT |
| ADDR | 1 | 31 | INAD | INCREMENT ADDRESS COUNTER BIT |

Micro-Assembler Mnemonic Summary

| Micro-operation field | Value | Mnemonic |
|---|---|---|
| SRCx | 0 | SOURCE=HOST (default) |
| | 1 | SOURCE=DP |
| | 2 | SOURCE=DS |
| | 3 | SOURCE=DLO |
| | 4 | SOURCE=DHI |
| | 5 | MULTIPLY |
| | 6 | DIVIDE-SELECT |
| | 7 | SOURCE=FLAGS |
| | 8 | SOURCE=RP |
| | 9 | SOURCE=RS |
| | 10 | SOURCE=ADDRESS-COUNTER |
| | 11 | SOURCE=RAM |
| | 12 | SOURCE=RAM-BYTE |
| | 13 | SOURCE=MPC |
| | 14 | SOURCE=MRAM |
| | 15 | SOURCE=FPU (unimplemented) |
| DSTx | 0 | (default) no bus destination |
| | 1 | DEST=DP |
| | 2 | DEST=DS |
| | 3 | (unused) |
| | 4 | DEST=PAGE |
| | 5 | DEST=ADDRESS-LATCH |
| | 6 | DEST=STATUS |

| Micro-operation field | Value | Mnemonic |
|---|---|---|
| | 7 | DEST=FLAGS |
| | 8 | DEST=RP |
| | 9 | DEST=RS |
| | 10 | DEST=ADDRESS-COUNTER |
| | 11 | DEST=RAM |
| | 12 | DEST=RAM-BYTE |
| | 13 | DEST=DECODE |
| | 14 | DEST=MRAM |
| | 15 | DEST=FPU (unimplemented) |
| DCTLx | 0 | DEC[DP] |
| | 1 | INC[DP] |
| | 2 | no-op (default) |
| | 3 | unused |
| RCTLx | 0 | no-op (default) |
| | 1 | (unused) |
| | 2 | INC[RP] |
| | 3 | DEC[RP] |
| SSELx | 0 | (pass ALU unchanged) (default) |
| | 1 | SR[ALU] |
| | 2 | SL[ALU] |
| | 3 | ROLL[ALU] |
| (logical ALU functions Mode=1) | | |
| ALUFx | 0 | ALU=notA |
| | 1 | ALU=AnorB |
| | 2 | (unused) |
| | 3 | ALU=0 |
| | 4 | ALU=AnandB |
| | 5 | ALU=notB |
| | 6 | ALU=AxorB |
| | 7 | (unused) |
| | 8 | (unused) |
| | 9 | ALU=AxnorB |
| | 10 | ALU=B |
| | 11 | ALU=AandB |
| | 12 | ALU=-1 |
| | 13 | (unused) |
| | 14 | ALU=AorB |
| | 15 | ALU=A (default) |
| (arithmetic ALU functions Mode=0, CIN=0) | | |
| ALUFx | 0 | ALU=A+1 |
| | 1 | (unused) |
| | 2 | ALU=AornotB+1 |
| | 3 | (unused) |
| | 4 | (unused) |
| | 5 | (unused) |
| | 6 | ALU=A-B |
| | 7 | (unused) |
| | 8 | (unused) |
| | 9 | ALU=A+B+1 |

| Micro-operation field | Value | Mnemonic |
|---|---|---|
| | 10 | (unused) |
| | 11 | (unused) |
| | 12 | ALU=A+A+1 |
| | 13 | (unused) |
| | 14 | (unused) |
| | 15 | (unused) |
| (arithmetic ALU functions Mode=0, CIN=1) | | |
| ALUFx | 0 | ALU=A+0 |
| | 1 | (unused) |
| | 2 | ALU=A-B-1 |
| | 3 | (unused) |
| | 4 | (unused) |
| | 5 | (unused) |
| | 6 | ALU=A-B |
| | 7 | (unused) |
| | 8 | (unused) |
| | 9 | ALU=A+B+1 |
| | 10 | (unused) |
| | 11 | (unused) |
| | 12 | ALU=A+A+1 |
| | 13 | (unused) |
| | 14 | (unused) |
| | 15 | (unused) |
| CIN | 0 | CIN=0 (default for logical ALU operations) |
| | 1 | CIN=1 |
| DSHx | 0 | (no-op) (default |
| | 1 | SR[DLO] |
| | 2 | SL[DLO] |
| | 3 | DEST=DLO |
| CONDx | 0 | JMP=xx0 |
| | 1 | JMP=xxC |
| | 2 | JMP=xxZ |
| | 3 | JMP=xxS |
| | 4 | JMP=xxL |
| | 5 | (unused) |
| | 6 | (unused) |
| | 7 | JMP=xx1 |
| MADx | 0 | JMP=00x |
| | 1 | JMP=01x |
| | 2 | JMP=10x |
| | 3 | JMP=11x |
| INMPC | 0 | (no-op) (default) |
| | 1 | INC[MPC] |
| NDECO | 0 | DECODE |
| | 1 | (no-op) (default) |
| INAD | 0 | (no-op) (default) |
| | 1 | INC[ADC] |

APPENDIX C

Summary of Hardware Characteristics:

INSTRUCTION FORMAT:

Each instruction performs a simultaneous micro-coded primitive execution and a jump. The microcoded primitive starts at micro-code word offset 0 of the microcode page held in the op-code field. The address field contains the word address of the next instruction to be executed. The jump mode field controls whether the address field is a jump target, or whether a subroutine call (DOCOL) or subroutine return (EXIT) is to be performed.

In the case where the next instruction is at the next consecutive memory address, the JUMP mode is used with the address field of the instruction set appropriately. All instructions must be aligned on word boundaries

JUMP MODE FIELD:

```
BITS 0-1:  00 = JUMP (eliminates tail-end recursion)
                (also for jump to next sequential address)
           01 = Subroutine exit
           10 = Subroutine call
           11 = ILLEGAL
```

ADDRESS FIELD:

BITS 2-22: High 21 bits of the 23-bit address of jump destination. The low two bits of the address are assumed to be zero (i.e. aligned on a word boundary.)

OP CODE FIELD:

BITS 23-31: These 9 bits set the page register of the micro-program counter for the next op-code.

DECODING SEQUENCE

```
CYCLE     ACTION
DEC0      Clock interrupt register near falling clock edge
          Clock micro-program counter at end of clock cycle

DEC1      Increment address counter on rising clock edge
          Enable next address register outputs to RADxx
          IF  EXIT, then clock Ram Address Latch from RS
              and enable RAL outputs instead of
              Next Addr Reg      ENDIF
          IF  CALL then decrement RP  ENDIF

DEC2      (Note: DEC2 from one instruction may occur simul-
             taneously with DEC0 of the next instruction)
          Enable Next Addr Reg outputs to RADxx
          IF  EXIT, then enable RAL outputs and increment RP
                    ENDIF
          IF  CALL, then write address counter to RS on
                    rising clock edge  ENDIF
          IF  no interrupt, then clock next address register,
                    next address register, and instruction latch
                    ENDIF
          Clock address counter from address bus
```

INTERRUPT HANDLING ACTIONS

If an interrupt occurs, then the MPC is loaded with a reference to instruction # 1 (interrupt handler) on DECO. Also, EXIT and CALL are inhibited during this clock cycle. The interrupt handling micro-instruction is expected to save the contents of the next address register, the page register, and the instruction latch, and set the interrupt mask bit. IMPORTANT: The interrupt handling word must wait one clock cycle after setting the interrupt mask before doing its own DECODE!!!

Since the next address register is not clocked if an interrupt is in progress, the next address register, instruction latch, and page register all contain the data of the instruction that was about to be executed when the interrupt occurred.

INTERRUPT FLAGS

| BIT | CONTENTS |
|---|---|
| 24 | DATA STACK POINTER ERROR |
| 25 | RETURN STACK POINTER ERROR |
| 26 | HOST SERVICE REQUEST (HOST WROTE TO SERVICE REQ REG) |
| 27 | DYNAMIC RAM PARITY ERROR (UNIMPLEMENTED) |
| 28 | Software interrupt #2 |
| 29 | Software interrupt #1 |
| 30 | Software interrupt #0 |
| 31 | INTERRUPT MASK (1=ENABLE 0=MASK) |

SUMMARY OF IMPORTANT MICROCODING RESTRICTIONS

1) In general, never use the RS or RP during the first or last micro-instruction of a word.

2) Never route the RS or RAM through the ALU in a single clock cycle.

3) Never route RS to or from RAM data directly.

4) Wait one clock cycle before using RAM after setting ADDRESS-LATCH from the RS.

5) Always use a DECODE on the next to last micro-instruction executed and an END on the last micro-instruction executed in each definition.

6) Never use an arithmetic ALU operation on the last micro-operation of a word.

7) Never use a JMP=xxZ micro-operation immediately following an ALU arithmetic operation.

BEST AVAILABLE COPY

MAIL ROOM

P.K.
11/8/90

APPENDIX D

~~DRAWINGS~~

~~WITH SIGNAL NAME DOCUMENTATION~~

Signal Descriptions for HOST Board
("*" indicates inter-board connection)

| NOTATION | SIGNAL DESCRIPTION |
|---|---|
| AEN | PC-Bus address enable (active low) |
| ALE | PC-Bus address latch enable -- used to latch PCAx |
| DIR | INTxx transceiver direction HI=host->CPU/32 |
| DMA | DMA mode |
| INT0 * | Inter-box data bus (from host interface |
| ..... * | .. card to CPU/32) bits 0-31 |
| INT31 * | .. |
| MASTR | Master mode |
| NCYCL | NOT-clock cycle request to CPU/32 |
| NDMA | NOT-DMA mode |
| NDMC | NOT-DMA cycle clock request |
| NDMIR | NOT-Destination MIR signal to CPU/32 |
| NIOR | PC-Bus NOT-I/O read signal |
| NIOW | PC-Bus NOT-I/O write signal |
| NMAST | NOT-master mode |
| NPCDK | PC-Bus NOT-DMA Acknowledge (DMA channel 3) |
| NRD0 | NOT-read from I/O port offset 0 |
| NRD1 | NOT-read from I/O port offset 1 |
| NRD2 | NOT-read from I/O port offset 2 |
| NREF | PC-Bus NOT-refresh signal (DACK0 for RAM refresh) |
| NRES | NOT-power on reset |
| NSEL | NOT-board select |
| NSEL0 | NOT-Select INTxx data bits (0-7) to/from PC |
| NSEL1 | NOT-Select INTxx data bits (8-15) to/from PC |
| NSEL2 | NOT-Select INTxx data bits (16-23) to/from PC |
| NSEL3 | NOT-Select INTxx data bits (24-31) to/from PC |

| | |
|---|---|
| NSMIR | NOT-Source MIR signal to CPU/32 |
| NWR0 | NOT-write to I/O port offset 0-7 |
| ..... | .. |
| NWR7 | .. |
| NXENB | NOT-enable transceiver to PC data bus |
| NXRD0 | NOT-intermediate read 0 (conditioned to form NRD0) |
| NXWR0 | NOT-intermediate write 0 (conditioned to form NWR0) |
| PC0 | Internally buffered 8-bit pc data bus |
| ..... | .. |
| PC7 | .. |
| PCA0 | PC-Bus address bits -- used for I/O port selection |
| ..... | .. (Direct from PC-bus) |
| PCA9 | .. |
| PCAD0 | PC address for read/write port offset decoding |
| ..... | .. |
| PCAD2 | .. |
| PCD0 | PC-Bus data bits |
| ..... | .. |
| PCD7 | .. |
| PCDRQ | PC-Bus DMA Request from board (DMA channel 3) |
| PCIOR | I/O Read in progress |
| PCIOW | I/O Write in progress |
| PCRES | PC-Bus reset signal (active high) |
| PCTC | PC-Bus terminal count |
| PULLX | 4.7K Ohm pull-up resistor |
| XNCYC * | Inter-box signal for NCYCL |
| XDIR * | Inter-box signal for DIR |
| XNDMR * | Inter-box signal for NDMIR |
| XNDSV * | Inter-box signal for NDSRV |
| XNMAS * | Inter-box signal for NMAST |
| XNREF * | Inter-box signal for NREF |
| XNSMR * | Inter-box signal for NSMIR |
| XNSST * | Inter-box signal for NSSTA |

Signal Descriptions for INT Board
("*" indicates inter-board connection)

| NOTATION | SIGNAL DESCRIPTION |
|---|---|
| ALU31 * | ALU31 highest bit for sign conditional branching From ALU board |
| BUS0 * | System data bus (32 bits) |
| ... | |
| BUS31 * | ... |

| | | |
|---|---|---|
| CLOCK | * | SYSTEM CLOCK |
| DCTL0 | | Data stack pointer control bit 0 from MIR |
| DCTL1 | | Data stack pointer control bit 1 from MIR |
| DLOLO | * | Lowest bit from DLO register from ALU board |
| DP0 | | Data stack pointer |
| ..... | | .. |
| DP11 | | .. |
| DST0 | | Bus destination control select from MIR |
| ..... | | .. |
| DST3 | | |
| DVOSC | | Divided crystal frequency |
| FASTC | * | System clock that is a few nano-seconds ahead of CLOCK for use with RAM writes and latch clocking |
| INT0 | * | Inter-box data bus (from host interface |
| ..... | * | .. card to CPU/32) bits 0-31 |
| INT31 | * | .. |
| MAD0 | * | MICROADDR0 MICROCODE RAM ADDRESS |
| ..... | * | ... |
| MAD11 | * | MICROADDR11 |
| MASTR | | Master mode |
| MIRCK | * | MIR register clock signal |
| MRXDR | * | Micro-instruction to bus xceiver direction |
| NACOT | * | NOT-ALU caryy out from ALU board |
| NALU0 | * | NOT-ALU=0 from DATA to ADDR boards |
| NBYTE | * | NOT-byte access control |
| NCKFP | * | NOT-cycle FPU clock |
| NCSMR | * | NOT-chip select for MRAM |
| NCYCL | | NOT-clock cycle request from host |
| NDADC | * | NOT-DEST ADDRESS-COUNTER |
| NDDEC | * | NOT-DEST decode |
| NDDP | | NOT-DEST DP |
| NDDS | | NOT-DEST DS |
| NDFLG | * | NOT-DEST INTERUPT FLAGS |
| NDFPU | * | NOT-bus destination FPU & cycle FPU clock |
| NDIV | * | NOT DIVIDE-SELECT |
| NDMA | * | NOT-DMA transfer mode |
| NDMIR | | NOT-Destination MIR signal from host to CPU/32 |

| | | |
|---|---|---|
| NDMRA | | NOT-DEST MRAM |
| NDPAG | * | NOT-DEST RAM ADDRESS PAGE REGISTER |
| NDPER | * | NOT-Data stack pointer overflow/underflow |
| NDRAL | * | NOT-DEST RAM-ADDRESS-LATCH |
| NDRB | * | NOT-DEST RAM-BYTE |
| NDRP | | NOT-DEST RP |
| NDRS | * | NOT-DEST RS |
| NDRW | * | NOT-DEST RAM-WORD |
| NDSRV | | NOT-Destination service request register (loading signal from host) |
| NDSTA | | NOT-DEST STATUS REGISTER |
| NDSWE | | NOT-DS RAM chip write enable |
| NDSXE | | NOT-DS to bus transceiver enable |
| NHOST | * | NOT-host interrupt |
| NINTR | | NOT-interrupt to PC HOST when dest=host request |
| NMAST | | NOT-master mode |
| NMRXE | * | NOT-micro-instruction to data bus xceiver enable |
| NMULT | * | NOT MULTIPLY-SELECT |
| NPCEN | * | NOT-enable PC to bus xceiver from host |
| NREF | * | NOT-refresh command from host for DRAMs |
| NRPEN | * | NOT-Return stack count up/down enable |
| NRPER | * | NOT-Return stack pointer over/underflow |
| NRSWE | * | NOT-RS write enable for stack RAM chips |
| NRSCS | * | NOT-RS chip select for return stack RAM chips |
| NRSXE | * | NOT-RS to bus xceiver enable |
| NSADC | * | NOT-SOURCE ADDRESS-COUNTER |
| NSDHI | * | NOT-SOURCE DHI & HOLD B-SIDE ALU LATCH |
| NSDLO | * | NOT-SOURCE DLO |
| NSDP | | NOT-SOURCE DP |
| NSDS | | NOT-SOURCE DS |
| NSFLG | * | NOT-SOURCE SERVICE REQUEST (0-7) /INTERRUPT FLAGS(24-31) |
| NSFPU | * | NOT-bus source FPU |
| NSMIR | * | NOT-bus source MIR |
| NSMPC | * | NOT-SOURCE MPC |
| NSMRA | | NOT-SOURCE MRAM |
| NSPC | | NOT-SOURCE PC -- host data buffer to bus |
| NSRB | * | NOT-SOURCE RAM-BYTE |
| NSRP | * | NOT-SOURCE RP |
| NSRS | * | NOT-SOURCE RS |
| NSRW | * | NOT-SOURCE RAM-WORD |
| NSSTA | | NOT-Source Status register from CPU/32 to host |

```
NWAIT *   NOT-Open collector clock cycle wait request
                    for use by slow memories

NWMRA *   NOT-write MRAM conditioned
            write-enable signal to MRAM memory CHIPS

OSC   *   Clock frequency without cycling/waiting inhibits

PULLG     4.7K Ohm pullup resistor

RALCK *   RAM address latch clock
          -- conditioned for DMA transfers.

RCTL0 *   RS control bit from MIR
RCTL1 *   RS control bit from MIR

RP0       RETURN STACK POINTER BITS 0-11
.....     ..  Up to 4K bytes of addressability
RP11      ..

RPUP  *   Return pointer up/not-down control bit

RS0   *   Return stack data bus
..... *   ..
RS31  *   ..

RSXC  *   RS bus transceiver direction control

SPL0  *   GND
SPL1  *   +5v

SRC0      Bus source control from MIR
.....     ..
SRC3      ..

SSEL0 *   ALU shift selection control from MIR to ALU board
SSEL1 *   ...

XCLK  *   system clock bus version (inverted)

XNCYC *   Inter-box signal for NCYCL
XNDMA *   Inter-box signal for NDMA
XNDMR *   Inter-box signal for NDMIR
XNDSV *   Inter-box signal for NDSRV
XNINT *   Inter-box signal for NINTR
XNMAS *   Inter-box signal for NMAST
XNPCE *   Inter-box signal for NPCEN
XNREF *   Inter-box signal for NREF
XNSMR *   Inter-box signal for NSMIR
XNSST *   Inter-box signal for NSSTA
```

Signal Descriptions for DATA Board
("*" indicates inter-board connection)

| NOTATION | SIGNAL DESCRIPTION |
|---|---|
| ALU0 | ALU outputs (from ALU into multiplexor) |
| ..... | ... |
| ALU30 | ... |
| ALU31 * | ... |
| ALUF0 | Raw ALU function inputs from MIR |
| ..... | .. (inverted & conditioned to form FUNCx) |
| ALUF3 | |
| ALUX0 | X carry-lookahead signal from ALU(0 - 3) |
| ALUX1 | X carry-lookahead signal from ALU(4 - 7) |
| ALUX2 | X carry-lookahead signal from ALU(8 -11) |
| ALUX3 | X carry-lookahead signal from ALU(12-15) |
| ALUX4 | X carry-lookahead signal from ALU(16-19) |
| ALUX5 | X carry-lookahead signal from ALU(20-23) |
| ALUX6 | X carry-lookahead signal from ALU(24-27) |
| ALUX7 | X carry-lookahead signal from ALU(28-31) |
| ALUY0 | Y carry-lookahead signal from ALU(0 - 3) |
| ALUY1 | Y carry-lookahead signal from ALU(4 - 7) |
| ALUY2 | Y carry-lookahead signal from ALU(8 -11) |
| ALUY3 | Y carry-lookahead signal from ALU(12-15) |
| ALUY4 | Y carry-lookahead signal from ALU(16-19) |
| ALUY5 | Y carry-lookahead signal from ALU(20-23) |
| ALUY6 | Y carry-lookahead signal from ALU(24-27) |
| ALUY7 | Y carry-lookahead signal from ALU(28-31) |
| BUS0 * | System data bus (32 bits) |
| ... | ... |
| BUS31 * | ... |
| CIN | ALU Carry-in bit for ALU from MIR |
| CKDHI | Clock DHI register |
| CLOCK * | system clock |
| DLOHI | High shift out bit of DLO register |
| DLOLO * | Low shift out bit of DLO register |
| DSH0 | DLO Shift control bit 0 from MIR |
| DSH1 | DLO Shift control bit 1 from MIR |
| FASTC * | FASTCLOCK |
| FUNC0 | ALU 74181 function & mode inputs |
| ..... | ... (conditioned for division as required) |
| FUNC3 | ... |
| LATEN | Enable transparent latch on B-side ALU input (pass bus data through to ALU) |
| MAD0 * | MICROADDR0 MICROCODE RAM ADDRESS |
| ..... | ... |
| MAD11 * | MICROADDR11 |

| | | |
|---|---|---|
| MIRCK | * | MIR clock |
| MODE | | ALU mode select from MIR |
| MRXDR | * | Micro-instruction to data bus xceiver direction |
| NALU0 | * | NOT-ALU = zero for condition code |
| NACOT | * | NOT-ALU carry out for condition code |
| NCIN0 | | NOT-ALU Carry-in bit for ALU (0-3) |
| NCIN1 | | NOT-ALU Carry-in bit for ALU (4-7) |
| NCIN2 | | NOT-ALU Carry-in bit for ALU (8-11) |
| NCIN3 | | NOT-ALU Carry-in bit for ALU (12-15) |
| NCIN4 | | NOT-ALU Carry-in bit for ALU (16-19) |
| NCIN5 | | NOT-ALU Carry-in bit for ALU (20-23) |
| NCIN6 | | NOT-ALU Carry-in bit for ALU (24-27) |
| NCIN7 | | NOT-ALU Carry-in bit for ALU (28-31) |
| NCSMR | * | NOT-chip select for MRAM |
| NDIV | * | NOT DIVIDE-SELECT |
| NMRXE | * | NOT-micro-instruction to data bus xceiver enable |
| NMULT | * | NOT MULTIPLY-SELECT |
| NSDHI | * | NOT-SOURCE DHI & HOLD B-SIDE ALU LATCH |
| NSDLO | * | NOT-SOURCE DLO |
| NSMIR | * | NOT-bus source MIR |
| NWMRA | * | NOT-write MRAM conditioned write-enable signal to MRAM memory CHIPS |
| PULLA | | 4.7 K-ohm Pull-up resistor |
| PULLB | | 4.7 K-ohm Pull-up resistor |
| SLIN | | DLO shift left input bit |
| SPL0 | * | GND |
| SPL1 | * | +5v |
| SRIN | | Multiplexor shift right input for ALU multiplexor. |
| SSEL0 | * | Multiplexor selection bit 0 from MIR |
| SSEL1 | * | Multiplexor selection bit 1 from MIR |
| XCLK | * | system clock bus version (inverted) |

Signal Descriptions for ADDR Board
("*" indicates inter-board connection)

| NOTATION | SIGNAL DESCRIPTION |
|---|---|
| ACIN1 | Address counter carry-in for bits (10-17) |
| ACIN2 | Address counter carry-in for bits (18-22) |
| ADCEN | Address counter count enable from MIR |
| ALU31 * | Sign bit from ALU output |
| BUS0 * | System data bus (32 bits) |
| ... | |
| BUS31 * | ... |
| BYTE | Signifies that byte RAM accessing is being used |
| CALL | Subroutine Call being processed during decode |
| CKLRD | Clock low 2 bits of RAM data to form CALL/EXIT bits |
| CLOCK * | System clock |
| CLOKB * | System clock -- Second copy for fanout control |
| COND0 | Condition code multiplexor control bits |
| ..... | .. from micro-instruction |
| COND2 | .. |
| DC12 | Decode cycle 1 or 2 -- debounced DEC1 OR DEC2 |
| DEC0 | Decode cycle 0 -- "DECODE" microcycle |
| DEC1 | Decode cycle 1 -- "END" microcycle |
| DEC2 | Decode cycle 2 -- 1st cycle of next opcode |
| DLOLO * | Low shift out bit of DLO register |
| EXIT | Subroutine exit being processed during decode |
| FASTC * | FASTCLOCK |
| INAD | Address counter increment control bit from MIR |
| INMPC | Increment MPC microcode control bit from MIR |
| INTR | Interrupt service required (used during Decode 0) |
| MAD0 * | Condition code select next-microaddress bit |
| MAD1 * | Next micro-address bit 1 from MIR |
| MAD2 * | Next micro-address bit 2 from MIR |
| MAD3 * | Next micro-address |
| ..... * | |
| MAD11 * | .. |
| MIRCK * | MIR clock |
| MPD3 | Micro-program counter data input bus |
| ..... | .. |
| MPD11 | .. |

MRXDR * Micro-instruction to data bus xceiver direction

NACOT * NOT-ALU carry out condition code bit

NADOE NOT-address counter output enable

NALU0 * NOT-ALU equal to zero condition code bit

NBYTE NOT-Signifies byte RAM accessing is being used

NCAL2 NOT CALL activated only during DEC2 cycle
NCALL NOT-currently processing a CALL command during decode (subroutine return address stored to return stack.)

NCKFP * NOT-cycle FPU clock

NCSMR * NOT-chip select for MRAM

ND2CK NOT-decode 2 clock for IL and NAR

NDADC * NOT-DEST ADDRESS-COUNTER
NDADD NOT-DEST address latch (activated either for direct write to address latch or for pass-thru to address counter).
NDDEC * NOT-DEST DECODE (simulates decoding of instruction and loads next address register & instruction latch.)

NDEC0 NOT-zeroth cycle of decode from MIR
NDEC1 NOT-1st cycle of decode
NDEC2 NOT-2nd cycle of decode (may correspond with the next NDEC0)

NDFLG * NOT-DEST INTERUPT FLAGS
NDFPU * NOT-bus destination FPU & cycle FPU clock
NDMA * NOT-DMA transfer mode
NDPAG * NOT-dest page register NDPER * NOT-Data stack pointer over/underflow NDRAL * NOT-DEST RAM-ADDRESS-LATCH
NDRB * NOT-DEST RAM-BYTE
NDRS * NOT-DEST RS
NDRW * NOT-DEST RAM-WORD NEX1 NOT-EXIT activated during DEC1 cycle
NEXIT NOT-currently processing an EXIT command during decode (subroutine return address fetched from return stack)

NHOST * NOT-host service request interrupt

NINTR NOT-interrupt pending (for Decode 0)

NLDAD NOT-load address counter

NMRXE * NOT-micro-instruction to data bus xceiver enable

NPRTY * NOT-RAM parity error (open collector)

NRAM * NOT-activate ram data xceivers to ram data bus

```
RLOE      NOT-RAM address latch output enable

RPER *    NOT-Return stack pointer over/underflow
RPEN *    NOT-Return stack count up/down enable

RSCS *    NOT-RS chip select for return stack RAM chips
RSWE *    NOT-RS write enable for stack RAM chips
RSXE *    NOT-RS to bus xceiver enable

RXEH      NOT-RAM to data bus xceiver enable for bits (8-31)

SADC *    NOT-SOURCE ADDRESS-COUNTER
SFLG *    NOT-SOURCE SERVICE REQUEST (0-7)
                    /INTERRUPT FLAGS(24-31)
SFPU *    NOT-bus source FPU
SMIR *    NOT-bus source MIR
SMPC *    NOT-SOURCE MPC
SRB  *    NOT-SOURCE RAM-BYTE
SRS  *    NOT-SOURCE RS
SRW  *    NOT-SOURCE RAM-WORD

WMRA *    NOT-write MRAM conditioned
            write-enable signal to MRAM memory CHIPS

SC   *    (undivided crystal frequency)

ULLD      4.7K pull-up resistor
ULLE      4.7K pull-up resistor
ULLF      4.7K pull-up resistor
ULLG      4.7K pull-up resistor

AD0  *    RAM address bus fed to RAM boards
.... *    ...
AD31 *    ...

ALCK *    RAM address latch clock -- conditioned for DMA
          addressing and latch loading/flow-through.  Note: latch
          becomes transparent when this signal is high.

CTL0 *    RS control bit from MIR
CTL1 *    RS control bit from MIR

D0   *    Ram data bus to/from ram boards &
....      ...  to next address register
D31  *    ...

PUP  *    Return pointer up/not-down control bit

S0   *    Return stack data bus
.... *    ..
S31  *    ..

SXC  *    RS bus transceiver direction control

PL0  *    GND
PL1  *    +5v

CLK  *    system clock bus version (inverted)
```

Signal Descriptions for MEM Board
("*" indicates inter-board connection)

| NOTATION | | SIGNAL DESCRIPTION |
|---|---|---|
| AD0 | | Internal RAM address bus on this board |
| ..... | | .. (Buffered from other boards by transmitters) |
| AD14 | | .. |
| CLOCK | * | system clock |
| D0 | | Internal RAM data bus on this board |
| ..... | | .. (isolated from other boards by xceivers) |
| D31 | | .. |
| NBDSL | | NOT-board select based on address jumpers |
| NDRB | * | NOT-DEST RAM-BYTE |
| NDRW | * | NOT-DEST RAM-WORD |
| NENB0 | | NOT-enable RAM bank 0 |
| NENB1 | | NOT-enable RAM bank 1 |
| NENB2 | | NOT-enable RAM bank 2 |
| NENB3 | | NOT-enable RAM bank 3 |
| NOE | | NOT-output enable for RAM chips |
| NRAM | * | NOT-RAM data xceiver enable for all RAM boards |
| NWE0 | | NOT-write enable bits (0-7) of active RAM bank |
| NWE1 | | NOT-write enable bits (8-15) of active RAM bank |
| NWE2 | | NOT-write enable bits (16-23) of active RAM bank |
| NWE3 | | NOT-write enable bits (24-31) of active RAM bank |
| RAD0 | * | RAM address bus from ADDR board |
| ..... | * | .. |
| RAD30 | * | .. |
| RD0 | * | Ram data bus to/from ram boards & |
| ..... | * | ... to next address register |
| RD31 | * | ... |
| SPL0 | * | GND |
| SPL1 | * | +5v |
| XCLK | * | system clock bus version (inverted) |

What we claim is:

1. A writable instruction set computer comprising:

data bus means for transferring data having a predetermined number of bits;

addressable and writable main program memory means coupled to said data bus means for storing macrocode, including instructions having the predetermined number of bits, and for storing data from and loading stored data onto said data bus means;

memory address logic means coupled to said data bus means and said main program memory means for addressing said main program memory means;

addressble and writable micro-program memory means coupled to said main program memory means for storing microcode instructions addressed by the macrocode instructions;

arithmetic logic unit (ALU) means coupled to said data bus means for performign operations on data received from said data bus means as defined by the microcode stored in said micro-program memory means;

data stack memory means coupled to said data bus means for storing data received from said data bus means for use during program execution;

return stack memory means physically separate from said main memory means, and coupled to said data bus means and to said memory address logic means for storing subroutine return address used during program execution, said memory address logic means addressing said main program memory means with the subroutine return address stored in said return stack memory means while said ALU means performs operations on data transferred from said data stack memory means on said data bus means;

clock means for generating a cyclic clock signal; and execution control logic means coupled to said micro-program memory means, ALU means, data stack memory means, return stack memory means, data bus means, and clock means for executing the microcode instructions, including performing only one data transfer on said data bus means for each clock signal cycle;

said data bus means providing only one communication path for transferring bidirectionally data between said ALU means, said data stack memory means and said main program memory means.

2. A computer according to claim 1 wherein said main program memory means stores each instruction as the combination of an opcode and a main program memory address.

3. A computer according to claim 2 wherein said address included in said instruction comprises the address of the location of the succeeding instruction in said main program memory.

4. A computer according to claim 3 wherein said execution control logic means is further for executing the operation specified by the opcode of a current macrocode instruction while, simultaneously with the operation executing, said memory address logic means fetches the macrocode instruction corresponding to the address included in the current macrocode instruction.

5. A computer according to claim 4 wherein said main program memory means further stores for a machine language program instruction, an indicator indicating whether the succeeding operation is a subroutine return, and said memory address logic means is further responsive to address information received from said stack memory means for executing a subroutine return simultaneously with the executing of the current operation, when the indicator indicates that the next operation is a subroutine return.

6. A computer according to claim 5 wherein said main program memory means stores a condition code having one of a plurality of values including a predetermined value, and a macrocode instruction comprises a conditional branch opcode requiring execution of a subroutine call if the value of the condition code is the predetermined value, and a subroutine call address, said memory address logic means further executing the subroutine call while said execution control logic means executes the conditional branch opcode, said memory address logic means being responsive to said execution control logic means for aborting the execution of the subroutine call if the value of the condition code is not the predetermined value.

7. A computer according to claim 1 wherein said ALU means comprises first and second input ALU ports and an output ALU port, said computer further comprising transparent latch means having an input latch port coupled to said data bus means and an output latch port coupled to said first input ALU port, said latch means being controllable for either transferring data input on said input latch port to said output latch port or retaining data input on said input latch port without it appearing on said output latch poret, and data register means having a register input port coupled to to said output ALU port and a register output port coupled to said second input ALU port and to said data bus means, said transparent latch means being for storing temporarily data received from said data bus means while data stored in said data register means is output to said data bus means.

8. A computer according to claim 1 wherein each macrocode instruction includes an opcode, and further comprising:

data stack pointer means coupled to said data bus means and said data stack memory means for only storing one pointer pointing to an element in said data stack memory mean,s wherein said execution control logic means is further for setting the pointer to point to any element in said data stack memory means without altering the contents of said stack memory means, the one pointer being the only means for accessing an element in said data stack memory means; and interrupt means coupled to said execution control logic means, and responsive to interrupt signals for generating an interrupt opcode when an interrupt signal indicates that the program execution is to be interrupted;

said execution control logic means being responsive to the interrupt opcode for itnerrupting program execution by isnerting the interrupt opcode in place of the next macrocode opcode, and thereby interrupting the program execution only when a next macrocode opcode is to be executed by said execution control logic means, said execution control logic means further controlling execution of the macrocode such that the pointer stored in said data stack pointer means is set to point to a predetermined data stack element prior to executing each new macrocode opcode, whereby the pointer can be changed to point to different data stack elements during execution of a macrocode opcode without altering the contents of said data stack memory means.

9. A writable instruction set computer comprising:

bus means;

addressable and writable main program memory means coupled to said bus means for storing macrocode including opcodes, and data, and for loading stored data onto said bus means;

memory address logic means coupled to said bus means and said main program memory means for addressing said main program memory means;

addressable and writable micro-program memory means coupled to said main program memory means for storing microcode addressed by the macrocode opcodes;

arithmetic logic unit (ALU) means coupled to said bus means for performing operations on data from said bus means as defined by microcode stored in said micro-program memory means;

data stack memory means coupled to said bus means for storing data used during opcode execution;

execution control logic means coupled to said main program memory means, said bus means and said micro-program memory means, and responsive to instructions received from said main program memory means for executing the macrocode;

data stack pointer means coupled to said bus means and said data stack memory means for only storing one pointer pointing to an element in said data stack memory means, wherein said execution control logic means is further for setting the pointer to point to any element in said data stack memory means without altering the contents of said data stack memory means, the one poitner being the only means for accessing an element in said data stack memory means; and interrupt means coupled to said execution control logic means, and responsive to interrupt signals for generating an interrupt opcode when an interrupt signal indicates that the program execution is to be interrupted;

said execution control logic means bieng responsive to the itnerrupt opcode for interrupting program execution by inserting the interrupt opcode in place of the next macrocode opcode, and thereby interrupting the program execution only when a next macrocode opcode is to be executed by said execution control logic means, said execution control logic means further controlling execution of the macrocode such that the pointer stored in said data stack pointer means is set to point to a predetermined data stack element prior to executing each new macrocode opcode, whereby the pointer can be changed to point to different data stack elements during execution of a macrocode opcode without altering the contents of said data stack memory means.

* * * * *